US012632319B2

(12) United States Patent
Palermo et al.

(10) Patent No.: US 12,632,319 B2
(45) Date of Patent: May 19, 2026

(54) SYSTEMS, APPARATUS, AND METHODS TO CONFIGURE HARDWARE BASED ON APPLICATION RATIOS

(71) Applicant: Intel Corporation, Santa Clara, CA (US)

(72) Inventors: Stephen Palermo, Chandler, AZ (US); Neelam Chandwani, Portland, OR (US); Kshitij Doshi, Tempe, AZ (US); Chetan Hiremath, Portland, OR (US); Rajesh Gadiyar, Chandler, AZ (US); Udayan Mukherjee, Portland, OR (US); Daniel Towner, Somerset (GB); Valerie Parker, Portland, OR (US); Shubha Bommalingaiahnapallya, East Brunswick, NJ (US); Rany ElSayed, Folsom, CA (US); William K. Rollender, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 17/922,277

(22) PCT Filed: Mar. 26, 2021

(86) PCT No.: PCT/US2021/024492
§ 371 (c)(1),
(2) Date: Oct. 28, 2022

(87) PCT Pub. No.: WO2021/242388
PCT Pub. Date: Dec. 2, 2021

(65) Prior Publication Data
US 2023/0205606 A1    Jun. 29, 2023

Related U.S. Application Data

(60) Provisional application No. 63/032,045, filed on May 29, 2020, provisional application No. 63/087,060, filed on Oct. 2, 2020, provisional application No. 63/113,733, filed on Nov. 13, 2020, provisional application No. 63/113,734, filed on Nov. 13, 2020.

(51) Int. Cl.
*G06F 9/50* (2006.01)

(52) U.S. Cl.
CPC .......... *G06F 9/5094* (2013.01); *G06F 9/5044* (2013.01); *G06F 9/505* (2013.01)

(58) Field of Classification Search
None
See application file for complete search history.

(56) References Cited

U.S. PATENT DOCUMENTS

| 9,075,614 | B2 | 7/2015 | Fetzer et al. |
| 2007/0033425 | A1 | 2/2007 | Clark |

(Continued)

FOREIGN PATENT DOCUMENTS

| KR | 10-2016-0085892 | | 7/2016 |
| WO | 2021242388 | A1 | 12/2021 |

OTHER PUBLICATIONS

International Searching Authority, "International Search Report and Written Opinion," mailed in connection with International Patent Application No. PCT/US2021/024492 on Jul. 16, 2021, 11 pages.

(Continued)

*Primary Examiner* — Eric C Wai
(74) *Attorney, Agent, or Firm* — Hanley, Flight & Zimmerman, LLC

(57) ABSTRACT

Systems, apparatus, and methods to workload optimize hardware are disclosed herein. An example apparatus includes power control circuitry to determine an application ratio based on an instruction to be executed by one or more cores of a processor to execute a workload, and configure, before the execution of the workload, at least one of (i) the one or more cores of the processor based on the application ratio or (ii) uncore logic of the processor based on the application ratio, and execution circuitry to execute the workload with the at least one of the one or more cores or the uncore logic.

23 Claims, 74 Drawing Sheets

(56)                 References Cited

U.S. PATENT DOCUMENTS

| | | |
|---|---|---|
| 2013/0232368 A1 | 9/2013 | Fetzer |
| 2014/0068290 A1 | 3/2014 | Bhandaru et al. |
| 2014/0122689 A1 | 5/2014 | Park et al. |
| 2015/0268710 A1 | 9/2015 | Bose et al. |
| 2016/0179163 A1 | 6/2016 | Haider et al. |
| 2016/0239074 A1 | 8/2016 | Lee et al. |
| 2017/0206118 A1 | 7/2017 | Theren et al. |
| 2018/0349168 A1 | 12/2018 | Ahmed |
| 2019/0012200 A1 | 1/2019 | Wilkerson et al. |
| 2020/0136906 A1 | 4/2020 | Guim Bernat et al. |

OTHER PUBLICATIONS

International Searching Authority, "International Search Report and Written Opinion," mailed in connection with International Patent Application No. PCT/US21/24497 on Aug. 18, 2021, 10 pages.

European Search Report, "Extended European Search Report," issued in connection with European Patent Application No. 21813700.8, dated Jan. 31, 2024, 11 pages.

International Searching Authority, "International Preliminary Report on Patentability," issued in connection with International Appl. No. PCT/US2021/024492, dated Nov. 17, 2022, 8 pages.

International Searching Authority, "International Preliminary Report on Patentability," issued in connection with International Appl. No. PCT/US2021/024497, mailed Dec. 8, 2022, 8 pages.

European Patent Office, "Extended European Search Report," issued in connection with European Patent Application No. 21812591.2, dated Dec. 11, 2023, 11 pages.

United States Patent and Trademark Office, "Non-Final Office Action," issued in connection with U.S. Appl. No. 17/922,280, dated Sep. 5, 2024 14 pages.

United States Patent and Trademark Office, "Notice of Allowance and Fee(s) Due," issued in connection with U.S. Appl. No. 17/922,280, dated Feb. 27, 2025, 10 pages.

Figure 2:
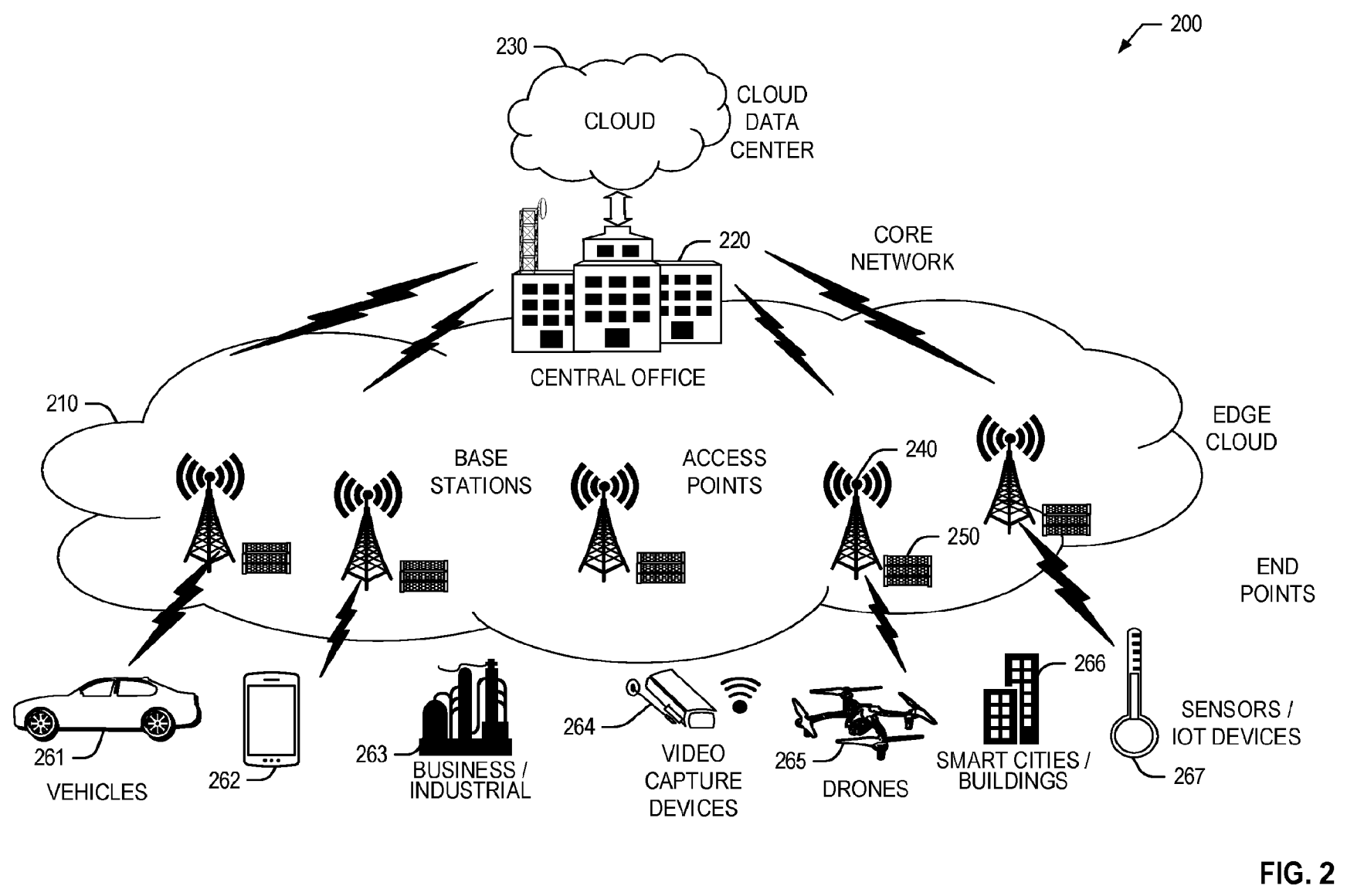

200

CLOUD DATA CENTER

CLOUD 230

CENTRAL OFFICE 220

CORE NETWORK

EDGE CLOUD

ACCESS POINTS

BASE STATIONS

END POINTS

250

240

VEHICLES 261

262

BUSINESS / INDUSTRIAL 263

VIDEO CAPTURE DEVICES 264

DRONES 265

SMART CITIES / BUILDINGS 266

SENSORS / IOT DEVICES 267

TOTAL CORES = 32C
THERMAL DESIGN POWER = 225 W
SSE CORES = 8
AVX-512 / 5G-ISA CORES = 24

1800

MAX ALL
CORE
TURBO SSE

BASE SSE 3.0 GHZ
2.9 GHZ
2.8 GHZ
2.7 GHZ
2.6 GHZ
2.5 GHZ
2.4 GHZ
2.3 GHZ
2.2 GHZ
2.1 GHZ
2.0 GHZ

AVX-512 / 5G-ISA

AVX-512 / 5G-ISA

8C OF 32C     24C OF 32C

1900

TOTAL CORES = 32C
THERMAL DESIGN POWER = 225 W
SSE CORES = 16
AVX-512 / 5G-ISA CORES = 16

MAX ALL
CORE
TURBO SSE

BASE SSE 3.0 GHZ
2.9 GHZ
2.8 GHZ
2.7 GHZ
2.6 GHZ
2.5 GHZ
2.4 GHZ
2.3 GHZ
2.3 GHZ
2.2 GHZ
2.1 GHZ
1.8 GHZ

AVX-512 / 5G-ISA

AVX-512 / 5G-ISA

| CATEGORY | DESCRIPTION | EXAMPLE INSTRUCTION (NOT AN EXHAUSTIVE LIST) |
|---|---|---|
| NATIVE FLOAT-16 DATA TYPE | ALL BASIC ARITHMETIC OPERATIONS WITH FLOAT16 DATA TYPE, INCLUDING FMA, 16B FIXED-POINT TO FP16 UP CONVERSION, FP16 TO 16B FIXED-POINT DOWN CONVERSION, RECIPROCAL, ETC.<br><br>LEVERAGE EXISTING AVX-512 INSTRUCTIONS WHERE POSSIBLE (E.G., SHUFFLE, PERMUTE, ETC. ) | VADDPH, VSUBPH, VDIVPH, VMAXPH, VMINPH, VMULPH, VF[N]MADD[132,213,231]PH, VFMADDSUB[132,312,231]PH, VFMSUBADD[132,213,231]PH |
| COMPLEX ARITHMETIC INSTRUCTIONS | COMPLEX MULTIPLICATION, COMPLEX MULTIPLICATION & ACCUMULATE, ITS CONJUGATE VARIANTS | VCF[C]MADDPH, VCF[C]MULPH |

| NUM | CLASS | ALGORITHM / KERNEL | DESCRIPTION |
|-----|-------|--------------------|-------------|
| 1 | CHANNEL ESTIMATION | CHANNEL ESTIMATION WITH NEW 5G RAT | 1-SECTOR 8x8, OR 3-SECTOR 4x4 |
| 2 | CHANNEL ESTIMATION | CHANNEL ESTIMATION | 8x8 SCENARIO, LTE FRAME STRUCTURE |
| 3 | MMSE | MMSE WEIGHT GENERATION WITH EQUALIZATION | 8x8 – PICK THE ONE FOR 1200 MATRICES |
| 4 | MMSE | MIMO_MMSE_8x8 | MU-MIMO DETECTION |
| 5 | RANDOM ACCESS CHANNEL | PRACH PROCESSING | INCLUDES FREQUENCY SHIFT PRACH PREAMBLE TO BASEBAND/DEMOD (INCLUDING MINUS-HALF-SUBCARRIER SHIFT), DOWN SAMPLING BY REDUCING NUMBER OF SAMPLES TO BE PROCESSED IN PRACH PREAMBLE DETECTION & CORRELATION FOR ROOT SEQUENCE |
| 6 | DEMAPPING | LLR DEMAPPING | QPSK, QAM16, QAM64, QAM256 |
| 7 | MATRIX OPERATIONS | LDL | NxN (UP TO 8) |
| 8 | MATRIX OPERATIONS | QR DECOMPOSITION | 2x(2,4,8,16), AVX2/3 |
| 9 | PRECODING | PRECODING (GENERIC) | 2, 4, 8 LAYERS AND 4, 8, 16 ANTENNAS. WEIGHTS TAKEN FROM BEAM-FORMING. |
| 10 | PHASE NOISE | PHASE NOISE COMPENSATION BEFORE MMSE | 20GHZ+ SCENARIOS |
| 11 | FFT / DFT | FFT / DFT | PRIMARY MODE TO EVALUATE BUTTERFLY INSTRUCTION |

FIG. 23

| CPU CONFIG | SSE P1 FREQ (GHZ) | AVX-512 P1 FREQ (GHZ) | AVX-512 5G-ISA FREQ (GHZ) | TDP (W) | CORE COUNT | THERMAL JUNCTION TEMP (C) | ALL CORE TURBO SSE (GHZ) | ALL CORE TURBO AVX-512 (GHZ) | ALL CORE TURBO AVX-512 5G-ISA (GHZ) | CLM P0 FREQ (GHZ) | CLM P1 FREQ (GHZ) |
|---|---|---|---|---|---|---|---|---|---|---|---|
| 0 | 2.3 | 1.8 | 1.5 | 185 | 26 | 91 | 3.0 | 2.5 | 2.0 | 2.4 | 1.8 |
| 1 | 2.8 | 2.0 | 1.7 | 185 | 20 | 105 | 3.4 | 2.7 | 2.2 | 2.4 | 1.8 |
| 2 | 2.5 | 1.8 | 1.5 | 150 | 20 | 102 | 3.2 | 2.4 | 2.0 | 2.4 | 1.8 |

| UNCORE FREQ (GHZ) | THROUGHPUT (PACKETS/SEC) | MIN LATENCY (NS) | MAX LATENCY (NS) | AVG LATENCY (NS) | METRIC PACKAGE POWER (WATTS) |
|---|---|---|---|---|---|
| 1.4 | 130,000 | 8,000 | 204,000 | 22,500 | 96 |
| 1.5 | 142,000 | 8,400 | 173,000 | 22,000 | 100 |
| 1.6 | 151,000 | 7,400 | 176,000 | 22,100 | 103 |
| 1.7 | 162,000 | 8,500 | 173,000 | 21,700 | 106 |
| 1.8 | 169,000 | 8,900 | 145,000 | 21,400 | 111 |
| 1.9 | 178,000 | 9,150 | 140,000 | 21,000 | 114 |
| 2.0 | 186,000 | 8,900 | 133,000 | 23,000 | 120 |
| 2.1 | 187,000 | 9,500 | 128,000 | 21,000 | 127 |
| 2.2 | 187,100 | 8,200 | 138,000 | 22,000 | 134 |
| 2.3 | 186,000 | 8,000 | 77,000 | 18,000 | 141 |
| 2.4 | 187,000 | 9,000 | 134,000 | 20,900 | 148 |

Figure 29:
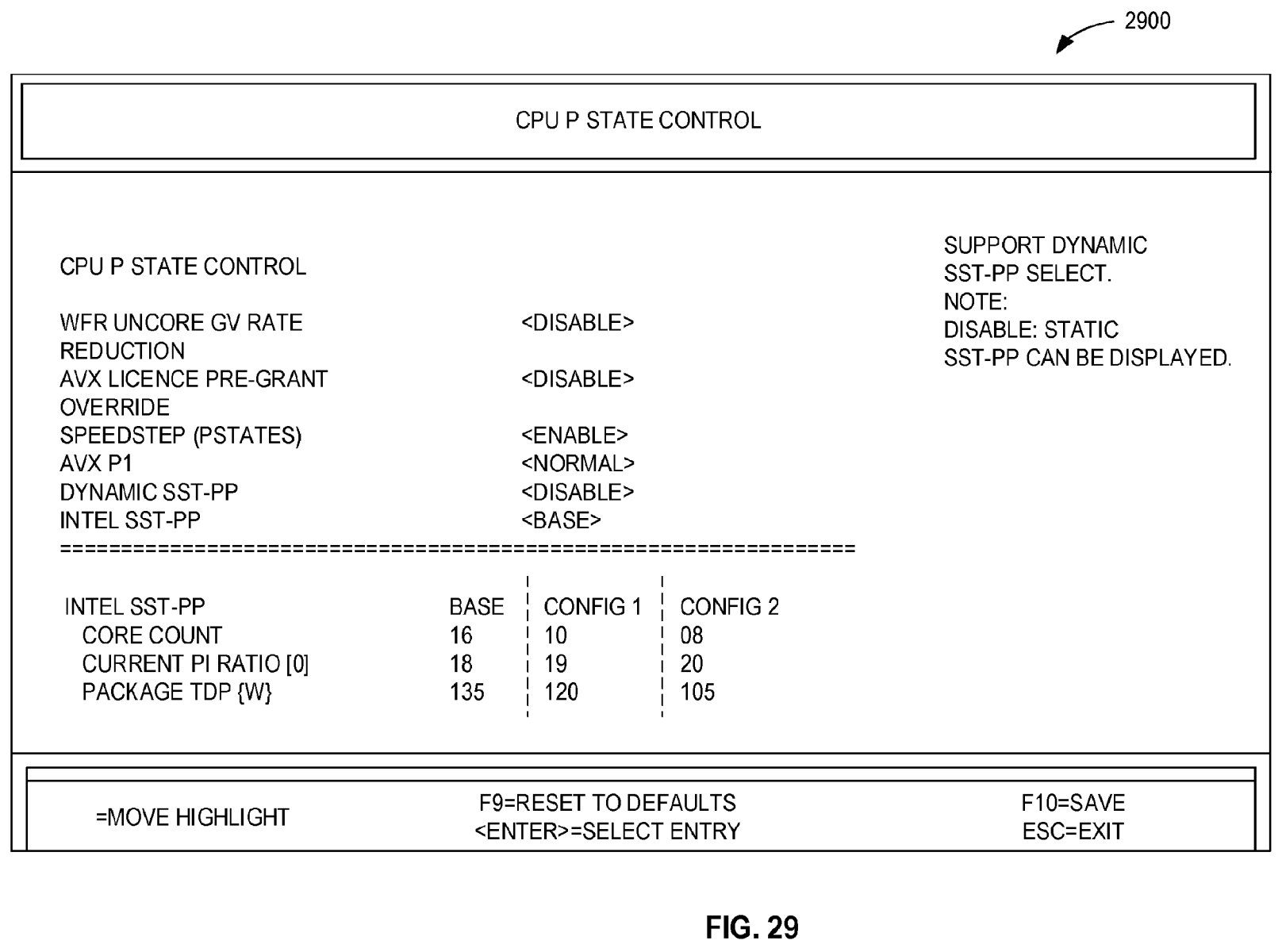

CPU P STATE CONTROL

CPU P STATE CONTROL

| | |
|---|---|
| WFR UNCORE GV RATE REDUCTION | <DISABLE> |
| AVX LICENCE PRE-GRANT OVERRIDE | <DISABLE> |
| SPEEDSTEP (PSTATES) | <ENABLE> |
| AVX P1 | <NORMAL> |
| DYNAMIC SST-PP | <DISABLE> |
| INTEL SST-PP | <BASE> |

| | BASE | CONFIG 1 | CONFIG 2 |
|---|---|---|---|
| INTEL SST-PP | | | |
| CORE COUNT | 16 | 10 | 08 |
| CURRENT PI RATIO [0] | 18 | 19 | 20 |
| PACKAGE TDP {W} | 135 | 120 | 105 |

SUPPORT DYNAMIC SST-PP SELECT.
NOTE:
DISABLE: STATIC
SST-PP CAN BE DISPLAYED.

| | |
|---|---|
| =MOVE HIGHLIGHT | F9=RESET TO DEFAULTS |
| | <ENTER>=SELECT ENTRY |

| F10=SAVE |
|---|
| ESC=EXIT |

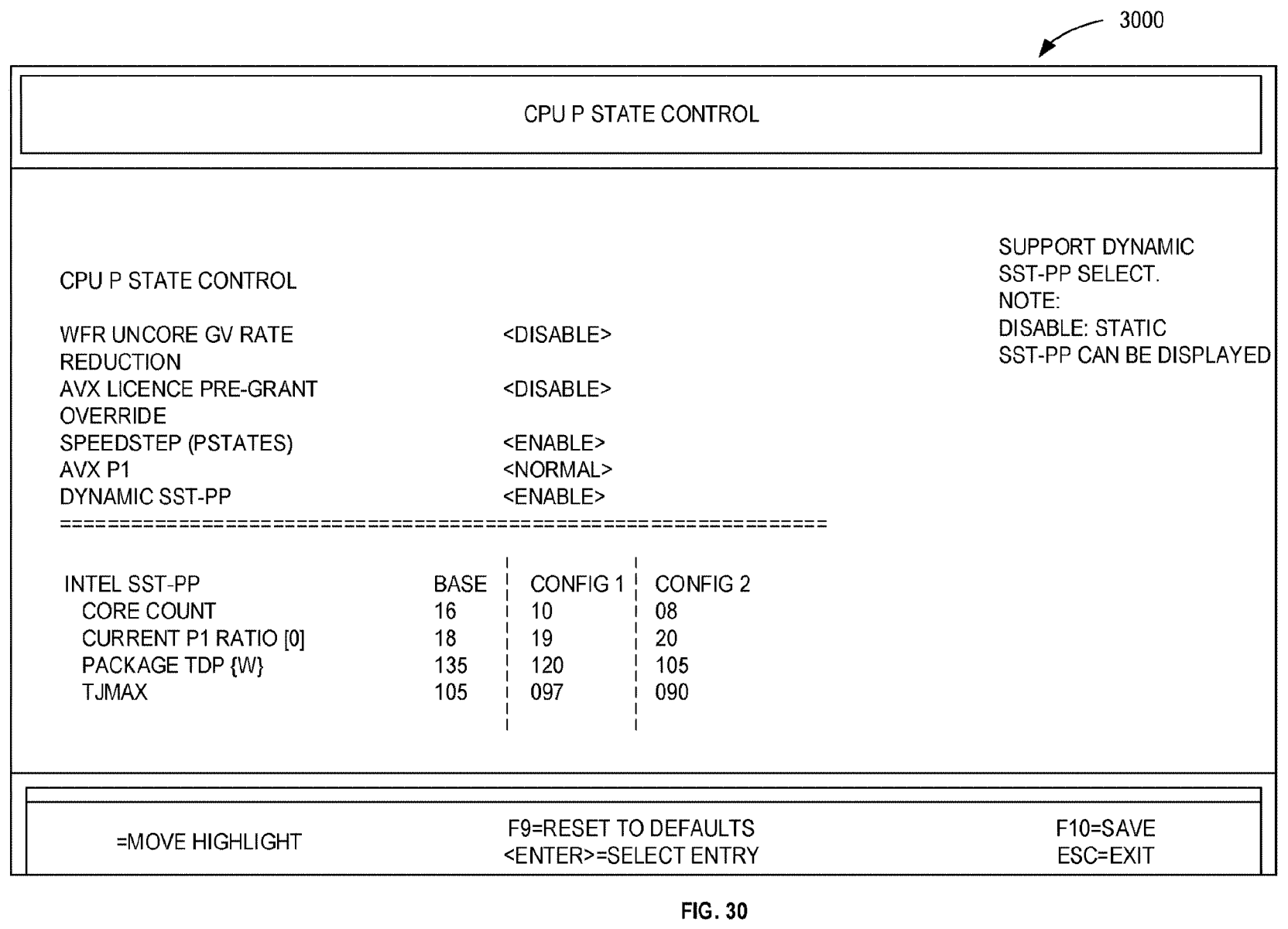

CPU P STATE CONTROL

CPU P STATE CONTROL

WFR UNCORE GV RATE
REDUCTION                        <DISABLE>

AVX LICENCE PRE-GRANT
OVERRIDE                         <DISABLE>

SPEEDSTEP (PSTATES)              <ENABLE>
AVX P1                           <NORMAL>
DYNAMIC SST-PP                   <ENABLE>

| | BASE | CONFIG 1 | CONFIG 2 |
|---|---|---|---|
| INTEL SST-PP | | | |
| CORE COUNT | 16 | 10 | 08 |
| CURRENT P1 RATIO [0] | 18 | 19 | 20 |
| PACKAGE TDP {W} | 135 | 120 | 105 |
| TJMAX | 105 | 097 | 090 |

SUPPORT DYNAMIC
SST-PP SELECT.
NOTE:
DISABLE: STATIC
SST-PP CAN BE DISPLAYED

=MOVE HIGHLIGHT

F9=RESET TO DEFAULTS
<ENTER>=SELECT ENTRY

F10=SAVE
ESC=EXIT

FIG. 30

| | PERFORMANCE | THROUGHPUT | LATENCY | TDP |
|---|---|---|---|---|
| CONFIGURATION 1 — 3120<br>CORE: 2.1 GHZ<br>UNCORE: 1.8 GHZ | BETTER | BEST | BEST | SAME |
| CONFIGURATION 2 — 3122<br>CORE: 1.8 GHZ<br>UNCORE: 1.5 GHZ | GOOD | GOOD | GOOD | SAME |
| CONFIGURATION 3 — 3124<br>CORE: 2.4 GHZ<br>UNCORE: 1.6 GHZ | BEST | BETTER | BETTER | SAME |

N CPUS IN 1

CPU
32C/185W
— 3102

FIG. 31B

| FREQUENCY | APPLICATION 1 P1n STATE | APPLICATION 2 P1n STATE | APPLICATION 3 P1n STATE |
|---|---|---|---|
| CORE | 56% OF POWER VIRUS (PV) | 49% OF PV | 75% OF PV |
| UNCORE / CLM | 113% OF PV | 56% OF PV | 75% OF PV |

| WORKER CORE FUNCTION | APPLICATION 1 P1n STATE | APPLICATION 2 P1n STATE | APPLICATION 3 P1n STATE |
|---|---|---|---|
| USER PLANE FUNCTION (UPF) (UPF, SEPP, N3IWF) KPI = THROUGHPUT (PPS) | X | | |
| CONTROL PLANE FUNCTION (CPF) (AMF, SMF, PCF, NSSF) KPI = SIR/W/$ | | X | |
| DB FUNCTION (UDM, AUSF, NEF, NRF) | | | X |
| | IO AND COMPUTE HEAVY | COMPUTE HEAVY | HEAVY FLOATING POINT (FP) MIN I/O |

FIG. 31D

|  | APPLICATION 1 P1n STATE ①  3150 | APPLICATION 2 P1n STATE ②  3152 | APPLICATION 3 P1n STATE ③  3154 |
|---|---|---|---|
| MMIMO—DU KPI: MAX #SECTORS | X | | X |
| NARROWBAND—DU KPI: MAX #SECTORS | X | | X |
| CU KPI: SIR/W/$ | | X | |

FIG. 31E

| | APPLICATION 1 P1n STATE | APPLICATION 2 P1n STATE | APPLICATION 3 P1n STATE |
|---|---|---|---|
| MEDIA FUNCTION 1 KPI: 264/265, HIGH-QUALITY PRESET 3 | | | X |
| MEDIA FUNCTION 2 KPI: 264/265, REAL-TIME (MEDIUM QUALITY) PRESET 9 | | | X |

|  | APPLICATION 1 P1n STATE | APPLICATION 2 P1n STATE | APPLICATION 3 P1n STATE |
|---|---|---|---|
| KPI: PERF/W/$ |  |  |  |
| KPI: VNGFW |  | X |  |
| KPI: NGINX | X | X |  |
| KPI: SNORT |  | X |  |

|  | NETWORK WORKLOADS (OPTION 1) | NETWORK WORKLOADS (OPTION 2) | NETWORK WORKLOADS (OPTION 3) | NETWORK WORKLOADS (OPTION 4) | GENERAL PURPOSE WORKLOADS | CLOUD WORKLOADS |
|---|---|---|---|---|---|---|
| APPLICATION RATIO | 0.82 | 0.82 | 0.82 | 0.82 | 0.87 | 0.91 |
| UNCORE FREQ THROUGHPUT | 1.3 GHZ 75 GBPS | 1.7 GHZ 225 GBPS | 1.7 GHZ 325 GBPS | 2.1 GHZ 450 GBPS | 1.3 GHZ | 1.3 GHZ |
| SST-PP | 0 | 1 | 2 | 3 | 4 | 5 |
| 56C / 300 W |  |  | 2.0 GHZ |  | 2.1 GHZ | 2.3 GHZ |
| 32C / 185 W | 2.1 GHZ | 2.0 GHZ | 1.9 GHZ |  | 1.9 GHZ | 2.2 GHZ |
| 28C / 165 W | 2.2 GHZ | 2.1 GHZ | 2.0 GHZ |  | 1.9 GHZ | 2.2 GHZ |
| 24C / 150 W | 2.2 GHZ | 2.1 GHZ | 1.9 GHZ |  | 1.9 GHZ | 2.2 GHZ |

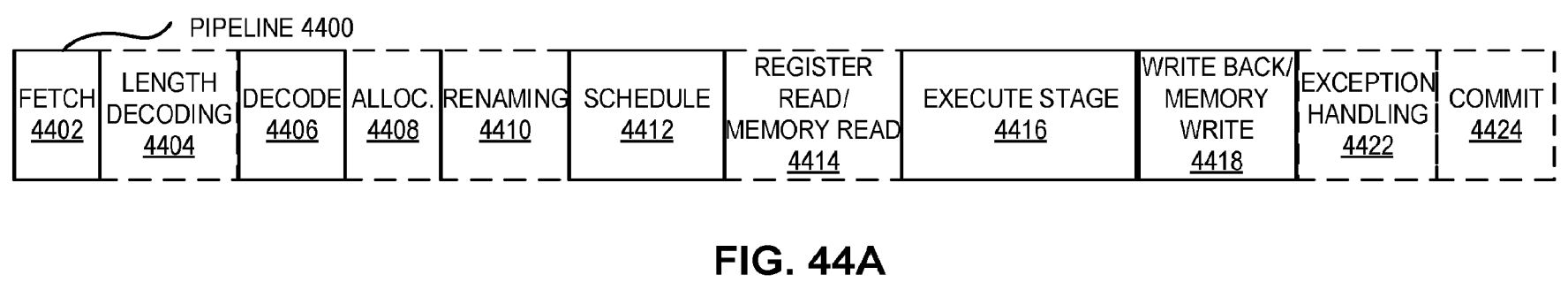

| PIPELINE 4400 | | | | | | | | | | |
|---|---|---|---|---|---|---|---|---|---|---|
| FETCH 4402 | LENGTH DECODING 4404 | DECODE 4406 | ALLOC. 4408 | RENAMING 4410 | SCHEDULE 4412 | REGISTER READ/ MEMORY READ 4414 | EXECUTE STAGE 4416 | WRITE BACK/ MEMORY WRITE 4418 | EXCEPTION HANDLING 4422 | COMMIT 4424 |

FIG. 44A

Figure 46:
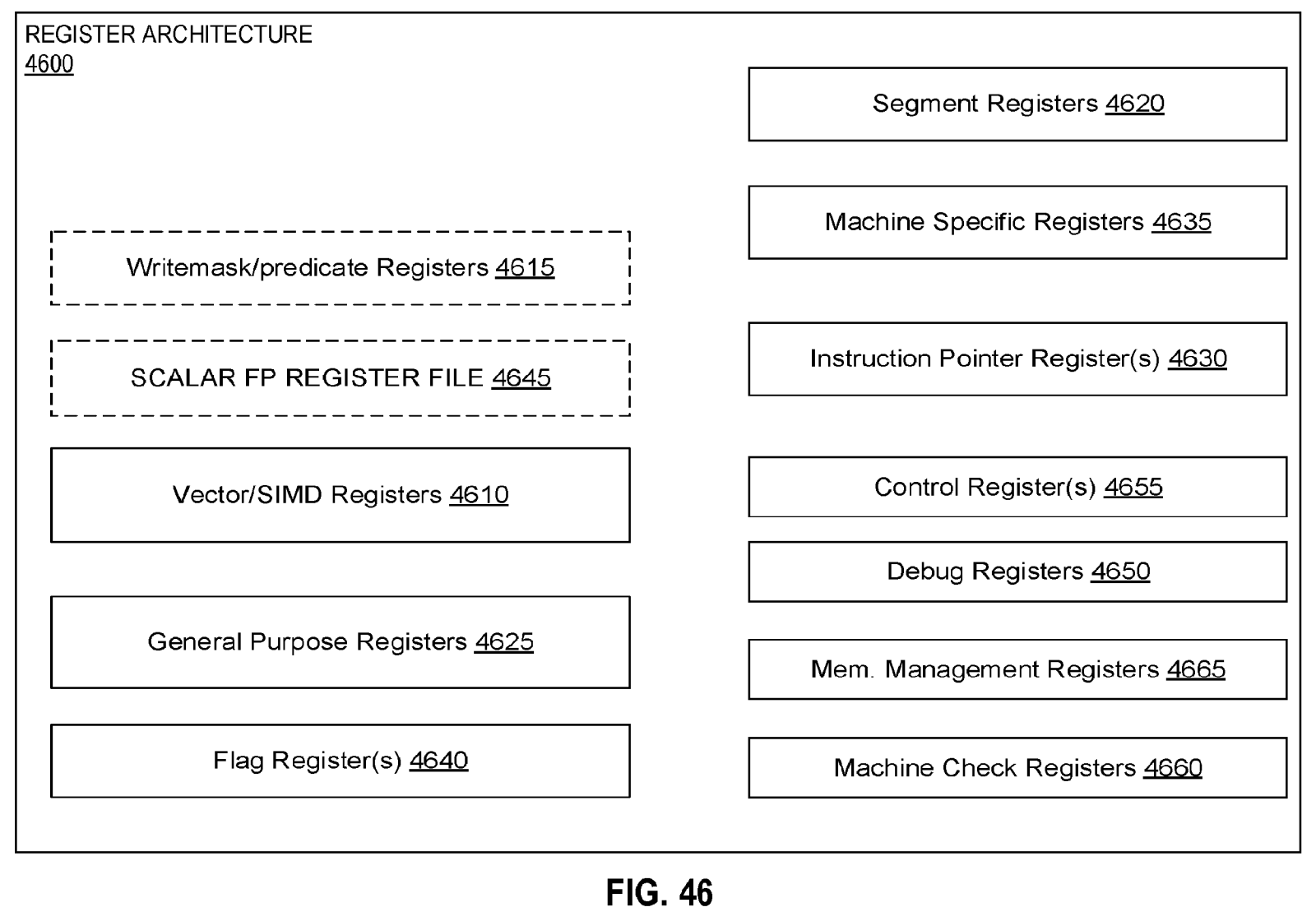

REGISTER ARCHITECTURE 4600

Segment Registers 4620

Machine Specific Registers 4635

Instruction Pointer Register(s) 4630

Control Register(s) 4655

Debug Registers 4650

Mem. Management Registers 4665

Machine Check Registers 4660

Writemask/predicate Registers 4615

SCALAR FP REGISTER FILE 4645

Vector/SIMD Registers 4610

General Purpose Registers 4625

Flag Register(s) 4640

| COMPONENT | AVX-512 & 5G-ISA BENEFITS |
|---|---|
| PF WEIGHT | YES |
| PF SORT | YES |
| UE SELECTION (CUS) | YES |
| POST SINR (MATRIX INVERSION AND ZF) | YES |
| MCS & TB | NO |

PRIMARILY COMPLEX NUMBERS ARITHMETIC OPERATIONS INCLUDING CORRELATIONS, MATRIX MULT AND INV. THIS WILL BENEFIT FROM 5G-ISA INSTRUCTIONS (E.G., UP TO 2X GAIN)

FIG. 54

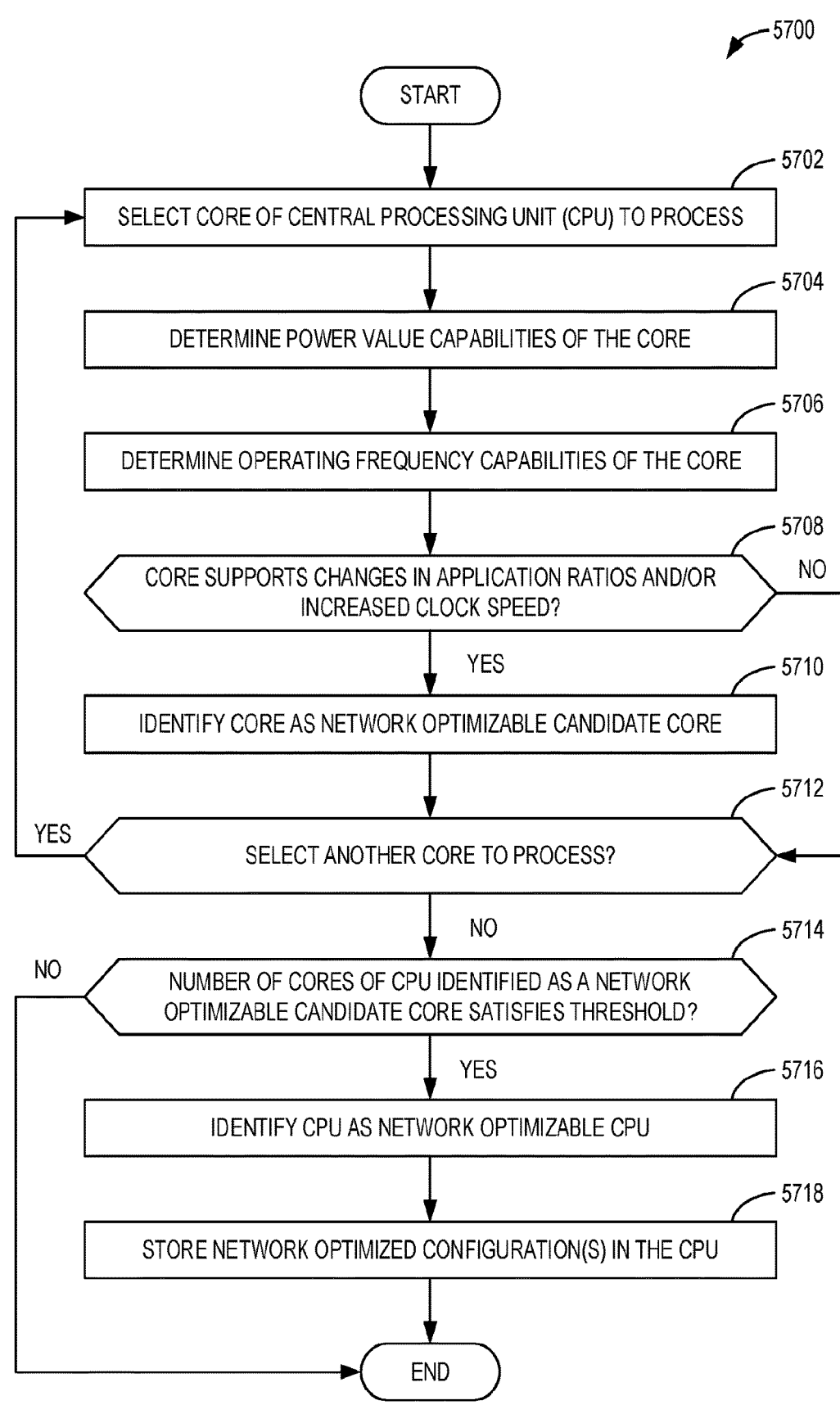

5700

START

5702
SELECT CORE OF CENTRAL PROCESSING UNIT (CPU) TO PROCESS

5704
DETERMINE POWER VALUE CAPABILITIES OF THE CORE

5706
DETERMINE OPERATING FREQUENCY CAPABILITIES OF THE CORE

5708
CORE SUPPORTS CHANGES IN APPLICATION RATIOS AND/OR
INCREASED CLOCK SPEED?                                         NO

YES                  5710
IDENTIFY CORE AS NETWORK OPTIMIZABLE CANDIDATE CORE

5712
YES    SELECT ANOTHER CORE TO PROCESS?

NO                   5714
NO    NUMBER OF CORES OF CPU IDENTIFIED AS A NETWORK
OPTIMIZABLE CANDIDATE CORE SATISFIES THRESHOLD?

YES                  5716
IDENTIFY CPU AS NETWORK OPTIMIZABLE CPU

5718
STORE NETWORK OPTIMIZED CONFIGURATION(S) IN THE CPU

END

FIG. 57

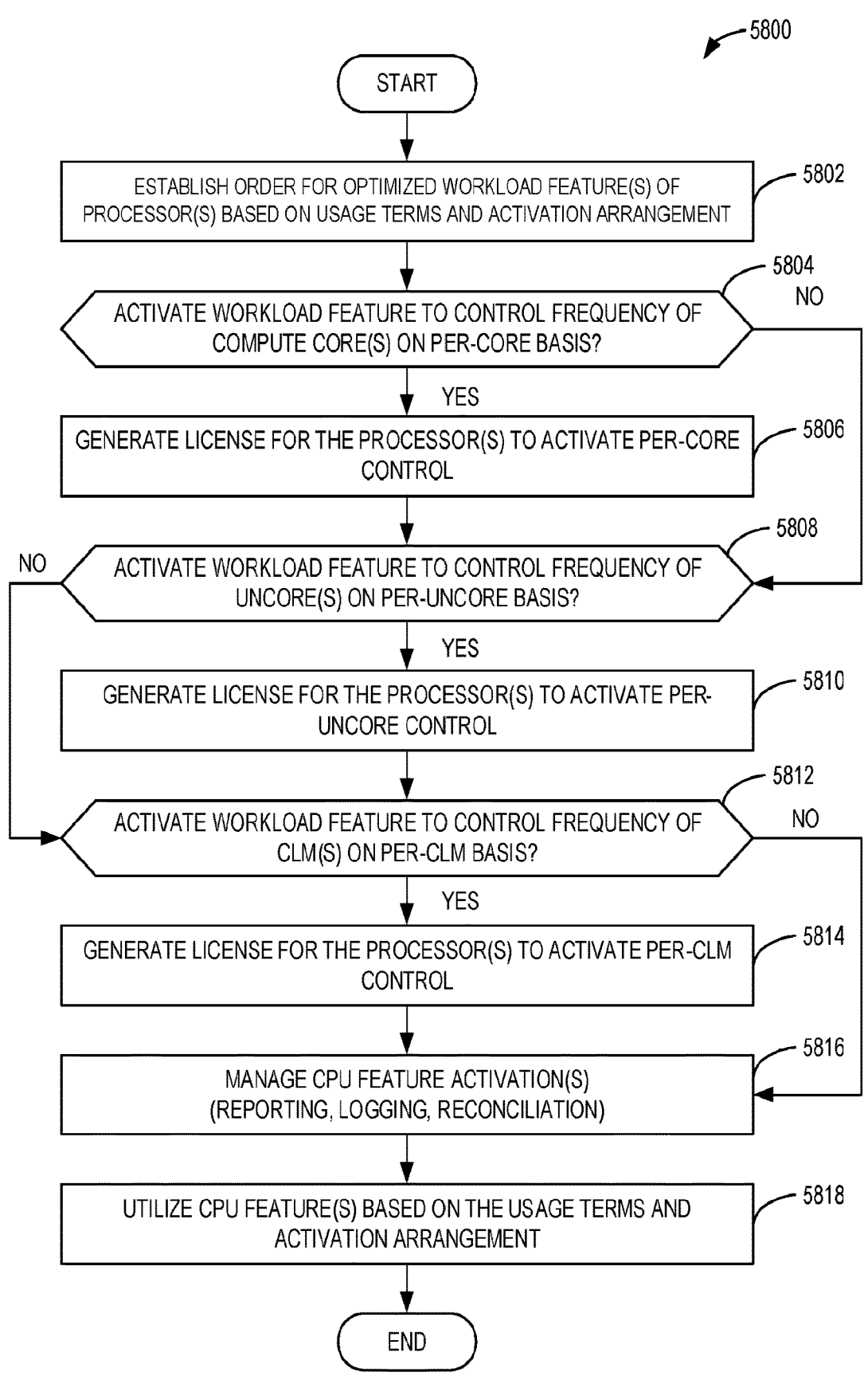

5800

START

ESTABLISH ORDER FOR OPTIMIZED WORKLOAD FEATURE(S) OF PROCESSOR(S) BASED ON USAGE TERMS AND ACTIVATION ARRANGEMENT — 5802

ACTIVATE WORKLOAD FEATURE TO CONTROL FREQUENCY OF COMPUTE CORE(S) ON PER-CORE BASIS? — 5804   NO

YES

GENERATE LICENSE FOR THE PROCESSOR(S) TO ACTIVATE PER-CORE CONTROL — 5806

ACTIVATE WORKLOAD FEATURE TO CONTROL FREQUENCY OF UNCORE(S) ON PER-UNCORE BASIS? — 5808   NO

YES

GENERATE LICENSE FOR THE PROCESSOR(S) TO ACTIVATE PER-UNCORE CONTROL — 5810

ACTIVATE WORKLOAD FEATURE TO CONTROL FREQUENCY OF CLM(S) ON PER-CLM BASIS? — 5812   NO

YES

GENERATE LICENSE FOR THE PROCESSOR(S) TO ACTIVATE PER-CLM CONTROL — 5814

MANAGE CPU FEATURE ACTIVATION(S) (REPORTING, LOGGING, RECONCILIATION) — 5816

UTILIZE CPU FEATURE(S) BASED ON THE USAGE TERMS AND ACTIVATION ARRANGEMENT — 5818

END

FIG. 58

SYSTEMS, APPARATUS, AND METHODS TO CONFIGURE HARDWARE BASED ON APPLICATION RATIOS

RELATED APPLICATION

This patent arises from the national stage of International Application No. PCT/US21/24492, which was filed on Mar. 26, 2021, which claims the benefit of U.S. Provisional Patent Application No. 63/113,733, which was filed on Nov. 13, 2020, U.S. Provisional Patent Application No. 63/087,060, which was filed on Oct. 2, 2020, U.S. Provisional Patent Application No. 63/113,734, which was filed on Nov. 13, 2020, and U.S. Provisional Patent Application No. 63/032, 045, which was filed on May 29, 2020. International Application No. PCT/US21/24492, U.S. Provisional Patent Application No. 63/113,733, U.S. Provisional Patent Application No. 63/087,060, U.S. Provisional Patent Application No. 63/113,734, and U.S. Provisional Patent Application No. 63/032,045 are hereby incorporated herein by reference in their entireties. Priority to International Application No. PCT/US21/24492, U.S. Provisional Patent Application No. 63/113,733, U.S. Provisional Patent Application No. 63/087, 060, U.S. Provisional Patent Application No. 63/113,734, and U.S. Provisional Patent Application No. 63/032,045 is hereby claimed.

FIELD OF THE DISCLOSURE

This disclosure relates generally to processors and, more particularly, to systems, apparatus, and methods to workload optimize hardware.

BACKGROUND

Multi-access edge computing (MEC) is a network architecture concept that enables cloud computing capabilities and an infrastructure technology service environment at the edge of a network, such as a cellular network. Using MEC, data center cloud services and applications can be processed closer to an end user or computing device to improve network operation. Such processing can consume a disproportionate amount of bandwidth of processing resources closer to the end user or computing device thereby increasing latency, congestion, and power consumption of the network.

BRIEF DESCRIPTION OF THE DRAWINGS

FIG. 2 illustrates an overview of an example edge cloud configuration for edge computing that may implement the examples disclosed herein.

FIG. 19 is an illustration of adjusting performance of an example workload-adjustable CPU based on an example network workload using the second example core allocation and the second example power budget.

FIG. 22 is a table of example machine readable instructions to effectuate processing of example network workloads.

FIG. 23 is a table of example algorithms that may be implemented by the workload-adjustable CPU of FIGS. 5, 6, 7, 8, 10, 11, 12, 13, and/or 15.

FIG. 27 is an illustration of example configurations that may be implemented by an example workload-adjustable CPU.

FIG. 28 is an illustration of example throughput, latency, and power parameters with respect to uncore frequency of an example workload-adjustable CPU.

FIG. 29 is an illustration of an example static configuration of an example workload-adjustable CPU.

FIG. 30 is an illustration of an example dynamic configuration of an example workload-adjustable CPU.

FIGS. 31A-31H are illustrations of example power adjustments to core(s) and uncore(s) of an example workload-adjustable CPU based on example workload(s).

FIG. 44A is a block diagram illustrating both an exemplary in-order pipeline and an exemplary register renaming, out-of-order issue/execution pipeline according to examples of the disclosure.

FIG. 46 is a block diagram of an example register architecture according to some examples.

FIG. 54 depicts a table depicting example 5G network workloads that may benefit from the examples disclosed herein.

FIG. 57 is a flowchart representative of example machine readable instructions that may be executed to implement an example workload-adjustable CPU to identify a CPU as a network optimizable CPU.

FIG. 58 is a flowchart representative of example machine readable instructions that may be executed to implement an example workload-adjustable CPU to utilize CPU feature(s) based on an example usage terms and activation arrangement.

DETAILED DESCRIPTION

Figure 1:
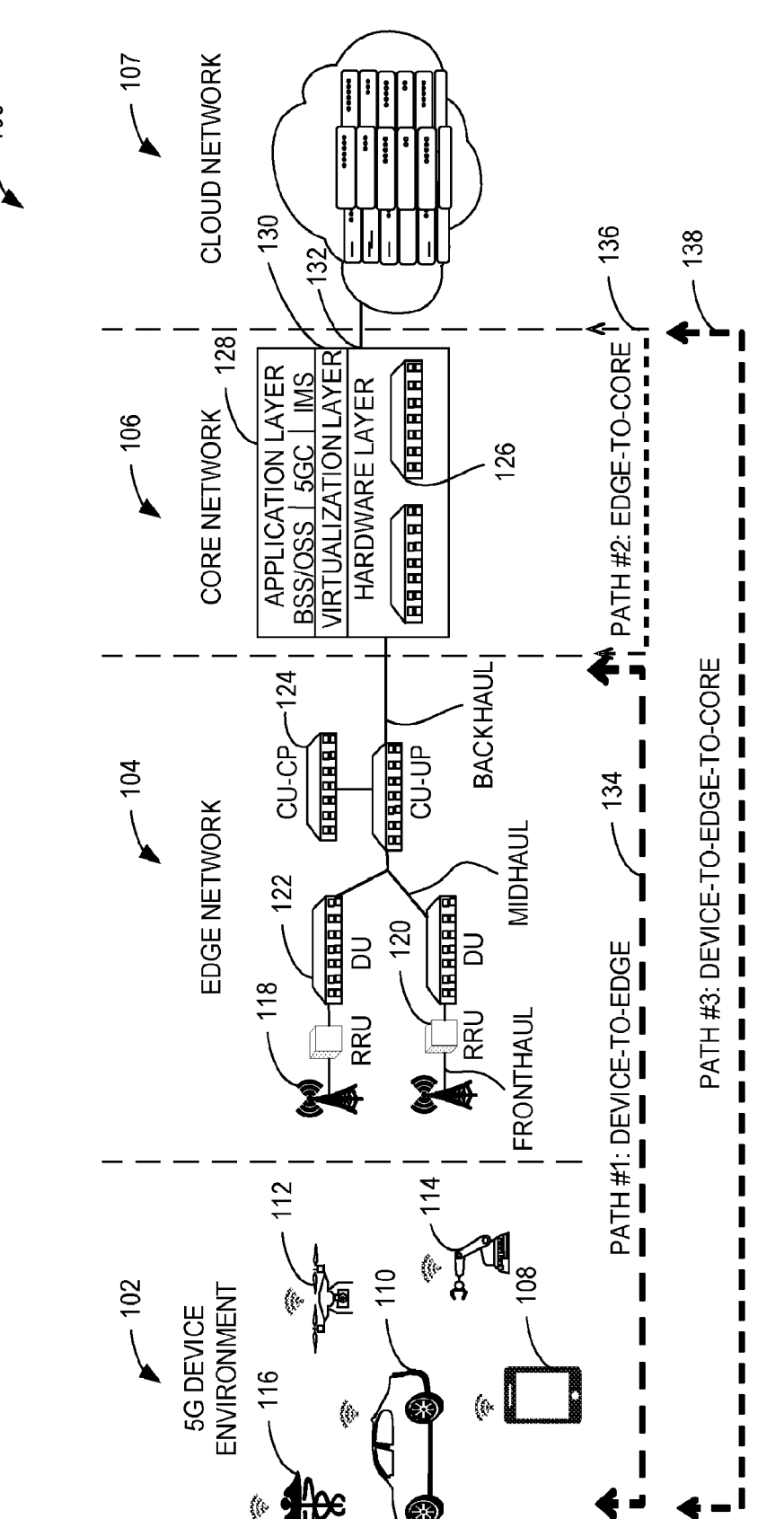
FIG. 1 is an illustration of a first example multi-core computing environment including a first example multi-core computing system.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Multi-access edge computing (MEC) is a network architecture concept that enables cloud computing capabilities and an infrastructure technology service environment at the edge of a network, such as a cellular network. Using MEC, data center cloud services and applications can be processed closer to an end user or computing device to improve network operation.

While MEC is an important part of the evolution of edge computing, cloud and communication service providers are addressing the need to transform networks of the cloud and communication service providers in preparation for fifth generation cellular network technology (i.e., 5G). To meet the demands of next generation networks supporting 5G, cloud service providers can replace fixed function proprietary hardware with more agile and flexible approaches that rely on the ability to maximize the usage of multi-core edge and data center servers. Next generation server edge and data center networking can include an ability to virtualize and deploy networking functions throughout a data center and up to and including the edge. High packet throughput amplifies the need for better end-to-end latency, Quality of Service (QoS), and traffic management. Such needs in turn drive requirements for efficient data movement and data sharing between various stages of a data plane pipeline across a network.

In some prior approaches, a processor guaranteed operating frequency (e.g., a deterministic frequency) was set to be consistent regardless of the type of workloads expected to be encountered. For example, central processing unit (CPU) cores in an Intel® x86 architecture may be set to a lower processor performance state (P-state) (e.g., lowered from a P0n state to a P1n state) frequency at boot time (e.g., by BIOS) than supported by the architecture to avoid frequency scaling latencies. Thus, x86 CPUs may operate with deterministic P-state frequencies, and as a result, all CPU cores utilize lower base frequencies to mitigate latencies. However, power consumption of a CPU core varies by workload when operating at the same frequency. Thus, there is an opportunity to increase the deterministic frequency of the CPU core if the workload is not power hungry within the core itself, or, the workload is less power hungry as compared with other types of workloads.

Compute-bound workloads, which may be implemented by high-intensity calculations (e.g., graphics rendering workloads), may rely disproportionately on compute utilization in a processor core rather than memory utilization and/or input/output (I/O) utilization. I/O bound workloads, such as communication workloads, network workloads, etc., use a combination of compute, memory, and/or I/O. Such I/O bound workloads do not rely on pure compute utilization in a processor core as would be observed with compute-bound workloads. For example, a communication workload, a network workload, etc., can refer to one or more computing tasks executed by one or more processors to effectuate the processing of data associated with a computing network (e.g., a terrestrial or non-terrestrial telecommunications network, an enterprise network, an Internet-based network, etc.). Thus, an adjustment in frequencies of at least one of one of the processor core or the processor uncore based on a type of workload may be used as an operational or design parameter of the processor core. Such adjustment(s) may enable a processor to increase processing frequency and workload throughput while still avoiding frequency scaling latencies from throttling of the processor core.

The use of power within a processor architecture may extend to a number of areas, and thus multiple areas of the processor may also be considered for optimization based on an application ratio. In some disclosed examples, an application ratio provides a measure of activity that a workload creates with respect to maximum activity. The application ratio may directly affect the processing rate and power undertaken by one or multiple cores and the other components of the processor. A decrease in the application ratio may result in an increase in guaranteed operating frequency (and thus, increased clock speed and performance) for network workloads that are less power hungry than general purpose computing workloads. In some such disclosed examples, the power behavior of other types of workloads may be calculated, evaluated, and implemented for the specification and optimization of CPUs using application ratio values.

A core (e.g., a processor core), interconnect/mesh, I/O (e.g., Ultra Path Interconnect (UPI), Peripheral Component Interconnect Express (PCIe), memory, etc.), voltage regulator (e.g., a Fully Integrated Voltage Regulator), and chassis all consume power, and in each of these processor areas, the determination and/or application of application ratio associated with these processor areas as disclosed herein is different than utilization associated with these processor areas, because the application ratio provides a measure of activity that a workload creates with respect to maximum activity, whereas utilization provides a measure of activity versus inactivity (e.g., idling). Thus, application ratio provides a measurement of dynamic power for the actual workload, and not a theoretical value that is encountered; adjustment and design of the processor power and frequency settings based on the application ratio may provide a number of real-world benefits. Modifying a processor to optimize performance for a reduced application ratio within the CPU core is intended to be encompassed in the "network workload optimization" discussed herein. Alternatively, modifying a processor to optimize performance for an increased application ratio within the CPU core may be intended to be encompassed in other optimizations to effectuate compute-bound workloads. However, in some disclosed examples, the optimization or settings within such optimization may extend to other ratios, settings, and features (including in uncore areas of processor).

In some disclosed examples, an adjustment in operating frequency of the processor core and/or a corresponding uncore or uncore logic (e.g., uncore logic circuitry) may be based on the application ratio. In some disclosed examples, the application ratio may refer to a ratio of the power consumed by the highest power consumption application such as the power virus (PV), which may be based on the following construct:

$$\text{Application Ratio}(AR) = \frac{\text{Application Activity } C_{dyn}}{\text{Power Virus } C_{dyn}}$$

The example construct above is based on total power associated with a processor being composed of static power consumption and dynamic power consumption, with at least the latter changing based on a processor workload. For example, the term Application Activity $C_{dyn}$ can refer to dynamic power consumption of a processor core and/or, more generally, a processor, when executing a workload (e.g., a compute-bound workload, an I/O-bound workload, etc.). In some such examples, the term Application Activity $C_{dyn}$ can refer to the dynamic power consumption of a single processor core, two processor cores, or an entirety of the processor cores of the processor. In some examples, Application Activity $C_{dyn}$ can be determined at runtime. Additionally or alternatively, the term Application Activity $C_{dyn}$ may refer to dynamic power consumption of an uncore region, uncore logic (e.g., uncore logic circuitry), etc.

In the above example construct, the term Power Virus $C_{dyn}$ can refer to dynamic power consumption of a processor core and/or, more generally, a processor, when consuming maximum dynamic power. For example, Power Virus $C_{dyn}$ can be determined by measuring the power of a processor core when the processor core executes an application (e.g., a power virus application) that causes the processor core to consume maximum dynamic power. In some examples, the power virus application can be representative of a synthetic workload that causes the processor core to consume maximum power (e.g., by switching on and/or otherwise enabling a maximum number of transistors of the processor core). In some such examples, the maximum dynamic power can be greater than the thermal design power or point (TDP) of the processor core. In some examples, Power Virus $C_{dyn}$ is a pre-determined value. Additionally or alternatively, the term Power Virus $C_{dyn}$ may refer to maximum dynamic power consumption of uncore logic, such that memory, I/O, etc., of the uncore logic may operate at maximum dynamic power.

By way of example, a processor core having an application ratio of 0.8 can correspond to the processor core operating at 80% of Power Virus $C_{dyn}$. For example, the processor core can be operated at a base operating frequency, an increased or turbo operating frequency, etc., insomuch as the processor core does not exceed 80% of the Power Virus $C_{dyn}$. By way of another example, uncore logic having an application ratio of 0.75 can correspond to memory, I/O, etc., of the uncore logic operating at 75% of Power Virus $C_{dyn}$. For example, the uncore logic can be operated at a base operating frequency, an increased or turbo operating frequency, etc., insomuch as the uncore logic does not exceed 75% of the Power Virus $C_{dyn}$.

In some disclosed examples, an application ratio for a particular hardware unit (e.g., a core or portion thereof, an uncore or portion thereof, etc.) may be calculated and/or otherwise determined based on one or more equations or formulas, based on the following construct:

$$\text{Application Ratio}(AR) = \text{SLOPE} * \left(\frac{1}{\text{UNIT COUNT}}\right) + \text{INTERCEPT}$$

Where SLOPE is proportional to the instructions per cycle for the hardware unit (e.g., a core or portion thereof, an uncore or portion thereof, etc.), scaled by the sensitivity of the application ratio to the utilization of the hardware unit (e.g., a core or portion thereof, an uncore or portion thereof, etc.), UNIT COUNT represents the number of hardware units (e.g., a number of the cores or portions thereof, a number of the uncores or portions thereof, etc.), and INTERCEPT represents the application ratio of the hardware unit (e.g., a core or portion thereof, an uncore or portion thereof, etc.) when it is at zero utilization (e.g., no traffic). The same equation or formula definition also applies to other hardware units, such as to a last level cache (LLC).

In some disclosed examples, a core of a processor can be configured to operate at different operating frequencies based on an application ratio of the processor. For example, the core may operate at a first operating frequency, such as a P1n operating frequency of 2.0 GHz, based on the processor being configured for a first application ratio, which may be representative of a baseline or default application ratio. In some examples, the core may operate at a different operating frequency based on the example of Equation (1) below:

$$\text{Core Operating Frequency(GHz)} = \left(P1n * \frac{1}{\text{UNIT COUNT}}\right) + \text{INTERCEPT}, \qquad \text{Equation (1)}$$

In the example of Equation (1) above, P1n represents the P1n operating frequency of the core, UNIT COUNT represents the number of hardware units (e.g., a number of the cores or portions thereof), and INTERCEPT represents the application ratio of the hardware unit (e.g., a core or portion thereof) when it is at zero utilization (e.g., no traffic). Accordingly, the core may be configured with a different operating frequency based on the application ratio as described below in Equation (2) and/or Equation (3).

$$\text{Core Operating Frequency (GHz)} = (P1n*0.6)+0.7, \qquad \text{Equation (2)}$$

$$\text{Core Operating Frequency (GHz)} = (P1n*0.5)+0.5, \qquad \text{Equation (3)}$$

In some disclosed examples, Equation (2) above can correspond to a core, and/or, more generally, a processor, being configured based on a second application ratio. In some examples, Equation (3) above can correspond to a core, and/or, more generally, a processor, being configured based on a third application ratio. Advantageously, an operating frequency of a core may be adjusted based on the application ratio.

In some disclosed examples, uncore logic may operate at a different operating frequency based on the example of Equation (4) below:

$$Uncore \text{ Operating Frequency(GHz)} = \left( P1n * \frac{1}{\text{UNIT COUNT}} \right) + \text{INTERCEPT}, \quad \text{Equation (4)}$$

In the example of Equation (4) above, P1n represents the P1n operating frequency of the uncore logic, UNIT COUNT represents the number of hardware units (e.g., a number of instances of the uncore logic or portions thereof), and INTERCEPT represents the application ratio of the hardware unit (e.g., an uncore or portion thereof, etc.) when it is at zero utilization (e.g., no traffic). Accordingly, the uncore logic may be configured with a different operating frequency based on the application ratio as described below in Equation (5) and/or Equation (6).

$$\text{Uncore Operating Frequency (GHz)} = (P1n * 0.5) + 0.6, \quad \text{Equation (5)}$$

$$\text{Uncore Operating Frequency (GHz)} = (P1n * 0.7) + 0.4, \quad \text{Equation (6)}$$

In some disclosed examples, Equation (5) above can correspond to uncore logic, and/or, more generally, a processor, being configured based on the second application ratio. In some examples, Equation (6) above can correspond to uncore logic, and/or, more generally, a processor, being configured based on the third application ratio. Advantageously, an operating frequency of the uncore logic may be adjusted based on the application ratio.

In some disclosed examples, an application ratio of a processor core and/or, more generally, a processor, may be adjusted based on a workload. In some disclosed examples, the application ratio of one or more processor cores may be increased (e.g., from 0.7 to 0.8, from 0.75 to 0.9, etc.) in response to processing a compute-bound workload. For example, in response to increasing the application ratio, the one or more processor cores can be operated at a higher operating frequency which, in turn, increases the dynamic power consumption of the one or more processor cores. In some such examples, an operating frequency of corresponding one(s) of uncore logic can be decreased to enable the one or more processor cores to operate at the higher operating frequency. Alternatively, an operating frequency of corresponding one(s) of the uncore logic may be increased to increase throughput of such compute-bound workloads.

In some disclosed examples, the application ratio of one or more processor cores may be decreased (e.g., from 0.8 to 0.75, from 0.95 to 0.75, etc.) in response to processing an I/O-bound workload. For example, in response to decreasing the application ratio, the one or more processor cores can be operated at a lower operating frequency which, in turn, decreases the dynamic power consumption of the one or more processor cores. In some such examples, an operating frequency of corresponding one(s) of uncore logic can be increased to increase throughput and reduce latency of such I/O bound workloads.

In some disclosed examples, the use of an application ratio on a per-core basis enables acceleration assignments to be implemented only for those cores that are capable of fully supporting increased performance (e.g., increased frequency) for a reduced application ratio. In some disclosed examples, implementing per-core acceleration assignments and frequency changes allow for different core configurations in the same-socket; thus, many combinations and configurations of optimized cores (e.g., one, two, or n cores) for one or multiple types of workloads may also be possible.

Examples disclosed herein provide configurations of processing hardware, such as a processor (e.g., a CPU or any other processor circuitry), to be capable of computing for general purpose and specialized purpose workloads. In some disclosed examples, the configurations described herein provide a processing architecture (e.g., a CPU architecture or any other processing architecture) that may be configured at manufacturing (e.g., configured by a hardware manufacturer) into a "hard" stock-keeping unit (SKU), or may be configured at a later time with software-defined changes into a "soft" SKU, to optimize performance for specialized computing workloads and applications, such as network-specific workloads and applications. For example, the applicable processor configurations may be applied or enabled at manufacturing to enable multiple processor variants (and SKUs) to be generated from the same processor architecture and fabrication design. Individual cores of a processor may be evaluated in high-volume manufacturing (HVM) during a binning process to determine which cores of the processor support the reduced application ratio and increased clock speed for a workload of interest to be executed.

In some disclosed examples, example workload-adjustable CPUs as disclosed herein may execute, implement, and/or otherwise effectuate example workloads, such as artificial intelligence and/or machine learning model executions and/or computations, Internet-of-Things service workloads, network workloads (e.g., edge network, core network, cloud network, etc., workloads), autonomous driving computations, vehicle-to-everything (V2X) workloads, video surveillance monitoring, and real time data analytics. Additional examples of workloads include delivering and/or encoding media streams, measuring advertisement impression rates, object detection in media streams, speech analytics, asset and/or inventory management, virtual reality, and/or augmented reality processing.

Software-defined or software-enabled silicon features allow changes to a processor feature set to be made after manufacturing time. For example, software-defined or software-enabled silicon feature can be used to toggle manufacturing settings that unlock and enable capabilities upon payment or licensing. Advantageously, such soft-SKU capabilities further provide significant benefits to manufacturers, as the same chip may be deployed to multiple locations and dynamically changed depending on the characteristics of the location.

Advantageously, either a hard- or soft-SKU implementation provides significant benefits for end customers such as telecommunication providers that intend to deploy the same hardware arrangement and CPU design for their enterprise (e.g., servers running conventional workloads) and for data plane network function virtualization (NFV) apps (e.g., servers running network workloads). Advantageously, the use of the same CPU fabrication greatly simplifies the cost and design considerations.

In some disclosed examples, the configurations described herein may be applicable to a variety of microprocessor types and architectures. These include, but are not limited to: processors designed for one-socket (1S) and two-socket (2S) servers (e.g., a rack-mounted server with two slots for CPUs), processors with a number of cores (e.g., a multi-core processor), processors adapted for connection with various types of interconnects and fabrics, and processors with x86 or OpenPOWER instruction sets. Examples of processor architectures that embody such types and configurations include the Intel® Xeon processor architecture, the AMD®

EPYC processor architecture, or the IBM® POWER processor architecture. However, the implementations disclosed herein are not limited to such architectures or processor designs.

In some disclosed examples, customer requirements (e.g., latency, power requirements, (e.g., power consumption requirements), and/or throughput requirements) and/or machine readable code may be obtained from a customer, an end-user, etc., that is representative of the workload of interest to be executed when the processor is to be deployed to an MEC environment. In some such examples, the processor may execute the machine readable code to verify that the processor is capable of executing the machine readable code to satisfy the latency requirements, throughput requirements, and/or power requirements associated with an optimized and/or otherwise improved execution of the workload of interest. Thus, a processor instance of a particular design that has at least n cores that support the network workload can be distributed with a first SKU indicative of supporting enhanced network operations, whereas another processor instance of the particular design which has less than n cores that support the network workload can be distributed with a second SKU. Advantageously, consideration of these techniques at design, manufacturing, and distribution time will enable multiple processor SKUs to be generated from the same processor fabrication packaging.

In some disclosed examples, the optimized performance for such network-specific workloads and applications are applicable to processor deployments located at Edge, Core Network, and Cloud Data Center environments that have intensive network traffic workloads, such as provided by NFV and its accompanying network virtual functions (NFVs) and applications. Additionally or alternatively, processor deployments as described herein may be optimized for other types of workloads, such as compute-bound workloads.

In some disclosed examples, workload analysis is performed prior to semiconductor manufacturing (e.g., silicon manufacturing) to identify and establish specific settings and/or configurations of the processor that are relevant to improved handling of network workloads. For example, the settings and/or configurations may be representative of application ratio parameters including process parameters, a number of cores, and per-rail (e.g., per-core) application ratio. In some disclosed examples, the calculation of the application ratio of the processor may be determined based on the application ratio parameters including a network node location (e.g., the fronthaul, midhaul, or backhaul of a terrestrial or non-terrestrial telecommunications network), latency requirements, throughput requirements, and/or power requirements. From this, a deterministic frequency may be produced, which can be tested, verified, and incorporated into manufacturing of the chip package. Different blocks of the processor package may be evaluated depending on the particular workload and the desired performance to be obtained.

In some disclosed examples, in HVM during class testing, each processor is tested for guaranteed operating frequency at different temperature set points. These temperature and frequency pairs may be stored persistently (e.g., within the processor), to be accessed during operation. That is, in operation this configuration information may be used to form the basis of providing different guaranteed operating frequency levels at different levels of cooling, processor utilization, workload demand, user control, etc., and/or a combination thereof. In addition, at lower thermal operating points, the processor may operate with lower leakage levels.

For example, if a maximum operating temperature (e.g., a maximum junction temperature) (Tjmax)) for a given processor is 95° Celsius (C), a guaranteed operating frequency may also be determined at higher (e.g., 105° C.) and lower (e.g., 85° C., 70° C., etc.) temperature set points as well. For every processor, temperature and frequency pairs may be stored in the processor as model specific register (MSR) values or as fuses that a power controller (e.g., a power control unit (PCU)) can access.

In some disclosed examples, the configuration information may include a plurality of configurations (e.g., application, processor, power, or workload configurations), personas (e.g., application, processor, power, or workload personas), profiles (e.g., application, processor, power, or workload profiles), etc., in which each configuration may be associated with a configuration identifier, a maximum current level (ICCmax), a maximum operating temperature (in terms of degrees Celsius), a guaranteed operating frequency (in terms of Gigahertz (GHz)), a maximum power level, namely a TDP level (in terms of Watts (W)), a maximum case temperature (in terms of degrees Celsius), a core count, and/or a design life (in terms of years, such as 3 years, 5 years, etc.). In some such disclosed examples, by way of these different configurations, when a processor is specified to operate at lower temperature levels, a higher configuration can be selected (and thus higher guaranteed operating frequency). In some such disclosed examples, one or more of the configurations may be stored in the processor, such as in non-volatile memory (NVM), read-only memory (ROM), etc., of the processor or may be stored in NVM, ROM, etc., that may be accessible by the processor via an electrical bus or communication pathway.

In some disclosed examples, the configurations may include settings, values, etc., to adjust and allocate power among compute cores (e.g., CPU cores, processor cores, etc.) and related components (e.g., in the "un-core" or "uncore" I/O mesh interconnect regions of the processor). These settings may have a significant effect on performance due to the different type of processor activity that occurs with network workloads (e.g., workloads causing higher power consumption in memory, caches, and interconnects between the processor and other circuitry) versus general purpose workloads (e.g., workloads causing higher power consumption in the cores of the processor).

In some disclosed examples, a processor may include cores (e.g., compute cores, processor cores, etc.), memory, mesh, and I/O (e.g., I/O peripheral(s)). For example, each of the cores may be implemented as a core tile that incorporates a core of a multi-core processor that includes an execution unit, one or more power gates, and cache memory (e.g., mid-level cache (MLC) that may also be referred to as level two (L2) cache). In some such examples, caching/home agent (CHA) (that may also be referred to as a core cache home agent) that maintains the cache coherency between core tiles. In some disclosed examples, the CHA may maintain the cache coherency by utilizing a converged/common mesh stop (CMS) that implements a mesh stop station, which may facilitate an interface between the core tile (e.g., the CHA of the corresponding core tile) and the mesh. The memory may be implemented as a memory tile that incorporates memory of the multi-core processor, such as cache memory (e.g., LLC memory). The mesh may be implemented as a fabric that incorporates a multi-dimensional array of half rings that form a system-wide interconnect grid. In some disclosed examples, at least one of the CHA, the LLC, or the mesh may implement a CLM (e.g., CLM=CHA (C), LLC (L), and mesh (M)). For example, each of the cores may have an associated CLM.

In some disclosed examples, the cores of the multi-core processor have corresponding uncores. For example, a first uncore can correspond to a first core of the multi-core processor. In some such examples, the first uncore can include a CMS, a mesh interface, and/or I/O. In some disclosed examples, a frequency of the first core may be decreased while a frequency of the first uncore is increased. For example, a frequency of the CMS, the mesh interface, the I/O, etc., and/or a combination thereof, may be increased to execute network workloads at higher frequencies and/or reduced latencies. Advantageously, increasing the frequency of the first uncore may improve the execution of network workloads because computations to process such network workloads are I/O bound due to throughput constraints. Alternatively, the frequency of the first core may be increased while the frequency of the first uncore is decreased. Advantageously, increasing the frequency of the first core may improve the execution of computationally intensive applications, such as video rendering, Machine Learning/Artificial Intelligence (ML/AI) applications, etc., because such applications are compute bound and may not require communication with different core(s) of the processor for completion of an associated workload.

Examples disclosed herein include techniques for processing a network workload with network workload optimized settings based on an application ratio. In some disclosed examples, an evaluation is made to determine whether the individual processor core supports network or workload optimized workloads with a modified processor feature. For example, a non-optimized processor may be configured for operation with an application ratio of 1.0 in a core for compute intensive workloads; an optimized processor may be configured for operation with an application ratio of less than 1.0 in a core for network intensive workloads. In some disclosed examples, other components of the processor (such as the uncore or portion(s) thereof) may be evaluated to utilize an application ratio greater than 1.0 for network intensive workloads.

In some disclosed examples, if core support for the network optimized workloads is not provided or available by a modified processor feature, then the processor core can be operated in its regular mode, based on an application ratio of 1.0. In some disclosed examples, if core support is provided and available by the modified processor feature, a processor feature (e.g., frequency, power usage, throttling, etc.) can be enabled to consider and model a particular workload scenario. In some disclosed examples, this particular workload scenario may be a network workload scenario involving a power and frequency setting adjusted based on a change in application ratio.

In some disclosed examples, one or more network workload optimizations may be implemented within the supported core(s) with a reduced application ratio. This may include a modified P-state, modified frequency values, enabling or utilization of instruction set extensions relevant to the workload, among other changes. The resulting outcome of the implementation may include operating the core in an increased performance state (e.g., higher deterministic frequency), or optionally enabling one or more instruction set features for use by the core.

In some disclosed examples, one or more optimizations may be applied within a processor design depending on its desired operational use case. This may involve throttling between standard and network workload-optimized features or optimizations (e.g., workload optimizations, network workload optimizations, etc.), depending on intended deployments, licenses, processing features of the workload, usage terms and activation agreement, etc.

In some disclosed examples, the optimized features are enabled in the form of power- and performance-based network workload optimizations, to change a processor's throughput in handling specific types of workloads at a customer deployment. For example, with the adjustment of the application ratio settings described below, processors within servers (e.g., computing servers) can be optimized for low-latency delivery of communications (e.g., 5G or NFV data) and/or content (e.g., audio, video, text, etc., data), such as from a multi-access edge computing scenario. Advantageously, such network enhancements may establish workload optimized processor performance for wireless network workloads associated with the mobile edge, core, and cloud, and other areas of mobile edge computing including data plane packet core, cloud radio access network (RAN), and backhaul processing. Advantageously, such network enhancements may also establish workload optimized processor performance for wired network workloads, including with virtual content, virtual broadband network gateways, and virtual cable modem termination systems (CMTS).

In some disclosed examples, one or more workload optimized CPUs implement aspects of a multi-core computing system, such as a terrestrial and/or non-terrestrial telecommunications network. For example, one or more workload optimized processors, such as workload optimized CPUs, having the same processor fabrication packaging can implement a virtual radio access network (vRAN) centralized unit (CU), a vRAN distributed unit (DU), a core server, etc., and/or a combination thereof. In some such examples, a first workload optimized CPU can implement the vRAN CU by executing a first set of instructions that correspond to a first set of network functions or workloads based on a first set of cores of the first workload optimized CPU having a first application ratio. In some such examples, the first workload optimized CPU can implement the vRAN DU by executing a second set of instructions that correspond to a second set of network functions or workloads based on a second set of cores of the first workload optimized CPU having a second application ratio. In some such examples, the first workload optimized CPU can implement the core server by executing a third set of instructions that correspond to a third set of network functions or workloads based on a third set of cores of the first workload optimized CPU having a third application ratio. Advantageously, the first workload optimized CPU can execute different network workloads by adjusting settings of the CPU cores on a per-core basis to operate with increased performance.

In some disclosed examples, the same multi-core processor (such as a multi-core CPU) may have a plurality of SKUs and, thus, may be implement a multi-SKU processor. For example, a first workload optimized CPU may have a first SKU when configured to implement the vRAN CU, a second SKU when configured to implement the vRAN DU, a third SKU when configured to implement the core server, etc. In some such examples, an external entity (e.g., a computing device, an infrastructure technology (IT) administrator, a user, a manufacturer enterprise system, etc.) may invoke software-defined or software-enabled silicon features of the first workload optimized CPU to allow changes to processor feature(s) thereof after manufacturing time (e.g., when deployed to and/or otherwise operating in a computing environment). For example, software-defined or software-enabled silicon feature(s) of the first workload-optimized CPU may be invoked to toggle manufacturing settings that unlock and enable capabilities upon payment or licensing to dynamically transition between SKUs.

FIG. 1 is an illustration of a first example multi-core computing environment 100. The first multi-core computing environment 100 includes an example device environment 102, an example edge network 104, an example core network 106, and an example cloud network 107. In this example, the device environment 102 is a 5G device environment that facilitates the execution of computing tasks using a wireless network, such as a wireless network based on 5G (e.g., a 5G cellular network).

The device environment 102 includes example devices (e.g., computing devices) 108, 110, 112, 114, 116. The devices 108, 110, 112, 114, 116 include a first example device 108, a second example device 110, a third example device 112, a fourth example device 114, and a fifth example device 116. The first device 108 is a 5G Internet-enabled smartphone. Alternatively, the first device 108 may be a tablet computer (e.g., a 5G Internet-enabled tablet computer), a laptop (e.g., a 5G Internet-enabled laptop), etc. The second device 110 is a vehicle (e.g., an automobile, a combustion engine vehicle, an electric vehicle, a hybrid-electric vehicle, an autonomous or autonomous capable vehicle, etc.). For example, the second device 110 can be an electronic control unit or other hardware included the vehicle, which, in some examples, can be a self-driving, autonomous, or computer-assisted driving vehicle.

The third device 112 is an aerial vehicle. For example, the third device 112 can be a processor or other type of hardware included in an unmanned aerial vehicle (UAV) (e.g., an autonomous UAV, a human or user-controlled UAV, etc.), such as a drone. The fourth device 114 is a robot. For example, the fourth device 114 can be a collaborative robot, a robot arm, or other type of machinery used in assembly, lifting, manufacturing, etc., types of tasks.

The fifth device 116 is a healthcare associated device. For example, the fifth device 116 can be a computer server that stores, analyzes, and/or otherwise processes health care records. In other examples, the fifth device 116 can be a medical device, such as an infusion pump, magnetic resonance imaging (MM) machine, a surgical robot, a vital sign monitoring device, etc. In some examples, one or more of the devices 108, 110, 112, 114, 116 may be a different type of computing device, such as a server, a personal computer, a workstation, a self-learning machine (e.g., a neural network), a mobile device (e.g., a cell phone, a smart phone, a tablet such as an iPad™), a personal digital assistant (PDA), an Internet appliance, a digital versatile disk (DVD) player, a compact disk (CD) player, a digital video recorder, a Blu-ray player, a gaming console, a personal video recorder, a set top box, a headset or other wearable device, or any other type of computing device. In some examples, there may be fewer or more devices than depicted in FIG. 1.

The devices 108, 110, 112, 114, 116 and/or, more generally, the device environment 102, are in communication with the edge network 104 via first example networks 118. The first networks 118 are cellular networks (e.g., 5G cellular networks). For example, the first networks 118 can be implemented by and/or otherwise facilitated by antennas, radio towers, etc., and/or a combination thereof. Additionally or alternatively, one or more of the first networks 118 may be an Ethernet connection, a digital subscriber line (DSL) connection, a telephone line connection, a coaxial cable system, a satellite system, a line-of-site wireless system, a cellular telephone system, a terrestrial network, a non-terrestrial network, etc., and/or a combination thereof.

In the illustrated example of FIG. 1, the edge network 104 includes the first networks 118, example remote radio units (RRUs) 120, example distributed units (DUs) 122, and example centralized units (CUs) 124. In this example, the DUs 122 and/or the CUs 124 are multi-core computing systems. For example, one or more of the DUs 122 and the CUs 124 can include a plurality of processors (e.g., multi-core processors) that each include a plurality of cores (e.g., compute cores, processor cores, etc.). In some such examples, the DUs 122 and/or the CUs 124 are edge servers (e.g., 5G edge servers), such as multi-core edge servers, that can effectuate the distribution of data flows (e.g., communication flows, packet flows, a flow of one or more data packets, etc.) through the edge network 104 to a different destination (e.g., the 5G device environment 102, the core network 106, etc.). In some examples, fewer or more of the first networks 118, the RRUs 120, the DUs 122, and/or the CUs 124 may be used than depicted in FIG. 1.

In this example, the RRUs 120 are radio transceivers (e.g., remote radio transceivers, also referred to as remote radio heads (RRHs)) in a radio base station. For example, the RRUs 120 are hardware that can include radio-frequency (RF) circuitry, analog-to-digital/digital-to-analog converters, and/or up/down power converters that connects to a network of an operator (e.g., a cellular operator or provider). In some such examples, the RRUs 120 can convert a digital signal to RF, amplify the RF signal to a desired power level, and radiate the amplified RF signal in air via an antenna. In some examples, the RRUs 120 can receive a desired band of signal from the air via the antenna and amplify the received signal. The RRUs 120 are termed as remote because the RRUs 120 are typically installed on a mast-top, or tower-top location that is physically distant from base station hardware, which is often mounted in an indoor rack-mounted location or installation.

In the illustrated example of FIG. 1, the RRUs 120 are coupled to and/or otherwise in communication with a respective one of the DUs 122. In this example, the DUs 122 include hardware that implement real time Layer 1 (L1) scheduling functions (e.g., physical layer control) and/or Layer 2 (L2) scheduling functions (e.g., radio link control (RLC), medium access control (MAC), etc.). In this example, the CU 124 includes hardware that implements Layer 3 scheduling functions, such as packet data convergence control (PDCP) and/or radio resource control (RRC) functions. In this example, a first one of the CUs 124 is a centralized unit control plane (CU-CP) and a second one of the CUs 124 is a centralized unit user plane (CU-UP).

In this example, at least one of one or more of the DUs 122 and/or one or more of the CUs 124 implement a vRAN. For example, one or more of the DUs 122 or portion(s) thereof may be virtualized to implement one or more vRAN DUs, one or more of the CUs 124 or portion(s) thereof may be virtualized to implement one or more vRAN CUs, etc. In some examples, one or more of the DUs 122 and/or one or more of the CUs 124 execute, run, and/or otherwise implement virtualized baseband functions on vendor-agnostic hardware (e.g., commodity server hardware) based on the principles of NFV. NFV is a network architecture concept that uses the technologies of IT virtualization to virtualize entire classes of network node functions into building blocks that may be connected, or chained together, to create communication services.

In the illustrated example of FIG. 1, first connection(s) or communication link(s) between the first networks 118 and the RRUs 120 implement(s) the fronthaul of the edge network 104. Second connection(s) or communication link (s) between the DUs 122 and the CUs 124 implement(s) the midhaul of the edge network 104. Third connection(s) or third communication link(s) between the CUs 124 and the core network 106 implement(s) the backhaul of the edge network 104.

In the illustrated example of FIG. 1, the core network 106 includes example core devices 126. In this example, the core devices 126 are multi-core computing systems. For example, one or more of the core devices 126 can include a plurality of processors (e.g., multi-core processors) that each include a plurality of cores (e.g., compute cores, processor cores, etc.). For example, one or more of the core devices 126 can be servers (e.g., physical servers, virtual or virtualized servers, etc., and/or a combination thereof). In some such examples, one or more of the core devices 126 can be implemented with the same hardware as the DUs 122, the CUs 124, etc. In some examples, one or more of the core devices 126 may be any other type of computing device.

The core network 106 is implemented by different logical layers including an example application layer 128, an example virtualization layer 130, and an example hardware layer 132. In some examples, the core devices 126 implement core servers. In some examples, the application layer 128 or portion(s) thereof, the virtualization layer 130 or portion(s) thereof, and/or the hardware layer 132 or portion(s) thereof implement one or more core servers. For example, a core server can be implemented by the application layer 128, the virtualization layer 130, and/or the hardware layer 132 associated with a first one of the core devices 126, a second one of the cores devices 126, etc., and/or a combination thereof. In this example, the application layer 128 can implement business support systems (BSS), operations supports systems (OSS), 5G core (5GC) systems, Internet Protocol (IP) multimedia core network subsystems (IMS), etc., in connection with operation of a telecommunications network, such as the first multi-core computing environment 100 of FIG. 1. In this example, the virtualization layer 130 can be representative of virtualizations of the physical hardware resources of the core devices 126, such as virtualizations of processing resources (e.g., CPUs, graphics processing units (GPUs), etc.), memory resources (e.g., non-volatile memory, volatile memory, etc.), storage resources (e.g., hard-disk drives, solid-state disk drives, etc.), network resources (e.g., network interface cards (NICs), gateways, routers, etc.), etc. In this example, the virtualization layer 130 can control and/or otherwise manage the virtualizations of the physical hardware resources with a hypervisor that can run one or more virtual machines (VMs) built and/or otherwise composed of the virtualizations of the physical hardware resources.

The core network 106 is in communication with the cloud network 107. In this example, the cloud network 107 can be a private or public cloud services provider. For example, the cloud network 107 can be implemented using virtual and/or physical hardware, software, and/or firmware resources to execute computing tasks. In some examples, the cloud network 107 may implement and/or otherwise effectuate Function-as-a-Service (FaaS), Infrastructure-as-a-Service (IaaS), Software-as-a-Service (SaaS), etc., systems.

In the illustrated example of FIG. 1, multiple example communication paths 134, 136, 138 are depicted including a first example communication path 134, a second example communication path 136, and a third example communication path 138. In this example, the first communication path 134 is a device-to-edge communication path that corresponds to communication between one(s) of the devices 108, 110, 112, 114, 116 of the 5G device environment 102 and one(s) of the first networks 118, RRUs 120, DUs 122, and/or CUs 124 of the edge network 104. The second communication path 136 is an edge-to-core communication path that corresponds to communication between one(s) of the first networks 118, RRUs 120, DUs 122, and/or CUs 124 of the edge network 104 and one(s) of the core devices 126 of the core network 106. The third communication path 138 is a device-to-edge-to-core communication path that corresponds to communication between one(s) of the devices 108, 110, 112, 114, 116 and one(s) of the core devices 126 via one(s) of the first networks 118, RRUs 120, DUs 122, and/or CUs 124 of the edge network 104.

In some examples, one(s) of the DUs 122, the CUs 124, the core servers 126, etc., of the first multi-core computing environment 100 include workload configurable or workload adjustable hardware, such as workload configurable or adjustable CPUs, GPUs, etc., or any other type of processor. For example, the workload adjustable hardware can be multi-SKU CPUs, such as network-optimized CPUs, that include cores that can be adjusted, configured, and/or otherwise modified on a per-core and/or per-uncore basis to effectuate completion of network workloads with increased performance. Additionally or alternatively, in some disclosed examples, the workload adjustable hardware may execute, implement, and/or otherwise effectuate example workloads, such as artificial intelligence and/or machine learning model executions and/or computations, IoT service workloads, autonomous driving computations, V2X workloads, video surveillance monitoring, real time data analytics, delivering and/or encoding media streams, measuring advertisement impression rates, object detection in media streams, speech analytics, asset and/or inventory management, virtual reality, and/or augmented reality processing with increased performance and/or reduced latency.

In some examples, the network-optimized CPUs include a first set of one or more cores that can execute first network workloads based on and/or otherwise assuming a first application ratio (and a first operating frequency) and a first set of instructions (e.g., machine readable instructions, 256-bit Streaming Single Instruction, Multiple Data (SIMD) Extensions (SSE) instructions, etc.). In some such examples, the network-optimized CPUs can include a second set of one or more cores that can execute second network workloads based on and/or otherwise assuming a second application ratio (and a second operating frequency) and a second set of instructions (e.g., Advanced Vector Extensions (AVX) 512-bit instructions also referred to as AVX-512 instructions). In some examples, the network-optimized CPUs can include a third set of one or more cores that can execute third network workloads based on and/or otherwise assuming a third application ratio (and a third operating frequency) and a third set of instructions (e.g., an Instruction Set Architecture (ISA) tailored to and/or otherwise developed to improve and/or otherwise optimize 5G processing tasks that may also be referred to herein as 5G-ISA instructions).

In some examples, the first application ratio can correspond to a regular or baseline operating mode having a first operating frequency. In some examples, the second application ratio can correspond to a first enhanced or increased performance mode having a second operating frequency greater than the first operating frequency, and thereby the second application ratio is less than the first application ratio. In some examples, the third application ratio can correspond to a second enhanced or increased performance mode having a third operating frequency greater than the first operating frequency and/or the second operating frequency, and thereby the third application ratio is less than the first application ratio and/or the second application ratio. In some such examples, changing between application ratios can invoke a change in guaranteed operating frequency of at least one of one or more cores or one or more corresponding uncores (e.g., one or more I/O, one or more memories, or one or more mesh interconnect(s) (or more generally one or more mesh fabrics), etc.).

In some examples, the second set of cores can execute the second network workloads with increased performance compared to the performance of the first set of cores. In some such examples, one(s) of the first set of cores and/or one(s) of the second set of cores can dynamically transition to different modes based on an instruction to be loaded to a core, an available power budget of the network-optimized CPU, etc., and/or a combination thereof. In some examples, one(s) of the first set of cores and/or one(s) of the second set of cores can dynamically transition to different modes in response to a machine-learning model analyzing past or instantaneous workloads and determining change(s) in operating modes based on the analysis. Advantageously, one(s) of the cores of the network-optimized CPU can be configured at boot (e.g., BIOS) or runtime.

FIG. 2 is a block diagram 200 showing an overview of a configuration for edge computing, which includes a layer of processing referred to in many of the following examples as an "edge cloud". For example, the block diagram 200 of FIG. 2 may implement the first multi-core computing environment 100 of FIG. 1 or portion(s) thereof. As shown, the edge cloud 210 is co-located at an edge location, such as an access point or base station 240, a local processing hub 250, or a central office 220, and thus may include multiple entities, devices, and equipment instances. The edge cloud 210 is located much closer to the endpoint (consumer and producer) data sources 260 (e.g., autonomous vehicles 261, user equipment 262, business and industrial equipment 263, video capture devices 264, drones 265, smart cities and building devices 266, sensors and Internet-of-Things (IoT) devices 267, etc.) than the cloud data center 230. Compute, memory, and storage resources that are offered at the edges in the edge cloud 210 are critical to providing ultra-low latency response times for services and functions used by the endpoint data sources 260 as well as reduce network backhaul traffic from the edge cloud 210 toward cloud data center 230 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 2, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center. At a more generic level, an edge computing system may be described to encompass any number of deployments operating in the edge cloud 210, which provide coordination from client and distributed computing devices.

Figure 3:
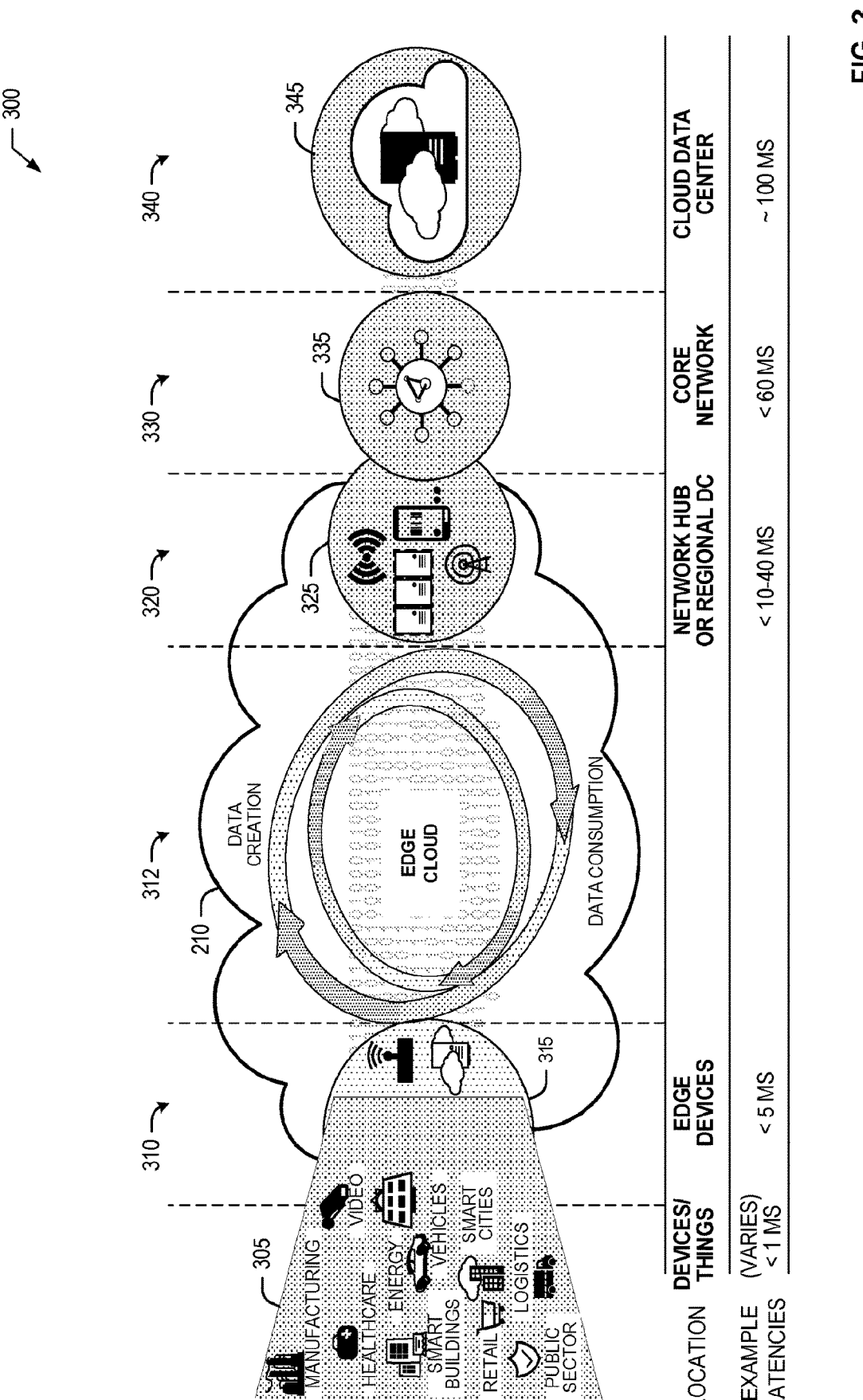
FIG. 3 illustrates operational layers among example end-points, an example edge cloud, and example cloud computing environments that may implement the examples disclosed herein.

FIG. 3 illustrates operational layers among endpoints, an edge cloud, and cloud computing environments. Specifically, FIG. 3 depicts examples of computational use cases 305, utilizing the edge cloud 210 of FIG. 2 among multiple illustrative layers of network computing. The layers begin at an endpoint (devices and things) layer 300, which accesses the edge cloud 210 to conduct data creation, analysis, and data consumption activities. For example, the endpoint layer 300 may implement the 5G device environment 102 of FIG. 1. The edge cloud 210 may span multiple network layers, such as an edge devices layer 310 having gateways, on-premise servers, or network equipment (nodes 315) located in physically proximate edge systems; a network access layer 320, encompassing base stations, radio processing units, network hubs, regional data centers (DC), or local network equipment (equipment 325); and any equipment, devices, or nodes located therebetween (in layer 312, not illustrated in detail). For example, the layer 312 and/or the network access layer 320, and/or, more generally, the edge cloud 210, may implement the edge network 104 of FIG. 1. The network communications within the edge cloud 210 and among the various layers may occur via any number of wired or wireless mediums, including via connectivity architectures and technologies not depicted. In some examples, the core network 330 may implement the core network 106 of FIG. 1.

Examples of latency, resulting from network communication distance and processing time constraints, may range from less than a millisecond (ms) when among the endpoint layer 300, under 5 ms at the edge devices layer 310, to even between 10 to 40 ms when communicating with nodes at the network access layer 320. Beyond the edge cloud 210 are core network 330 and cloud data center 332 layers, each with increasing latency (e.g., between 50-60 ms at the core network layer 330, to 100 or more ms at the cloud data center layer 340). As a result, operations at a core network data center 335 or a cloud data center 345, with latencies of at least 50 to 100 ms or more, will not be able to accomplish many time-critical functions of the use cases 305. Each of these latency values are provided for purposes of illustration and contrast; it will be understood that the use of other access network mediums and technologies may further reduce the latencies. In some examples, the cloud data center layer 340 may implement the cloud network 107 of FIG. 1. In some examples, respective portions of the network may be categorized as "close edge", "local edge", "near edge", "middle edge", or "far edge" layers, relative to a network source and destination. For instance, from the perspective of the core network data center 335 or a cloud data center 345, a central office or content data network may be considered as being located within a "near edge" layer ("near" to the cloud, having high latency values when communicating with the devices and endpoints of the use cases 305), whereas an access point, base station, on-premise server, or network gateway may be considered as located within a "far edge" layer ("far" from the cloud, having low latency values when communicating with the devices and endpoints of the use cases 305). It will be understood that other categorizations of a particular network layer as constituting a "close", "local", "near", "middle", or "far" edge may be based on latency, distance, number of network hops, or other measurable characteristics, as measured from a source in any of the network layers 300-340.

The various use cases 305 may access resources under usage pressure from incoming streams, due to multiple services utilizing the edge cloud. To achieve results with low latency, the services executed within the edge cloud 210 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 210 may provide the ability to serve and respond to multiple applications of the use cases 305 (e.g., object tracking, video surveillance, connected cars, etc.) in real-time or near real-time, and meet ultra-low latency requirements for these multiple applications. These advantages enable a whole new class of applications (e.g., virtual network functions (VNFs), FaaS, Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 210 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 210 (network layers 310-330), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 210.

As such, the edge cloud 210 is formed from network components and functional features operated by and within edge gateway nodes, edge aggregation nodes, or other edge compute nodes among network layers 310-330. The edge cloud 210 thus may be embodied as any type of network that provides edge computing and/or storage resources which are proximately located to RAN capable endpoint devices (e.g., mobile computing devices, IoT devices, smart devices, etc.), which are discussed herein. In other words, the edge cloud 210 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 210 may be servers, multi-tenant servers, appliance computing devices, and/or any other type of computing devices. For example, the edge cloud 210 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, light emitting diodes (LEDs), speakers, I/O ports (e.g., universal serial bus (USB)), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include IoT devices. The appliance computing device may include hardware and software components to manage local issues such as device temperature, vibration, resource utilization, updates, power issues, physical and network security, etc. The example processor systems of at least FIGS. 68, 69, and/or 70 illustrate example hardware for implementing an appliance computing device. The edge cloud 210 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 4:
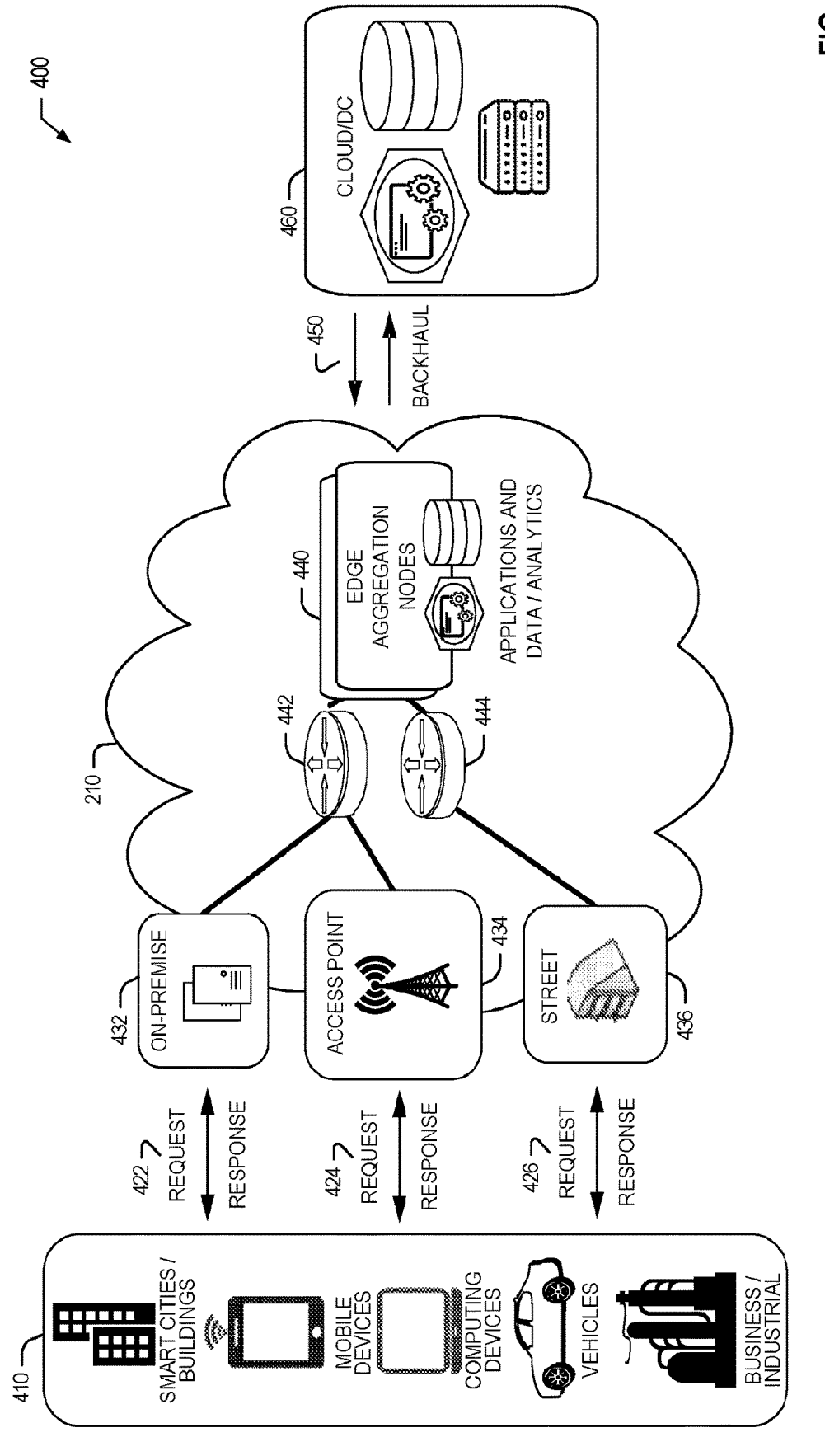
FIG. 4 illustrates an example approach for networking and services in an edge computing system that may implement the examples disclosed herein.

In FIG. 4, various client endpoints 410 (in the form of mobile devices, computers, autonomous vehicles, business computing equipment, industrial processing equipment) exchange requests and responses that are specific to the type of endpoint network aggregation. For instance, client endpoints 410 may obtain network access via a wired broadband network, by exchanging requests and responses 422 through an on-premise network system 432. Some client endpoints 410, such as mobile computing devices, may obtain network access via a wireless broadband network, by exchanging requests and responses 424 through an access point (e.g., cellular network tower) 434. Some client endpoints 410, such as autonomous vehicles may obtain network access for requests and responses 426 via a wireless vehicular network through a street-located network system 436. However, regardless of the type of network access, the TSP may deploy aggregation points 442, 444 within the edge cloud 210 of FIG. 2 to aggregate traffic and requests. Thus, within the edge cloud 210, the TSP may deploy various compute and storage resources, such as at edge aggregation nodes 440, to provide requested content. The edge aggregation nodes 440 and other systems of the edge cloud 210 are connected to a cloud or data center (DC) 460, which uses a backhaul network 450 to fulfill higher-latency requests from a cloud/data center for websites, applications, database servers, etc. Additional or consolidated instances of the edge aggregation nodes 440 and the aggregation points 442, 444, including those deployed on a single server framework, may also be present within the edge cloud 210 or other areas of the TSP infrastructure.

Figure 5:
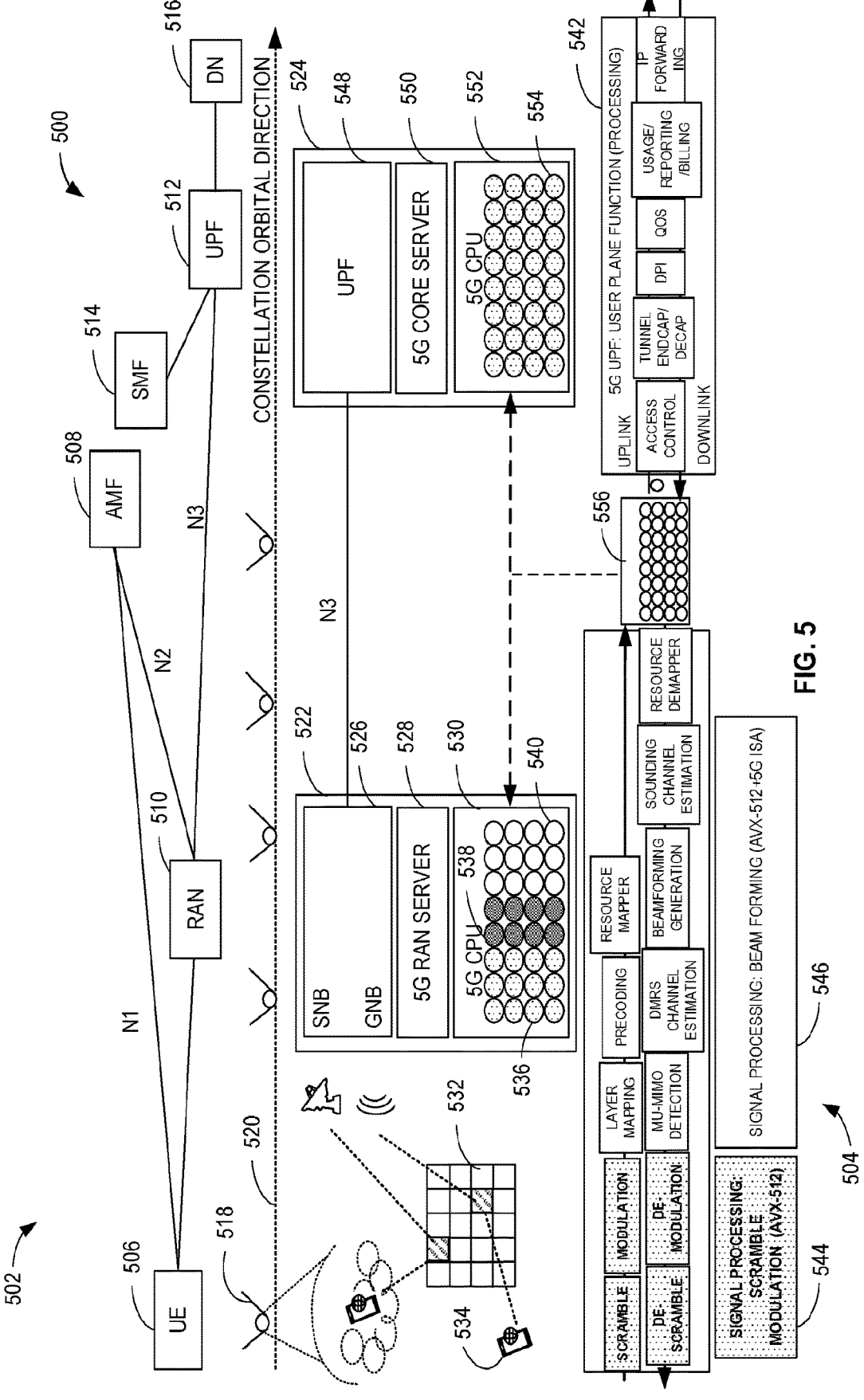
FIG. 5 is an illustration of a second example multi-core computing environment including a second example multi-core computing system including an example workload-adjustable central processing unit (CPU).

FIG. 5 is an illustration of a second example multi-core computing environment 500 including an example non-terrestrial network 502 and an example terrestrial network 504. In this example, the non-terrestrial network 502 includes example user equipment (UE) 506, an example core access and mobility management function (AMF) 508, an example radio access network (RAN) 510, an example user plane function (UPF) 512, an example session management function (SMF) 514, an example destination network (DN) 516, and example satellites 518 orbiting along an example constellation orbital direction 520. In this example, at least one of the UE 506, the AMF 508, the RAN 510, the UPF 512, the SMF 514, the DN 516, or the satellites 518 implement a network, such as a 5G telecommunications network. In this example, the UE 506, the AMF 508, the RAN 510, the UPF 512, the SMF 514, the DN 516, and/or the satellites 518 is/are in communication with one(s) of each other via communication links or nodes (e.g., node 1 (N1), node 2 (N2), node 3 (N3), node 4 (N4), node 5 (N5), node 6 (N6), etc.).

In the illustrated example of FIG. 5, the terrestrial network 504 includes a first example multi-core computing system 522 and a second example multi-core computing system 524. In this example, the first multi-core computing system 522 is in communication with the second multi-core computing system 524 via a wired or wireless connection represented by node 3 (N3).

The first multi-core computing system 522 includes example nodes 526, an example 5G RAN server 528, and a first example 5G CPU 530. In this example, the nodes 526 include and/or otherwise implement a satellite Node B (sNB) and a next generation Node B (gNB). The nodes 526 may be implemented with hardware that is connected to an example wireless network (e.g., a mobile phone network) 532. In this example, the wireless network 532 communicates with mobile handsets, such as an example 5G Internet-enabled smartphone 534. For example, the nodes 526 may include and/or otherwise implement radio frequency transmitter(s) and the receiver(s) used to communicate with the mobile handsets. In this example, one(s) of the satellites 518 may communicate with the sNB node of the nodes 526 via the wireless network 532. Additionally or alternatively, the nodes 526 may be in communication with one(s) of the devices 108, 110, 112, 114, 116 of FIG. 1. In some examples, the wireless network 532 may implement the 5G device environment 102 of FIG. 1.

In this example, the 5G RAN server 528 may implement one of the DUs 122 of FIG. 1, one of the CUs 124 of FIG. 1, etc. In this example, the first 5G CPU 530 is a multi-core network optimized CPU. For example, the first 5G CPU 530 includes a plurality of cores that may be configured on a per-core basis to execute network workloads of interest. In some examples, the first 5G CPU 530 includes a plurality of uncores (e.g., uncore logic circuitry, uncore logic, etc.) that may be configured on a per-uncore basis to execute network workloads of interest with reduced latency and increased throughput. In this example, the first 5G CPU 530 includes a first example set of cores 536, a second example set of cores 538, and a third example set of cores 540. In some examples, one or more of the cores 536, 538, 540 may have a corresponding uncore. For example, the first set of cores 536 can load a first set of machine readable instructions that, when executed, can process first example network functions or workloads 542. In some such examples, the second set of cores 538 can load a second set of machine readable instructions that, when executed, can process second example network functions or workloads 544. In some such examples, the third set of cores 540 can load a third set of machine readable instructions that, when executed, can process third example network functions or workloads 546.

In some examples, one or more of the uncores may be configured to operate at a higher or lower operating frequency based on the type of network workload (e.g., a terrestrial network workload or non-terrestrial network workload) to be executed. In some examples, one or more of the uncores may be configured to operate at a higher or lower operating frequency based on the latency requirements, the power requirements, and/or the throughput requirements associated with network workloads to be executed and/or otherwise processed.

In this example, the first set of machine readable instructions can be 256-bit SSE instructions. For example, the first set of machine readable instructions may effectuate UPF-related tasks, such as access control tunnel encapsulation or decapsulation, deep packet inspection (DPI), Quality-of-Service (QoS), usage reporting and/or billing, Internet Protocol (IP) forwarding, etc. In some examples, the second set of machine readable instructions can be 512-bit AVX instructions. For example, the second set of machine readable instructions can effectuate signal processing related tasks, such as scrambling or descrambling, modulation or demodulation, etc. In some examples, the third set of machine readable instructions can be a set of instructions that include 512-bit AVX instructions and 5G instruction set architecture (ISA) instructions, which may be referred to herein as AVX-512+5G ISA instructions (e.g., AVX-512 and 5G ISA instructions). For example, the AVX-512+5G ISA instructions may implement an extension (e.g., an instruction set extension) of the AVX-512 instructions with extension being the 5G ISA instructions.

Denormal FP16 operands in 5G-ISA instructions are handled at full speed to facilitate using the full dynamic range of FP16 numbers. Unlike FP32 and FP64 numbers, the FP16 operands in the AVX512-FP16 ISA are not conditionally flushed to zero or treated as zero based on MXCSR settings. Except for the legacy instructions that use FP16 inputs, if an instruction uses an FP16 value as a source operand, denormal numbers are unconditionally processed. Similarly, except for the legacy instructions that produce FP16 outputs, if an instruction produces an FP16 output, denormal numbers are unconditionally produced. The legacy instructions associated with the CPUID bits F16C and AVX512F continue to use MXCSR.DAZ and MXCSR.FTZ for their inputs and outputs respectively. Conversion instructions that use FP32 or FP64 sources continue to use MXCSR.DAZ to control denormal handling for their inputs. Conversion instructions that create FP32 or FP64 outputs continue to use MXCSR.FTZ to control denormal handling for their outputs.

Advantageously, 5G-ISA instructions can effectuate higher, enhanced, and/or otherwise increased performance of core(s) of a multi-core processor at increased frequencies or reduced power, with the ability to trade-off between the two to improve and/or otherwise optimize the performance of the multi-core processor. For example, the third set of machine readable instructions can effectuate signal processing tasks, such as beam forming. In some such examples, the signal processing tasks can include layer mapping, precoding, resource mapping, multi-user, multiple-input, multi-output technology (MU-MIMO) detection, demodulation reference signal (DMRS) channel estimation, beamforming generation, sounding channel estimation, resource demapping, etc.

In the illustrated example of FIG. 5, the second multi-core computing system 524 includes an example UPF 548, an example 5G core server 550, and a second example 5G CPU 552. In this example, the 5G core server 550 may implement one of the core devices 126 of FIG. 1. In this example, the second 5G CPU 552 includes example cores 554 that are executing the first machine readable instructions to process one(s) of the first network functions or workloads 542. Although all the cores 554 in this example are executing the first machine readable instructions, alternatively, one or more of the cores 554 may execute the second or third machine readable instructions. In this example, cores of the first multi-core CPU 530 and/or the second multi-core CPU 552 may execute different machine readable instructions to effectuate different one(s) of the network workloads 542, 544, 546. For example, at a first time, a first core of the first set of cores 536 may load a first instruction of the first machine readable instructions to execute one of the first network workloads 542. In some such examples, in response to completing the one of the first network workloads 542, the first core may load a second instruction of the second machine readable instructions to execute one of the second network workloads 544.

Advantageously, one(s) of the cores of the first 5G CPU 530 and/or the second 5G CPU 552 may be dynamically configured to process one(s) of the network workloads 542, 544, 546 based on a machine readable instruction that is loaded for execution. Advantageously, one(s) of the uncores corresponding to the one(s) of the cores of the first 5G CPU 530 and/or the second 5G CPU 552 may be dynamically configured to process one(s) of the network workloads 542, 544, 546 based on the machine readable instruction that is loaded for execution, the type of the network workload, requirement(s) (e.g., latency requirements, power requirements, throughput requirements, etc.) associated with the network workload, etc., and/or a combination thereof. Further depicted in FIG. 5 is a third example 5G CPU 556. In this example, the third 5G CPU 556 may not be a network-optimized CPU and thereby may not be dynamically configurable on a per-core and/or per-uncore basis.

Figure 6:
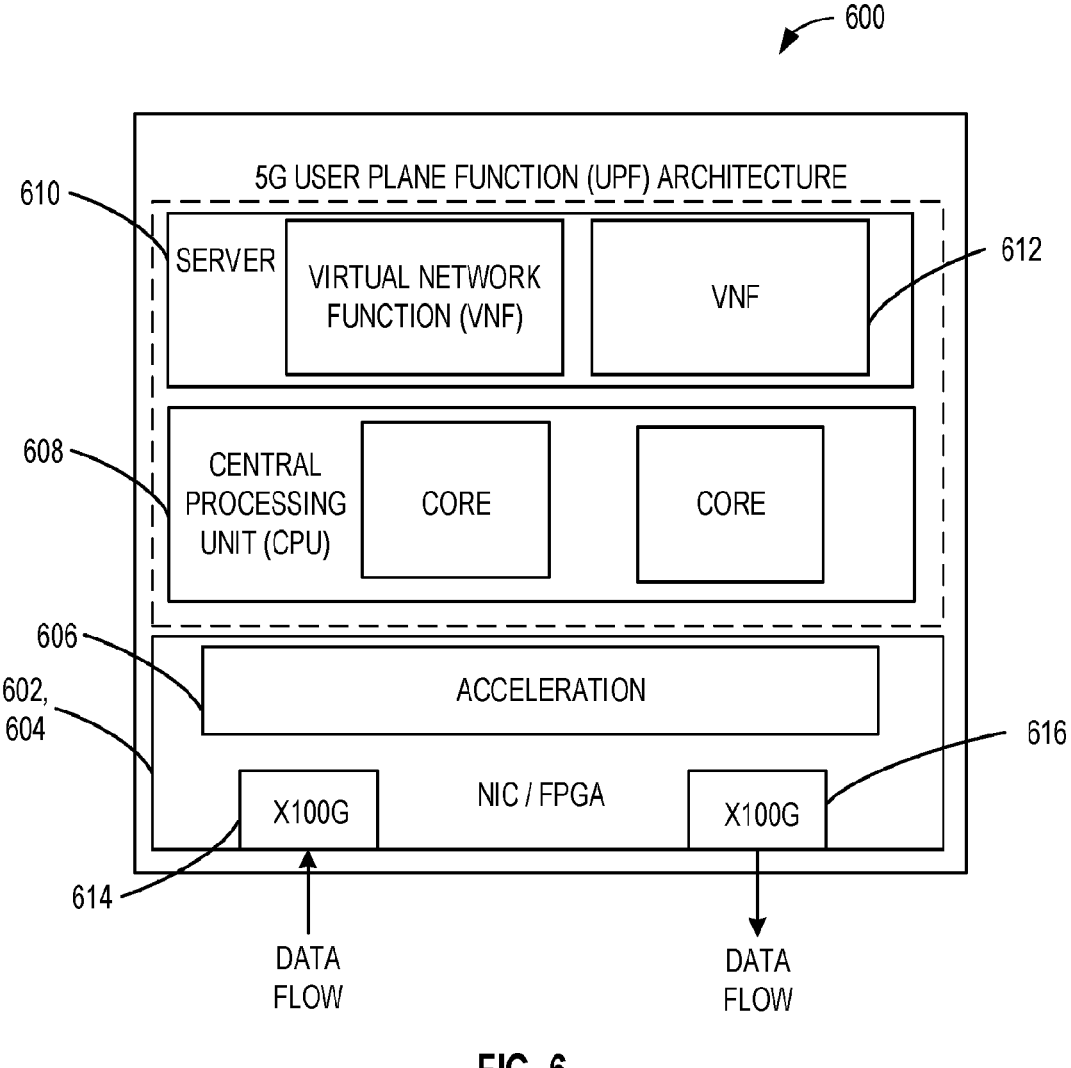
FIG. 6 is a block diagram of an example implementation of the first multi-core computing system of FIG. 1 and/or the second multi-core computing system of FIG. 5.

FIG. 6 is a block diagram of an example implementation of a third example multi-core computing system 600. For example, the third multi-core computing system 600 may implement the DUs 122 of FIG. 1, the CUs 124 of FIG. 1, the core servers 126 of FIG. 1, the first multi-core computing system 522 of FIG. 5 or portion(s) thereof, and/or the second multi-core computing system 524 of FIG. 5 or portion(s) thereof.

In this example, the third multi-core computing system 600 includes an example network interface card (NIC) 602 and/or an example field programmable gate array (FPGA) 604. In this example, the NIC 602 and/or the FPGA 604 implements an example acceleration resource 606. Additionally or alternatively, example multi-core CPU 608 may implement the acceleration resource 606. In this example, the third multi-core computing system 600 includes the multi-core CPU 608 and an example server 610 that implements example VNFs 612. In this example, the NIC 602 and/or the FPGA 604 obtains a workload (e.g., a computing workload, a network workload, etc.) at a first example interface (e.g., a 100 gigabit (100G) interface) 614 and outputs a result of processing the workload at a second example interface 616. In some examples, the first interface 614 may be the same as the second interface 616. In this example, the server 610 and/or the multi-core CPU 608 implements a 5G UPF architecture. For example, the multi-core CPU 608, the server 610, and/or, more generally, the third multi-core computing system 600 may implement the UPF 512 and/or the UPF 548 of FIG. 5.

Figure 7:
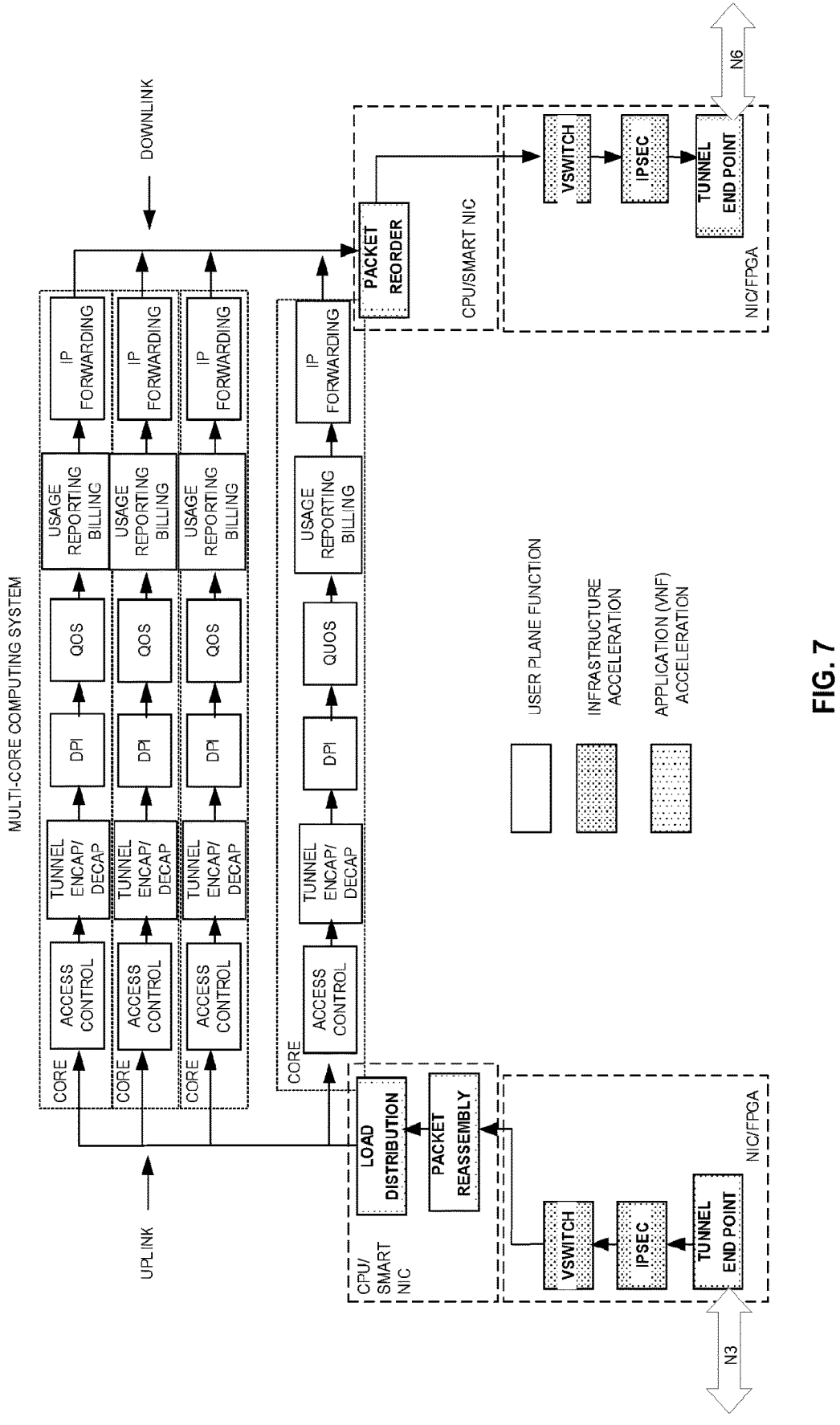
FIG. 7 is a block diagram of another example implementation of the first multi-core computing system of FIG. 1 and/or the second multi-core computing system of FIG. 5.

FIG. 7 is a block diagram of an example implementation of a fourth example multi-core computing system 700. In this example, the fourth multi-core computing system 700 implements the third multi-core computing system 600 of FIG. 6. In some examples, the fourth multi-core computing system 700 may implement the DUs 122 of FIG. 1, the CUs 124 of FIG. 1, the core servers 126 of FIG. 1, the first multi-core computing system 522 of FIG. 5 or portion(s) thereof, and/or the second multi-core computing system 524 of FIG. 5 or portion(s) thereof. In this example, the NIC 602 and/or the FPGA 604 of FIG. 6 may execute tasks such as tunnel end point, IP security (IPsec), and virtual switch (vSwitch) tasks. In this example, the acceleration resource 606 of FIG. 6 may execute tasks such as packet reassembly (e.g., data packet reassembly), load distribution, and packet reordering. In this example, the multi-core CPU 608 may execute tasks to implement the VNFs 612 of FIG. 6, such as access control, tunnel encapsulation or decapsulation, DPI, QoS, usage reporting and/or billing, and IP forwarding tasks. In some examples, a first one of the multi-core CPU 608 may execute the VNFs 612 based on a first application ratio (and a first operating frequency), a second one of the multi-core CPU 608 may execute the VNFs 612 based on a second application ratio (and a second operating frequency), etc.

Advantageously, the multi-core CPU 608 may be configured on a per-core basis based on a loaded instruction to improve performance. For example, in response to loading an access control instruction (e.g., a machine readable instruction that, when executed, effectuates an access control task or function), a first core of the first one of the multi-core CPU 608 may be configured assuming the first application ratio and thereby configured to execute the access control instruction with the first operating frequency. In some examples, a first uncore that corresponds to the first core can be configured based on the loaded instruction to improve throughput and reduce latency. For example, in response to loading the access control instruction by the first core, the first uncore may be configured assuming the first application ratio (or a different application ratio) and thereby configured to operate with a second operating frequency to facilitate execution of the access control instruction.

Figure 8:
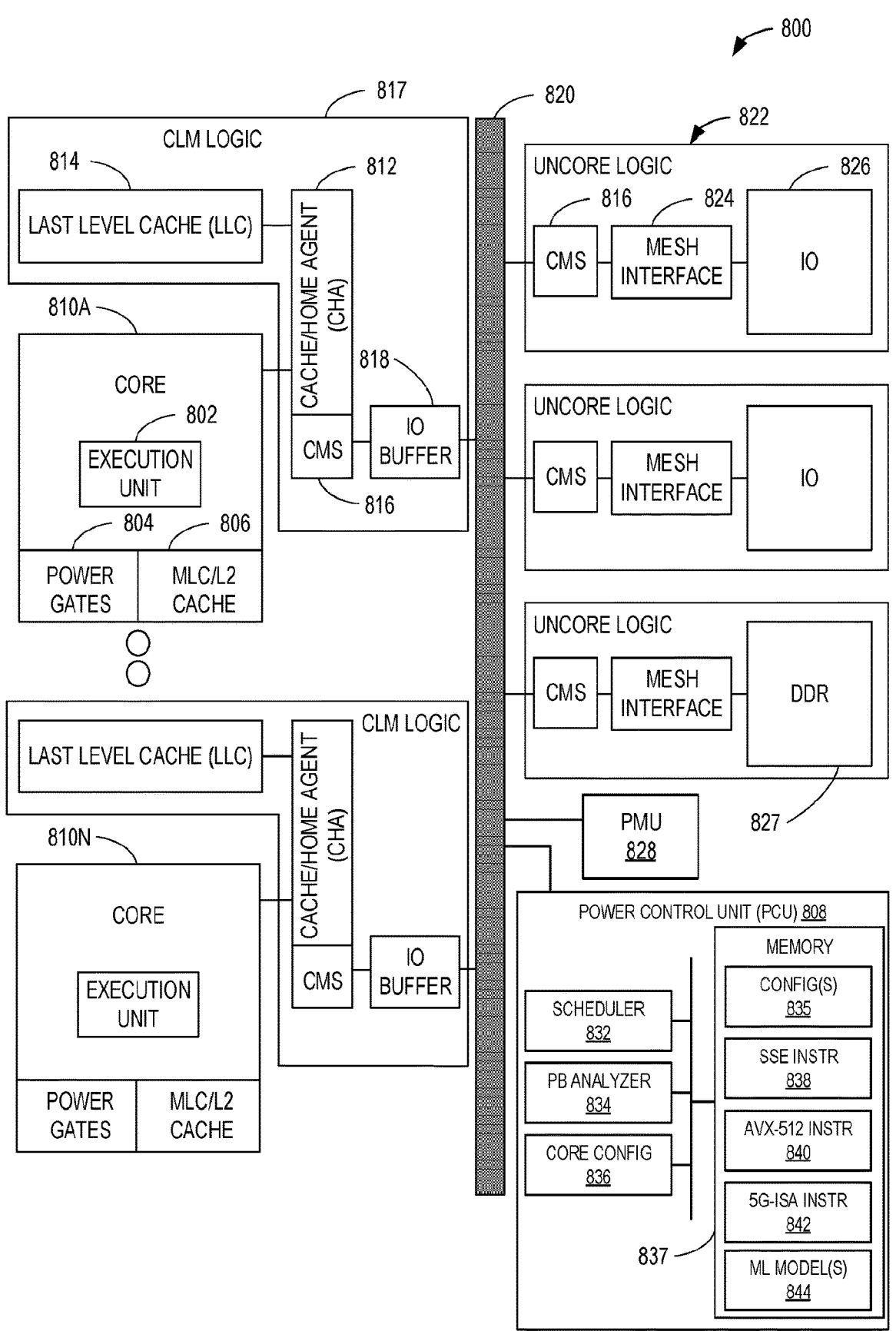
FIG. 8 is a block diagram of an example implementation of a multi-core processor including an example power control unit (PCU) that may be used to implement per-core basis configuration to improve and/or otherwise optimize the processing of network workloads.

FIG. 8 is a block diagram of an example implementation of a processor 800 that may be used to implement hardware configurations on a per-core and/or per-uncore basis to improve and/or otherwise optimize the processing of network workloads. In some examples, the processor 800 implements a network-optimized processor, such as a workload-optimized processor (e.g., network-workload-optimized processor). For example, the processor 800 may implement the first multi-core CPU 530 of FIG. 5, the second multi-core CPU 552 of FIG. 5, and/or the multi-core CPU 608 of FIGS. 6 and/or 7.

As illustrated in FIG. 8, the processor 800 may be a multi-core processor including a plurality of example cores 810A-810N. By way of example, the processor 800 may include 32 of the cores 810A-810N. Alternatively, the processor 800 may include any other number of the cores 810A-810N. In this example, the cores 810A-810N implement circuitry to facilitate execution of the cores 810A-810N, such as an example execution unit 802, one or more example power gates 804 to deliver power to one(s) of the cores 810A-810N, and example cache memory 806. In some examples, the execution unit 802 implements execution circuitry or logic circuitry. In this example, the cache memory 806 is mid-level cache (MLC), which may also be referred to as level two (L2) cache. In some examples, one or more of the cores 810A-810N may be of an independent power domain and can be configured to enter and exit active states and/or maximum performance states based on workload.

In this example, the cores 810A-810N are coupled to a respective caching/home agent (CHA) 812 that maintain the cache coherency between one(s) of the cores 810A-810N and respective example last level cache (LLC) 814. In this example, the CHA 812 implements an example converged/common mesh stop (CMS) 816. In this example, the CMS 816 implements an interface between the cores 810A-810N and an example I/O buffer 818. In this example, the I/O buffer 818 implements an interface between the CMS 816 and an example interconnect 820, which may also be referred to as a mesh. For example, the interconnect 820 may be implemented as a bus, a fabric (e.g., a mesh fabric), etc., that incorporates a multi-dimensional array of half rings that form a system-wide interconnect grid. In some examples, at least one of the LLC 814, the CHA 812, the CMS 816, or the I/O buffer 818 may implement a CLM or CLM logic 817. For example, each of the cores 810A-810N may have a corresponding instance of the CLM 817.

In this example, the interconnect 820 facilitates communication between the cores 810A-810N and corresponding hardware and example uncore logic 822. In this example, the uncore logic 822 includes instances of the CMS 816, an example mesh interface 824, example input/output (I/O) circuitry 826, and/or example memory such as example DDR memory 827. For example, each of the cores 810A-810N can have corresponding instances of portions of the uncore logic 822. In some such examples, the first core 810A can have a corresponding portion of the uncore logic 822, such as a first instance of the CMS 816, a first instance of the mesh interface 824, and a first instance of the I/O 826. The uncore logic 822 may also include various hardware, such as an example performance monitoring unit (PMU) 828, and an example power control unit (PCU) 808, which may include logic to perform power management techniques as described herein. In some examples, the uncore logic 822 implements execution circuitry or logic circuitry (e.g., uncore execution circuitry, uncore execution logic circuitry, etc.). In some examples, the PMU 828 implements power monitoring circuitry or logic circuitry. In some examples, the PCU 808 implements power control circuitry or logic circuitry.

In the illustrated example of FIG. 8, the cores 810A-810N may be configured on a per-core basis to optimize the execution of network workloads as described herein. In some examples, one(s) of the cores 810A-810N process data for an operating system (OS) running on or using the cores 810A-810N for processing. In some examples, one(s) of the cores 810A-810N is/are configured to process data for one or more applications (e.g., software applications) running on the OS. In this example, the cores 810A-810N may include hardware, circuitry, components and/or logic necessary for such processing. In addition, such processing may include using hardware, circuitry, components and/or logic in addition to the cores 810A-810N.

In some examples, one or more of the cores 810A-810N each have a core identifier (ID), processor firmware (e.g., microcode), a shared state, and/or a dedicated state. For example, each of the cores 810A-810N may include two or more P-states (e.g., a P0 state, a P1n state, etc.). In some examples, the microcode of the cores 810A-810N is utilized in performing the save/restore functions of the processor state and for various data flows in the performance various processor states.

In some examples, the processor 800 can operate at various performance states or levels, so-called P-states, namely from P0 to PN. In some examples, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor 800 or at least portions thereof to operate at a higher than guaranteed frequency. In some examples, the processor 800 can include multiple so-called bin frequencies above the P1 guaranteed maximum frequency, exceeding to a maximum peak frequency of the particular processor, as fused or otherwise written into the processor during manufacture. In some examples, the processor 800 can operate at various power states or levels. With regard to power states, different power consumption states may be specified for the processor 800, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

In some examples, the cores 810A-810N and the uncore logic 822 may operate at the same guaranteed operating frequency and thereby operate with the same operating power (e.g., same operating voltage or available power). In some examples, this guaranteed operating frequency may be variable and may be managed (e.g., controlled or varied) such as depending on processing needs, P-states, application ratios, and/or other factors. For example, one(s) of the cores 810A-810N may receive different voltages and/or clock frequencies. In some examples, the voltage may be in range of approximately 0 to 1.2 volts at frequencies in a range of 0 to 3.6 GHz. In some examples, the active operating voltage may be 0.7 to 1.2 volts at 1.2 to 3.6 GHz. Alternatively, any other values for voltage and/or clock frequencies may be used.

Advantageously, the guaranteed operating frequency associated with the cores 810A-810N or portion(s) thereof, the guaranteed operating frequency associated with the uncore logic 822 or portion(s) thereof, and/or the guaranteed operating frequency associated with the CLM 817 or portion(s) thereof may be adjusted to improve and/or otherwise optimize execution of network workloads. For example, for I/O-bound workloads such as those associated with effectuating 5G computing tasks, the guaranteed operating frequency of the CMS 816, the mesh interface 824, the I/O 826, and/or, more generally, the uncore logic 822, may be increased. In some such examples, respective guaranteed operating frequencies of one(s) of the cores 810A-810N may be decreased and thereby allocate additional power for the CMS 816, the mesh interface 824, the I/O 826 and/or, more generally, the uncore logic 822, to consume without violating the TDP of the processor 800. Additionally or alternatively, one or more instances of the CLMs 817 may operate at different guaranteed operating frequencies.

In the illustrated example of FIG. 8, the processor 800 includes the PMU 828 to measure and/or otherwise determine performance parameters of the processor 800. For example, the PMU 828 can determine performance parameters such as a number of instruction cycles, cache hits, cache misses, branch misses, etc. In some examples, the PMU 828 implements a plurality of hardware performance counters to store counts associated with the performance parameters. In some examples, the PMU 828 determines workload parameters such as values of latency, throughput, etc., associated with a workload executed by the processor 800. For example, the PMU 828 may implement one or more hardware performance counters to store counts associated with the workload parameters. In some examples, the PMU 828 may transmit the performance parameters, the workload parameters, hardware performance counter values, etc., to an external system (e.g., the manufacturer enterprise system 4010 and/or the customer enterprise system 4015 of FIG. 40) as telemetry data.

In the illustrated example of FIG. 8, the uncore logic 822 and/or, more generally, the processor 800, includes the PCU 808 to control and/or otherwise invoke the processor 800 to operate at one of multiple different example configurations 835. Such configurations 835 may be stored in example memory 837 of the processor 800. In this example, the configurations 835 may include information regarding at least one of guaranteed operating frequency or core count at which the processor 800 may operate at a given temperature operating point. Advantageously, the PCU 808 may dynamically control the processor 800 to operate at one of these configurations 835 based at least in part on a type of instruction to be executed and thereby a type of workload to be processed.

In the illustrated example of FIG. 8, the PCU 808 includes an example scheduler 832, an example power budget analyzer (PB ANALYZER) 834, an example core configurator (CORE CONFIG) 836, and example memory 837, which includes and/or otherwise stores example configuration(s) 835, example SSE instructions 838, example AVX-512 instructions 840, example 5G-ISA instructions 842, and example machine-learning model(s) (ML MODEL(S)) 844. In this example, the memory 837 is non-volatile memory. Alternatively, the memory 837 may be implemented by cache memory, ROM, or any other type of memory. In this example, the scheduler 832, the power budget analyzer 834, the core configurator 836, and/or, more generally, the PCU 808, is/are coupled to the cores 810A-810N through the interconnect 820.

In the illustrated example of FIG. 8, the scheduler 832 identifies one(s) of the cores 810A-810N to execute instructions based on a workload, such as a network workload. In an example where there are 32 of the cores 810A-810N, the scheduler 832 may determine that eight of the 32 cores are to be used to execute instructions to effectuate a function to be executed by an application (e.g., a software application, a 5G telecommunication application, etc.). In some such examples, the scheduler 832 can determine that the eight identified cores are to execute one(s) of the SSE instructions 838, one(s) of the AVX-512 instructions 840, and/or one(s) of the 5G-ISA instructions 842. For example, the scheduler 832 may cause one(s) of the cores 810A-810N to load one(s) of the SSE instructions 838, the AVX-512 instructions 840, or the 5G-ISA instructions 842.

In some examples, the scheduler 832 executes the machine-learning model(s) 844 to identify the workload. For example, the scheduler 832 can enter the identified one(s) of the cores 810A-810N, the one(s) of the SSE instructions 838, the AVX-512 instructions 840, or the 5G-ISA instructions 842, etc., as inputs to the machine-learning model(s) 844. In some such examples, the machine-learning model(s) 844 can output a type of the workload to be executed, such as one(s) of the network workloads 542, 544, 546 of FIG. 6. Additionally or alternatively, the machine-learning model(s) 844 can output a type of the workload to be executed, such as one(s) of artificial intelligence and/or machine learning model executions and/or computations, IoT service workloads, autonomous driving computations, V2X workloads, video surveillance monitoring, real time data analytics, delivering and/or encoding media streams, measuring advertisement impression rates, object detection in media streams, speech analytics, asset and/or inventory management, virtual reality, and/or augmented reality processing. In some such examples, the scheduler 832 can determine a sequence of network workloads to be executed based on the output(s) of the machine-learning model(s) 844. In some such examples, the scheduler 832 can determine a corresponding sequence of instructions to be loaded based on the determined sequence.

In the illustrated example of FIG. 8, the power budget analyzer 834 determines whether one(s) of the cores 810A-810N can execute one(s) of the instructions 838, 840, 842 with increased performance (e.g., at a higher voltage and/or frequency). In some examples, the cores 810A-810N query and/or otherwise interface with the power budget analyzer 834 in response to loading an instruction. For example, the scheduler 832 can cause the first core 810A to load one or more of the 5G-ISA instructions 842. In some such examples, in response to the first core 810A loading the one or more of the 5G-ISA instructions 842, the first core 810A queries the power budget analyzer 834 whether increased performance can be achieved. In some such examples, the power budget analyzer 834 may compare a current or instant value of the power being consumed by one(s) of the cores 810A-810N to a threshold (e.g., a power budget threshold, a TDP threshold, etc.).

In some examples, the power budget analyzer 834 determines that there is available power budget to increase the performance of the first core 810A to execute the one or more 5G-ISA instructions 842 in response to determining that the increase does not cause the threshold to be exceeded and/or otherwise not satisfied. In some such examples, the power budget analyzer 834 may direct the core configurator 836 to change a configuration (e.g., a P-state, a core configuration, etc.) of the first core 810A to execute the one or more 5G-ISA instructions 842 with increased performance.

In some examples, the power budget analyzer 834 determines that there is not enough available power budget to increase the performance of the first core 810A to execute the one or more 5G-ISA instructions 842 in response to determining that the increase causes the threshold to be exceeded and/or otherwise satisfied. In some such examples, the power budget analyzer 834 may direct the core configurator 836 to change a configuration (e.g., a P-state, a core configuration, etc.) of the first core 810A to execute the one or more 5G-ISA instructions 842 without increased performance, such as operating at a base or baseline voltage and/or frequency.

In some examples, the power budget analyzer 834 executes the machine-learning model(s) 844 using a TDP of the processor 800, a power measurement (e.g., a power consumption measurement) of one(s) of the cores 810A-810N, and/or, more generally, the processor 800, etc., as inputs to the machine-learning model(s) 844. In some such examples, the machine-learning model(s) 844 can determine an application ratio that may be utilized to configure the cores 810A-810N to optimally and/or otherwise execute the workload application(s) with improved efficiency to conform with power budget considerations of the processor 800. For example, the power budget analyzer 834 can determine based on outputs from the machine-learning model(s) 844 that one(s) of the cores 810A-810N may be configured using an application ratio to increase performance and/or throughput, reduce latency, etc., without violating the TDP of the processor 800.

In some examples, the power budget analyzer 834 determines whether instance(s) of the uncore logic 822 can operate with increased performance (e.g., at a higher voltage and/or frequency). In some examples, the power budget analyzer 834 can determine an instantaneous power consumption of a first instance of the uncore logic 822, a second instance of the uncore logic 822, etc., and/or a total instantaneous power consumption of the first instance, the second instance, etc. In some such examples, the power budget analyzer 834 may compare a current or instant value of the power being consumed by one(s) of the uncore logic 822 to a threshold (e.g., a power budget threshold, a TDP threshold, an uncore power threshold, etc.).

In some examples, the power budget analyzer 834 determines that there is available power budget to increase the performance of a first instance of the uncore logic 822 to operate at a higher operating frequency in response to determining that the increase does not cause the threshold to be exceeded and/or otherwise not satisfied. In some such examples, the power budget analyzer 834 may direct the core configurator 836 to change a configuration (e.g., a P-state, an uncore core configuration, a guaranteed operating frequency, etc.) of the first instance of the uncore logic 822. In some examples, the power budget analyzer 834 can determine that the instance(s) of the uncore logic 822 can be operated at the higher frequency to reduce latency and/or improve throughput based on the instantaneous power consumption measurements.

In some examples, the power budget analyzer 834 determines that there is not enough available power budget to increase the performance of the first instance of the uncore logic 822 to operate at the higher operating frequency in response to determining that the increase causes the threshold to be exceeded and/or otherwise satisfied. In some such examples, the power budget analyzer 834 may direct the core configurator 836 to change a configuration (e.g., a P-state, an uncore core configuration, a guaranteed operating frequency, etc.) of the first instance of the uncore logic 822 to operate without increased performance, such as operating at a base or baseline voltage and/or frequency.

In some examples, the power budget analyzer 834 executes the machine-learning model(s) 844 using a TDP of the processor 800, a power measurement (e.g., a power consumption measurement) of one(s) of the uncore logic 822, and/or, more generally, the processor 800, etc., as inputs to the machine-learning model(s) 844. In some such examples, the machine-learning model(s) 844 can determine an application ratio that may be utilized to configure the uncore logic 822 to optimally and/or otherwise execute the workload application(s) with improved efficiency to conform with power budget considerations of the processor 800. For example, the power budget analyzer 834 can determine based on outputs from the machine-learning model(s) 844 that one(s) of the uncore logic 822 may be configured using an application ratio to increase performance and/or throughput, reduce latency, etc., without violating the TDP of the processor 800.

In some examples, the power budget analyzer 834, and/or, more generally, the power control unit 808, implements example means for determining an application ratio based on an instruction to be executed by one or more cores of a processor to execute the workload. For example, the means for determining may be implemented by executable instructions such as that implemented by at least blocks 5910 and

Figure 59:
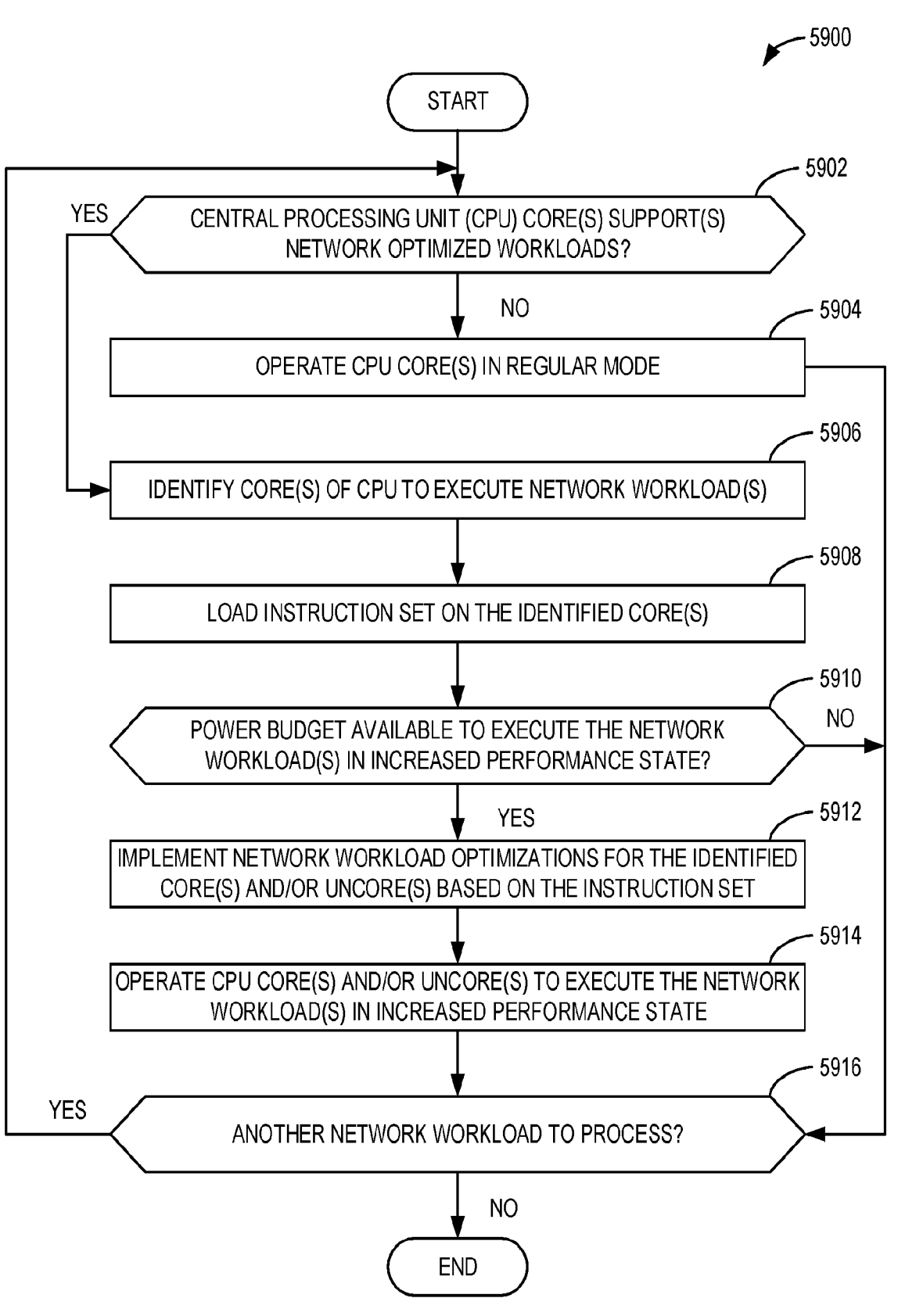
FIG. 59 is a flowchart representative of example machine readable instructions that may be executed to implement an example workload-adjustable CPU to modify operation of CPU core(s) based on a workload.
Figure 62:
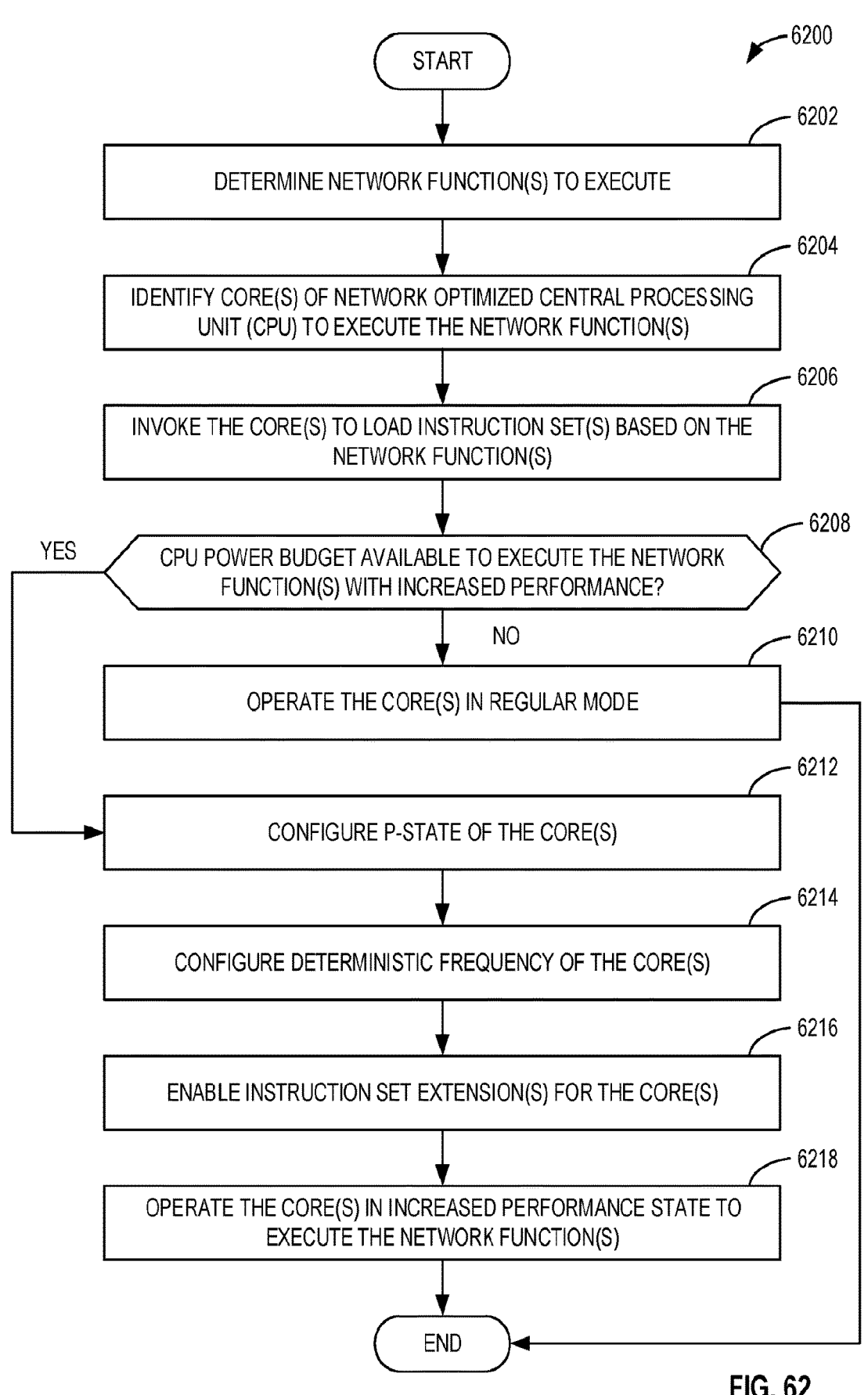
FIG. 62 is a flowchart representative of example machine readable instructions that may be executed to implement an example workload-adjustable CPU to modify operation of CPU core(s) based on a workload.
Figure 63:
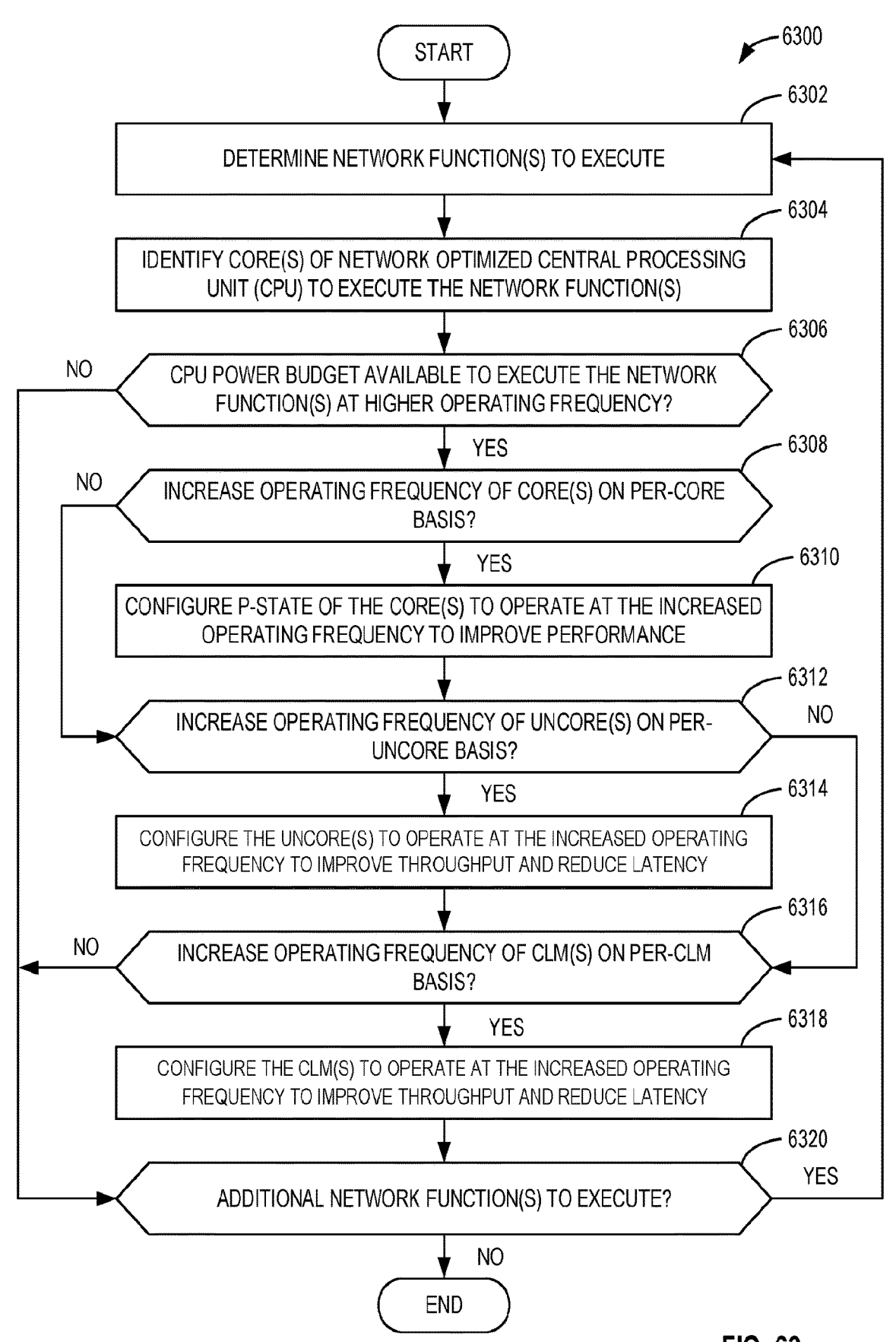
FIG. 63 is a flowchart representative of example machine readable instructions that may be executed to implement an example workload-adjustable CPU to modify operation of at least one of a core, an uncore, or a CLM based on a workload.
Figure 64:
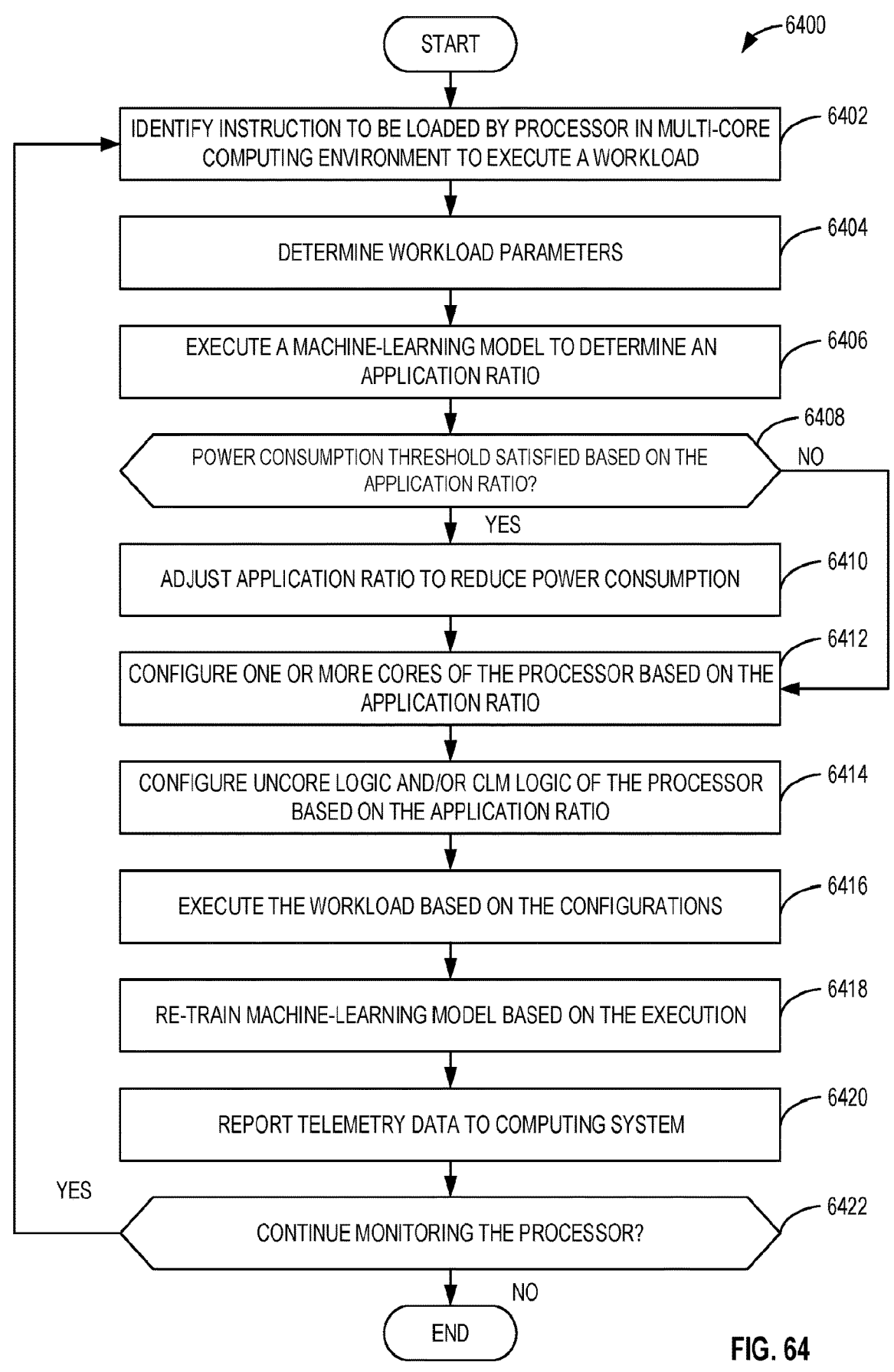
FIG. 64 is a flowchart representative of example machine readable instructions that may be executed to implement an example workload-adjustable CPU to configure the workload-adjustable CPU based on a machine-learning model.
Figure 65:
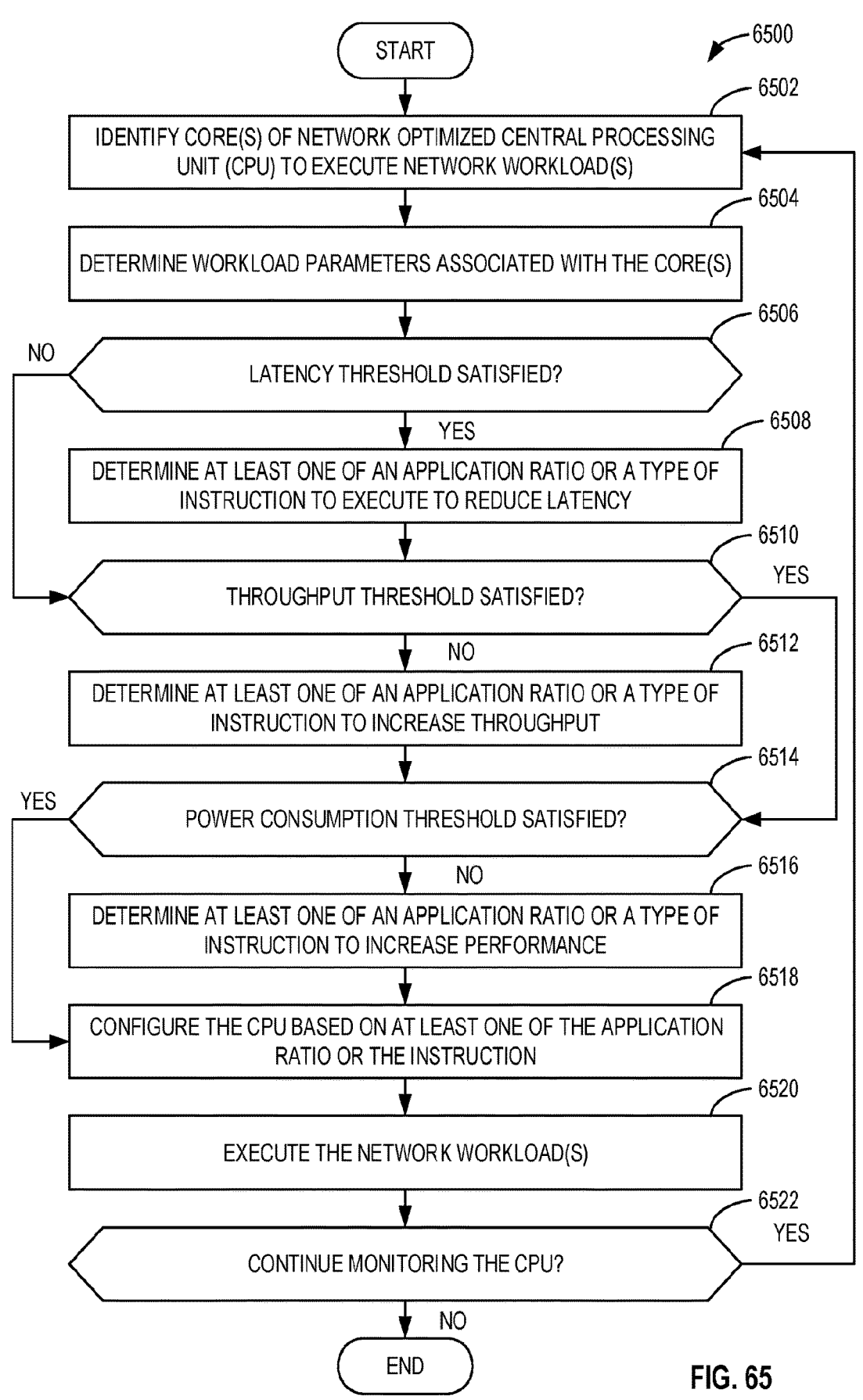
FIG. 65 is a flowchart representative of example machine readable instructions that may be executed to implement an example workload-adjustable CPU to modify operation of the workload-adjustable CPU based on workload parameters.

5912 of FIG. 59, block 6208 of FIG. 62, block 6306 of FIG. 63, blocks 6404, 6406, 6408, and 6418 of FIG. 64, and/or blocks 6504, 6506, 6510, 6512, 6514, and 6516 of FIG. 65. In some examples, the executable instructions of blocks 5910 and 5912 of FIG. 59, block 6208 of FIG. 62, block 6306 of FIG. 6, blocks 6404, 6406, 6408, and 6418 of FIG. 64, and/or blocks 6504, 6506, 6510, 6512, 6514, and 6516 of FIG. 65 may be executed on at least one processor such as the example processor 6815, 6838, 6870, 6880 of FIG. 68 and/or the example processor 6912 of FIG. 69, the example GPU 6940 of FIG. 69, the example vision processing unit 6942 of FIG. 69, and/or the example neural network processor 6944 of FIG. 69. In other examples, the means for determining is implemented by hardware logic, hardware implemented state machines, logic circuitry, and/or any other combination of hardware, software, and/or firmware. For example, the means for determining may be implemented by at least one hardware circuit (e.g., discrete and/or integrated analog and/or digital circuitry, a general purpose programmable processor, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples in which the instruction is a first instruction, the workload is a first workload, the application ratio is a first application ratio, the one or more cores are one or more first cores, the uncore logic is first uncore logic, the means for determining is to determine a second application ratio based on a second instruction to be executed by one or more second cores of the processor to execute a second workload. In some examples, the means for determining is to compare at least one of a latency of the processor to a latency threshold or a throughput of the processor to a throughput threshold. In some examples, the means for determining is to determine a first value of power consumption of the one or more cores to execute the workload with the first instruction, and determine a second value of power consumption of the one or more cores to execute the workload with a second instruction, the second value greater than the first value.

In the illustrated example of FIG. 8, the core configurator 836 adjusts, modifies, and/or otherwise changes a configuration of the first core 810A, the second core 810N, etc., of the processor 800. For example, the core configurator 836 may configure one(s) of the cores 810A-810N on a per-core basis. In some such examples, the core configurator 836 may instruct and/or otherwise invoke the first core 810A to change from a first P-state to a second P-state, the second core 810N to change from the second P-state to a third P-state, etc. For example, the core configurator 836 can increase a voltage and/or frequency at which one(s) of the cores 810A-810N operate.

In some examples, the core configurator 836 executes the machine-learning model(s) 844 using an identification of a workload, a type of instruction to be loaded, a current configuration of the processor 800, power measurements of one(s) of the cores 810A-810N, and/or, more generally, the processor 800, etc., as inputs to the machine-learning model(s) 844. In some such examples, the machine-learning model(s) 844 can determine an application ratio that may be utilized to optimally and/or otherwise execute the workload application(s) with improved efficiency to conform with latency, throughput, and/or power budget considerations of the processor 800. For example, the core configurator 836 can determine based on outputs from the machine-learning model(s) 844 that one(s) of the cores 810A-810N may be configured using an application ratio to increase performance and/or throughput, reduce latency, etc., without violating the TDP of the processor 800. In some such examples, the core configurator 836 can determine a configuration based on the application ratio that includes a change in operating frequency of one(s) of the cores 810A-810N.

In some examples, the core configurator 836 adjusts, modifies, and/or otherwise changes a configuration of one or more instances of the uncore logic 822 of the processor 800. For example, the core configurator 836 may configure instance(s) of the uncore logic 822 on a per-uncore basis. In some such examples, the core configurator 836 may instruct and/or otherwise invoke a first instance of the CMS 816, a first instance of the mesh interface 824, a first instance of the I/O 826, and/or, more generally, the first instance of the uncore logic 822, to change from a first uncore configuration (e.g., a first guaranteed operating frequency) to a second uncore configuration (e.g., a second guaranteed operating frequency). For example, the core configurator 836 can increase a voltage and/or frequency at which one(s) of the uncore logic 822 operate. Additionally or alternatively, the PCU 808 may include an uncore configurator to adjust, modify, and/or otherwise change a configuration of one or more instances of the uncore logic 822 of the processor 800 as described herein.

In some examples, the core configurator 836 executes the machine-learning model(s) 844 using an identification of a workload, a type of instruction to be loaded, a current configuration of one(s) of the uncore logic 822, power measurements of one(s) of the uncore logic 822, and/or, more generally, the processor 800, etc., as inputs to the machine-learning model(s) 844. In some such examples, the machine-learning model(s) 844 can determine an application ratio that may be utilized to optimally and/or otherwise execute the workload application(s) with improved efficiency to conform with latency, throughput, and/or power budget considerations of the processor 800. For example, the core configurator 836 can determine based on outputs from the machine-learning model(s) 844 that one(s) of the uncore logic 822 may be configured using an application ratio to increase performance and/or throughput, reduce latency, etc., without violating the TDP of the processor 800. In some such examples, the core configurator 836 can determine a configuration based on the application ratio that includes a change in operating frequency of one(s) of the cores 810A-810N, one(s) of the uncore logic 822, etc., and/or a combination thereof.

In some examples, the core configurator 836 adjusts, modifies, and/or otherwise changes a configuration of one or more instances of the CLMs 817 of the processor 800. For example, the core configurator 836 may configure instance(s) of the LLC 814, the CHA 812, the CMS 816, the I/O buffer 818, and/or, more generally, the CLM(s) 817 on a per-CLM basis. In some such examples, the core configurator 836 may instruct and/or otherwise invoke a first instance of the LLC 814, the CHA 812, a first instance of the CMS 816, a first instance of the I/O buffer 818, and/or, more generally, the first instance of the CLM 817, to change from a first CLM configuration (e.g., a first guaranteed operating frequency) to a second CLM configuration (e.g., a second guaranteed operating frequency). For example, the core configurator 836 can increase a voltage and/or frequency at which one(s) of the CLM(s) 817 operate. Additionally or alternatively, the PCU 808 may include a CLM configurator to adjust, modify, and/or otherwise change a configuration of one or more instances of the CLM 817 of the processor 800 as described herein.

In some examples, the core configurator 836 executes the machine-learning model(s) 844 using an identification of a workload, a type of instruction to be loaded, a current configuration of one(s) of the CLMs 817, power measurements of one(s) of the CLMs 817, and/or, more generally, the processor 800, etc., as inputs to the machine-learning model(s) 844. In some such examples, the machine-learning model(s) 844 can determine an application ratio that may be utilized to optimally and/or otherwise execute the workload application(s) with improved efficiency to conform with latency, throughput, and/or power budget considerations of the processor 800. For example, the core configurator 836 can determine based on outputs from the machine-learning model(s) 844 that one(s) of the CLMs 817 may be configured using an application ratio to increase performance and/or throughput, reduce latency, etc., without violating the TDP of the processor 800. In some such examples, the core configurator 836 can determine a configuration based on the application ratio that includes a change in operating frequency of one(s) of the cores 810A-810N, one(s) of the uncore logic 822, one(s) of the CLMs 817, etc., and/or a combination thereof.

In some examples, the core configurator 836, and/or, more generally, the power control unit 808, implements example means for configuring, before the execution of a workload, at least one of (i) the one or more cores of a processor based on an application ratio or (ii) uncore logic of the processor based on the application ratio. For example, the means for configuring may be implemented by executable instructions such as that implemented by at least blocks 5902, 5904, 5912, and 5914 of FIG. 59, blocks 6210, 6212, and 6214 of FIG. 62, blocks 6310, 6314, 6318, and 6320 of FIG. 63, blocks 6404, 6410, 6412, and 6414 of FIG. 64, and/or block 6518 of FIG. 65. In some examples, the executable instructions of blocks 5902, 5904, 5912, and 5914 of FIG. 59, blocks 6210, 6212, and 6214 of FIG. 62, blocks 6310, 6314, 6318, and 6320 of FIG. 63, blocks 6404, 6410, 6412, and 6414 of FIG. 64, and/or block 6518 of FIG. 65 may be executed on at least one processor such as the example processor 6815, 6838, 6870, 6880 of FIG. 68 and/or the example processor 6912 of FIG. 69, the example GPU 6940 of FIG. 69, the example vision processing unit 6942 of FIG. 69, and/or the example neural network processor 6944 of FIG. 69. In other examples, the means for configuring is implemented by hardware logic, hardware implemented state machines, logic circuitry, and/or any other combination of hardware, software, and/or firmware. For example, the means for configuring may be implemented by at least one hardware circuit (e.g., discrete and/or integrated analog and/or digital circuitry, a general purpose programmable processor, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In some examples, the means for configuring is to identify a first operating frequency of a first core of the one or more cores, the first operating frequency included in a first set of one or more operating frequencies associated with the application ratio, and identify a second operating frequency of the uncore logic, the second operating frequency included in a second set of one or more operating frequencies associated with the application ratio, the means for configuring to configure the at least one of (i) the one or more cores of the processor based on at least one of the first operating frequency or the second operating frequency or (ii) the uncore logic of the processor based on the at least one of the first operating frequency or the second operating frequency.

In some examples, the means for configuring is to configure the at least one of the one or more cores of the processor or the uncore logic of the processor in response to a determination that a power consumption associated with the application ratio satisfies a threshold. In some examples, the means for configuring is to decrease a first operating frequency of the one or more cores to decrease a first power consumption associated with the one or more cores, and increase a second operating frequency of at least a portion of the uncore logic to increase a second power consumption associated with the at least the portion of the uncore logic, the increase of the second power consumption to increase throughput of the processor, the means for configuring to configure the at least one of the one or more cores of the processor or the uncore logic of the processor based on at least one of the decrease of the first operating frequency or the increase of the second operating frequency.

In some examples, the means for configuring is to at least one of adjust a first operating frequency of the one or more cores to a second operating frequency or adjust a third operating frequency of the uncore logic to a fourth operating frequency, at least one of the second operating frequency or the fourth operating frequency associated with the application ratio, the means for configuring to configure the at least one of the one or more cores of the processor or the uncore logic of the processor based on at least one of the adjustment of the first operating frequency to the second operating frequency or the adjustment of the third operating frequency to the fourth operating frequency.

In some examples in which the instruction is a first instruction, the workload is a first workload, the application ratio is a first application ratio, the one or more cores are one or more first cores, the uncore logic is first uncore logic, the means for configuring is to configure, before execution of the second, at least one of (i) the one or more second cores of the processor based on the second application ratio or (ii) second uncore logic of the processor based on the second application ratio. In some examples in which the application ratio is a first application ratio, the means for configuring is to, in response to the respective one of the latency threshold or the throughput threshold being satisfied, adjust the first application ratio to a second application ratio, and configure the uncore logic based on the second application ratio to at least one of increase the throughput of the processor or reduce the latency of the processor.

In some examples, the scheduler 832 and/or the core configurator 836 implements example means for initiating execution of a workload with at least one of one or more cores or uncore logic of a processor. In some examples, the means for executing is to execute the workload with a type of instruction to improve throughput of the processor in response to a power consumption value, a throughput value, a latency value, etc., satisfying a respective one of one or more thresholds (e.g., a power consumption threshold, a throughput threshold, a latency threshold, etc.). For example, the means for initiating may be implemented by executable instructions such as that implemented by at least blocks 5902, 5904, 5906, 5908, 5912, 5914, and 5916 of FIG. 59, blocks 6002, 6008, and 6012 of FIG. 60, blocks 6202, 6204, 6206, 6210, 6212, 6214, and 6216 of FIG. 62, blocks 6302, 6304, 6310, 6314, 6318, and 6320 of FIG. 63, blocks 6402, 6404, 6410, 6412, and 6414 of FIG. 64, and/or blocks 6502, 6518, and 6522 of FIG. 65. In some examples, the executable instructions of blocks 5902, 5904, 5906, 5908, 5912, 5914, and 5916 of FIG. 59, blocks 6002, 6008, and 6012 of FIG. 60, blocks 6202, 6204, 6206, 6210, 6212, 6214, and 6216 of FIG. 62, blocks 6302, 6304, 6310, 6314, 6318, and 6320 of FIG. 63, blocks 6402, 6404, 6410, 6412, and 6414 of FIG. 64, and/or blocks 6502, 6518, and 6522 of FIG. 65 may be executed on at least one processor such as the example processor 6815, 6838, 6870, 6880 of FIG. 68 and/or the example processor 6912 of FIG. 69, the example GPU 6940 of FIG. 69, the example vision processing unit 6942 of FIG. 69, and/or the example neural network processor 6944 of FIG. 69. In other examples, the means for configuring is implemented by hardware logic, hardware implemented state machines, logic circuitry, and/or any other combination of hardware, software, and/or firmware. For example, the means for configuring may be implemented by at least one hardware circuit (e.g., discrete and/or integrated analog and/or digital circuitry, a general purpose programmable processor, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example, the configurations 835 include one or more configurations 835 that may be used to adjust operation of the cores 810A-810N, the uncore logic 822, and/or the CLMs 817. In this example, each of the configuration(s) 835 may be associated with a configuration identifier, a maximum current level (ICCmax), a maximum operating temperature (in terms of degrees Celsius), a guaranteed operating frequency (in terms of Gigahertz (GHz)), a maximum power level, namely a thermal design power or point (TDP) level (in terms of Watts), a maximum case temperature (in terms of degrees Celsius), a core count, and/or a design life (in terms of years, such as 3 years, 5 years, etc.). Additionally or alternatively, one or more of the configurations 835 may include different parameters, settings, etc.

In some examples, the one or more configurations 835 may be based on an application ratio. For example, the processor 800 may be deployed to implement the 5G RAN server 528 of FIG. 5 (and/or the 5G core server 550 of FIG. 5) having a core application ratio of 0.7 and an uncore application ratio of 0.9. In some such examples, the core configurator 836 can configure one(s) of the cores 810A-810N to operate with one of the configurations 835 to ensure that the cores 810A-810N and/or, more generally, the processor 800, do not violate the TDP of the processor 800. For example, the core configurator 836 can increase a core frequency of one(s) of the cores 810A-810N. In some examples, the core configurator 836 can configure portion(s) of the uncore logic 822 to operate with one of the configurations 835 to ensure that the portion(s) of the uncore logic 822 and/or, more generally, the processor 800, do(es) not violate the TDP of the processor 800. For example, the core configurator 836 can increase an uncore frequency (e.g., an UCLK frequency) of at least one of the interconnect 820, the CMS 816, the mesh interface 824, or the I/O 826. In some examples, the uncore frequency may be fixed or static. In some examples, the uncore frequency may be dynamic by being a function of the core frequency. In some examples, the uncore frequency may be dynamic by being adjusted independent of the core frequency.

In some examples, the core configurator 836 can configure portion(s) of the CLMs 817 to operate with one of the configurations 835 to ensure that the portion(s) of the CLMs 817 and/or, more generally, the processor 800, do(es) not violate the TDP of the processor 800. For example, the core configurator 836 can increase a frequency of at least one of the LLC 814, the CHA 812, the CMS 816, the I/O buffer 318, and/or, more generally, the CLM 817.

In the illustrated example, the SSE instructions 838 may implement the first instructions 504 of FIG. 5. For example, the SSE instructions 838, when executed, may implement the network workloads 608 of FIG. 6. In the illustrated example, the AVX-512 instructions 840 may implement the second instructions 506 of FIG. 8. For example, the AVX-512 instructions 840, when executed, may implement the network workloads 516 of FIG. 5. In the illustrated example, the 5G-ISA instructions 842 may implement the third instructions 508 of FIG. 5. For example, the 5G-ISA instructions 842, when executed, may implement the network workloads 518 of FIG. 5. In some examples, one(s) of the SSE instructions 838, the AVX-512 instructions 840, and/or the 5G-ISA instructions 842 may be stored in memory (e.g., volatile memory, non-volatile memory, cache memory, etc.) of the PCU 808. Alternatively, one or more of the SSE instructions 838, the AVX-512 instructions 840, and/or the 5G-ISA instructions 842 may be stored in a different location than the PCU 808, such as in the LLC 830, system memory (e.g., DDR memory), etc.

In some examples, frequencies of one(s) of the cores 810A-810N, portion(s) of the uncore logic 822, and/or portion(s) of the CLMs 817 may be adjusted based on a type of the instructions 838, 840, 842 to be executed. For example, in response to the first core 810A executing the SSE instructions 838, the core configurator 836 may increase an operating frequency of the first core 810A based on the configuration 835 of the first core 810A, increase an operating frequency of a corresponding portion of the uncore logic 822, and/or increase an operating frequency of a corresponding portion of the CLM 817. In some examples, in response to the first core 810A executing the 5G-ISA instructions 842, the core configurator 836 may decrease an operating frequency of the first core 810A based on the configuration 835 of the first core 810A, increase an operating frequency of a corresponding portion of the uncore logic 822, and/or increase an operating frequency of a corresponding portion of the CLM 817.

Advantageously, at least one of the scheduler 832, the power budget analyzer 834, or the core configurator 836 may execute the machine-learning model(s) 844, which may include and/or otherwise implement one or more machine-learning models, to identify an application ratio that may be used to configure the processor 800 or portion(s) thereof for increased performance and/or reduced latency. Many different types of machine learning models and/or machine learning architectures exist. In examples described herein, a neural network model may be used. Using a neural network model enables the workload analysis to classify activity of a processor, determine a probability representative of whether the activity is optimized for a given workload, and/or determine adjustment(s) to a configuration of one or more cores 810A-810N and/or, more generally, the processor 800, based on at least one of the classification or the probability. In general, machine learning models/architectures that are suitable to use in the example approaches described herein include recurrent neural networks. However, other types of machine learning models could additionally or alternatively be used such as supervised learning artificial neural network models. Example supervised learning artificial neural network models can include two-layer (2-layer) radial basis neural networks (RBN), learning vector quantization (LVQ) classification neural networks, etc. For example, the machine-learning model(s) 844 may be implemented by a neural network (e.g., a recurrent neural network, an artificial neural network, etc.) as described above.

In general, implementing a ML/AI system involves two phases, a learning/training phase and an inference phase. In the learning/training phase, a training algorithm is used to train the machine-learning model(s) 844 to operate in accordance with patterns and/or associations based on, for example, training data. In general, the machine-learning model(s) 844 include(s) internal parameters that guide how input data is transformed into output data, such as through a series of nodes and connections within the machine-learning model(s) 844 to transform input data into output data. Additionally, hyperparameters are used as part of the training process to control how the learning is performed (e.g., a learning rate, a number of layers to be used in the machine-learning model(s) 844, etc.). Hyperparameters are defined to be model hyperparameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the machine-learning model(s) 844 that reduce model error. As used herein, labeling refers to an expected output of the machine-learning model(s) 844 (e.g., a classification, an expected output value, etc.). Alternatively, unsupervised training (e.g., used in deep learning, a subset of machine learning, etc.) involves inferring patterns from inputs to select parameters for the machine-learning model(s) 844 (e.g., without the benefit of expected (e.g., labeled) outputs).

In examples described herein, ML/AI models, such as the machine-learning model(s) 844, can be trained using stochastic gradient descent. However, any other training algorithm may additionally or alternatively be used. In examples described herein, training can be performed until the level of error is no longer reducing. In examples described herein, training can be performed locally on a computing system and/or remotely at an external computing system communicatively coupled to the computing system. For example, the scheduler 832, the power budget analyzer 834, the core configurator 836, and/or, more generally, the processor 800 may train the machine-learning model(s) 844 or obtain already trained or partially trained one(s) of the machine-learning model(s) 844 from an external computing system or other hardware. Training is performed using hyperparameters that control how the learning is performed (e.g., a learning rate, a number of layers to be used in the machine-learning model(s) 844, etc.).

In examples described herein, hyperparameters that control model performance and training speed are the learning rate and regularization parameter(s). Such hyperparameters are selected by, for example, trial and error to reach an optimal model performance. In some examples, Bayesian hyperparameter optimization is utilized to determine an optimal and/or otherwise improved or more efficient network architecture to avoid model overfitting and improve the overall applicability of the machine-learning model(s) 844. In some examples, re-training may be performed. Such re-training may be performed in response to override(s) to model-determined processor adjustment(s) by a user, a computing system, etc. In some examples, re-training may be performed when new inputs and/or outputs are available. For example, the PMU 828 may provide processor performance data, hardware counter values, etc., that may be used to re-train the machine-learning model(s) 844.

Training is performed using training data. In examples described herein, the training data originates from locally generated data, such as utilization data from the processor 800 or different processor(s). For example, the training data may be implemented by the configuration(s) 835, data from the PMU 828, or any other data. In some described examples where supervised training is used, the training data is labeled. Labeling is applied to the training data by a user manually or by an automated data pre-processing system. In some examples, the training data is pre-processed. In some examples, the training data is sub-divided into a first portion of data for training the machine-learning model(s) 844, and a second portion of data for validating the machine-learning model(s) 844.

Once training is complete, the machine-learning model(s) 844 is deployed for use as an executable construct that processes an input and provides an output based on the network of nodes and connections defined in the machine-learning model(s) 844. The machine-learning model(s) 844 is/are stored in the memory 837 as the machine-learning model(s) 844 or in memory of a remote computing system that may be accessible via a network, an electrical bus, etc. The machine-learning model(s) 844 may then be executed by the analyzed processor when deployed in a multi-core computing environment, or processor(s) that manage the multi-core computing environment. For example, one(s) of the machine-learning model(s) 844 may be deployed to the processor 800 for execution by the processor 800.

Once trained, the deployed machine-learning model(s) 844 may be operated in an inference phase to process data. In the inference phase, data to be analyzed (e.g., live data) is input to the machine-learning model(s) 844, and the machine-learning model(s) 844 execute(s) to create an output. This inference phase can be thought of as the AI "thinking" to generate the output based on what it learned from the training (e.g., by executing the machine-learning model(s) 844 to apply the learned patterns and/or associations to the live data). In some examples, input data undergoes pre-processing before being used as an input to the machine-learning model(s) 844. Moreover, in some examples, the output data may undergo post-processing after it is generated by the machine-learning model(s) 844 to transform the output into a useful result (e.g., a display of data, an instruction to be executed by a machine, etc.).

In some examples, output of the deployed machine-learning model(s) 844 may be captured and provided as feedback. By analyzing the feedback, an accuracy of the deployed machine-learning model(s) 844 can be determined. If the feedback indicates that the accuracy of the deployed machine-learning model(s) 844 is less than a threshold or other criterion, training of an updated machine-learning model(s) 844 can be triggered using the feedback and an updated training data set, hyperparameters, etc., to generate an updated, deployed machine-learning model(s) 844. In some examples, the deployed machine-learning model(s) 844 may obtain customer or workload requirements, such as a network node location, throughput requirements, power requirements, and/or latency requirements. In some examples, the deployed machine-learning model(s) 844 may generate an output including an application ratio associated with a workload that is optimized to satisfy the customer or workload requirements. For example, the output may specify an operating frequency of a core, corresponding uncore logic, CLMs, etc., that satisfies the customer or workload requirements. In some examples, the application ratio is based on the operating frequency to execute the workload. In some examples, the deployed machine-learning model(s) 844 may generate an output including a selection or identification of a type of instruction such as which one(s) of the instructions 838, 840, 842 to execute a workload.

While an example manner of implementing the PCU 808 of FIG. 8, and/or, more generally, the processor 800, is illustrated in FIG. 8, one or more of the elements, processes and/or devices illustrated in FIG. 8 may be combined, divided, re-arranged, omitted, eliminated and/or implemented in any other way. Further, the example scheduler 832, the example power budget analyzer 834, the example core configurator 836, the example SSE instructions 838, the example AVX-512 instructions 840, the example 5G-ISA instructions 842, the example machine-learning model(s) 844, and/or, more generally, the example PCU 808 of FIG. 8 may be implemented by hardware, software, firmware and/or any combination of hardware, software and/or firmware. Thus, for example, any of the example scheduler 832, the example power budget analyzer 834, the example core configurator 836, the example SSE instructions 838, the example AVX-512 instructions 840, the example 5G-ISA instructions 842, the example machine-learning model(s) 844, and/or, more generally, the example PCU 808 could be implemented by one or more analog or digital circuit(s), logic circuits, programmable processor(s), programmable controller(s), GPU(s), digital signal processor(s) (DSP(s)), application specific integrated circuit(s) (ASIC(s)), programmable logic device(s) (PLD(s)), field programmable gate arrays (FPGAs), and/or field programmable logic device(s) (FPLD(s)). When reading any of the apparatus or system claims of this patent to cover a purely software and/or firmware implementation, at least one of the example scheduler 832, the example power budget analyzer 834, the example core configurator 836, the example SSE instructions 838, the example AVX-512 instructions 840, the example 5G-ISA instructions 842, and/or the example machine-learning model(s) 844 is/are hereby expressly defined to include a non-transitory computer readable storage device or storage disk such as a memory, a DVD, a CD, a Blu-ray disk, etc. including the software and/or firmware. Further still, the example PCU 808 of FIG. 8, and/or, more generally, the processor 800, may include one or more elements, processes and/or devices in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
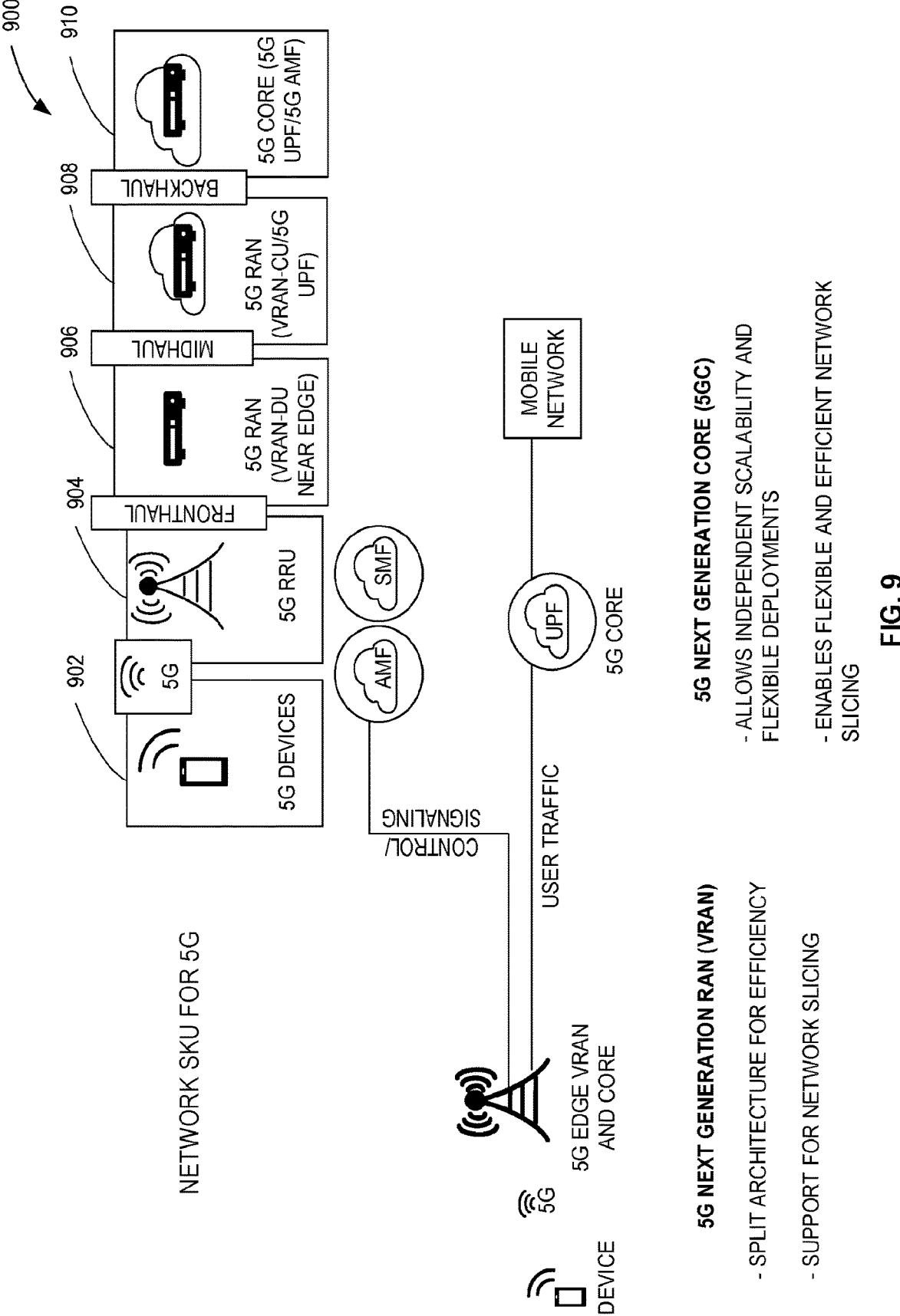
FIG. 9 is an illustration of an example 5G network architecture implemented by the example multi-core computing systems of FIGS. 1, 5, 6, and/or 7.

FIG. 9 is an illustration of an example 5G network architecture 900. In this example, the 5G network architecture 900 may be implemented with one or more example 5G devices 902, one or more example 5G RRUs 904, one or more example 5G RANs 906, 908 such as example vRAN-DUs 906 and/or vRAN-CUs 908, and/or one or more example 5G cores (e.g., 5G core servers) 910. In this example, the 5G devices 902 may be implemented by one(s) of the devices 108, 110, 112, 114, 116 of FIG. 1. In this example, the 5G RRUs 904 may be implemented by the RRUs 120 of FIG. 1. In this example, the vRAN-DUs 906 may be implemented by the DUs 122 of FIG. 1, the first multi-core computing system 522 of FIG. 5 or portion(s) thereof, the second multi-core computing system 524 of FIG. 5 or portion(s) thereof, the third multi-core computing system 600 of FIG. 6 or portion(s) thereof, and/or the fourth multi-core computing system 700 of FIG. 7 or portion(s) thereof. In this example, the vRAN-CUs 408 may be implemented by the CUs 124 of FIG. 1, the first multi-core computing system 522 of FIG. 5 or portion(s) thereof, the second multi-core computing system 524 of FIG. 5 or portion(s) thereof, the third multi-core computing system 600 of FIG. 6 or portion(s) thereof, and/or the fourth multi-core computing system 700 of FIG. 7 or portion(s) thereof. In this example, the 5G core servers 910 may be implemented by the core devices 126 of FIG. 1, the first multi-core computing system 522 of FIG. 5 or portion(s) thereof, the second multi-core computing system 524 of FIG. 5 or portion(s) thereof, the third multi-core computing system 600 of FIG. 6 or portion(s) thereof, and/or the fourth multi-core computing system 700 of FIG. 7 or portion(s) thereof.

Advantageously, examples described herein improve 5G next generation RAN (vRAN) by splitting the architecture for efficiency and supporting network slicing. For example, examples described herein can effectuate splitting a 5G architecture into hardware, software, and/or firmware. Advantageously, examples described herein improve 5G next generation core (5GC) by allowing independent scalability and flexible deployments and enabling flexible and efficient network slicing. Advantageously, examples described herein improve 5GC by effectuating configurability of the 5G devices 902, the one or more 5G RRUs 904, the one or more 5G RANs 906, 908, and/or the one or more 5G cores 910 on a per-core and/or per-uncore basis based on a network node location, latency requirements, throughput requirements, and/or power requirements associated with network workloads to be executed by such processor(s).

Figure 10:
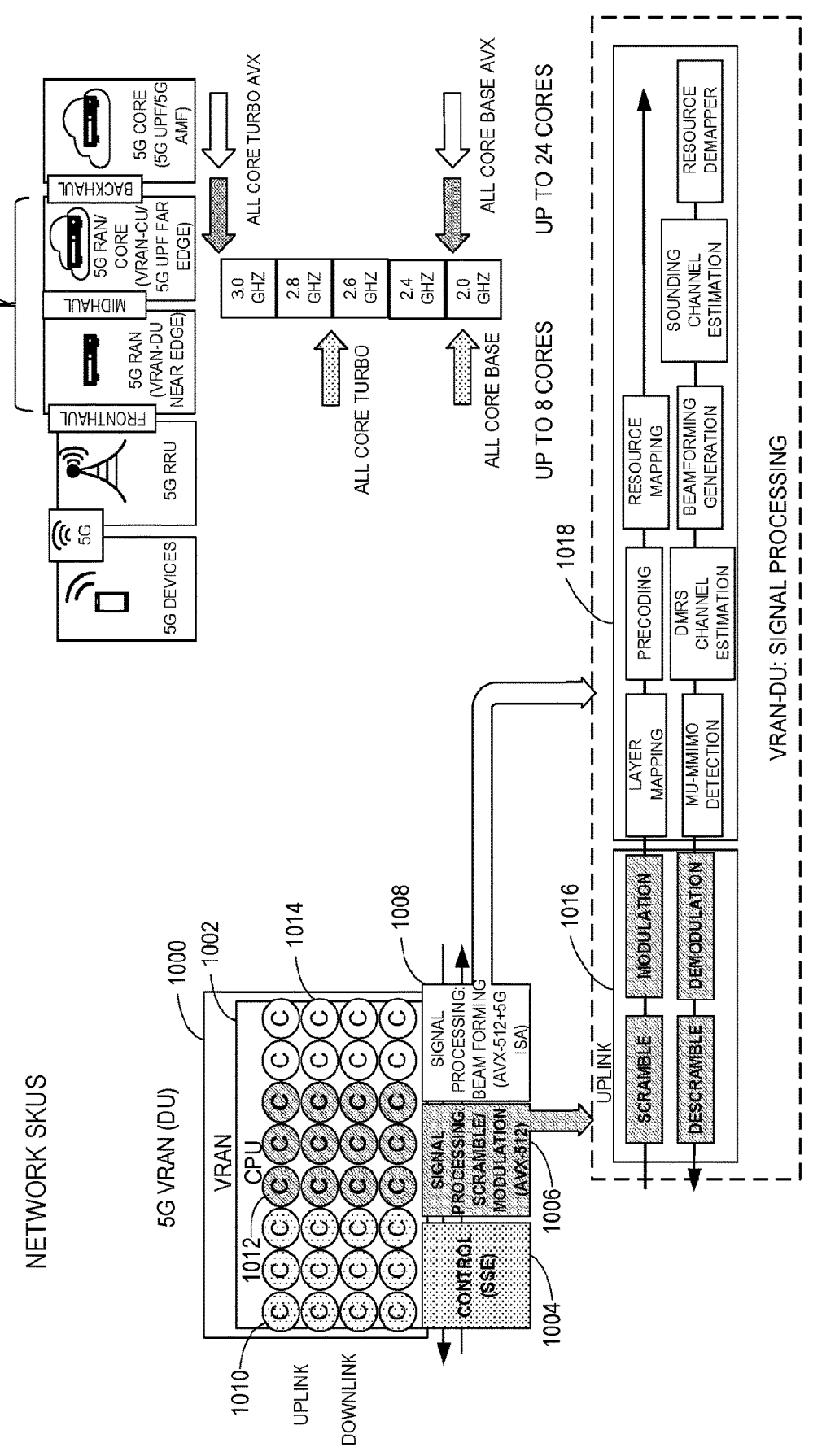
FIG. 10 is an illustration of an example workload-adjustable CPU that may implement an example 5G virtual radio access network (vRAN) distributed unit (DU).

FIG. 10 is an illustration of an example multi-core CPU 1002 that may implement an example 5G vRAN DU 1000. For example, the 5G vRAN DU 1000 may implement the near edge and/or the far edge of the edge cloud 210 of FIG. 2. In this example, the vRAN DU 1000 may be implemented by the DUs 122 of FIG. 1, the first multi-core computing system 522 of FIG. 5, the second multi-core computing system 524 of FIG. 5, the third multi-core computing system 600 of FIG. 6, the fourth multi-core computing system 700 of FIG. 7, and/or portion(s) thereof. In this example, the multi-core CPU 1002 is a workload adjustable and/or otherwise a network-optimizable CPU. For example, the multi-core CPU 1002 may be optimized and/or otherwise configured based on a computing or network workload to be executed or processed. In some such examples, the multi-core CPU 1002 may be configurable on a per-core, per-uncore, and/or per-CLM basis to improve at least one of performance, throughput, or latency associated with processing the computing or network workload. In some examples, the multi-core CPU 1002 may implement a multi-SKU CPU that may be adapted to operate in different configurations associated with different respective SKUs.

In this example, the multi-core CPU 1002 may execute first example instructions (e.g., hardware or machine readable instructions) 1004, second example instructions 1006, or third example instructions 1008. For example, the instructions 1004, 1006, 1008 may be written, implemented, and/or otherwise based on an assembly, hardware, or machine language. In this example, the first instructions 1004 may implement and/or otherwise correspond to SSE instructions to effectuate control tasks (e.g., core control tasks, CPU control tasks, etc.). In this example, the second instructions 1006 may implement and/or otherwise correspond to AVX- 512 instructions. In this example, the third instructions 1008 may implement and/or otherwise correspond to AVX-512+ 5G ISA instructions.

In the illustrated example of FIG. 10, the multi-core CPU 1002 has first example cores 1010, second example cores 1012, and third example cores 1014. In this example, the first cores 1010 execute the first instructions 1004 to effectuate first workloads by executing control tasks. In this example, the second cores 1012 execute the second instructions 1006 to effectuate second example network workloads 1016. In this example, the second network workloads 1016 are signal processing workloads, such as scrambling or descrambling data, modulating or demodulating data, etc. In this example, the third cores 1014 execute the third instructions 1008 to effectuate third example network workloads 1018. In this example, the third network workloads 1018 include layer mapping, precoding, resource mapping, MU-MMIMO detection, demodulation reference signal (DMRS) channel estimation, beamforming generation, sounding channel estimation, and resource demapping.

In some examples, the multi-core CPU 1002 invokes an application ratio based on a network node location, latency requirements, throughput requirements, and/or power requirements associated with network workloads to be executed by the 5G vRAN DU 1000. For example, the multi-core CPU 1002 may select a first application ratio (e.g., 0.7, 0.8, etc.) from a plurality of application ratios that the multi-core CPU 1002 may support or be capable of implementing. In some such examples, the multi-core CPU 1002 can calculate and/or otherwise determine CPU settings, such as operating frequencies for a core when executing a respective one of the instructions 1004, 1006, 1008, operating frequencies for a corresponding uncore when executing the respective one of the instructions 1004, 1006, 1008, etc.

Advantageously, in response to loading the second instructions 1006, the second cores 1012 may be configured based on the selected application ratio by increasing their operating frequencies from a base frequency to a turbo frequency (e.g., from 2.0 to 3.0 Gigahertz (GHz)). For example, the second instructions 1006 may be optimized to execute compute bound and/or otherwise more processing intensive computing tasks compared to the first instructions 1004. In some examples, the multi-core CPU 1002 may determine to operate first one(s) of the second cores 1012 at a first frequency (e.g., the base frequency of 2.0 GHz) while operating second one(s) of the second cores 1012 at a second frequency (e.g., the turbo frequency of 3.0 GHz). In some examples, the multi-core CPU 1002 may determine to operate all of the second cores 1012 at the same frequency (e.g., the base frequency or the turbo frequency).

Advantageously, in response to loading the third instructions 1008, the third cores 1014 may be configured based on the selected application ratio by increasing their operating frequencies (e.g., from 2.0 to 3.2 GHz). For example, the third instructions 1008 may be optimized to execute compute bound and/or otherwise more processing intensive computing tasks compared to the first instructions 1004 and/or the second instructions 1006. In some examples, the multi-core CPU 1002 may determine to operate first one(s) of the third cores 1014 at a first frequency (e.g., the base frequency of 2.0 GHz) while operating second one(s) of the third cores 1014 at a second frequency (e.g., the turbo frequency of 3.0 GHz). In some examples, the multi-core CPU 1002 may determine to operate all of the third cores 1014 at the same frequency (e.g., the base frequency or the turbo frequency).

In this example, up to eight of the cores 1010, 1012, 1014 may execute the first instructions 1004 at the same time. Alternatively, a different number of the cores 1010, 1012, 1014 may execute the first instructions 1004 at the same time. In this example, up to 24 of the cores 1010, 1012, 1014 may execute the second instructions 1016 or the third instructions 1018 at the same time. Alternatively, a different number of the cores 1010, 1012, 1014 may execute the second instructions 1016 or the third instructions 1018 at the same time.

Although the cores 1010, 1012, 1014 are represented in this example as executing the corresponding instructions 1004, 1006, 1008, at a different point in time or operation, one(s) of the cores 1010, 1012, 1014 may load different ones of the instructions 1004, 1006, 1008 and thereby may be dynamically configured from a first instruction loading instance (e.g., loading one of the first instructions 1004) to a second instruction loading instance (e.g., loading one of the second instructions 1006 or the third instructions 1008 after executing a workload with the one of the first instructions 1004). For example, a first one of the first cores 1010 may execute the first instructions 1004 at a first time, the second instructions 1006 at a second time after the first time, and the third instructions 1008 at a third time after the second time.

Figure 11:
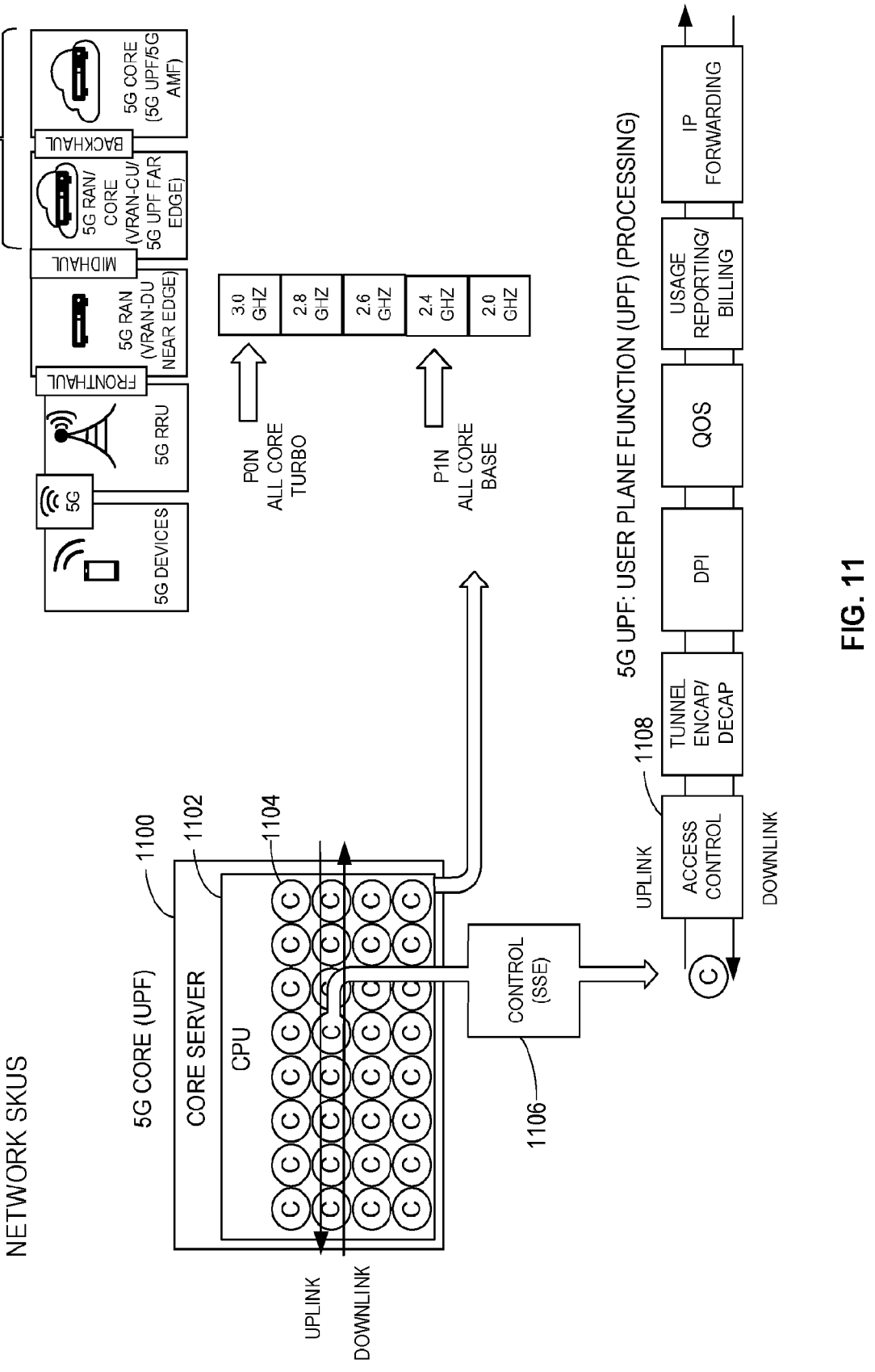
FIG. 11 is an illustration of an example implementation of a 5G core server including an example workload-adjustable CPU.

FIG. 11 is an illustration of an example implementation of a 5G core server 1100 including an example multi-core CPU 1102. For example, the 5G core server 1100 may implement the far edge of the edge cloud 210 of FIG. 2 and/or the core network 330 of FIG. 3. In this example, the multi-core CPU 1102 includes a plurality of example computing cores 1104. In this example, the core server 1100 may be implemented by the core devices 126 of FIG. 1, the first multi-core computing system 522 of FIG. 5, the second multi-core computing system 524 of FIG. 5, the third multi-core computing system 600 of FIG. 6, the fourth multi-core computing system 700 of FIG. 7, and/or portion(s) thereof. In this example, the multi-core CPU 1102 is a workload adjustable and/or otherwise a network-optimizable CPU. For example, the multi-core CPU 1102 may be optimized and/or otherwise configured based on a computing or network workload to be executed or processed. In such examples, the multi-core CPU 1102 may implement a multi-SKU CPU that may be adapted to operate in different configurations associated with different respective SKUs based on the network node location, the latency requirements, the throughput requirements, and/or the power requirements of the core server 1100.

In this example, the multi-core CPU 1102 may execute first example instructions (e.g., machine readable instructions) 1106. For example, the first instructions 1106 of FIG. 11 may correspond to the first instructions 1004 of FIG. 10. In this example, the first instructions 1106 may be written, implemented, and/or otherwise based on an assembly, hardware, or machine language. In this example, the first instructions 1106 may implement and/or otherwise correspond to SSE instructions to effectuate control tasks (e.g., core control tasks, CPU control tasks, etc.). In this example, the computing cores 1104 execute the first instructions 1106 to effectuate first example workloads 1108 by executing control tasks. In this example, the first workloads 1108 implement a 5G UPF (e.g., a 5G UPF processing or workload pipeline). For example, the cores 1104 can load and execute the first instructions 1106 to implement and/or otherwise execute access control, tunnel encapsulation or decapsulation, deep packet inspection (DPI), Quality-of-Service (QoS), usage reporting and/or billing, and/or Internet Protocol (IP) forwarding tasks.

In some examples, the multi-core CPU 1102 invokes an application ratio based on a network node location, latency requirements, throughput requirements, and/or power requirements associated with network workloads to be executed by the core server 1100. For example, the multi-core CPU 1102 may select a first application ratio (e.g., 0.7, 0.8, etc.) from a plurality of application ratios that the multi-core CPU 1102 can support and/or is licensed to support. In such examples, the multi-core CPU 1102 can calculate and/or otherwise determine CPU parameters or settings, such as operating frequencies, power consumption values, etc., for one of the cores 1104 when executing the instructions 1106, operating frequencies, power consumption values, etc., for a corresponding uncore when executing the instructions 1106, etc.

Advantageously, in response to loading the first instructions 1106, the cores 1104 may be configured based on the selected application ratio by increasing their operating frequencies (e.g., from 2.4 to 3.0 GHz). Although the cores 1104 are represented in this example as executing the first instructions 1106, at a different point in time or operation, one(s) of the cores 1104 may load different instructions, such as one(s) of the instructions 1004, 1006, 1008 of FIG. 10, and thereby may be dynamically configured from a first instruction loading instance (e.g., loading one of the first instructions 1106) to a second instruction loading instance (e.g., loading one of the second instructions 1006 of FIG. 10 after executing a workload with the one of the first instructions 1106).

Figure 12:
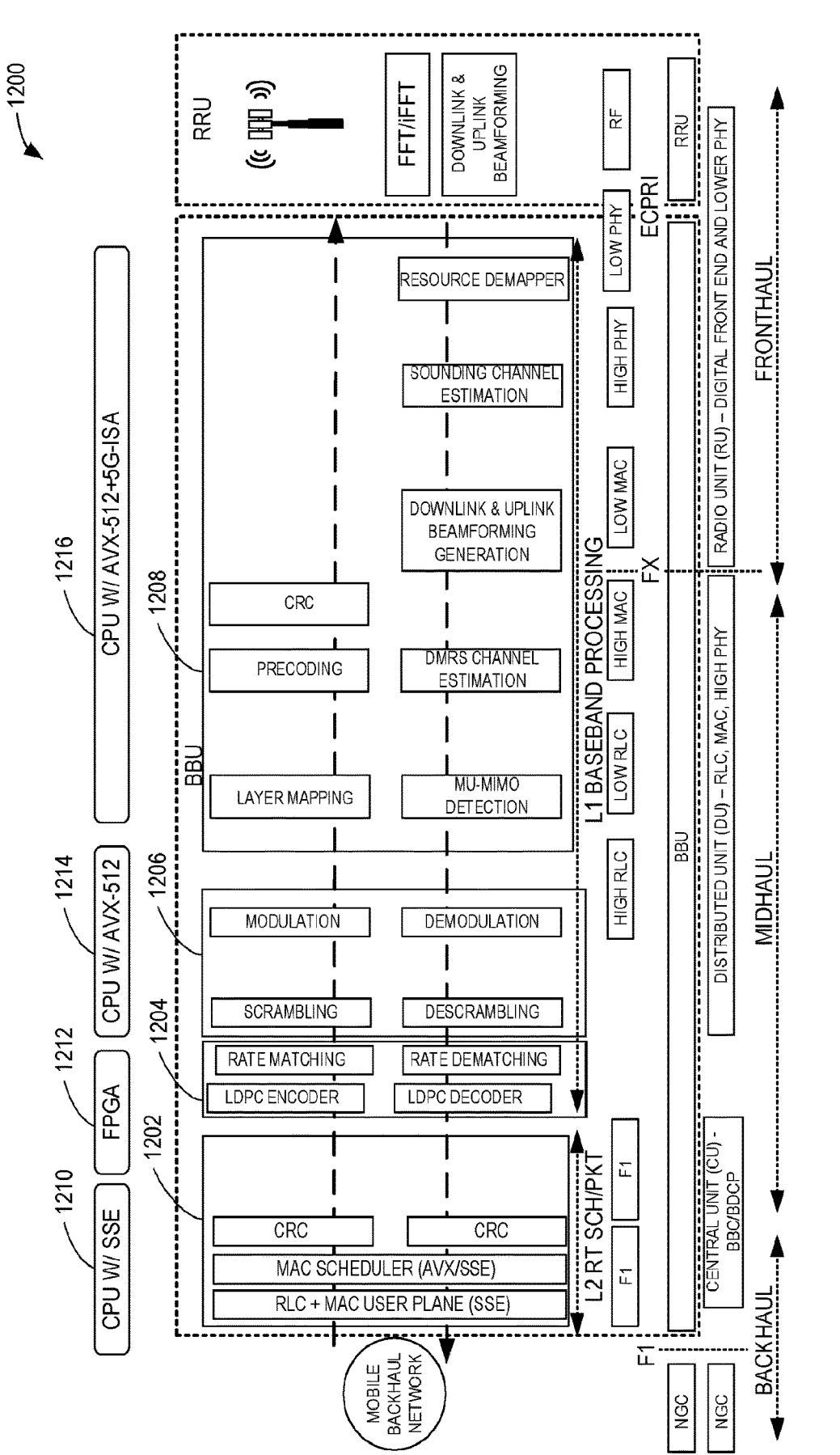
FIG. 12 is an illustration of example network workloads that may be executed by the first example multi-core computing environment of FIG. 1 and/or the second example multi-core computing environment of FIG. 5.

FIG. 12 is an illustration of an example network architecture (e.g., a 5G network architecture) 1200 to effectuate and/or otherwise facilitate the processing or completion of example network workloads 1202, 1204, 1206, 1208. For example, the network architecture 1200 may implement the first multi-core computing environment 100 of FIG. 1, the second multi-core computing environment 500 of FIG. 5, and/or portion(s) thereof.

In the illustrated example of FIG. 12, the network workloads 1202, 1204, 1206, 1208 may be performed by a first example CPU (e.g., a multi-core CPU, a 5G CPU, etc.) 1210, an example FPGA 1212, a second example CPU 1214, and/or a third example CPU 1216. In this example, the first CPU 1210 may process the first network workloads 1202 with a first set of instructions (e.g., SSE instructions), such as the first instructions 1004 of FIG. 10 and/or the first instructions 1106 of FIG. 11. In this example, the FPGA 1212 may process the second network workloads 1204 using a second set of instructions such as Very High Speed Integrated Circuit Hardware Description Language (VHSIC-HDL or VHDL) instructions.

In this example, the second CPU 1214 may process the third network workloads 1206 with a third set of instructions (e.g., AVX-512 instructions) that may be different from the first set of instructions, where the third set of instructions may correspond to the second instructions 1006 of FIG. 10. In this example, the third CPU 1216 may process the fourth network workloads 1208 with a fourth set of instructions (e.g., AVX-512+5G ISA instructions) that may be different from the first set of instructions and/or the third set of instructions, where the fourth set of instructions may correspond to the third instructions 1008 of FIG. 10. In this example, a baseband unit (BBU) may implement one(s) of the network workloads 1202, 1204, 1206, 1208 and a RRU may implement network workloads associated with downlink and uplink beamforming, fast Fourier transform (FFT), and/or Inverse FFT (IFFT), etc. In this example, the fourth set of instructions implement and/or otherwise correspond to L1 baseband assist instructions. For example, AVX-512+ 5G-ISA instructions, and/or, more generally, 5G-ISA instructions as described herein may be referred to as L1 baseband assist instructions. In some examples, the L1 baseband assist instructions, when executed, effectuate one(s) of the fourth network loads 1208 with increased performance, increased throughput, and/or reduced latency with respect to other types of instructions (e.g., SSE instructions, AVX-512 instructions, etc.).

In the illustrated example of FIG. 12, the CPUs 1210, 1214, 1216 may be different CPUs. Alternatively, one or more of the CPUs 1210, 1214, 1216 may be the same CPU. For example, one or more first cores of the first CPU 1210 may implement the first network workloads 1202, one or more second cores of the first CPU 1210 may implement the third network workloads 1206, and/or one or more third cores of the first CPU 1210 may implement the fourth network workloads 1208. Advantageously, the first CPU 1210 (or the second CPU 1214 or the third CPU 1216) may dynamically configure (or re-configure) core(s) of the CPU based on an instruction (e.g., an SSE instruction, an AVX-512 instruction, a 5G ISA instruction, etc.) that is loaded to respective core(s). For example, a 5G ISA instruction can be representative of a machine readable instruction that, when executed, executes a 5G computing task, such as one(s) of the network workloads 1202, 1204, 1206, 1208 depicted in the example of FIG. 12. Advantageously, the first CPU 1210 (or the second CPU 1214 or the third CPU 1216) may dynamically configure (or re-configure) uncore(s) and/or CLMs of the CPU based on an instruction (e.g., an SSE instruction, an AVX-512 instruction, a 5G ISA instruction, etc.) that is loaded to respective core(s), an application invoked by the first CPU 1210, etc.

Figure 13:
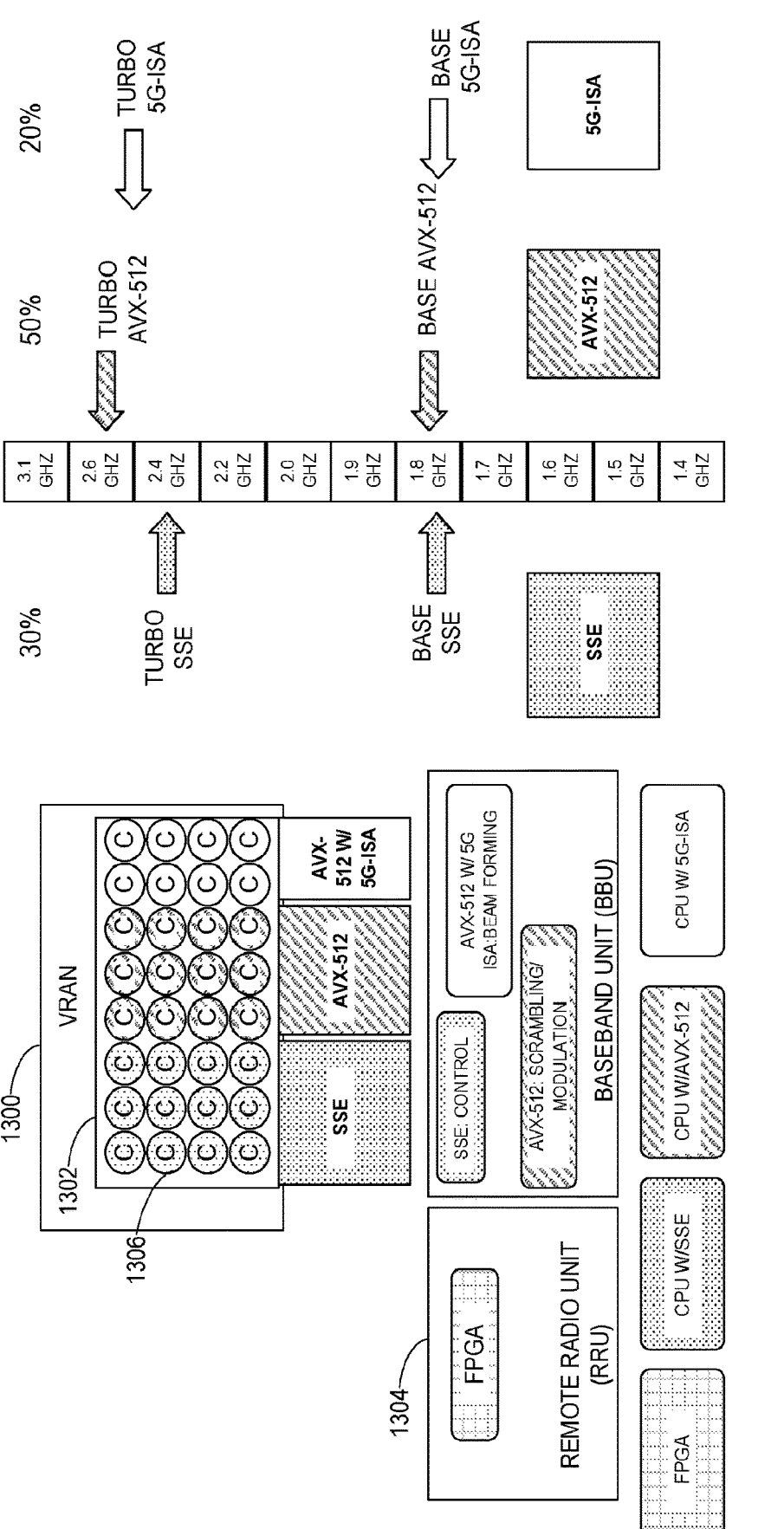
FIG. 13 is an illustration of adjusting performance of an example workload-adjustable CPU that may implement an example vRAN.

FIG. 13 is an illustration of adjusting performance of an example multi-core CPU 1302 that may implement an example vRAN 1300. In this example, the vRAN 1300 may be implemented by the DUs 122 of FIG. 1, the CUs 124 of FIG. 1, the first multi-core computing environment 100 of FIG. 1, the second multi-core computing environment 500 of FIG. 5, and/or portion(s) thereof. In this example, the multi-core CPU 1302 is a workload adjustable and/or otherwise a network-optimizable CPU. For example, the multi-core CPU 1302 may be configured and/or otherwise optimized based on a computing or network workload to be executed or processed. In some such examples, the multi-core CPU 1302 may implement a multi-SKU CPU that may be adapted to operate in different configurations associated with different respective SKUs based on the network node location, the latency requirements, the throughput requirements, and/or the power requirements of the vRAN 1300.

In this example, an example FPGA 1304 implements an RRU. In this example, the vRAN 1300 may implement an example BBU, which may execute SSE instructions, AVX-512 instructions, and/or 5G-ISA instructions to effectuate control, scrambling/modulation, and/or beam forming tasks or workloads. In this example, the multi-core CPU 1302 includes example cores 1306 that load an SSE instruction, an AVX-512 instruction, or a 5G-ISA instruction.

In some examples, the multi-core CPU 1302 invokes an application ratio based on a network node location, latency requirements, throughput requirements, and/or power requirements associated with network workloads to be executed by the vRAN 1300. For example, the multi-core CPU 1302 may select a first application ratio (e.g., 0.7, 0.8, etc.) from a plurality of application ratios. In such examples, the multi-core CPU 1302 can calculate and/or otherwise determine CPU settings, such as operating frequencies for one of the cores 1306 when executing the instructions (e.g., the SSE instructions, the AVX-512 instructions, the 5G-ISA instructions, etc.), operating frequencies for a corresponding uncore when executing the instructions, etc.

Advantageously, in response to loading an SSE instruction, one(s) of the cores 1306 may be configured based on the selected application ratio by increasing their operating frequencies (e.g., from 1.8 to 2.4 GHz). In response to loading an AVX-512 instruction, one(s) of the cores 1306 may be configured based on the selected application ratio by increasing their operating frequencies (e.g., from 1.8 to 2.6 GHz). In response to loading a 5G-ISA instruction, one(s) of the cores 1306 may be configured based on the selected application ratio by increasing their operating frequencies (e.g., from 1.8 to 2.5 GHz). Although the cores 1306 are represented in this example as executing one(s) of the instructions, at a different point in time or operation, one(s) of the cores 1306 may load different instructions, such as one(s) of the instructions 1004, 1006, 1008 of FIG. 10, and thereby may be dynamically configured from a first instruction loading instance (e.g., loading one of the first instructions 1004 of FIG. 10) to a second instruction loading instance (e.g., loading one of the second instructions 1006 of FIG. 10 after executing a workload with the one of the first instructions 1006).

Figure 14:
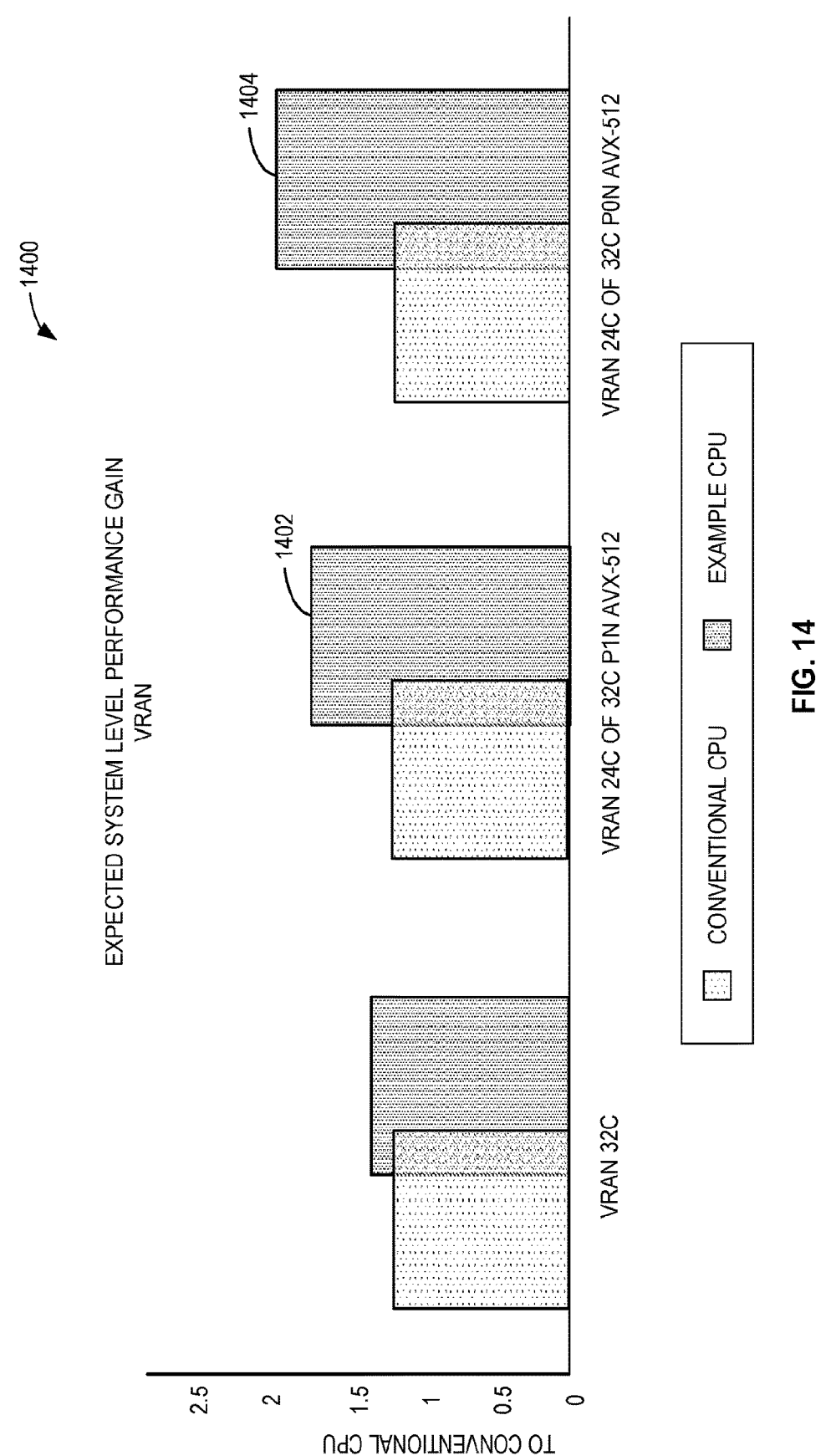
FIG. 14 is a graph of example expected system level performance gain by implementing the examples described herein.

FIG. 14 is a graph 1400 of example expected system level performance gain by implementing the examples described herein. For example, an example CPU, such as the first multi-core CPU 530 of FIG. 5, the second multi-core CPU 552 of FIG. 5, the multi-core CPU 608 of FIG. 6, etc., demonstrate increased and/or otherwise improved performance compared to conventional CPUs. In some such examples, the improvement depicted in FIG. 14 can be demonstrated when the example CPU implements a vRAN (e.g., a vRAN-CU, a vRAN-DU, etc.).

In FIG. 14, comparisons between the example CPU and the conventional CPU are depicted for different P-states of a CPU, such as a P1n state and a P0n state. In this example, a second example comparison 1402 depicts a comparison between the conventional CPU and the example CPU when 24 cores of 32 total cores of the example CPU are executing AVX-512 instructions and the example CPU is in a P1n P-state. In this example, a third example comparison 1404 depicts a comparison between the conventional CPU and the example CPU when 24 cores of 32 total cores of the example CPU are executing AVX-512 instructions and the example CPU is in a P0n P-state. In this example, the third comparison 1404 demonstrates the highest expected system level performance gain.

In some examples, a P-state corresponds to and/or is otherwise representative of a characterization of a CPU. For example, a P-state may be a voltage-frequency pair that sets a speed and power consumption of the CPU. For example, a P-state may be based on a frequency (e.g., an operating frequency) and a voltage operating point. In such examples, the frequency and the voltage operating point are scaled (e.g., scaled higher) as the P-state increases. In some examples, a CPU supports P0 through Pn P-states. The number of P-states that a particular CPU supports may vary, but typically is two or more.

Figure 15:
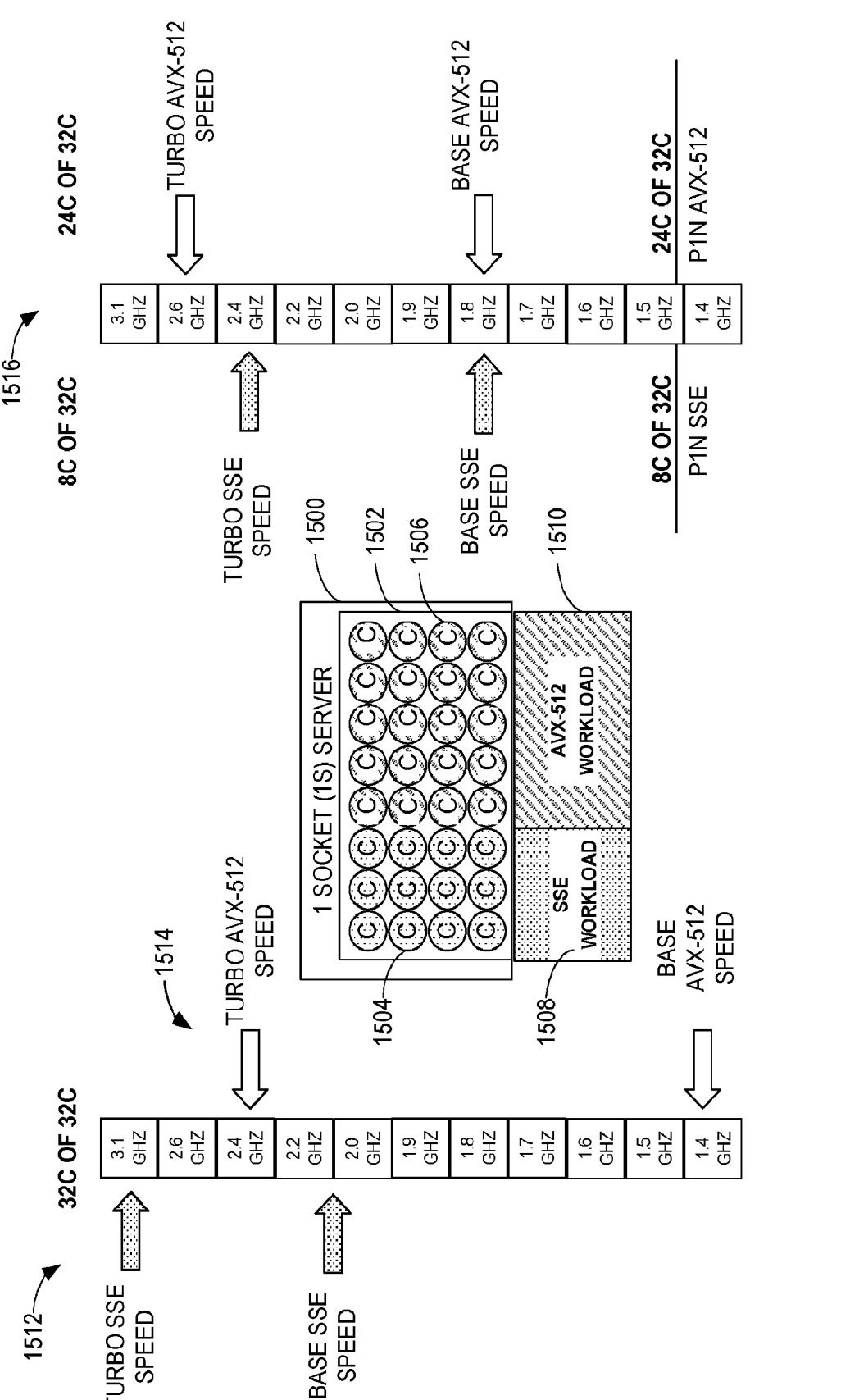
FIG. 15 is an illustration of adjusting performance of an example workload-adjustable CPU included in an example multi-core computing system.

FIG. 15 is an illustration of adjusting performance of an example multi-core CPU 1502 included in an example multi-core computing system 1500. In this example, the multi-core computing system 1500 is a one socket (1S) or single socket server. For example, the multi-core computing system 1500 may implement the DUs 122 of FIG. 1, the CUs 124 of FIG. 1, the core servers 126 of FIG. 1, the first multi-core computing system 522 of FIG. 5, the second multi-core computing system 524 of FIG. 5, the third multi-core computing system 600 of FIG. 6, the fourth multi-core computing system 700 of FIG. 7, and/or portion(s) thereof. In this example, the multi-core CPU 1502 may implement the first multi-core CPU 530 of FIG. 5, the second multi-core CPU 552 of FIG. 5, the multi-core CPU 608 of FIG. 6, etc.

In this example, the multi-core CPU 1502 includes first example cores 1504 and second example cores 1506. In this example, the first cores 1504 execute first machine readable instructions (e.g., SSE instructions) to process example non-AVX workloads 1508, such as SSE workloads. In this example, the second cores 1506 execute second machine readable instructions (e.g., AVX-512 instructions) to process example AVX-512 workloads 1510.

In the illustrated example of FIG. 15, one(s) of the cores 1504, 1506 can be dynamically configured at runtime based on an instruction (e.g., an SSE instruction, an AVX-512 instruction, etc.) to be loaded for execution by the one(s) of the cores 1504, 1506. In some examples, uncore(s) that correspond to the one(s) of the cores 1504, 1506 can be dynamically configured at runtime based on the instruction, a network node location, a latency requirement, a power requirement, a throughput requirement, etc., that may be associated with a network workload to be processed by the multi-core CPU 1502.

In a first example configuration 1512, all the cores of the multi-core CPU 1502 execute the first machine readable instructions to execute the non-AVX workloads 1508. In some such examples, one or more of the cores may operate at a deterministic speed of 2.1 GHz or at a turbo speed of 3.1 GHz. In a second example configuration 1514, all the cores of the multi-core CPU 1502 execute the second machine readable instructions to execute the AVX-512 workloads 1510. In some such examples, one or more of the cores may operate at a deterministic speed of 1.4 GHz or at a turbo speed of 2.4 GHz. In some examples, the first configuration 1512 and/or the second configuration 1514 may be based on a first application ratio of the multi-core CPU 1502.

In a third example configuration 1516, eight of the cores (e.g., the first cores 1504) of the multi-core CPU 1502 execute the first machine readable instructions to execute the non-AVX workloads 1508 and 24 of the cores (e.g., the second cores 1506) execute the second machine readable instructions to execute the AVX-512 workloads 1510 while in the P1n state. In some such examples, the first cores 1504 may operate at either the SSE speed of 1.8 GHz or at a turbo speed of 2.4 GHz. In some such examples, the second cores 1506 may operate at either a deterministic frequency of 1.8 GHz or at a turbo speed of 2.6 GHz. In some examples, the third configuration 1516 may be based on a second application ratio of the multi-core CPU 1502 different from the first application ratio in connection with the first configuration 1512 and/or the second configuration 1514.

Figure 16:
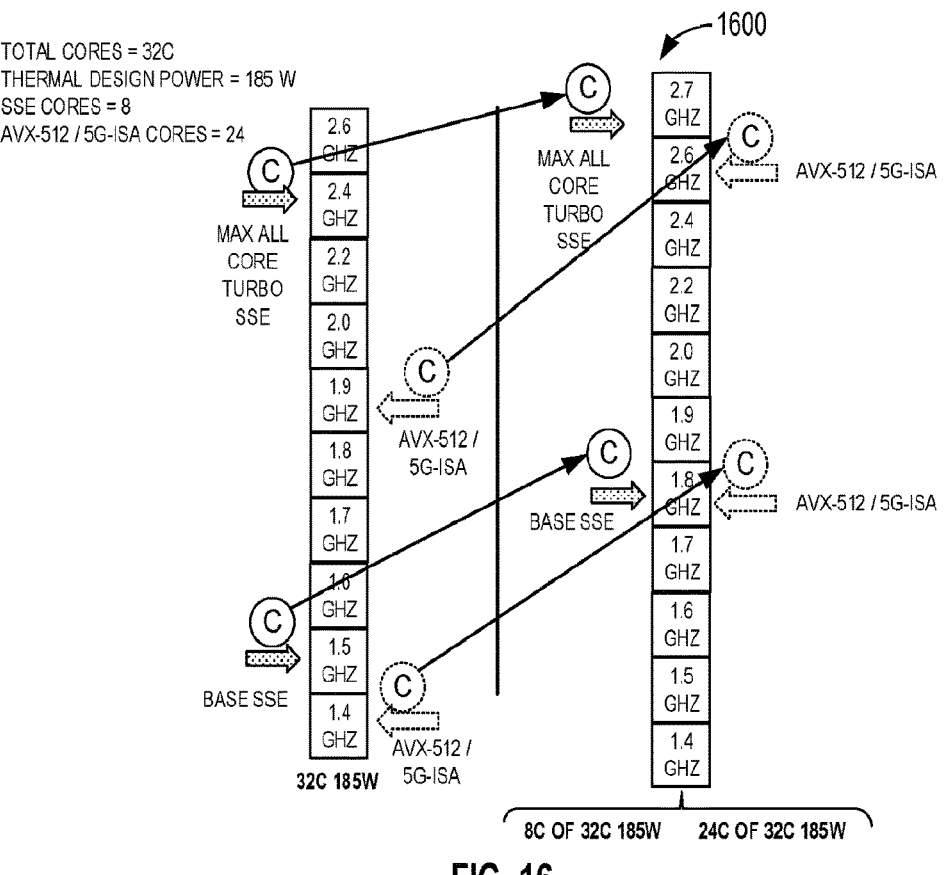
FIG. 16 is an illustration of adjusting performance of an example workload-adjustable CPU based on an example network workload using a first example core allocation and a first example power budget.

FIG. 16 is an illustration of a first example configuration 1600 of adjusting performance of an example multi-core CPU, such as the first multi-core CPU 530 of FIG. 5, the second multi-core CPU 552 of FIG. 5, the multi-core CPU 608 of FIG. 6, etc., based on an example network workload using a first example core allocation and a first example power budget. In this example, the first core allocation is eight of the 32 total cores configured as SSE cores (e.g., cores configured to execute SSE instructions) and 24 of the 32 total cores configured as AVX-512/5G-ISA cores (e.g., cores configured to execute AVX-512 and/or 5G-ISA instructions). In this example, the first power budget, or thermal design power (TDP) constraint or boundary, is 185 watts (W). In this example, the TDP may implement a threshold, such as a power budget threshold, a TDP threshold, a thermal threshold, etc. For example, during runtime of the multi-core CPU, up to 24 of the 32 total cores may load AVX-512/5G-ISA instructions without violating the TDP of 185 W. In some such examples, up to 32 cores may load SSE instructions without violating the TDP of 185 W. In some such examples, enabling more than 24 of the 32 total cores to load AVX-512/5G-ISA (e.g., AVX-512+5G-ISA) instructions may cause the multi-core CPU to consume more than 185 W.

In the illustrated example of FIG. 16, an SSE core may operate at a base frequency of 1.8 GHz or at a turbo frequency of 2.7 GHz. In this example, an AVX-512/5G-ISA core may operate and/or otherwise execute instructions at a base frequency of 1.8 GHz or at a turbo frequency of 2.6 GHz. Advantageously, the illustrated example of FIG. 16 demonstrates that such a configuration of the cores can enable the cores to operate at higher frequencies compared to a configuration of all 32 cores executing SSE instructions or all 32 cores executing AVX-512/5G-ISA instructions. In some examples, the first configuration 1600 may be based on a first application ratio of the multi-core CPU.

Figure 17:
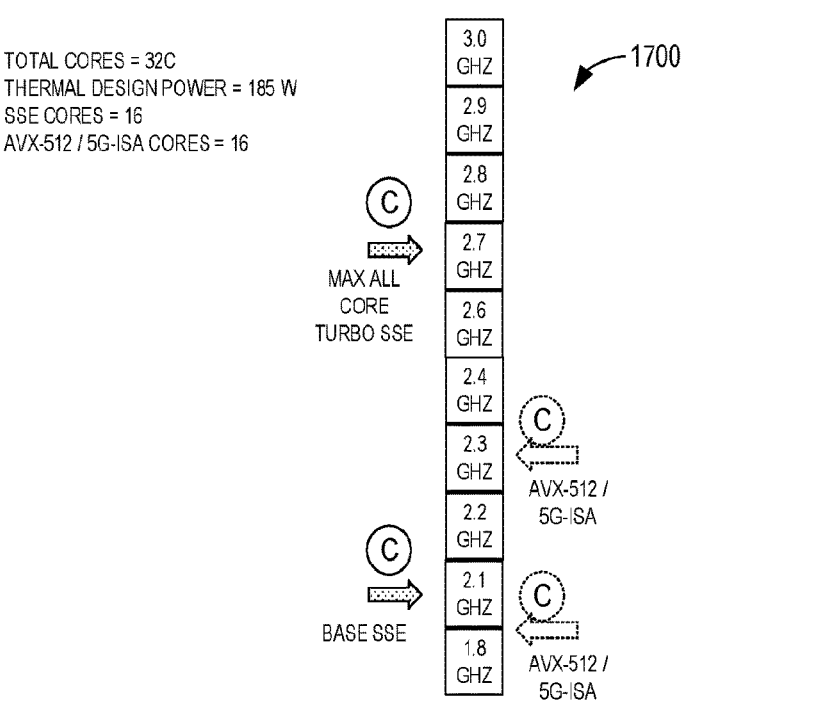
FIG. 17 is an illustration of adjusting performance of an example workload-adjustable CPU based on an example network workload using a second example core allocation and the first example power budget.

FIG. 17 is an illustration of a second example configuration 1700 of adjusting performance of an example multi-core CPU, such as the first multi-core CPU 530 of FIG. 5, the second multi-core CPU 552 of FIG. 5, the multi-core CPU 608 of FIG. 6, etc., based on an example network workload using a second example core allocation and a second example power budget. In this example, the second core allocation is 16 of the 32 total cores configured as SSE cores (e.g., cores configured to execute SSE instructions) and 16 of the 32 total cores configured as AVX-512/5G-ISA cores (e.g., cores configured to execute AVX-512 and/or 5G-ISA instructions).

In this example, the second power budget is 185 W. In this example, during runtime of the multi-core CPU, up to 16 of the 32 total cores may load AVX-512/5G-ISA instructions without violating the TDP of 185 W. In some such examples, up to 32 cores may load SSE instructions without violating the TDP of 185 W. In some such examples, enabling more than 16 of the 32 total cores to load AVX-512/5G-ISA instructions may cause the multi-core CPU to consume more than 185 W. In the illustrated example of FIG. 17, an SSE core may operate at a base frequency of 2.1 GHz or at a turbo frequency of 2.7 GHz. In this example, an AVX-512/5G-ISA core may operate and/or otherwise execute instructions at a base frequency of 1.8 GHz or at a turbo frequency of 2.3 GHz. In some examples, the second configuration 1700 may be based on a second application ratio of the multi-core CPU, which may be different than the first application ratio in connection with the illustrated example of FIG. 16 as described above.

Figure 18:
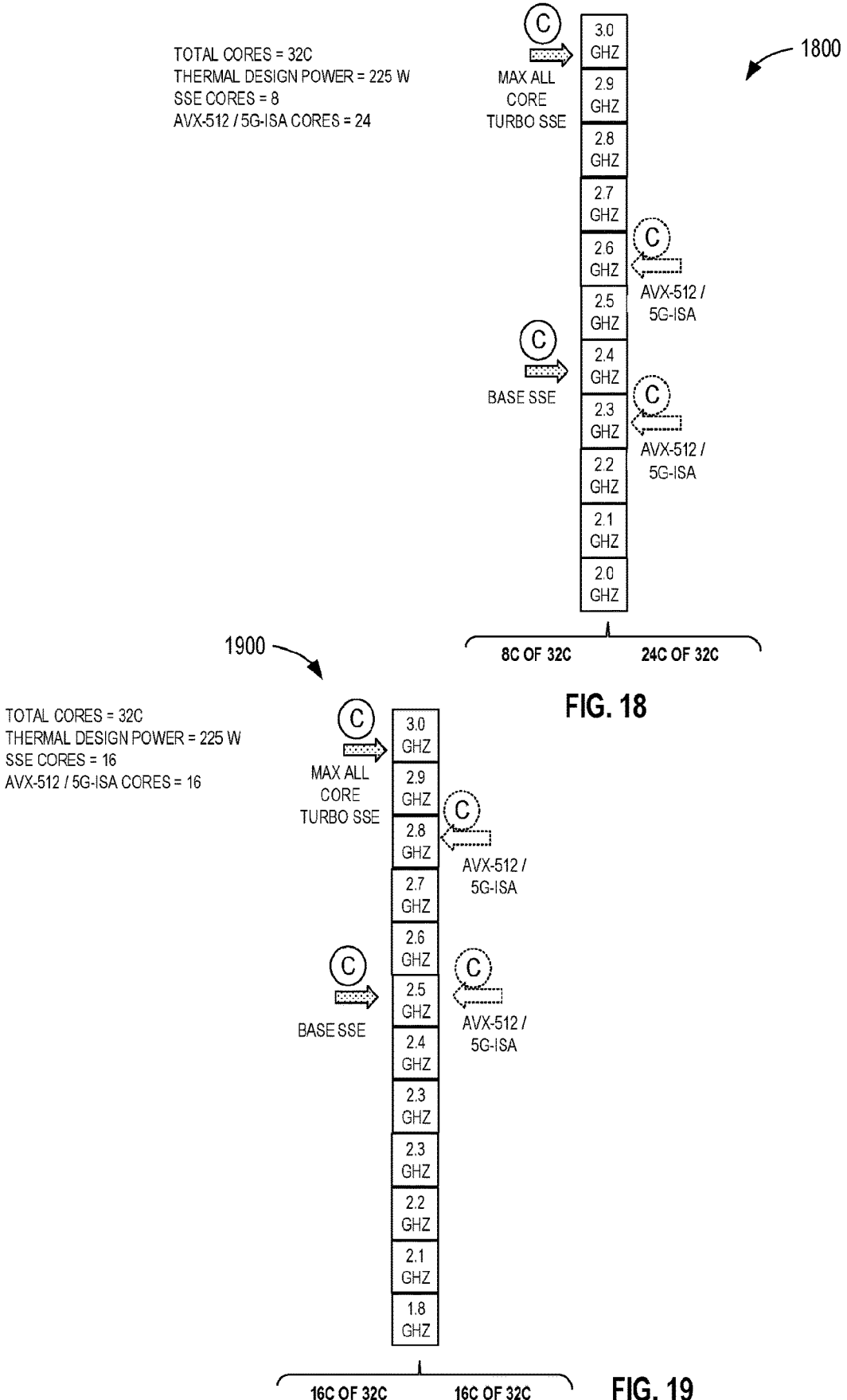
FIG. 18 is an illustration of adjusting performance of an example workload-adjustable CPU based on an example network workload using a third example core allocation and a second example power budget.

FIG. 18 is an illustration of a third example configuration 1800 of adjusting performance of an example multi-core CPU, such as the first multi-core CPU 530 of FIG. 5, the second multi-core CPU 552 of FIG. 5, the multi-core CPU 608 of FIG. 6, etc., based on an example network workload using a third example core allocation and a third example power budget. In this example, the third core allocation is eight of the 32 total cores configured as SSE cores (e.g., cores configured to execute SSE instructions) and 24 of the 32 total cores configured as AVX-512/5G-ISA cores (e.g., cores configured to execute AVX-512 and/or 5G-ISA instructions).

In this example, the third power budget is 225 W. In this example, during runtime of the multi-core CPU, up to 24 of the 32 total cores may load AVX-512/5G-ISA instructions without violating the TDP of 225 W. In some such examples, up to 32 cores may load SSE instructions without violating the TDP of 225 W. In some such examples, enabling more than 24 of the 32 total cores to load AVX-512/5G-ISA instructions may cause the multi-core CPU to consume more than 225 W. In the illustrated example of FIG. 18, an SSE core may operate at a base frequency of 2.4 GHz or at a turbo frequency of 3.0 GHz. In this example, an AVX-512/5G-ISA core may operate and/or otherwise execute instructions at a base frequency of 2.3 GHz or at a turbo frequency of 2.6 GHz. In some examples, the third configuration 1800 may be based on a third application ratio of the multi-core CPU, which may be different than the first application ratio in connection with the example of FIG. 16 above and/or the second application ratio in connection with the example of FIG. 17 above.

FIG. 19 is an illustration of a fourth example configuration 1900 of adjusting performance of an example multi-core CPU, such as the first multi-core CPU 530 of FIG. 5, the second multi-core CPU 552 of FIG. 5, the multi-core CPU 608 of FIG. 6, etc., based on an example network workload using a fourth example core allocation and a fourth example power budget. In this example, the fourth core allocation is 16 of the 32 total cores configured as SSE cores (e.g., cores configured to execute SSE instructions) and 16 of the 32 total cores configured as AVX-512/5G-ISA cores (e.g., cores configured to execute AVX-512 and/or 5G-ISA instructions).

In this example, the fourth power budget is 225 W. In this example, during runtime of the multi-core CPU, up to 16 of the 32 total cores may load AVX-512/5G-ISA instructions without violating the TDP of 225 W. In some such examples, up to 32 cores may load SSE instructions without violating the TDP of 225 W. In some such examples, enabling more than 16 of the 32 total cores to load AVX-512/5G-ISA instructions may cause the multi-core CPU to consume more than 225 W. In the illustrated example of FIG. 19, an SSE core may operate at a base frequency of 2.5 GHz or at a turbo frequency of 3.0 GHz. In this example, an AVX-512/5G-ISA core may operate and/or otherwise execute instructions at a base frequency of 2.5 GHz or at a turbo frequency of 2.8 GHz. In some examples, the fourth configuration 1900 may be based on a fourth application ratio of the multi-core CPU, which may be different than the first application ratio in connection with the example of FIG. 16 above, the second application ratio in connection with the example of FIG. 17 above, and/or the third application ratio in connection with the example of FIG. 18 above.

Figure 20:
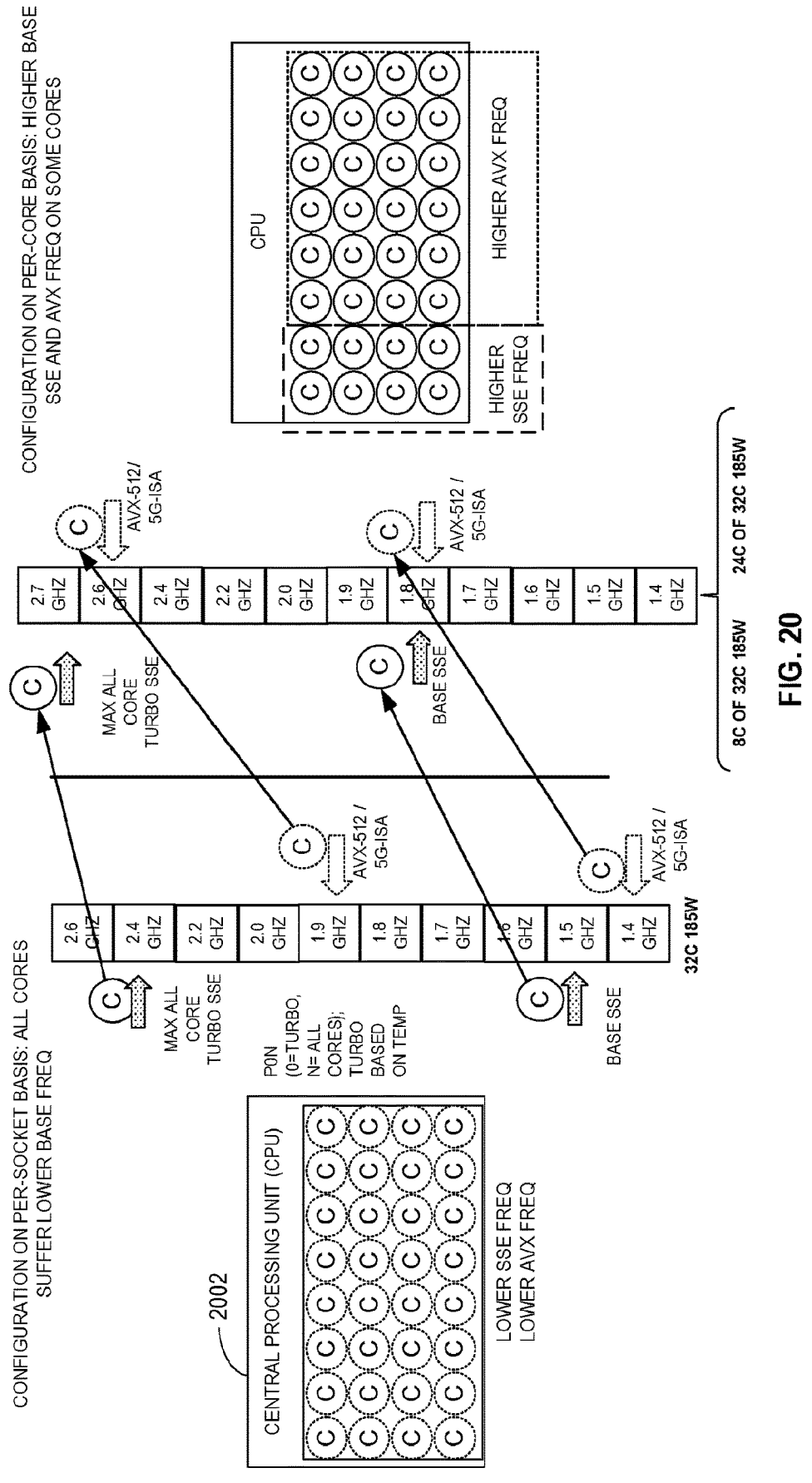
FIG. 20 is an illustration of adjusting performance of an example workload-adjustable CPU on a per-core basis.

FIG. 20 is an illustration of adjusting performance of an example multi-core CPU 2002 on a per-socket basis and a per-core basis. In this example, all 32 cores of the multi-core CPU 2002 operate in either a P0n state (e.g., a turbo state) or a P1n state (e.g., a base state) when configured on a per-socket basis. In this example, 24 of the 32 cores of the multi-core CPU 2002 can operate in either a P0n state (e.g., a turbo state) or a P1n state (e.g., a base state) to execute AVX-512 and/or 5G-ISA instructions when configured on a per-core basis. In this example, up to 32 cores of the multi-core CPU 2002 can operate in either a P0n state (e.g., a turbo state) or a P1n state (e.g., a base state) to execute SSE instructions when configured on a per-core basis.

In this example, all the cores of the multi-core CPU 2002 suffer lower base frequency (e.g., lower SSE frequency, lower AVX frequency, etc.) by configuring the multi-core CPU 2002 on a per-socket basis. Advantageously, in this example, a portion of the cores of the multi-core CPU 2002 operate at a higher base frequency (e.g., higher SSE frequency, higher AVX frequency, etc.) by configuring the multi-core CPU 2002 on a per-core basis when compared to the per-socket basis. Additionally or alternatively, the multi-core CPU 2002 may be adjusted on a per-uncore and/or per CLM basis. Advantageously, as illustrated in the example of FIG. 20, configuring the multi-core CPU 2002 on a per-core basis may achieve increased performance, reduced latency, etc., with respect to configuring the multi-core CPU 2002 on a per-socket basis when executing network workloads as described herein.

Figure 21:
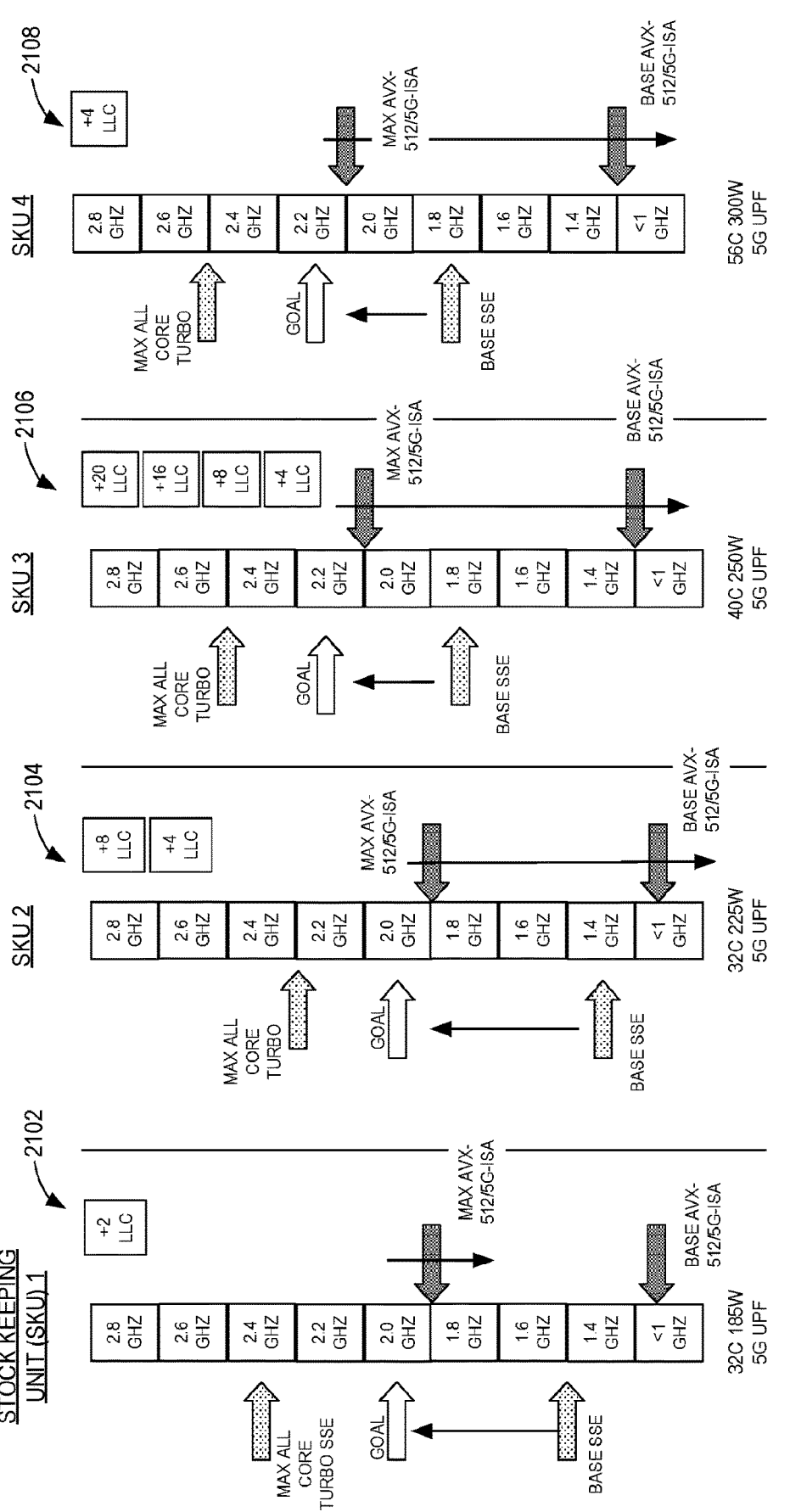
FIG. 21 is an illustration of adjusting performance of example workload-adjustable CPUs based on different example power budgets.

FIG. 21 is an illustration of adjusting performance of example workload-adjustable CPUs 2102, 2104, 2106, 2108 based on different example power budgets (e.g., 185 W, 225 W, 250 W, 300 W, etc., power budgets). In this example, the workload-adjustable CPUs 2102, 2104, 2106, 2108 include a first example CPU 2102 representative of a first SKU (SKU 1), a second example CPU 2104 representative of a second SKU (SKU 2), a third example CPU 2106 representative of a third SKU (SKU 3), and a fourth example CPU 2108 representative of a fourth SKU (SKU 4).

Advantageously, one or more of the workload-adjustable CPUs 2102, 2104, 2106, 2108 may be configured on a per-core, per-uncore, and/or per-CLM basis to process different workloads. Advantageously, one or more of the workload-adjustable CPUs 2102, 2104, 2106, 2108 may be deployed in a 5G environment to implement a vRAN-DU, a vRAN-CU, a core server, etc. For example, the first workload-adjustable CPU 2102 may be configured on a per-core, per-uncore, and/or per-CLM basis to implement a vRAN-DU, a vRAN-CU, a core server, etc. For example, an end-user or customer may deploy a first instance of the first workload-adjustable CPU 2102 as a vRAN-DU, a second instance of the first workload-adjustable CPU 2102 as a vRAN-CU, and a third instance of the first workload-adjustable CPU 2102 as a core server while ordering the same SKU 1 from the CPU manufacturer. In some examples, a first portion of the cores of the first workload-adjustable CPU 2102 may implement a vRAN-DU while a second portion of the cores of the first workload-adjustable CPU 2102 may implement a vRAN-CU and/or a third portion of the cores of the first workload-adjustable CPU 2102 may implement a core server. In some such examples, a first portion of uncore logic that corresponds to the first portion of the cores may be configured to improve throughput and reduce latency to implement a vRAN-DU. For example, the first portion of the uncore logic may be configured by increasing a frequency of a CMS, mesh interface, and/or I/O included in the uncore logic. In some such examples, a first portion of CLMs that corresponds to the first portion of the cores and/or the first portion of the uncore logic may be configured to improve throughput and reduce latency to implement a vRAN-DU. For example, the first portion of the CLMs may be configured by increasing a frequency of a CMS, an LLC, a CHA, and/or an I/O buffer in the CLMs.

FIG. 22 is a table 2200 of example machine readable instructions 2202, 2204 to effectuate processing of example network workloads. In this example, the machine readable instructions 2202, 2204 include example native float-16 data type instructions 2202 and example complex arithmetic instructions 2204. Advantageously, one(s) of the machine readable instructions 2202, 2204 may be utilized and/or otherwise invoked by an example multi-core CPU (e.g., the first multi-core CPU 530 of FIG. 5, the second multi-core CPU 552 of FIG. 5, etc.) as described herein to process 5G-ISA workloads. Advantageously, such 5G-ISA workloads may be performed without a new operating system (OS) to be installed. Advantageously, such 5G-ISA workloads may be performed without Virtual Machine Manager (VMM) dependencies by leveraging an AVX-512 infrastructure (e.g., a legacy or existing AVX-512 infrastructure).

FIG. 23 is a table 2300 of example algorithms that may be implemented by an example multi-core CPU as described herein, such as the first multi-core CPU 530 of FIG. 5, the second multi-core CPU 552 of FIG. 5, the multi-core CPU 608 of FIG. 6, etc. Advantageously, the example multi-core CPU(s) as described herein can execute 5G-ISA instructions, such as the third instructions 1008 of FIG. 10, to process 5G network workloads. For example, the example multi-core CPU(s) can execute a 5G network workload by executing first 5G-ISA instruction(s) to implement a channel estimation with new 5G radio access technology (RAT) algorithm by executing 1-sector 8×8 or 3-sector 4-4 instructions. Advantageously, the algorithms described in the table 2300 may be implemented by the example multi-core CPU(s) as described herein to execute 5G-related network workloads with improved performance and/or efficiency (e.g., less CPU core utilization) compared to conventional multi-core CPUs.

Figure 24:
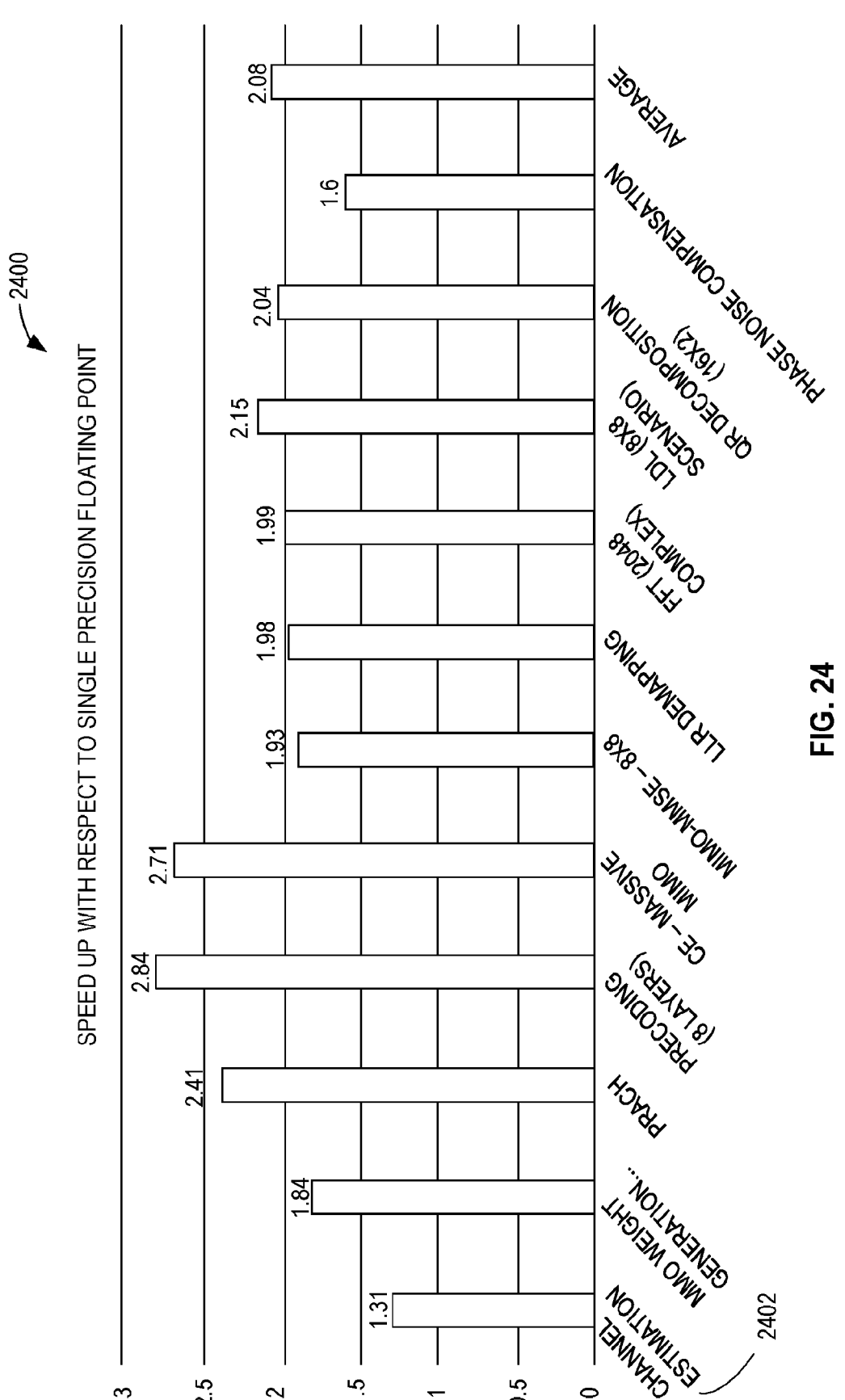
FIG. 24 is a graph of example speed up values with respect to processing single precision floating point calculations with the workload-adjustable CPU of FIGS. 5, 6, 7, 8, 10, 11, 12, 13, and/or 15.

FIG. 24 is a graph 2400 of example speed up values with respect to processing single precision floating point calculations with an example multi-core CPU, such as the first multi-core CPU 530 of FIG. 5, the second multi-core CPU 552 of FIG. 5, the multi-core CPU 608 of FIG. 6, etc. In this example, a first example speed up value of 1.31 for an example channel estimation algorithm (e.g., one or more channel estimation workloads and/or tasks) 2402 can be representative of a 31% increase in speed up for the example multi-core CPU to complete a channel estimation workload compared to a conventional multi-core CPU to complete the same channel estimation workload. Advantageously, the example multi-core CPU may process the channel estimation workload by implementing the channel estimation algorithm(s) depicted in FIG. 23.

Figure 25:
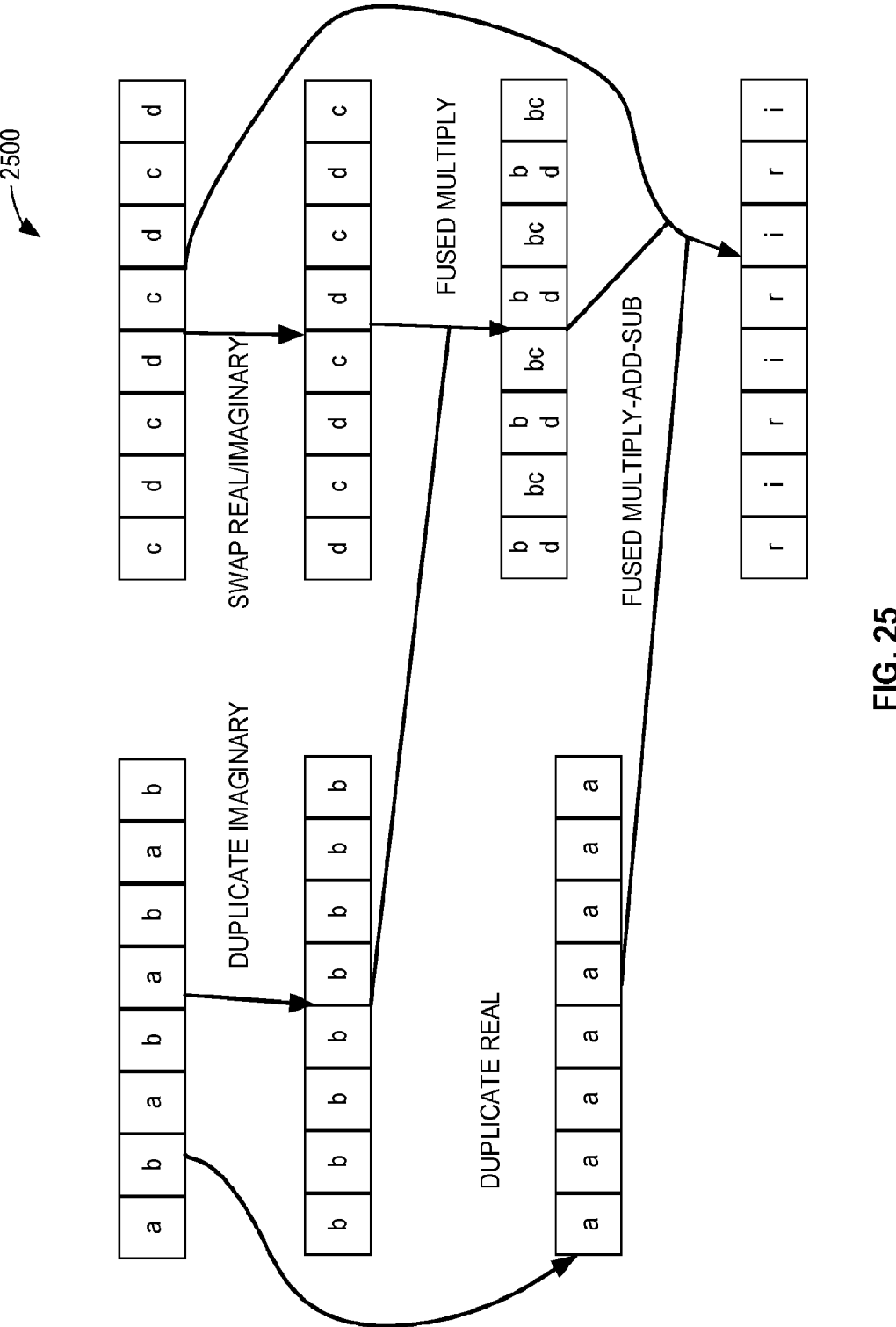
FIG. 25 is an illustration of executing an example complex multiplication operation using a conventional CPU.

FIG. 25 is an illustration of executing an example complex multiplication operation 2500 using a conventional CPU. In this example, the conventional CPU executes a sequence including two duplicates (e.g., a duplicate imaginary operation and a duplicate real operation), one real/imaginary swap, and two fused multiplications (e.g., a fused multiply and a fused multiply-add-sub operation). In some instances, the two duplications may be done by a load unit thereby being an essentially free operation. In some such instances, the sequence depicted in this example includes three instructions.

Figure 26:
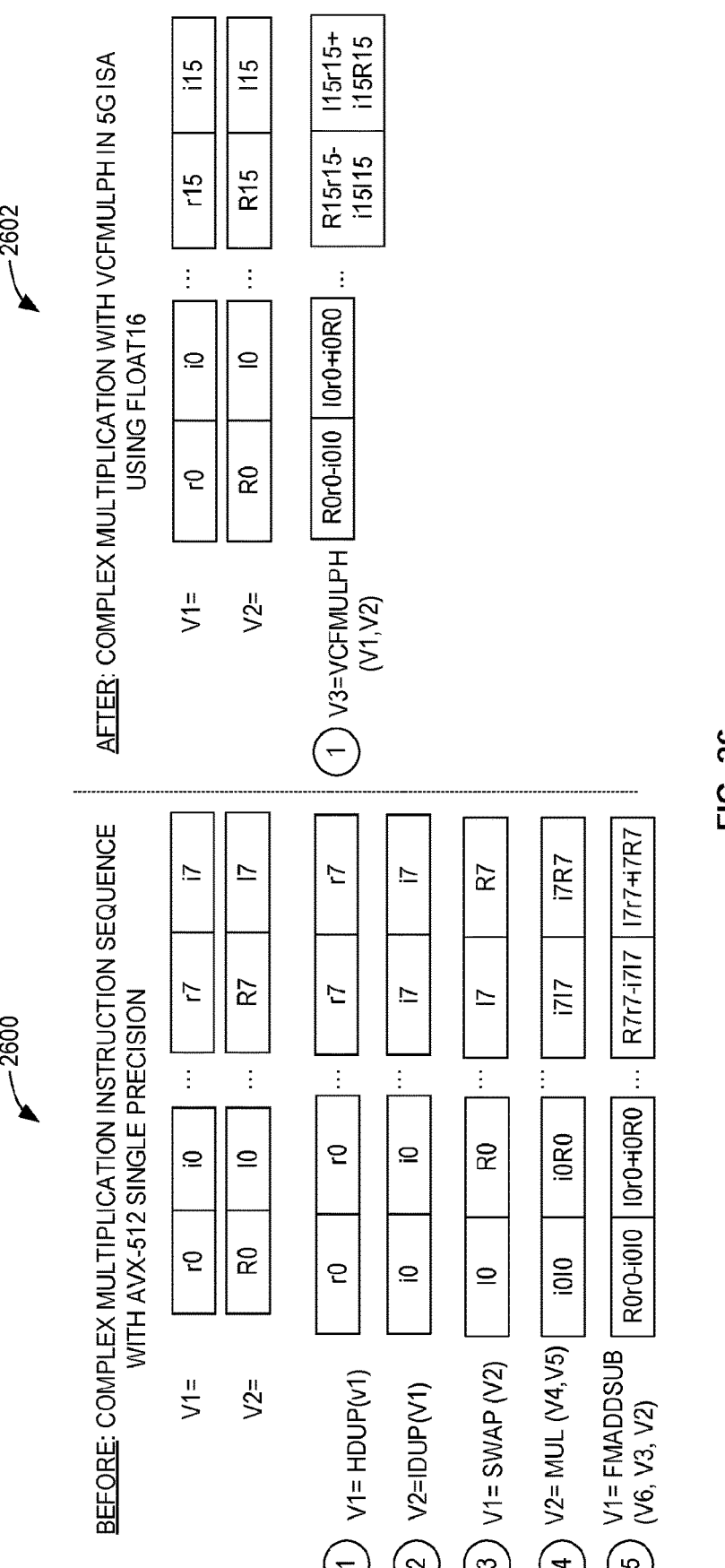
FIG. 26 is an illustration of executing an example complex multiplication operation using the workload-adjustable CPU of FIGS. 5, 6, 7, 8, 10, 11, 12, 13, and/or 15.

FIG. 26 is an illustration of a first example sequence 2600 of executing an example complex multiplication operation using a conventional CPU and a second example sequence 2602 of executing the complex multiplication operation using an example multi-core CPU as described herein, such as the first multi-core CPU 530 of FIG. 5, the second multi-core CPU 552 of FIG. 2, the multi-core CPU 608 of FIG. 6, etc. In this example, five instructions are required to execute the first sequence 2600 and one instruction (e.g., one 5G-ISA instruction) is needed to execute the second sequence 2602. Advantageously, a multi-core CPU as described herein may achieve increased performance, reduced latency, etc., by utilizing 5G-ISA instructions to execute a workload with respect to other types of instructions, such as AVX-512 instructions.

Advantageously, complex arithmetic instructions on the example multi-core CPU as described herein reduce a computational gap with specialized DSPs used in 5G wireless baseband, as well as adjacent signal processing workloads. Advantageously, a customer or end-user can deploy the example multi-core CPU as described herein for a range of workloads from typical computing tasks such as executing Word processing software to complex arithmetic instructions to process 5G network workloads. Advantageously, a CPU manufacturer may deploy the same multi-core CPU to different customers using the same SKU (e.g., the same hard SKU) and configure the multi-core CPU after deployment using software activated features to implement different SKUs (e.g., different soft SKUs). In some examples, the multi-core CPU may execute one or more machine-learning models to identify a workload to be processed and to identify a configuration associated with one of the SKUs for deployment and execution of workloads.

FIG. 27 is an illustration of example configuration information 2700 including example configurations 2702 that may be implemented by an example workload-adjustable CPU, such as the first multi-core CPU 530 of FIG. 5, the second multi-core CPU 552 of FIG. 5, the multi-core CPU 608 of FIG. 6, the processor 800 of FIG. 8, etc. For example, the configurations 2702 may implement a persona or profile of the workload-adjustable CPU for optimized and/or otherwise improved execution of network workloads based on an application ratio. The configurations 2702 are processor configurations, such as CPU configurations, and include a first example configuration (CPU CONFIG 0), a second example configuration (CPU CONFIG 1), and a third example configuration (CPU CONFIG 2). Alternatively, there may be fewer or more configurations than depicted in the illustrated example of FIG. 27.

In the illustrated example of FIG. 27, each of the configurations 2702 has different guaranteed operating frequencies to be used to execute different types of instructions, which correspond to different network workloads. For example, CPU CONFIG 0 can have a guaranteed operating frequency of 2.3 GHz when executing SSE instructions when operating in the P1 state, a guaranteed operating frequency of 1.8 GHz when executing AVX-512 instructions when operating in the P1 state, and a guaranteed operating frequency of 1.5 GHz when executing AVX-512 5G-ISA instructions when operating in the P1 state. In this example, CPU CONFIG 0 has a TDP of 185 W, a core count of 26 (e.g., 26 cores to be enabled), and a thermal junction temperature of 91 degrees Centigrade. Further depicted in this example, CPU CONFIG 0 has a guaranteed operating frequency of 3.0 GHz for all cores (e.g., all 26 cores associated with the core count of 26) when executing SSE instructions when operating in the turbo state or mode, a guaranteed operating frequency of 2.5 GHz for all cores when executing AVX-512 instructions when operating in the turbo state or mode, and a guaranteed operating frequency of 2.0 GHz for all cores when executing AVX-512 5G-ISA instructions when operating in the turbo state or mode.

In this example, CPU CONFIG 0 has a guaranteed operating frequency of 2.4 GHz for corresponding CLMs when operating in the P0 state (e.g., the turbo mode or state) and a guaranteed operating frequency of 1.8 GHz for corresponding CLMs when operating in the P1 mode. In some examples, the configuration information 2700 or portion(s) thereof are stored in a multi-core CPU. For example, the configuration information 2700 can be stored in NVM, ROM, etc., of the multi-core CPU, such as the first multi-core CPU 530 of FIG. 5, the second multi-core CPU 552 of FIG. 5, the multi-core CPU 608 of FIG. 6, etc. In some such examples, changing between ones of the configurations 2702 may include retrieving data stored in register(s) of the workload-adjustable CPU, and/or updating or modifying data stored in the register(s). For example, the processor 800 of FIG. 8 may determine a first value indicative of CPU CONFIG 0 by retrieving the first value from a register stored in the configuration(s) 835 in the memory 837 of FIG. 8. In some such examples, the processor 800 can update the first value to a second value indicative of CPU CONFIG 1. In some such examples, the processor 800 can adjust and/or otherwise scale the SSE P1 frequency from 2.3 to 2.8 GHz, the AVX-512 P1 frequency from 1.5 to 1.7 GHz, etc., in response to the change in values of the register.

FIG. 28 is a table 2800 of example throughput, latency, and power parameters with respect to uncore frequency (measured in GHz) of an example workload-adjustable CPU, such as the first multi-core CPU 530 of FIG. 5, the second multi-core CPU 552 of FIG. 2, the multi-core CPU 608 of FIG. 3, the processor 800 of FIG. 8, etc. For example, the uncore frequency can correspond to a UCLK frequency of the CMS 816, the mesh interface 824, the I/O 826, and/or, more generally, the uncore logic 822 described above in connection with FIG. 8.

In this example, the throughput parameter of the table 2800 is calculated, determined, and/or otherwise measured in packets per second. For example, a value of the throughput parameter can correspond to a number of packets per second that the uncore logic 822 can process at a specified uncore frequency. Alternatively, the throughput parameter may be calculated using any other unit of measure. In some examples, the PMU 828 of FIG. 8 may calculate values of the throughput parameter.

In this example, the minimum latency parameter (MIN LATENCY) of the table 2800 is calculated, determined, and/or otherwise measured in nanoseconds (ns). For example, a value of the minimum latency parameter can correspond to the lowest measured latency that is identified for a time period that the uncore logic 822 is processing packets at a specified uncore frequency. Alternatively, the minimum latency parameter may be calculated using any other unit of measure. In some examples, the PMU 828 of FIG. 8 may calculate values of the minimum latency parameter.

In this example, the maximum latency parameter (MAX LATENCY) of the table 2800 is calculated, determined, and/or otherwise measured in nanoseconds (ns). For example, a value of the maximum latency parameter can correspond to the highest measured latency that is identified for a time period that the uncore logic 822 is processing packets at a specified uncore frequency. Alternatively, the maximum latency parameter may be calculated using any other unit of measure. In some examples, the PMU 828 of FIG. 8 may calculate values of the maximum latency parameter.

In this example, the average latency parameter (AVG LATENCY) of the table 2800 is calculated, determined, and/or otherwise measured in nanoseconds (ns). For example, a value of the average latency parameter can correspond to the average measured latency for a time period that the uncore logic 822 is processing packets at a specified uncore frequency. Alternatively, the average latency parameter may be calculated using any other unit of measure. In some examples, the PMU 828 of FIG. 8 may calculate values of the average latency parameter.

In this example, the power parameter (METRIC_PACKAGE POWER) of the table 2800 is calculated, determined, and/or otherwise measured in watts. For example, a value of the power parameter can correspond to the measured power of a package of the multi-core processor 800 of FIG. 8 that is identified for a time period that the uncore logic 822 is processing packets at a specified uncore frequency. Alternatively, the power parameter may be calculated using any other unit of measure. In some examples, the PMU 828 of FIG. 8 and/or the power budget analyzer 834 of FIG. 8 may calculate values of the throughput parameter.

Advantageously, the uncore logic 822 can increase and/or otherwise improve throughput in response to increasing the frequency of the uncore logic 822. Advantageously, the uncore logic 822 can decrease and/or otherwise reduce latency in response to increasing the frequency of the uncore logic 822 or portion(s) thereof. In this example, at least one of the throughput parameter, the minimum latency parameter, the maximum latency parameter, the average latency parameter, or the power parameter are not linear. For example, there may be diminishing returns (e.g., marginal changes) to increase the throughput parameter by increasing the uncore frequency above 2.0 GHz. In some examples, there may be an optimized and/or otherwise improved maximum latency achieved by the uncore logic 822 when operating at 2.3 GHz. For example, although there may be a marginal increase in throughput in response to increasing the uncore frequency from 2.0 GHz to 2.3 GHz, there may be substantial decreases achieved for at least one of the minimum latency, the maximum latency, or the average latency.

FIG. 29 is an illustration of an example static configuration 2900 of an example workload-adjustable CPU, such as the first multi-core CPU 530 of FIG. 5, the second multi-core CPU 552 of FIG. 5, the multi-core CPU 608 of FIG. 6, etc. In this example, the static configuration 2900 may be accessed and/or otherwise configured in BIOS of the workload-adjustable CPU. For example, dynamic speed select technology (SST) power profiles (PP) as provided by Intel® are disabled. In some such examples, 16 cores of the workload-adjustable CPU can be configured with a base configuration having a P1 ratio of 18 and a TDP of 185 W.

FIG. 30 is an illustration of an example dynamic configuration 3000 of an example workload-adjustable CPU, such as the first multi-core CPU 530 of FIG. 5, the second multi-core CPU 552 of FIG. 5, the multi-core CPU 608 of FIG. 6, etc. In this example, the dynamic configuration 3000 may be accessed and/or otherwise configured in BIOS of the workload-adjustable CPU. For example, dynamic SST-PP is enabled. In such some examples, core(s) of the workload-adjustable CPU can be configured on a per-core, per-uncore, and/or per-CLM basis based on a first configuration (Base), a second configuration (Config 1), or a third configuration (Config 2) of the workload-adjustable CPU. Advantageously, the workload-adjustable CPU can configure the core(s) based on a workload to be executed by the core(s), which can be indicated by an instruction to be loaded on the core(s).

Figure 31A:
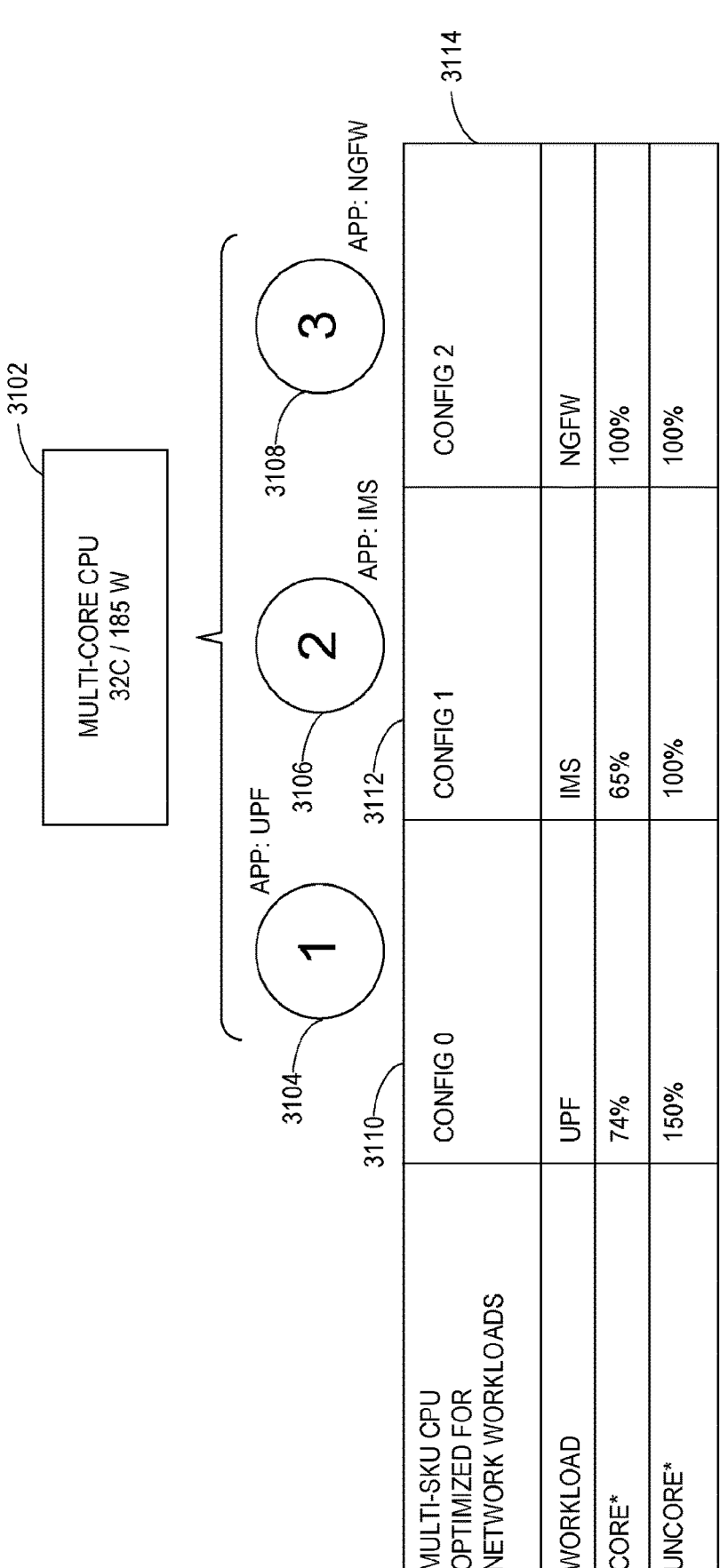

FIG. 31A is an illustration of example power adjustments to core(s) and uncore(s) of an example workload-adjustable CPU 3102 based on example workloads 3104, 3106, 3108. For example, the workload-adjustable CPU 3102 can be a multi-SKU CPU. In such examples, the workload-adjustable CPU 3102 can implement the first multi-core CPU 530 of FIG. 5, the second multi-core CPU 552 of FIG. 5, the multi-core CPU 608 of FIG. 6, etc. In this example, the workloads 3104, 3106, 3108 include a first example workload 3104, a second example workload 3106, and a third example workload 3108. In this example, the first workload 3104 is a user plane function (UPF) application associated with effectuating a 5G network. In this example, the second workload 3106 is an IP Multimedia System Services (IMS) application. In this example, the third workload 3108 is a next generation firewall (NGFW) application.

In the illustrated example of FIG. 31A, in response to executing the first workload 3104, the workload-adjustable CPU 3102 can transition core(s) to a first example configuration (CONFIG 0) 3110. In this example, the first configuration 3110 includes configuring core(s) that execute the first workload 3104 with an application ratio of 0.74 (e.g., 74% of the Power Virus $C_{dyn}$ as computed for a processor core as described above) and configuring uncore(s) that correspond to the core(s) with an application ratio of 1.5 (e.g., 150% of the Power Virus $C_{dyn}$ as computed for uncore hardware as described above). In some examples, application ratios may be greater than 1.0 but penalties may be incurred. Advantageously, in response to the uncore(s) being configured based on the application ratio of 1.5, their operating frequency can be increased to execute the first workload 3104 with increased throughput and/or reduced latency.

In the illustrated example of FIG. 31A, in response to executing the second workload 3106, the workload-adjustable CPU 3102 can transition core(s) to a second example configuration (CONFIG 1) 3112. In this example, the second configuration 3112 includes configuring core(s) that execute the second workload 3106 with an application ratio of 0.65 (e.g., 65% of the Power Virus $C_{dyn}$ as computed for a processor core as described above) and configuring uncore(s) that correspond to the core(s) with an application ratio of 1.0 (e.g., 100% of the Power Virus $C_{dyn}$ as computed for uncore hardware as described above). Advantageously, in response to the uncore(s) being configured based on the application ratio of 1.0, their operating frequency can be increased to execute the second workload 3106 with increased throughput and/or reduced latency.

In the illustrated example of FIG. 31A, in response to executing the third workload 3108, the workload-adjustable CPU 3102 can transition core(s) to a third example configuration (CONFIG 2) 3114. In this example, the third configuration 3114 includes configuring core(s) that execute the first workload 3104 with an application ratio of 1.0 (e.g., 100% of the Power Virus $C_{dyn}$ as computed for a processor core as described above) and configuring uncore(s) that correspond to the core(s) with an application ratio of 1.0 (e.g., 100% of the Power Virus $C_{dyn}$ as computed for uncore hardware described above). Advantageously, in response to the uncore(s) being configured based on the application ratio of 1.0, their operating frequency can be increased to execute the third workload 3114 with increased throughput and/or reduced latency.

Advantageously, the workload-adjustable CPU 3102 can configure one(s) of the 32 cores on a per-core and/or per-uncore basis based on one(s) of the workloads 3104, 3106, 3108 to be executed. Advantageously, one(s) of the configurations 3110, 3112, 3114 can cause allocation of additional power from the core(s) to the uncore(s) to improve and/or otherwise optimize execution of workloads, such as the workloads 3104, 3106, 3108 that are I/O bound and can benefit from the increased activity of the uncore(s).

FIGS. 31B-31G are further illustrations of example power adjustments to core(s) and uncore(s) of the workload-adjustable CPU 3102 of FIG. 31A based on a workload. FIG. 31B depicts additional example configurations 3120, 3122, 3124 including a fourth example configuration (CONFIGU- RATION 1) 3120, a fifth example configuration (CONFIGURATION 2) 3122, and a sixth example configuration (CONFIGURATION 3) 3124. In this example, the fourth configuration 3120 is the optimal and/or otherwise best of the configurations 3120, 3122, 3124 for increasing throughput and latency based on the increased uncore frequency, which is advantageous for I/O-bound workloads, such as network workloads. In this example, the sixth configuration 3124 is the optimal and/or otherwise best of the configurations 3120, 3122, 3124 for performance based on the increased core frequency, which is advantageous for compute-bound workloads. Advantageously, the configurations 3120, 3122, 3124 of FIG. 31B illustrate an example manner of implementing N CPUs in one CPU package.

Figure 31C:
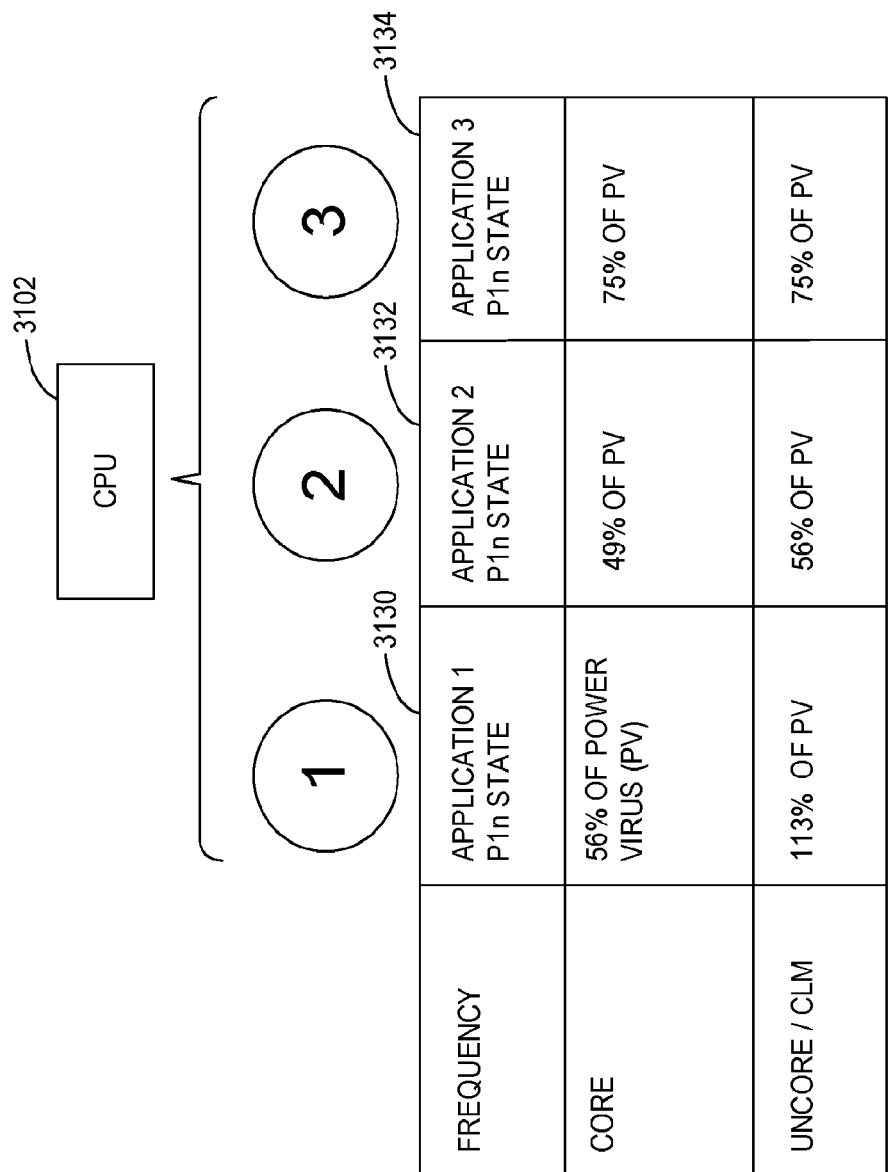

FIG. 31C depicts additional example configurations 3130, 3132, 3134 including a seventh example configuration (APPLICATION 1 P1n STATE) 3130, an eighth example configuration (APPLICATION 2 P1n STATE) 3132, and a ninth example configuration (APPLICATION 3 P1n STATE) 3134 for the workload-adjustable CPU 3102 of FIG. 31A. In this example, the seventh configuration 3130 has an application ratio of 0.56 (e.g., 56% of the power virus level for a core) for core(s) of the workload-adjustable CPU 3102 and an application ratio of 1.13 (e.g., 113% of the power virus level for an uncore) for an uncore or CLM. Advantageously, the seventh configuration 3130 may be beneficial for I/O-bound workloads with the increase in uncore operating frequency, while the ninth configuration 3134 may be beneficial for compute-bound workloads with the increase in core frequency.

FIG. 31D depicts additional example configurations 3140, 3142, 3144 including a tenth example configuration (APPLICATION 1 P1n STATE) 3140, an eleventh example configuration (APPLICATION 2 P1n STATE) 3142, and a twelfth example configuration (APPLICATION 3 P1n STATE) 3144 for the workload-adjustable CPU 3102 of FIG. 31A. In this example, the tenth configuration 3130 has an application ratio that may be advantageous for UPF workloads, the eleventh configuration 3132 has an application ratio that may be advantageous for control plane function (CPF) workloads, and the twelfth configuration 3144 that may be advantageous for database (DB) functions.

FIG. 31E depicts additional example configurations 3150, 3152, 3154 including a thirteenth example configuration (APPLICATION 1 P1n STATE) 3150, a fourteenth example configuration (APPLICATION 2 P1n STATE) 3152, and a fifteenth example configuration (APPLICATION 3 P1n STATE) 3154 for the workload-adjustable CPU 3102 of FIG. 31A. In this example, the thirteenth configuration 3150 and the fifteenth configuration 3154 have respective application ratios that may be advantageous for massive MIMO (mMIMO) workloads and narrowband workloads that may be implemented by a DU. In this example, the fourteenth configuration 3152 has an application ratio that may be advantageous for CU workloads that may be implemented by a CU.

FIG. 31F depicts additional example configurations 3160, 3162, 3164 including a sixteenth example configuration (APPLICATION 1 P1n STATE) 3160, a seventeenth example configuration (APPLICATION 2 P1n STATE) 3162, and an eighteenth example configuration (APPLICATION 3 P1n STATE) 3164 for the workload-adjustable CPU 3102 of FIG. 31A. In this example, the eighteenth configuration 3164 has an application ratio that may be advantageous for media workloads, such as IMS, media encoding, etc.

FIG. 31G depicts additional example configurations 3170, 3172, 3174 including a nineteenth example configuration (APPLICATION 1 P1n STATE) 3170, a twentieth example configuration (APPLICATION 2 P1n STATE) 3172, and a twenty-first example configuration (APPLICATION 3 P1n STATE) 3174 for the workload-adjustable CPU 3102 of FIG. 31A. In this example, the nineteenth configuration 3170 has an application ratio that may be advantageous for proxy server workloads, load balance workloads, etc., such as NGINX workloads. In this example, the twentieth configuration 3172 has an application ratio that may be advantageous for PERF, vNGFW, and network intrusion detection system workloads (e.g., SNORT workloads).

FIG. 31H is an illustration of example power adjustments to core(s) and uncore(s) of the example workload-adjustable CPU 3102 of FIG. 31A based on example application ratios 3182, 3184, 3186. In this example, the application ratios 3182, 3184, 3186 include a first example application ratio 3182, a second example application ratio 3184, and a third example application ratio 3186. In this example, the first application ratio 3182 may be utilized to effectuate network workloads (e.g., NFV workloads). In this example, the second application ratio 3184 may be utilized to effectuate general purpose workloads. In this example, the third application ratio 3186 may be utilized to effectuate cloud workloads.

In the illustrated example of FIG. 31H, the first application ratio 3182 has multiple options, variants, etc. For example, the first application ratio 3182 has a first option (OPTION 1), a second option (OPTION 2), a third option (OPTION 3), and a fourth option (OPTION 4). In this example, each of the options for the first application ratio 3182 have the same application ratio of 0.82 (e.g., 74% of the Power Virus $C_{dyn}$ as computed for a processor core and/or uncore as described above). Advantageously, even though each of the options have the same application ratio of 0.82, cores and/or uncores may be configured differently. For example, the first option may be selected to configure an uncore to have an operating frequency of 1.3 GHz to achieve a potential throughput of 75 Gbps. In some such examples, the second option may be selected to configure an uncore to have an operating frequency of 1.7 GHz to achieve a potential throughput of 225 Gbps. Advantageously, the second option may be selected to achieve a higher throughput and/or reduced latency with respect to the first option while having the same application ratio of 0.82. Additionally or alternatively, one or more of the options may also include different configurations for CLMs. For example, the first option may include a first operating frequency for a CLM, the second option may include a second operating frequency for the CLM, and/or the third option may include a third operation frequency for the CLM. In some such examples, the first operating frequency, the second operating frequency, and/or the third operating frequency of the CLM may be different from one(s) of each other.

In the illustrated example of FIG. 31H, the first option specifies different operating frequencies for a core of the multi-core CPU 3102 based on a number of cores of the multi-core CPU 3102 and/or a TDP of the multi-core CPU 3102. For example, the first option specifies that for a 32-core CPU having a TDP of 185 W, the operating frequency is 2.1 GHz for a core when the core is configured for the first option of the first application ratio 3182. As illustrated in the example of FIG. 31H, as the uncore frequency increases with the different options of the first application ratio 3182 (e.g., an uncore frequency of 1.3 GHz for the first option, an uncore frequency of 1.7 GHz for the second option, etc.), the core frequency decreases with the different options of the first application ratio 3182 (e.g., a core frequency of 2.1 GHz for the first option, a core frequency of 2.0 GHz for the second option, etc.).

Advantageously, the workload-adjustable CPU 3102 can configure one(s) of a plurality of cores of the workload-adjustable CPU 3102 on a per-core and/or per-uncore basis based on one(s) of the application ratios 3182, 3184, 3186 of FIG. 31H. Advantageously, one(s) of the application ratios 3182, 3184, 3186, one(s) of the options within the application ratios 3182, 3184, 3186, etc., can cause allocation of additional power from the core(s) to the uncore(s) (or from the uncore(s) to the core(s)) to improve and/or otherwise optimize execution of workloads, such as the workloads 3104, 3106, 3108 of FIG. 31A that are I/O bound and can benefit from the increased activity of the uncore(s).

Figure 32:
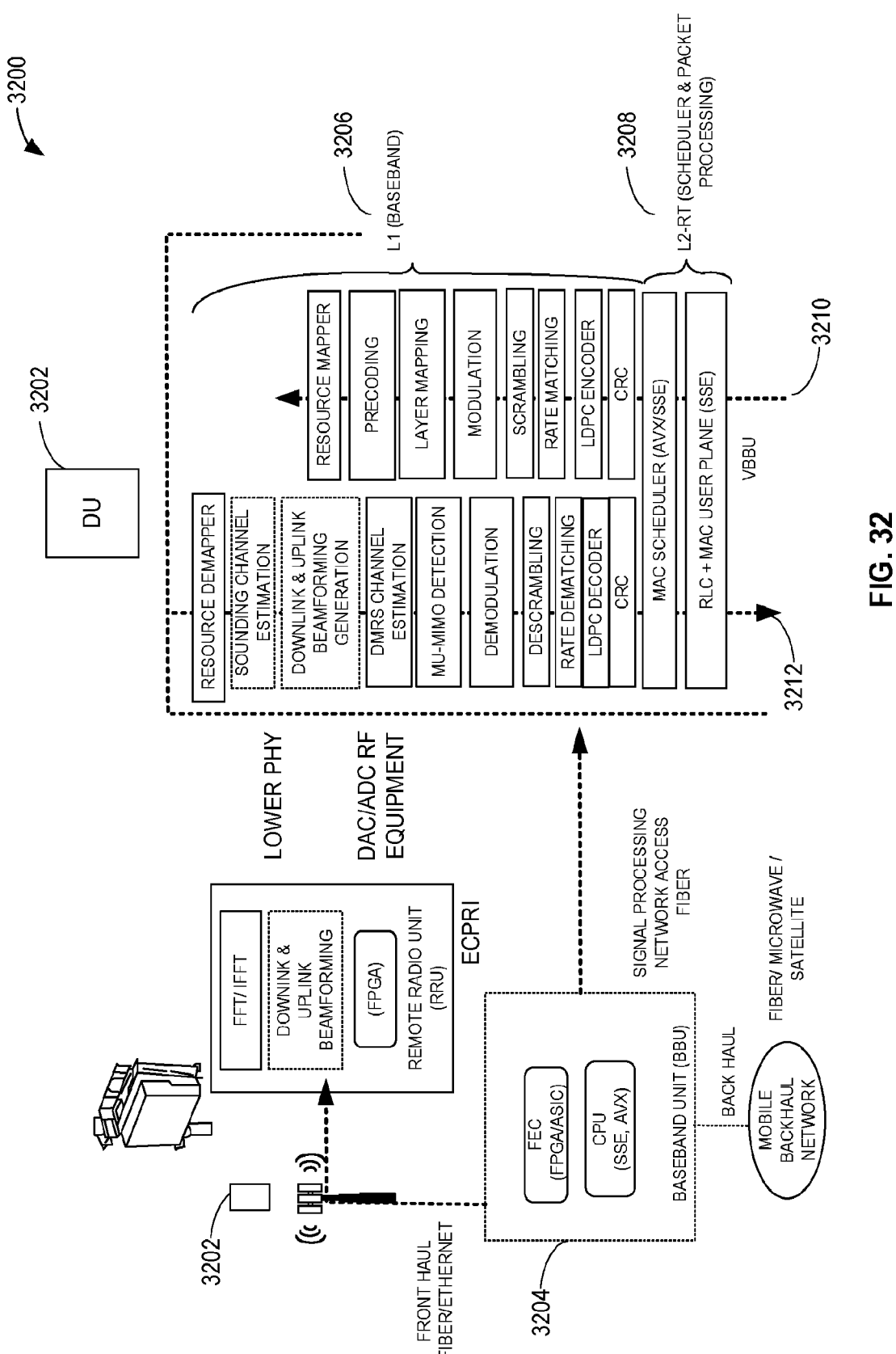
FIG. 32 is an illustration of an example system to execute example network workloads.

FIG. 32 is an illustration of an example system 3200 including an example DU 3202 and an example BBU 3204 to execute example network workloads 3206, 3208. In this example, the DU 3202 may be implemented by the DUs 122 of FIG. 1, the first multi-core computing system 522 of FIG. 5, the second multi-core computing system 524 of FIG. 5, the third multi-core computing system 600 of FIG. 6, and/or the fourth multi-core computing system 700 of FIG. 7, and/or portion(s) thereof. In this example, the DU 3202 may implement an example virtual BBU (vBBU) 3210 to process the network workloads 3206, 3208. In this example, the network workloads 3206, 3208 include example Level 1 (L1) Baseband workloads 3206 and example Level 2 real-time (L2-rt) scheduler and packet processing workloads 3208. Advantageously, the DU 3202 may process the network workloads 3206, 3208 in a processing pipeline 3212 represented by directional arrows. For example, the processing pipeline 3212 may begin with resource demapping and end with resource mapping.

Figure 33:
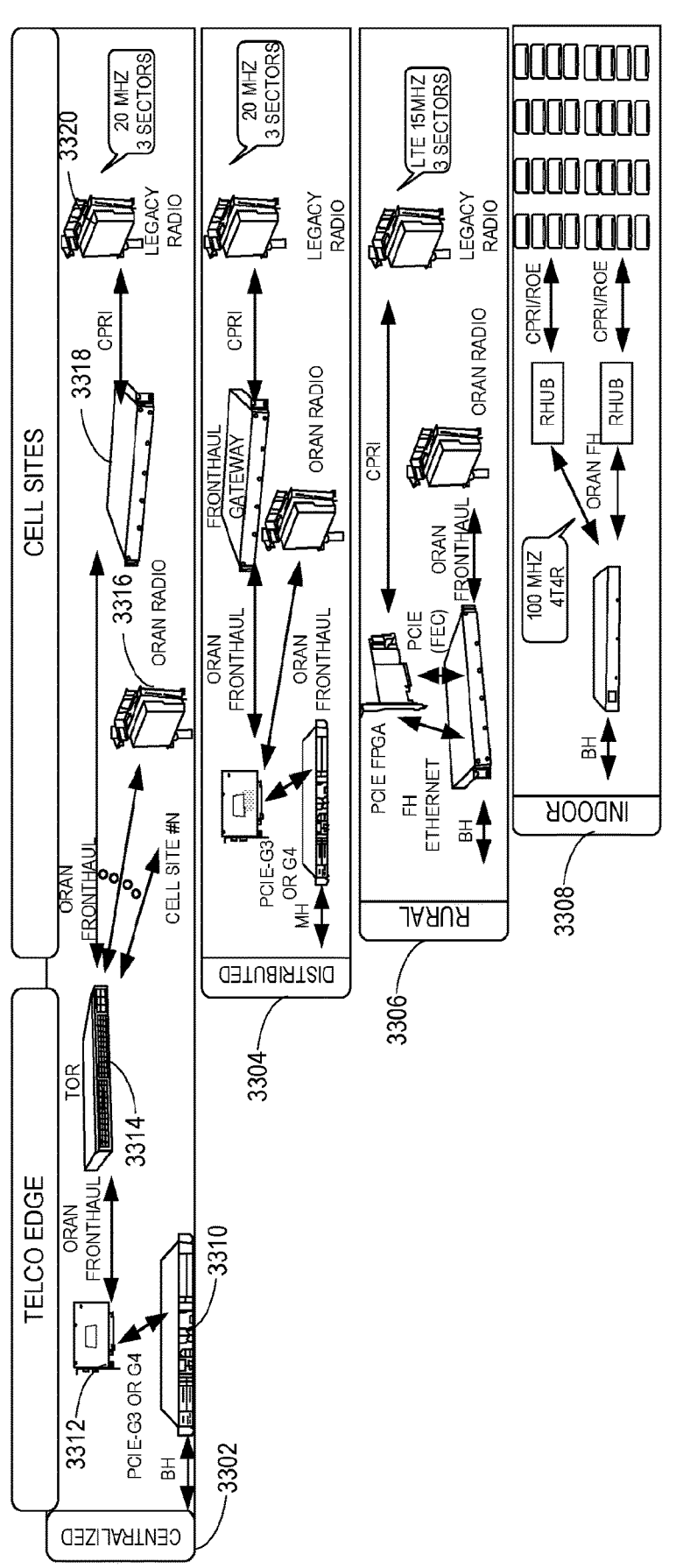
FIG. 33 is an illustration of different implementations of example network architectures using the examples described herein.

FIG. 33 is an illustration of different implementations of example network architectures 3302, 3304, 3306, 3308 using the examples described herein. In this example, the network architectures 3302, 3304, 3306, 3308 include a first example network architecture 3302 that may implement a 5G centralized deployment, a second example network architecture 3304 that may implement a 5G distributed deployment, a third example network architecture 3306 that may implement a 5G rural deployment, and a fourth example network architecture 3308 that may implement a 5G indoor deployment. For example, the first network architecture 3302 includes an example single socket server (e.g., a single socket CU or DU) 3310, an example FPGA 3312, an example top-of-the-rack (TOR) switch 3314, an example open RAN (ORAN) radio 3316, an example front haul gateway 3318, and an example legacy radio 3320. Advantageously, the single socket server 3310 may implement the DUs 122 of FIG. 1, the first multi-core computing system 522 of FIG. 5, the second multi-core computing system 524 of FIG. 5, the third multi-core computing system 600 of FIG. 6, and/or the fourth multi-core computing system 700 of FIG. 7 to effectuate a 5G network architecture.

Figure 34:
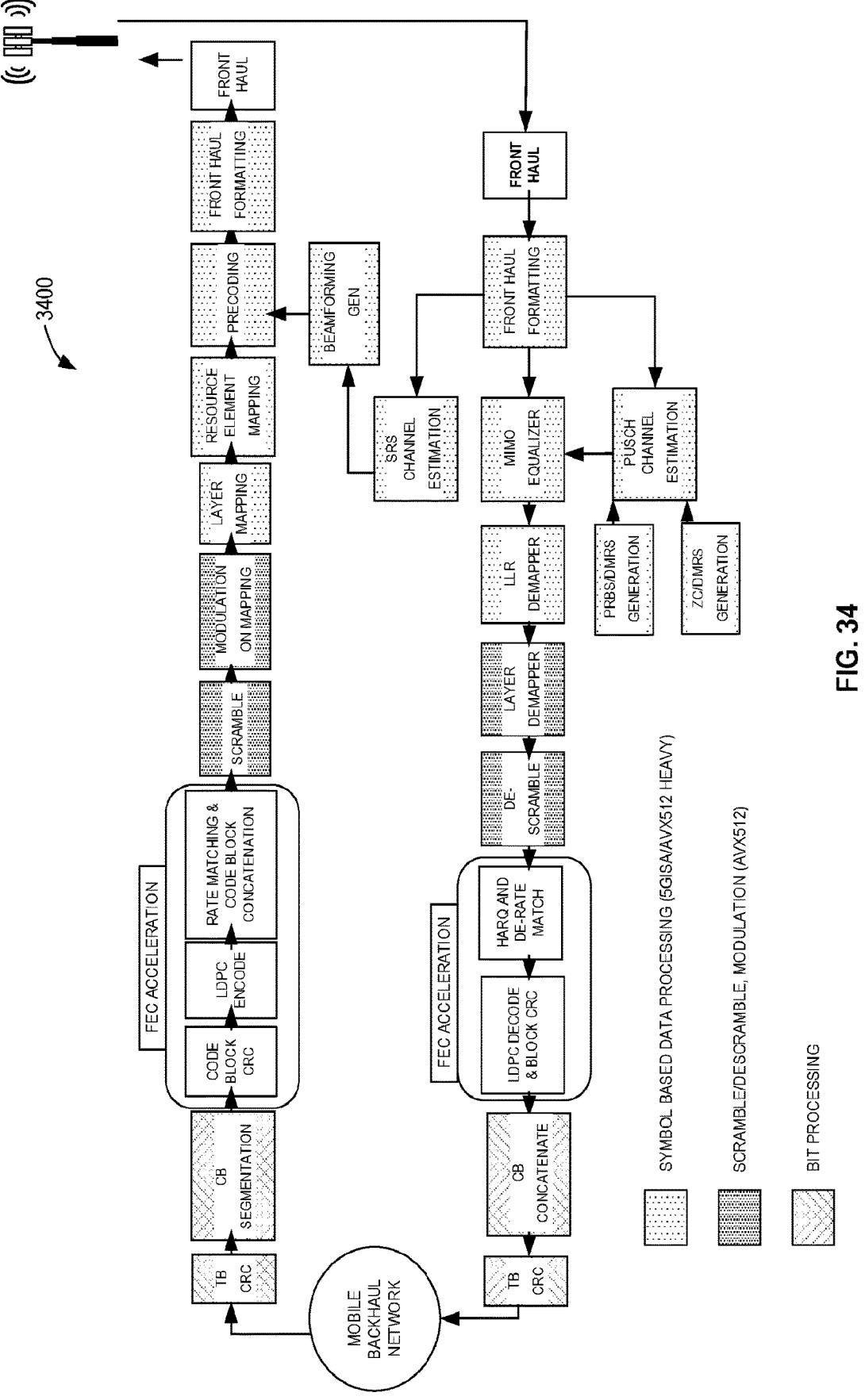
FIG. 34 is an illustration of an example network workload pipeline.

FIG. 34 is an illustration of an example network workload pipeline 3400. The network workload pipeline 3400 depicts example kernels in a 5GNR pipeline that is MMSE based with data channels only. For example, the network workload pipeline 3400 of FIG. 34 may implement level 1 (L1) functions in a 5G telecommunications network. Advantageously, one or more example multi-core CPUs as described herein can execute 5G-ISA instructions to obtain a performance increase when addressing symbol based data processing. For example, the one or more multi-core CPUs can execute the third instructions 508 of FIG. 5 to execute layer mapping, resource element mapping, precoding, front haul formatting, etc., network workloads with increased performance compared to conventional multi-core CPUs.

Figure 35:
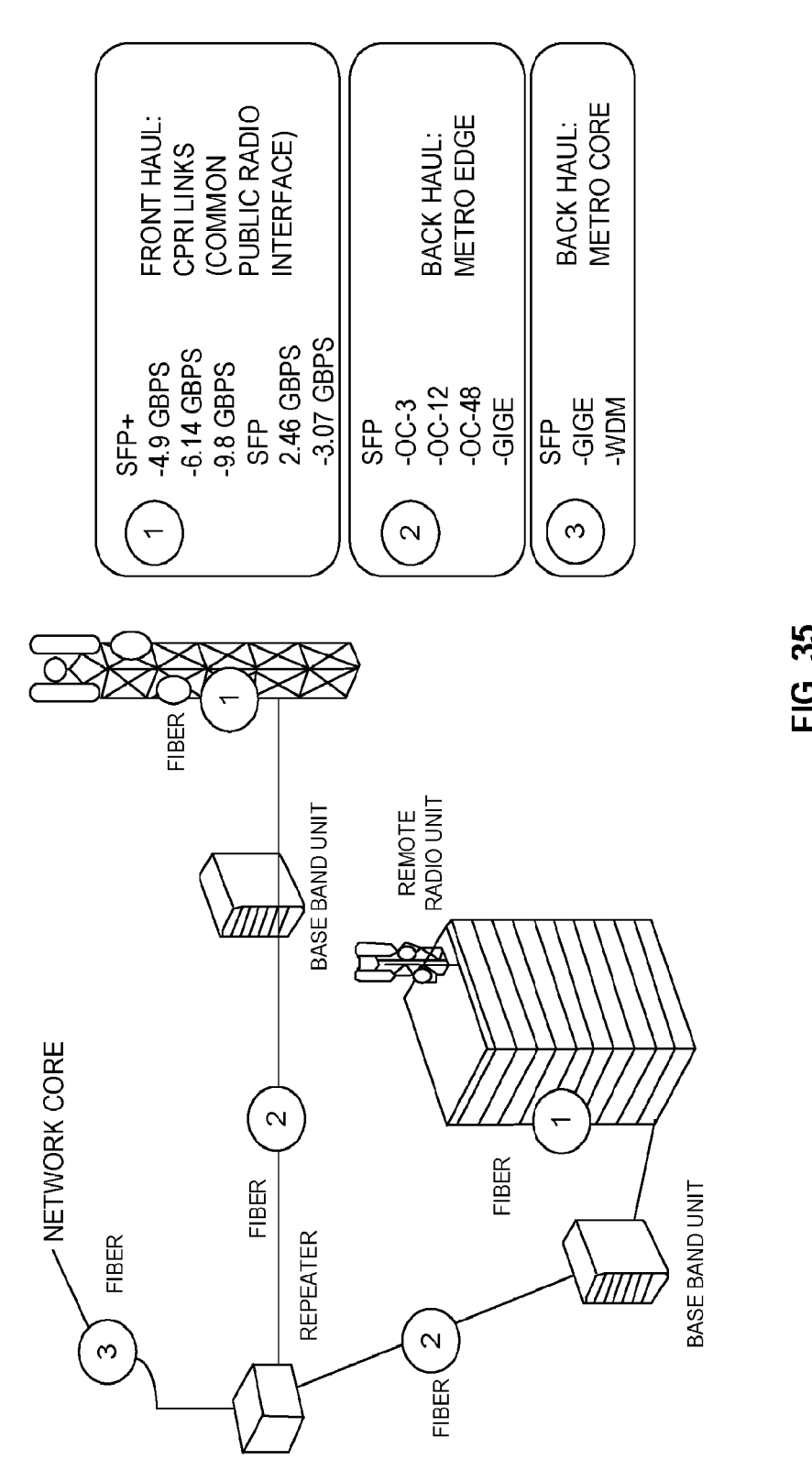
FIG. 35 is an illustration of an example network architecture that may benefit using the examples described herein.

FIG. 35 is an illustration of an example network architecture 3500 that may benefit using the examples described herein. For example, hardware that may be deployed to implement the front haul, the back haul, or portion(s) thereof may include one or more example multi-core CPUs as described herein, such as the first multi-core CPU 530 of FIG. 5, the second multi-core CPU 552 of FIG. 5, the multi-core CPU 608 of FIG. 6, etc. Advantageously, the one or more example multi-core CPUs may improve 5G Level 1 (L1) processing. For example, 70% or more of L1 functions may benefit by invoking the one or more example multi-core CPUs to process network workloads using different sets of instructions, such as SSE instructions, AVX-512 instructions, 5G-ISA instructions, etc.

Figure 36:
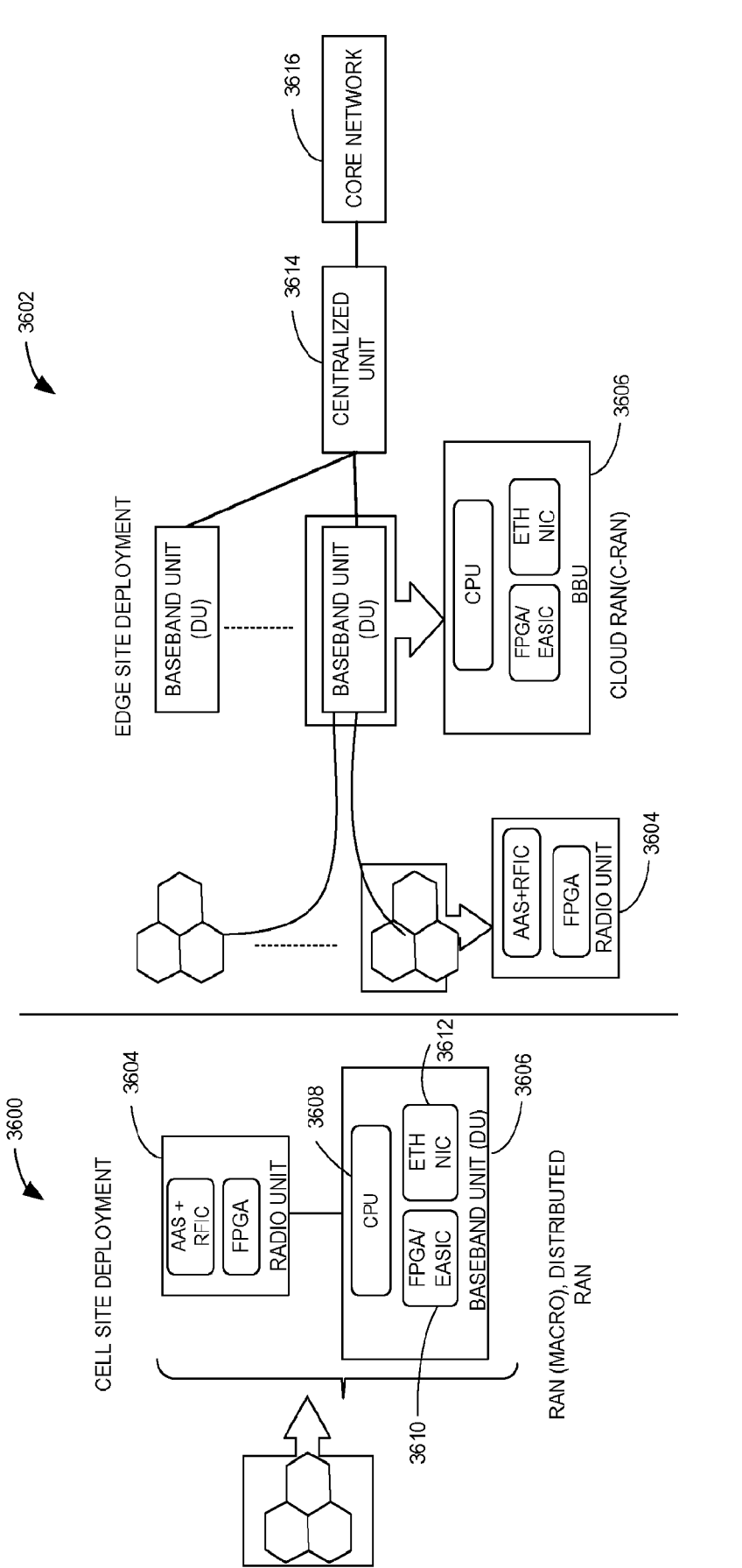
FIG. 36 is an illustration of example flexible radio access network (FlexRAN) deployment architectures.

FIG. 36 is an illustration of example flexible radio access network (FlexRAN) deployment architecture 3600, 3602. In this example, the FlexRAN deployment architectures 3600, 3602 include a first example FlexRAN deployment architecture 3600 representative of a cell or cellular site deployment and a second example FlexRAN deployment architecture 3602 representative of an edge site deployment. For example, the first FlexRAN deployment architecture 3600 may be deployed when fiber-optic communication is not available to an edge location or server. The second FlexRAN deployment architecture 3602 may be deployed when fiber-optic communication is available to an edge location or server.

In the illustrated example of FIG. 36, the first FlexRAN deployment architecture 3600 is implemented by an example Radio Unit (e.g., an RRU) 3604 and an example baseband unit 3606. In this example, the baseband unit 3606 implements a DU, such as the DUs 122 of FIG. 1, the first multi-core computing system 522, the third multi-core computing system 600 of FIG. 6, the fourth multi-core computing system 700 of FIG. 7, and/or portion(s) thereof. In this example, the baseband unit 3606 includes an example multi-core CPU 3608, an example FPGA and/or eASIC 3610, and an example Ethernet-based network interface card (NIC) 3612. In this example, the baseband unit 3606 implements a distributed RAN. Advantageously, core(s), uncore(s), CLM(s) of the multi-core CPU 3608 may be configured based on a loaded instruction or an instruction identified to be executed to effectuate network-related computing workloads.

In the illustrated example of FIG. 36, the second FlexRAN deployment architecture 3602 includes the radio unit 3604, the baseband unit 3606, an example centralized unit 3614, and an example core network 3616. For example, the centralized unit 3614 may implement the CUs 124 of FIG. 1. For example, the core network 3616 may implement one or more of the core devices 126 of FIG. 1 and/or the second multi-core computing system 524 of FIG. 5 (or portion(s) thereof). In this example, the baseband unit 3606 implements a cloud RAN (C-RAN). Advantageously, core(s), uncore(s), CLM(s) of the multi-core CPU 3608 may be configured based on a loaded instruction or an instruction identified to be executed to effectuate network-related computing workloads.

Figure 37:
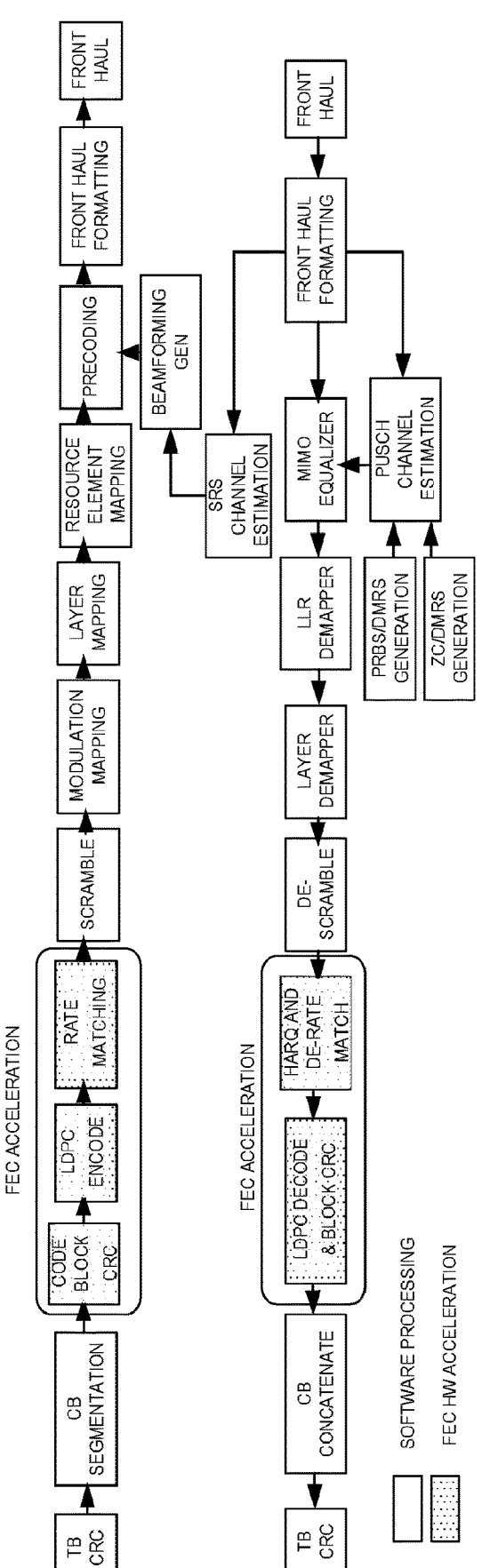
FIG. 37 is an illustration of another example network workload pipeline.

FIG. 37 is an illustration of an example network workload pipeline 3700 that may be executed by one or more example multi-core CPUs as described herein, such as the first multi-core CPU 530 of FIG. 5, the second multi-core CPU 552 of FIG. 5, the multi-core CPU 608 of FIG. 6, etc. For example, the network workload pipeline 3700 may implement a 5G new radio (NR) L1 pipeline. In some such examples, the network workload pipeline 3700 implements a front haul portion of a 5G network. In some such examples, 5G NR may correspond to the global standard developed by the 3rd Generation Partnership Project (3GPP) for the 5G mobile network. In the example of FIG. 37, first portions of the network workload pipeline 3700 may be processed using software, such as embedded software (e.g., firmware) and/or application software (e.g., software executing on an OS). In the example of FIG. 37, second portions of the network workload pipeline 3700 may be processed using forward-error correction (FEC) hardware (HW) acceleration. For example, the second portions may be implemented by hardware accelerators that implement FEC, which is a technique for recovering data from a signal containing one or more errors. In some such examples, FEC may be implemented using convolutional, turbo, low-density parity-check (LDPC), and polar codes.

Advantageously, the one or more example multi-core CPUs as described herein can effectuate the network workload pipeline 3700 by executing front haul formatting, PUSCH channel estimation, MIMO equalizer, SRS channel estimation, etc., workloads to facilitate processing of telecommunication data. Advantageously, core(s), uncore(s), and/or CLM(s) of the one or more example multi-core CPUs as described herein may be configured based on a loaded instruction to effectuate network-related computing workloads, such as the workloads included in the network workload pipeline 3700 of the illustrated example. Advantageously, core(s), uncore(s), and/or CLM(s) of the one or more example multi-core CPUs as described herein may be configured based on a network node location, latency requirements, throughput requirements, and/or power requirements associated with network-related computing workloads to be executed by such multi-core CPUs to effectuate the workloads included in the network workload pipeline 3700 of the illustrated example.

Figure 38:
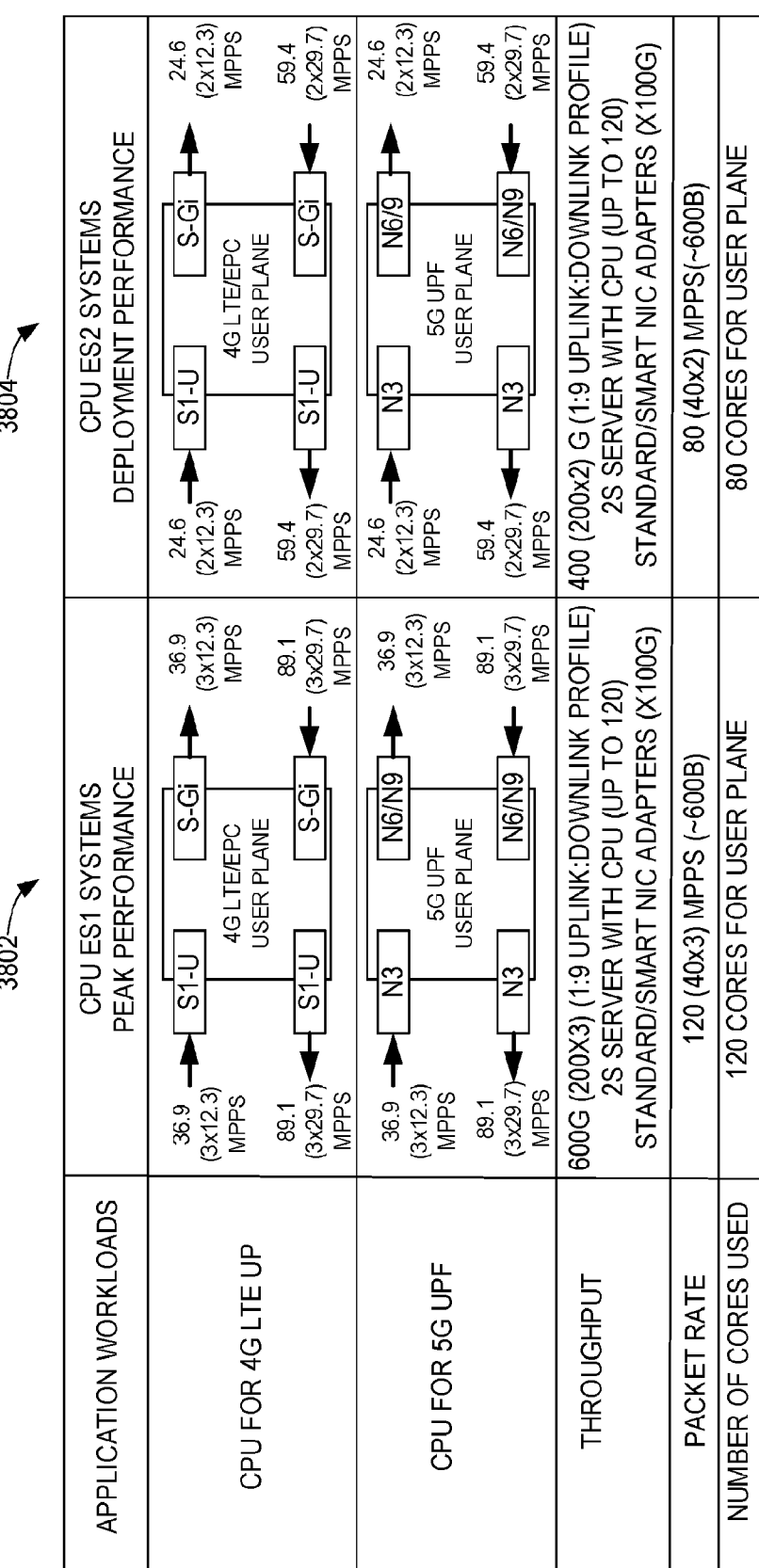
FIG. 38 is an illustration of adjusting performance of an example workload-adjustable CPU associated with an example core server.

FIG. 38 is an illustration of example performance of an example multi-core CPU associated with an example single socket server 3802 and an example dual socket server 3804. For example, the single socket server 3802 may include one or more multi-core CPUs as described herein, such as the first multi-core CPU 530 of FIG. 5, the second multi-core CPU 552 of FIG. 5, the multi-core CPU 608 of FIG. 6, etc. In this example, the single socket server 3802 may implement a fourth generation (i.e., 4G) LTE evolved packet core (EPC) user plane and/or a 5G UPF user plane.

In the illustrated example of FIG. 38, the dual socket server 3804 may include one or more multi-core CPUs as described herein, such as the first multi-core CPU 530 of FIG. 2, the second multi-core CPU 552 of FIG. 5, the multi-core CPU 608 of FIG. 6, etc. In this example, the dual socket server 3804 may implement a 4G LTE EPC user plane and/or a 5G UPF user plane.

Figure 39:
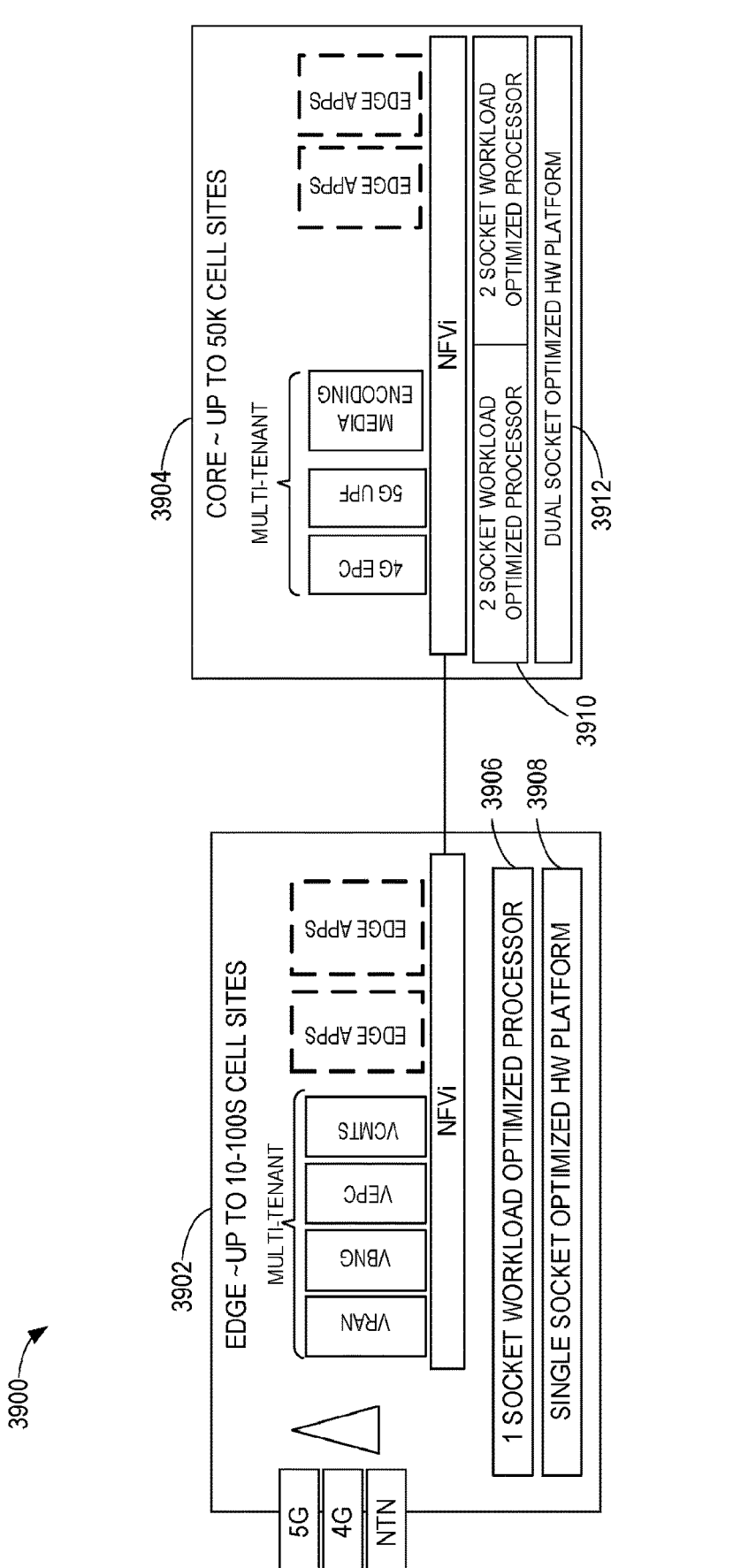
FIG. 39 is an illustration of an example single socket system and an example dual socket system implementing example network workload optimized settings.

FIG. 39 is an illustration of an example system 3900 including an example single socket computing system 3902 and an example dual socket computing system 3904 implementing network workload optimized settings, according to an example. In this example, the single socket system 3902 implements an edge server, such as the edge server 3902 of FIG. 39, adapted to support an NFV platform and the use of multi-tenant network services (such as vRAN, vBNG, vEPC, vCMTS) and accompanying applications (e.g., edge applications hosted by a service provider or accessed by a service consumer). An example edge server deployment may be adapted for the management and servicing of 4G and 5G services with such NFV platform, such as for the support of edge NFV instances among dozens or hundreds of cell sites. The processing performed for this NFV platform is provided by a one-socket workload optimized processor 3906, which operates on a single-socket optimized hardware platform 3908. For purposes of simplicity, a number of hardware elements (including network interface cards, accelerators, memory, storage) are omitted from illustration in the hardware platform.

In this example, the dual socket computing system 3904 implements a core server that is adapted to support an NFV platform and the use of additional multi-tenant management services, such as 4G EPC and 5G UPF services and accompanying applications (e.g., cloud applications hosted by a service provider or accessed by a service consumer). An example core server deployment may be adapted for the management and servicing of 4G and 5G services with such NFV platform, such as for the support of core NFV instances among thousands or tens of thousands of cell sites. The processing performed for this NFV platform is provided by example two-socket workload optimized processors 3910, which operates on an example dual-socket optimized hardware platform 3912. For purposes of simplicity, a number of hardware elements (including network interface cards, accelerators, memory, storage) are also omitted from illustration in this hardware platform.

In some instances, varying latencies resulting from processor frequency scaling (e.g., caused by CPU "throttling" with dynamic frequency scaling to reduce power) produce inconsistent performance results among different type of applications workloads and usages. Thus, depending on the type of workload, whether in the form of scientific simulations, financial analytics, artificial intelligence (AI)/deep learning, 3D modeling and analysis, image and audio/video processing, cryptography, data compression, or even 5G infrastructure workloads such as FlexRAN, significant variation in processor utilization—and thus power utilization and efficiency—will occur. The examples and techniques discussed herein take advantage of the reduced power requirements needed by network workloads in some CPU components, to reduce the application ratio and increase the deterministic frequency of the processor.

Specific examples of workloads considered for optimization may include workloads from: 5G UPF, vCCAP, vBNG, vCG-NAPG, FlexRAN, vIMS, vNGFW, VPP IPSec, NGINX, VPP FWD, vEPC, OVS, ZFS, Hadoop, VMWare® vSAN, Media encoding, and the like.

From different combinations and evaluations of these workloads, workload optimized "EDGE," "NETWORK-ING," or "CLOUD" processor SKU configurations (or other hybrid combinations) are all possible. For example, the implementations may be used with evolving wired edge cloud workloads (CDN, IPSEC, BNG) as edge cloudification is evolving now into vBNG, vVPN, vCDN use cases. Also, for example, the implementations may be used with wireless edge cloud workloads, such as in settings where the network edge is evolving from a traditional communications service provider RAN architecture to a centralized BBU to virtual cloudification (e.g., vBBU, vEPC) architecture and associated workloads.

Figure 40:
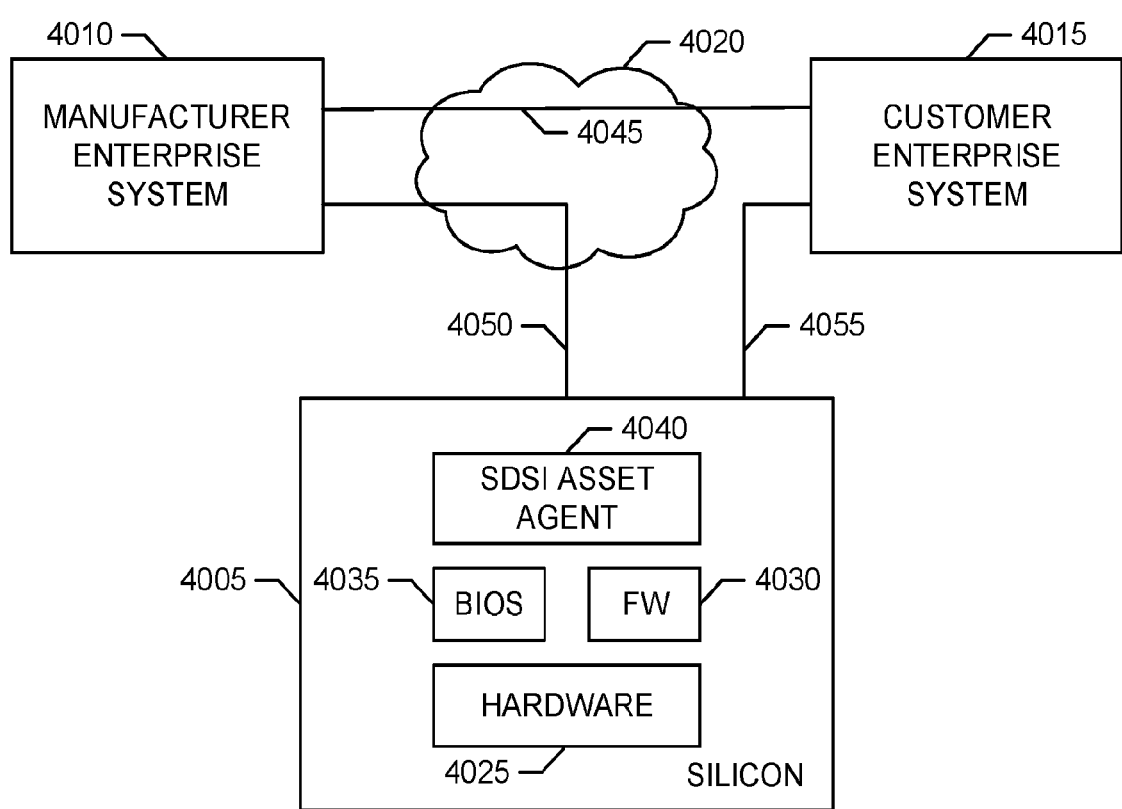
FIG. 40 is a block diagram of an example system to implement and manage software defined silicon products in accordance with teachings of this disclosure.
Figure 41:
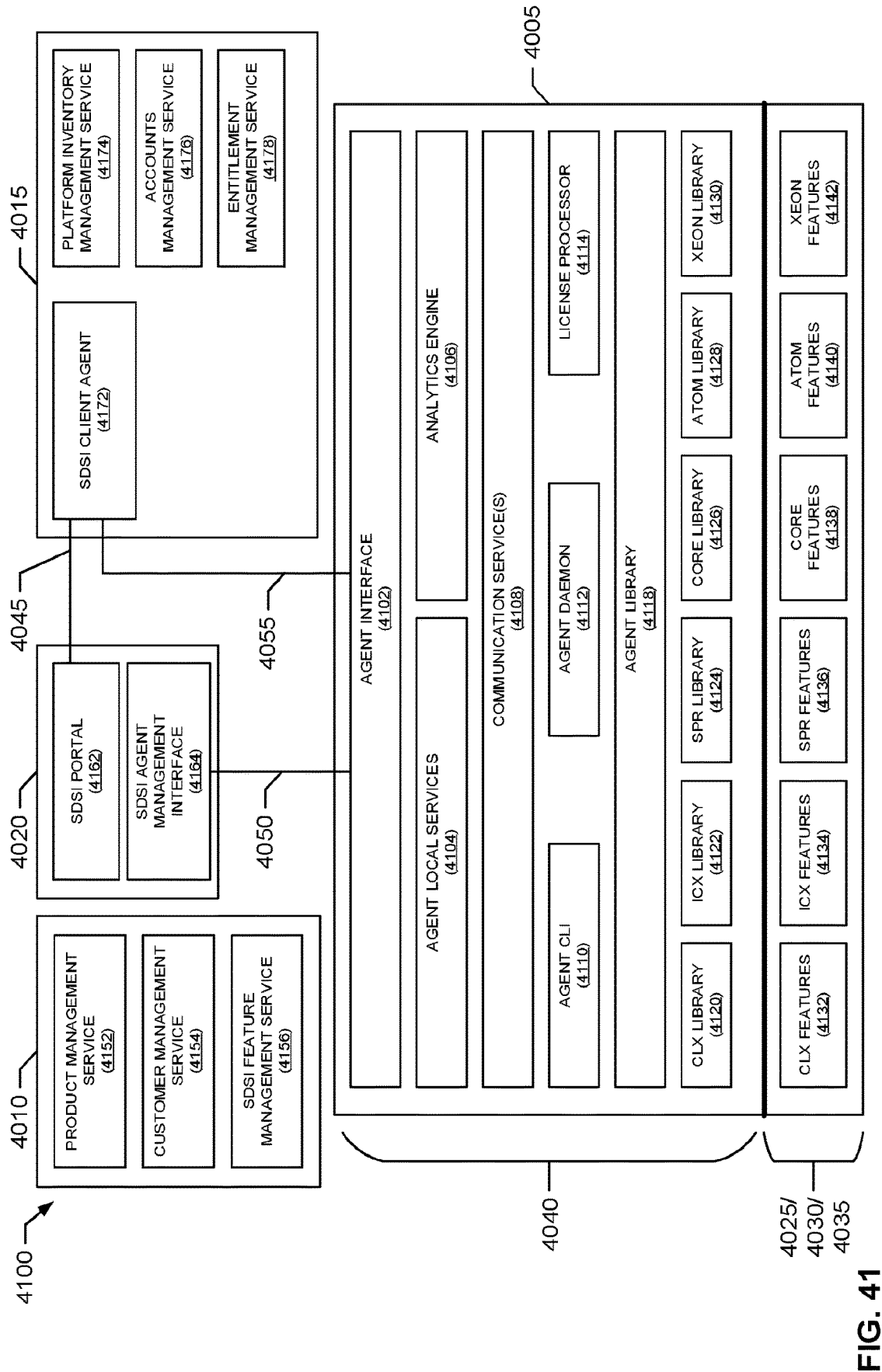
FIG. 41 is a block diagram illustrating example implementations of an example software defined silicon agent, an example manufacturer enterprise system and an example customer enterprise system included in the example system of FIG. 40.
Figure 42:
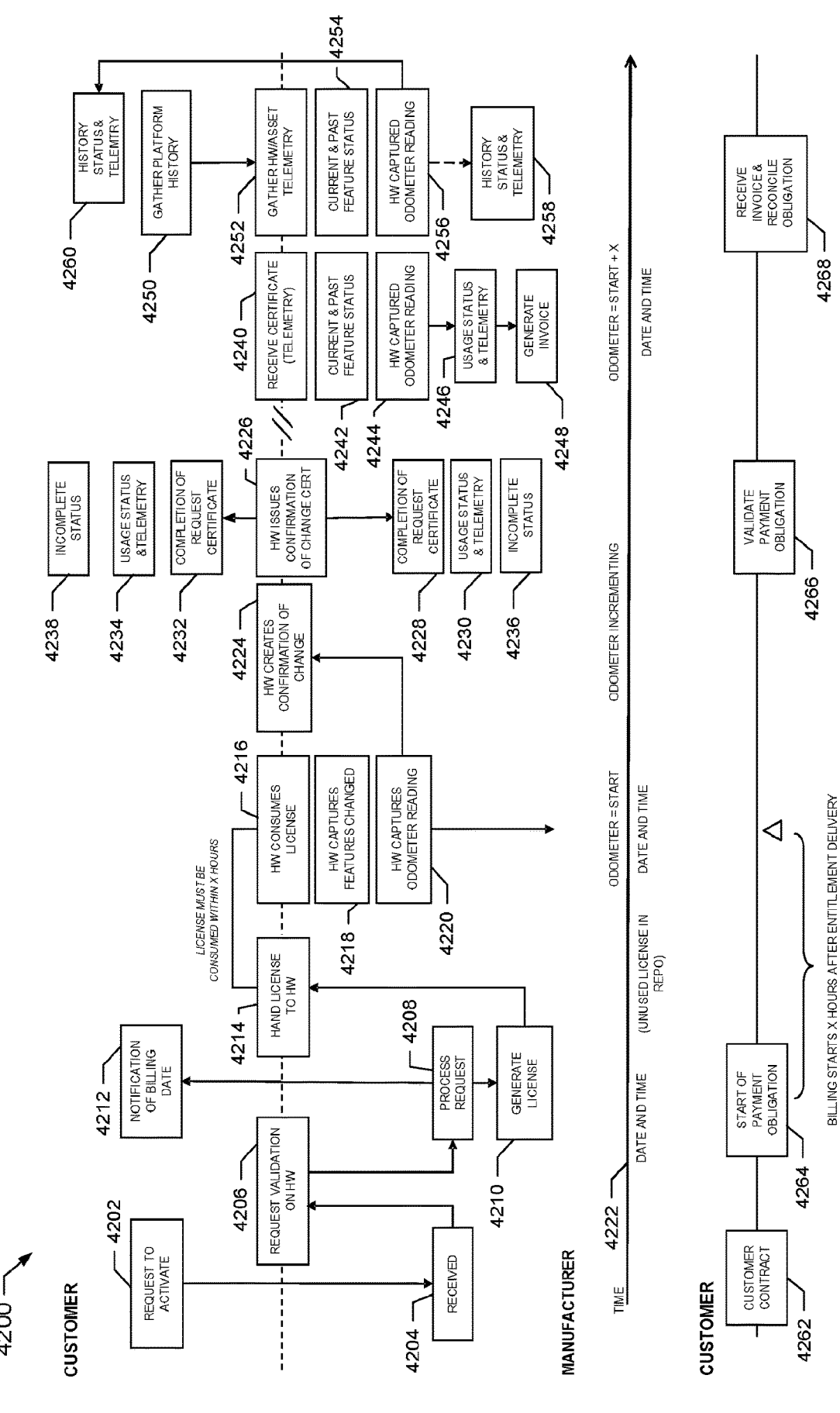
FIG. 42 illustrates an example software defined silicon management lifecycle implemented by the example systems of FIGS. 40 and/or 41.

FIGS. 40-42 illustrate example implementations of managing SDSi products in accordance with teachings of this disclosure. Device enhancements for software defined silicon implementations are also disclosed herein. As used herein, "the absolute time" refers to a particular clock and date reading (e.g., 11:11 PM EST, Jan. 1, 2020, etc.). As used herein, "the relative time" refers to an elapsed time between a fixed event (e.g., a time of manufacture of a device, etc.) and the current time. As used, herein a "time reference" refers to a singular absolute time reading and/or a singular relative time reading and may be used to generate a time-stamp and/or an odometer reading.

As used herein, a "feature configuration" of a silicon product refers to the hardware, firmware, and/or physical features enabled on the silicon products. Feature configurations can, for example, include the number of cores of a processor that have been activated and/or the speed at which each core runs. As disclosed in further detail below, a license can be used to change the feature configuration of a silicon product.

As least some prior silicon products, such as central processing units (CPUs) and other semiconductor devices, are not able to provide/determine relative or absolute time references. For example, some existing CPUs lack internal clocks. Also, in at least some silicon products that include clocks, the clocks can be set and/or adjusted by a user of the machine, and, thusly, may not be reliable for determining absolute and/or relative time references. Further, some internal clocks (e.g., monotonic clocks, etc.) require power and, accordingly, cannot measure time if the silicon product and/or machine including the silicon product is powered off. Example SDSi systems disclosed herein utilize absolute and/or relative time references to enable or prohibit certain actions to ensure business and financial viability of feature activation decisions associated with the silicon product. In some examples, some silicon product features can be available only before or after a particular date and/or time from the time of manufacture of the processor.

Examples disclosed herein overcome the above-noted problems by adding one or more features to the silicon product, such that the feature has electrical properties that are time-dependent. In some examples disclosed herein, the electrical properties of the feature change in a known or predetermined manner as a function of time. In some examples disclosed herein, the electrical properties of the feature change when the silicon product is not powered on. In some examples disclosed herein, by determining the electrical properties of the feature at two separate points of time, the relative time between those points can be determined. In some examples disclosed herein, the electrical properties of the time-dependent features are measured at the time of manufacture and are stored with the date and time of manufacture. In such examples, the absolute time can be determined by adding the determined relative time between the current time and the time of manufacture to the date and time of manufacture. In some examples disclosed herein, the feature is implemented by a radioisotope. In some examples disclosed herein, the feature is implemented by a physical unclonable function (PUF) with time-varying electrical properties. As such, the examples disclosed herein provide a reliable and unfalsifiable measures of absolute and relative time references that do not require constant power to the silicon product and/or machine in which the silicon product is used.

Examples disclosed herein enable users, customers, and/or machine-manufacturers flexibility of changing the configuration of a processor after the silicon product has been manufactured. In some examples, the changing of the configuration of a silicon product can affect the operating conditions (e.g., thermal design power (TDP), etc.) of the silicon product, and, thusly, affect the lifespan and/or condition of the processor. As such, in some examples, changing the configuration of the silicon product can cause the silicon product to have a combination of features that damage the silicon product and/or reduce the lifespan of a silicon product to an unacceptable level. In some examples, the features activated in a given configuration can affect the operating conditions of a silicon product in an interdependent manner. For example, the number of active cores in a semiconductor device such as a CPU impacts the maximum frequency those cores can operate at, as well as the thermal design power of the semiconductor device. As such, to prevent unacceptable device degradation and damage, examples disclosed herein account for the effect of each feature on the operating conditions of the device.

A block diagram of an example system 4000 to implement and manage SDSi products in accordance with teachings of this disclosure is illustrated in FIG. 40. The example SDSi system 4000 of FIG. 40 includes an example silicon product 4005, such as an example semiconductor device 4005 or any other silicon asset 4005, that implement SDSi features as disclosed herein. Thus, the silicon product 4005 of the illustrated example is referred to herein as an SDSi product 4005, such as an SDSi semiconductor device 4005 or SDSi silicon asset 4005. In some examples, the silicon product 4005 may implement the first multi-core CPU 530 of FIG. 5, the second multi-core CPU 552 of FIG. 5, the multi-core CPU 608 of FIG. 6, the processor 800 of FIG. 8, etc. The system 4000 also includes an example manufacturer enterprise system 4010 and an example customer enterprise system 4015 to manage the SDSi product 4005. In the illustrated example of FIG. 40, at least some aspects of the manufacturer enterprise system 4010 are implemented as cloud services in an example cloud platform 4020.

The example manufacturer enterprise system 4010 can be implemented by any number(s) and/or type(s) of computing devices, servers, data centers, etc. In some examples, the manufacturer enterprise system 4010 is implemented by a processor platform, such as the example multi-processor system(s) 6800 of FIG. 68, the example processor platform(s) 6900 of FIG. 69, and/or the example system(s) 7000 of FIG. 70. Likewise, the example customer enterprise system 4015 can be implemented by any number(s) and/or type(s) of computing devices, servers, data centers, etc. In some examples, the customer enterprise system 4015 is implemented by a processor platform, such as the example multi-processor system(s) 6800 of FIG. 68, the example processor platform(s) 6900 of FIG. 69, and/or the example system(s) 7000 of FIG. 70. The example cloud platform 4020 can be implemented by any number(s) and/or type(s), such as Amazon Web Services (AWS®), Microsoft's Azure® Cloud, etc. In some examples, the cloud platform 4020 is implemented by one or more edge clouds as described above in connection with FIGS. 2-4. Aspects of the manufacturer enterprise system 4010, the customer enterprise system 4015 and the cloud platform 4020 are described in further detail below.

In the illustrated example of FIG. 40, the SDSi product 4005 is an SDSi semiconductor device 4005 that includes example hardware circuitry 4025 that is configurable under the disclosed SDSi framework to provide one or more features. For example, such features can include a configurable number of processor cores, a configurable clock rate from a set of possible clock rates, a configurable cache topology from a set of possible cache topologies, configurable coprocessors, configurable memory tiering, etc. In some examples, such features may be based on a plurality of application ratios as described herein. As such, the hardware circuitry 4025 can include one or more analog or digital circuit(s), logic circuits, programmable processor(s), programmable controller(s), GPU(s), DSP(s), ASIC(s), PLD(s), FPGAs, FPLD(s), etc., or any combination thereof. The SDSi semiconductor device 4005 of FIG. 40 also includes example firmware 4030 and an example basic input/output system (BIOS) 4035 to, among other things, provide access to the hardware circuitry 4025. In some examples, the firmware 4030 and/or the BIOS 4035 additionally or alternatively implement features that are configurable under the disclosed SDSi framework. The SDSi semiconductor device 4005 of FIG. 40 further includes an example SDSi asset agent 4040 to configure (e.g., activate, deactivate, etc.) the SDSi features provided by the hardware circuitry 4025 (and/or the firmware 4030 and/or the BIOS 4035), confirm such configuration and operation of the SDSi features, report telemetry data associated with operation of the SDSi semiconductor device 4005, etc. In some examples, the SDSi asset agent 4040 implements asset agentry circuitry or logic circuitry. Aspects of the SDSi asset agent 4040 are described in further detail below.

In some examples, the SDSi asset agent 4040 implements example means for activating a plurality of features including a first feature and a second feature based on a first license, the first feature associated with a first operating frequency of one or more cores of a processor, the second feature associated with a second operating frequency of the uncore logic. In some examples, the means for activating to initialize the one or more cores to operate at the first operating frequency, initialize the uncore logic to operate at the second operating frequency, and in response to obtaining a second license, activate at least one of (i) one of the one or more cores to operate at a third operating frequency or (ii) a portion of the uncore logic to operate at a fourth operating frequency. For example, the means for activating may be implemented by executable instructions such as that implemented by at least blocks 4202-4268 of FIG. 42. In some examples, the executable instructions of blocks 4202-4268 may be executed on at least one processor such as the example processor 6815, 6838, 6870, 6880 of FIG. 68 and/or the example processor 6912 of FIG. 69, the example GPU 6940 of FIG. 69, the example vision processing unit 6942 of FIG. 69, and/or the example neural network processor 6944 of FIG. 69. In other examples, the means for activating is implemented by hardware logic, hardware implemented state machines, logic circuitry, and/or any other combination of hardware, software, and/or firmware. For example, the means for activating may be implemented by at least one hardware circuit (e.g., discrete and/or integrated analog and/or digital circuitry, a general purpose programmable processor, an FPGA, a PLD, a FPLD, an ASIC, a comparator, an operational-amplifier (op-amp), a logic circuit, etc.) structured to perform the corresponding operation without executing software or firmware, but other structures are likewise appropriate.

The system 4000 allows a customer, such as an original equipment manufacturer (OEM) of computers, tablets, mobile phones, other electronic devices, etc., to purchase the SDSi semiconductor device 4005 from a silicon manufacturer and later configure (e.g., activate, deactivate, etc.) one or more SDSi features of the SDSi semiconductor device 4005 after it has left the silicon manufacturer's factory. In some examples, the system 4000 allows the customer (OEM) to configure (e.g., activate, deactivate, etc.) the SDSi feature(s) of the SDSi semiconductor device 4005 at the customer's facility (e.g., during manufacture of a product including the SDSi semiconductor device 4005) or even downstream after customer's product containing the SDSi semiconductor device 4005 has been purchased by a third party (e.g., a reseller, a consumer, etc.)

By way of example, consider an example implementation in which the semiconductor device 4005 includes up to eight (8) processor cores. Previously, the number of cores activated on the semiconductor device 4005 would be fixed, or locked, at the manufacturer's factory. Thus, if a customer wanted the semiconductor device 4005 to have two (2) active cores, the customer would contract with the manufacturer to purchase the semiconductor device 4005 with 2 active cores, and the manufacturer would ship the semiconductor device 4005 with 2 cores activated, and identify the shipped device with a SKU indicating that 2 cores were active. However, the number of active cores (e.g., 2 in this example) could not be changed after the semiconductor device 4005 left the manufacturer's factory. Thus, if the customer later determined that 4 (or 8) active cores were needed for its products, the customer would have to contract with the manufacturer to purchase new versions of the semiconductor device 4005 with 4 (or 8) active cores, and the manufacturer would ship the new versions of the semiconductor device 4005 with 4 (or 8) cores activated, and identify the shipped device with a different SKU indicating that 4 (or 8) cores were active. In such examples, the customer and/or the manufacturer may be left with excess inventory of the semiconductor device 4005 with the 2-core configuration, which can incur economic losses, resource losses, etc.

In contrast, assume the number of processor cores activated on the semiconductor device 4005 is an SDSi feature that can be configured in the example system 4000 in accordance with teachings of this disclosure. In such an example, the customer could contract with the manufacturer to purchase the SDSi semiconductor device 4005 with 2 active cores, and the manufacturer would ship the SDSi semiconductor device 4005 with 2 cores activated, and identify the shipped device with a SKU indicating that 2 cores were active. After the device is shipped, if the customer determines that it would prefer that 4 cores were active, the customer management system 4005 can contact the manufacturer enterprise system 4010 via a cloud service implemented by the cloud platform 4020 (represented by the line labeled 4045 in FIG. 40) to request activation of 2 additional cores. Assuming the request is valid, the manufacturer enterprise system 4010 generates a license (also referred to as a license key) to activate the 2 additional cores, and sends the license to the customer management system 4015 via the cloud service implemented by the cloud platform 4020 (represented by the line labeled 4045 in FIG. 40) to confirm the grant of an entitlement to activate the 2 additional cores. The customer enterprise system 4015 then sends the license (or license key) to the SDSi asset agent 4040 of the SDSi semiconductor device 4005 (via a network as represented by represented by the line labeled 4055 in FIG. 40) to cause activation of 2 additional cores provided by the hardware circuitry 4025 of the SDSi semiconductor device 4005. In the illustrated example, the SDSi asset agent 4040 reports a certificate back to the manufacturer enterprise system 4010 (e.g., via an appropriate cloud service implemented by the cloud platform 4020, as represented by the line labeled 4050 in FIG. 40) to confirm activation of the 2 cores. In some examples, the SDSi asset agent 4040 also reports the certificate back to the customer enterprise system 4015 (e.g., via the network as represented by the line labeled 4055 in FIG. 40) to confirm activation of the 2 cores. In some examples, the SDSi asset agent 4040 also reports telemetry data associated with operation of the SDSi semiconductor device 4005 to the manufacturer enterprise system 4010 (e.g., via the appropriate cloud service implemented by the cloud platform 4020, as represented by the line labeled 4050 in FIG. 40) and/or the customer enterprise system 4015 (e.g., via the network as represented by the line labeled 4055 in FIG. 40). After successful activation is confirmed, the manufacturer then invoices the customer (e.g., via the manufacturer enterprise system 4010 and the customer management system 4015) for the newly activate features (e.g., 2 additional cores). In some examples, the manufacturer enterprise system 4010 and/or the customer management system 4015 determine a new SKU (e.g., a soft SKU) to identify the same SDSi semiconductor device 4005 but with the new feature configuration (e.g., 4 cores instead of 2 cores).

If the customer later determines that it would prefer that 8 cores were active, the customer management system 4015 can contact the manufacturer enterprise system 4010 via the cloud service implemented by the cloud platform 4020 (represented by the line labeled 4045 in FIG. 40) to request activation of the remaining 4 additional cores. Assuming the request is valid, the manufacturer enterprise system 4010 generates another license (or license key) to activate the 4 additional cores, and sends the license to the customer management system 4015 via the cloud service implemented by the cloud platform 4020 (represented by the line labeled 4045 in FIG. 40) to confirm the grant of an entitlement to activate the 4 remaining cores. The customer enterprise system 4015 then sends license (or license key) to the SDSi asset agent 4040 of the SDSi semiconductor device 4005 (e.g., via the network as represented by the line labeled 4055 in FIG. 40) to cause activation of the 4 remaining cores provided by the hardware circuitry 4025 of the SDSi semiconductor device 4005. In the illustrated example, the SDSi asset agent 4040 reports a certificate back to the manufacturer enterprise system 4010 (e.g., via the appropriate cloud service implemented by the cloud platform 4020, as represented by the line labeled 4050 in FIG. 40) to confirm activation of the 4 remaining cores. In some examples, the SDSi asset agent 4040 also reports the certificate back to the customer enterprise system 4015 (e.g., via the network as represented by the line labeled 4055 in FIG. 40) to confirm activation of the 4 remaining cores. In some examples, the SDSi asset agent 4040 reports telemetry data associated with operation of the SDSi semiconductor device 4005 to the manufacturer enterprise system 4010 (e.g., via the appropriate cloud service implemented by the cloud platform 4020, as represented by the line labeled 4050 in FIG. 40) and/or the customer enterprise system 4015 (e.g., via the network as represented by the line labeled 4055 in FIG. 40). After successful activation is confirmed, the manufacturer then invoices the customer (e.g., via the manufacturer enterprise system 4010 and the customer management system 4015) for the newly activate features (e.g., the 4 additional cores). In some examples, the manufacturer enterprise system 4010 and/or the customer management system 4015 determine yet another new SKU (e.g., a soft SKU) to identify the same SDSi semiconductor device 4005 but with the new feature configuration (e.g., 8 cores instead of 4 cores).

By way of another example, consider an example implementation in which the semiconductor device 4005 includes up to thirty-two (32) processor cores configured by selecting a first application of three or more application ratios. Previously, the application ratio of the semiconductor device 4005 activated on the semiconductor device 4005 would be fixed, or locked, at the manufacturer's factory. Thus, if a customer wanted the semiconductor device 4005 to have a second application ratio, such as to implement a vRAN DU instead of a core server, the customer management system 4005 can contact the manufacturer enterprise system 4010 via a cloud service implemented by the cloud platform 4020 to request activation of the second application ratio. Assuming the request is valid, the manufacturer enterprise system 4010 generates a license (also referred to as a license key) to activate the second application ratio, and sends the license to the customer management system 4015 via the cloud service implemented by the cloud platform 4020 to confirm the grant of an entitlement to activate the second application ratio. The customer enterprise system 4015 then sends the license (or license key) to the SDSi asset agent 4040 of the SDSi semiconductor device 4005 (via a network as represented by represented by the line labeled 4055 in FIG. 40) to cause activation of the second application ratio provided by the hardware circuitry 4025 of the SDSi semiconductor device 4005. For example, in response to activating the second application ratio, the SDSi semiconductor device 4005 can configure core(s), uncore(s), CLM(s), etc., of the SDSi semiconductor device 4005 based on the second application ratio. In some examples, the activation includes activating one(s) of the configurations 835 of FIG. 8. In some examples, the activation includes transmitting new one(s) of the configurations 835 to the SDSi semiconductor device 4005.

In the illustrated example, the SDSi asset agent 4040 reports a certificate back to the manufacturer enterprise system 4010 (e.g., via an appropriate cloud service implemented by the cloud platform 4020, as represented by the line labeled 4050 in FIG. 40) to confirm activation of the second application ratio. In some examples, the SDSi asset agent 4040 also reports the certificate back to the customer enterprise system 4015 (e.g., via the network as represented by the line labeled 4055 in FIG. 40) to confirm activation of the second application ratio. In some examples, the SDSi asset agent 4040 also reports telemetry data associated with operation of the SDSi semiconductor device 4005 to the manufacturer enterprise system 4010 (e.g., via the appropriate cloud service implemented by the cloud platform 4020, as represented by the line labeled 4050 in FIG. 40) and/or the customer enterprise system 4015 (e.g., via the network as represented by the line labeled 4055 in FIG. 40). After successful activation is confirmed, the manufacturer then invoices the customer (e.g., via the manufacturer enterprise system 4010 and the customer management system 4015) for the newly activate features (e.g., the second application ratio). In some examples, the manufacturer enterprise system 4010 and/or the customer management system 4015 determine a new SKU (e.g., a soft SKU) to identify the same SDSi semiconductor device 4005 but with the new feature configuration (e.g., the second application ratio instead of the first application ratio).

In the illustrated examples of FIG. 40, the communications between the manufacturer enterprise system 4010 and the customer enterprise system 4015, between the manufacturer enterprise system 4010 and the SDSi asset agent 4040 of the SDSi semiconductor device 4005, and between the SDSi asset agent 4040 of the SDSi semiconductor device 4005 and the customer enterprise system 4015 can be implemented by one or more networks. For example, such networks can include the Internet, one or more wireless (cellular, satellite, etc.) service provider networks, one or more wired (e.g., cable, digital subscriber line, optical fiber, etc.) networks, one or more communication links, busses, etc.

In some examples, the SDSi semiconductor device 4005 is included in or otherwise implements an example edge node, edge server, etc., included in or otherwise implementing one or more edge clouds. In some examples, the SDSi semiconductor device 4005 is included in or otherwise implements an appliance computing device. In some examples, the manufacturer enterprise system 4010 is implemented by one or more edge node, edge server, etc., included in or otherwise implementing one or more edge clouds. In some examples, the manufacturer enterprise system 4010 is implemented by one or more appliance computing devices. In some examples, the customer enterprise system 4015 is implemented by one or more edge node, edge server, etc., included in or otherwise implementing one or more edge clouds. In some examples, the customer enterprise system 4015 is implemented by one or more appliance computing devices. Examples of such edge nodes, edge servers, edge clouds and appliance computing devices are described in further detail above in connection with FIGS. 2-4. Furthermore, in some examples, such edge nodes, edge servers, edge clouds and appliance computing devices may themselves be implemented by SDSi semiconductor devices capable of being configured/managed in accordance with the teachings of this disclosure.

In some examples, the manufacturer enterprise system 4010 communicates with multiple customer enterprise systems 4015 and/or multiple SDSi semiconductor devices 4005 via the cloud platform 4020. In some examples, the manufacturer enterprise system 4010 communicates with multiple customer enterprise systems 4015 and/or multiple SDSi semiconductor device(s) 4005 via the cloud platform 4020 through one or more edge servers/nodes. In either such example, the customer enterprise system(s) 4015 and/or SDSi semiconductor device(s) 4005 can themselves correspond to one or more edge nodes, edge servers, edge clouds and appliance computing devices, etc.

In some examples, the manufacturer enterprise system 4010 may delegate SDSi license generation and management capabilities to one or more remote edge nodes, edge servers, edge clouds, appliance computing devices, etc., located within a customer's network domain. For example, such remote edge nodes, edge servers, edge clouds, appliance computing devices, etc., may be included in the customer enterprise system 4015. In some such examples, the manufacturer enterprise system 4010 can delegate to such remote edge nodes, edge servers, edge clouds, appliance computing devices, etc., a full ability to perform SDSi license generation and management associated with the customer's SDSi semiconductor devices 4005 provided the remote edge nodes, edge servers, edge clouds, appliance computing devices, etc., are able to communicate with manufacturer enterprise system 4010. However, in some examples, if communication with the manufacturer enterprise system 4010 is disrupted, the remote edge nodes, edge servers, edge clouds, appliance computing devices may have just a limited ability to perform SDSi license generation and management associated with the customer's SDSi semiconductor devices 4005. For example, such limited ability may restrict the delegated SDSi license generation and management to supporting failure recovery associated with the SDSi semiconductor devices 4005. Such failure recovery may be limited to generating and providing licenses to configure SDSi features of a client's SDSi semiconductor device 4005 to compensate for failure of one or more components of the SDSi semiconductor device 4005 (e.g., to maintain a previously contracted quality of service).

A block diagram of an example system 4100 that illustrates example implementations of the SDSi asset agent 4040 of the SDSi silicon product 4005, the manufacturer enterprise system 4010 and the customer enterprise system 4015 included in the example system 4000 of FIG. 40 is illustrated in FIG. 41. The example SDSi asset agent 4040 of FIG. 41 includes an example agent interface 4102, example agent local services 4104, an example analytics engine 4106, example communication services 4108, an example agent command line interface (CLI) 4110, an example agent daemon 4112, an example license processor 4114, and an example agent library 4118. The example SDSi asset agent 4040 of FIG. 41 also includes example feature libraries 4120-4130 corresponding to respective example feature sets 4132-4142 implemented by the hardware circuitry 4025, firmware 4030 and/or BIOS 4035 of the SDSi semiconductor device 4005. The example manufacturer enterprise system 4010 of FIG. 41 includes an example product management service 4152, an example customer management service 4154, and an example SDSi feature management service 4156. The example manufacturer enterprise system 4010 of FIG. 41 also implements an example SDSi portal 4162 and an example SDSi agent management interface 4164 as cloud services in the cloud platform 4020. The example customer enterprise system 4015 of FIG. 41 includes an example SDSi client agent 4172, an example platform inventory management service 4174, an example accounts management service 4176 and an example entitlement management service 4178.

In the illustrated example of FIG. 41, the agent interface 4102 implements an interface to process messages sent between the SDSi asset agent 4040 and the manufacturer enterprise system 4010, and between the SDSi asset agent 4040 and the customer enterprise system 4015. The SDSi asset agent 4040 of the illustrated example includes the agent local services 4104 to implement any local services used to execute the SDSi asset agent 4040 on the semiconductor device 4005. The SDSi asset agent 4040 of the illustrated example includes the analytics engine 4106 to generate telemetry data associated with operation of the semiconductor device 4005. Accordingly, the analytics engine 4106 is an example of means for reporting telemetry data associated with operation of the semiconductor device 4005. The communication services 4108 provided in the SDSi asset agent 4040 of the illustrated example include a local communication service to enable the SDSi asset agent 4040 to communicate locally with the other elements of the semiconductor device 4005 and/or a product platform including the semiconductor device 4005. The communication services 4108 also include a remote communication service to enable the SDSi asset agent 4040 to communicate remotely with the SDSi agent management interface 4164 of the manufacturer enterprise system 4010 and the SDSi client agent 4172 of the customer enterprise system 4015. The SDSi asset agent 4040 of the illustrated example includes the agent CLI 4110 to process commands entered locally to the semiconductor device 4005 via a command line interface. The SDSi asset agent 4040 of the illustrated example includes the license processor 4114 to process license(s) received from the customer enterprise system 4015 to configure (e.g., activate, deactivate, etc.) one or more SDSi features included in the feature sets 4132-4142 implemented by the hardware circuitry 4025, firmware 4030 and/or BIOS 4035 of the SDSi semiconductor device 4005. Accordingly, the license processor 4114 is an example of means for activating or deactivating at least one feature of the semiconductor device 4005 based on a license received via a network from a remote enterprise system. The SDSi asset agent 4040 of the illustrated example includes the agent daemon 4112 to securely execute the elements of the SDSi asset agent 4040. For example, the agent daemon 4112 can execute one or more of the agent interface 4102, the agent local services 4104, the analytics engine 4106, the communication services 4108, the agent CLI 4110 and/or the license processor 4114 in a protected environment, such as a trusted execution environment (TEE), implemented by the semiconductor device 4005. The SDSi asset agent 4040 of the illustrated example includes the agent library 4118 to provide, among other things, hardware-agnostic application programming interfaces (APIs) to be used by the license processor 4114 to invoke the respective, hardware-specific feature libraries 4120-4130 to configure (e.g., activate, deactivate, etc.), based on the received license data, one or more features in the corresponding example features sets 4132-4142 implemented by the hardware circuitry 4025, firmware 4030 and/or BIOS 4035 of the SDSi semiconductor device 4005. Accordingly, the hardware circuitry 4025, firmware 4030 and/or BIOS 4035 are examples of means for providing SDSi features in the SDSi semiconductor device 4005. In some examples, the agent library 4118 and/or the hardware-specific feature libraries 4120-4130 also operate in a protected environment, such as a TEE, implemented by the semiconductor device 4005. Further details concerning the elements of the SDSi asset agent 4040 of FIG. 41 are described below.

In the illustrated example of FIG. 41, the manufacturer enterprise system 4010 includes the example product management service 4152 to manage the inventory, pricing, etc., of the products manufactured by the manufacturer of the SDSi semiconductor device 4005. The manufacturer enterprise system 4010 of the illustrated example includes the customer management service 4154 to manage customer accounts, billing, reconciliation, etc., for the manufacturer of the SDSi semiconductor device 4005. The manufacturer enterprise system 4010 of the illustrated example includes the SDSi feature management service 4156 to manage the configuration of SDSi feature(s) implemented by the silicon products manufactured by the manufacturer of the SDSi semiconductor device 4005. The manufacturer enterprise system 4010 of the illustrated example implements the SDSi portal 4162 to communicate (e.g., via a network) with the customer enterprise system 4015. The manufacturer enterprise system 4010 of the illustrated example implements the SDSi agent management interface 4164 to communicate (e.g., via a network) with the SDSi asset agent 4040 of the SDSi semiconductor device 4005. Further details concerning the elements of the manufacturer enterprise system 4010 of FIG. 41 are described below.

In the illustrated example of FIG. 41, the customer enterprise system 4015 includes the SDSi client agent 4172 to communicate (e.g., via a network) with the manufacturer enterprise system 4010 and the SDSi asset agent 4040 of the SDSi semiconductor device 4005. The customer enterprise system 4015 of the illustrated example includes the platform inventory management service 4174 to manage the platforms offered by the customer (OEM), such as platforms that include the SDSi semiconductor device 4005. The customer enterprise system 4015 of the illustrated example includes the accounts management service 4176 to manage accounts, billings, reconciliations, etc., the customer has with manufacturers, downstream customers, etc., such as the manufacturer of the SDSi semiconductor device 4005. The customer enterprise system 4015 of the illustrated example includes the entitlement management service 4178 to manage licenses granted by manufacturers of SDSi products, such as the manufacturer of the SDSi semiconductor device 4005, to configure (e.g., activate, deactivate, etc.) SDSi features implemented by those products. Further details concerning the elements of the customer enterprise system 4015 of FIG. 41 are described below.

An example SDSi management lifecycle 4200 capable of being implemented by the example systems 4000 and/or 4100 of FIGS. 40-42 is illustrated in FIG. 42. The lifecycle 4200 is described from the perspective of activating or deactivating an SDSI feature provided by the SDSi semiconductor device 4005, but also can be applied to any type of configuration change of an SDSI feature provided by the SDSi semiconductor device 4005. The lifecycle 4200 begins at block 4202 at which the SDSi client agent 4172 of the customer enterprise system 4015 sends a request to the SDSi portal 4162 of the manufacturer enterprise system 4010 to activate (or deactivate) an SDSI feature provided by the SDSi semiconductor device 4005. Accordingly, the SDSi portal 4162 is an example of means for receiving a request to activate or deactivate a feature provided by the semiconductor device 4005. For example, the customer may access a customer management record for the SDSi semiconductor device 4005 maintained by the platform inventory management service 4174, and modify the customer management record to invoke the SDSi client agent 4172 to send the request. Accordingly, the SDSi client agent 4172 is an example of means for sending a request to activate or deactivate an SDSi feature provided by the semiconductor device 4005. At block 4204, the SDSi portal 4162 of the manufacturer enterprise system 4010 receives the request sent by the SDSi client agent 4172 of the customer enterprise system 4015 to activate (or deactivate) the SDSI feature provided by the SDSi semiconductor device 4005. At block 4206, the SDSi agent management interface 264 sends a query to the SDSi asset agent 4040 to confirm that the SDSi semiconductor device 4005 supports the SDSi feature to be activated (or deactivated). For example, the SDSi feature management service 4156 may process the customer request received via the SDSi portal 4162 and invoke the SDSi agent management interface 4164 to send the query. The agent interface 4102 of the SDSi asset agent 4040 receives the query and invokes the license processor 4114 to generate a response. The license processor 4114 analyzes the configuration of the hardware circuitry 4025, the firmware 4030 and/or the BIOS 4035 of the semiconductor device 4005, generates feature support verification information indicating whether the queried feature is supported by the semiconductor device 4005, and reports, via the agent interface 4102, a response including the feature support verification information to the SDSi agent management interface 4164. In some examples, rather than querying the SDSi asset agent 4040 of the SDSi semiconductor device 4005, the SDSi agent management interface 4164 accesses one or more databases and/or other data structures (e.g., based on device identifier and/or SKU information included in the feature request) that store specification/configuration data for the SDSi semiconductor device 4005 to confirm whether the SDSi semiconductor device 4005 supports the requested feature.

At block 4208 of the lifecycle 4200, the SDSi agent management interface 4164 receives the query response from the SDSi asset agent 4040 (or from the queries database(s) and/or data structure(s)), which is processed by the SDSi feature management service 4156. If the response indicates the SDSi feature of interest is supported by the SDSi semiconductor device 4005, at block 4210 the SDSi feature management service 4156 generates a license to activate (or deactivate) the SDSi feature as requested. Accordingly, the SDSi feature management service 4156 is an example of means for generating a license to be processed by the semiconductor device 4005 to activate or deactivate an SDSi feature. Also, at block 4212, the SDSi feature management service 4156 causes the license to be sent via the SDSi portal 4162 to the SDSi client agent 4172 of the customer enterprise system 4015. Accordingly, the SDSi client agent 4172 is an example of means for receive a license from an enterprise management system to authorize activation or deactivation of an SDSi feature provided by the semiconductor device 4005 In the illustrated example, the license generated at block 4210 is associated with a license key and/or license data that specifies, for example, an identifier of the semiconductor device 4005, the SDSi feature to be activated (or deactivated), terms of the activation (or deactivation), such as whether this is a one-time feature activation (deactivation) or renewable activation subject to a subscription, a valid start window (e.g., X hours, where X is a numerical value, or some other duration) for invoking the license to activate (or deactivate) the SDSI feature, etc. At this point in the lifecycle 4200, the license generated at block 4210 is treated as an unused license to activate (or deactivate) the SDSi feature, which is stored in a repository at the customer enterprise system 4015 until the customer triggers use of the license to activate (or deactivate) the requested feature, such as an application ratio, a processor configuration, etc. For example, the SDSi feature management service 4156 of the manufacturer enterprise system 4010 can update a manufacturer management record maintained by the manufacturer for the semiconductor device 4005 to include the license and/or license data generated at block 4210. Likewise, the entitlement management service 4178 of the customer enterprise system 4015 can update the customer management record maintained by the customer for the semiconductor device 4005 to indicate receipt of the license along with the license details. Accordingly, the entitlement management service 4178 is an example of means for updating a management record associated with the semiconductor device 4005 based on a license. In some such examples, the entitlement management service 4178 can be invoked by the customer to update the customer management record to trigger operation of the license to activate (or deactivate) the SDSi feature, which cause the SDSi client agent 4172 of the customer enterprise system 4015 to transmit (e.g., download) the license via the network 4055 to the SDSi asset agent 4040 of the semiconductor device 4005.

For example, upon receipt of a request at the SDSi client agent 4172 to invoke the license, at block 4214 the SDSi client agent 4172 sends the license to the SDSi asset agent 4040. Accordingly, the SDSi client agent 4172 is an example of means for sending a license to the semiconductor device 4005. The license is received by the agent interface 4102, which at block 4216 invokes the license processor 4114. At block 4216, the license processor 4114 processes the license data to identify the feature to be activated (or deactivated), and activates (or deactivates) the feature in accordance with the license data. For example, if the feature is representative of a second application ratio (e.g., one(s) of the cores can operate at second operating frequencies based on a workload), and the semiconductor device 4005 was initialized to have a first application ratio (e.g., one(s) of the cores can operate at first operating frequencies based on a workload), the license data may specify that the second application ratio to be activated (e.g., in response to a request from the customer enterprise system 4015 to activate the second application ratio). The license data may also identify one(s) of the cores, the uncores, the CLMs, etc., in which to apply the second application ratio. In such an example, the license processor 4114 invokes the agent library 4118 to activate the second application ratio specified in the license data. As another example, the SDSi asset agent 4040 may later receive a second license from the SDSi client agent 4172 of the customer enterprise system 4015 that specifies a third application ratio to be activated (e.g., with the second license being generated by the manufacturer enterprise system 4010 in response to a request from the customer enterprise system 4015 to activate the third application ratio). The second license data may also identify which ones of the cores are to be affected by the third application ratio. In such an example, the license processor 4114 invokes the agent library 4118 to configure the cores specified in the license data. In some examples, if the feature is a configurable clock rate, and the semiconductor device was initialized to activate a first clock rate from a set of possible clock rates, the license generated by the manufacturer enterprise system 4010 and downloaded via the SDSi client agent 4172 of the customer enterprise system 4015 may identify a second clock rate different from the first clock rate that is to be activated (e.g., in response to a request from the customer enterprise system 4015 to activate the second clock rate). In such an example, the license processor 4114 invokes the agent library 4118 to activate the second clock rate identified in the license data.

In some examples, a single license can configure multiple features across different feature categories. For example, a single license may include first license data to activate one or more additional cores, and second license to modify and/or otherwise adjust a clock rate of one or more cores to effectuate a change in application ratio. In such an example, the adjusted clock rate may be applied to one or more previously activated cores and/or one(s) of the one or more additional cores to be activated in response to the license processor 4114 processing the license. Additionally or alternatively, in some examples, a single license can activate one or more features, and also deactivate one or more other features.

At block 4218 of the lifecycle 4200, the analytics engine 4106 of the SDSi asset agent 4040 logs the SDSi feature activation (or deactivation) performed on the semiconductor device 4005. At block 4220, the analytics engine 4106 captures an odometer reading representative of a present, local time maintained by the circuitry 4025 (in combination with the firmware 4035 and/or BIOS 4040) of the semiconductor device 4005. For example, the circuitry 4025 may utilize a counter, timer or other mechanism to implement an odometer to track the passage of time locally at the semiconductor device 4005 (which is represented by the directed line 4222 in FIG. 42). In some examples, the odometer reading may be used by the manufacturer enterprise system 4010 to determine whether operation of the SDSi semiconductor device 4005 has violated a warranty and/or otherwise the usage terms and activation agreement associated with the SDSi semiconductor device 4005. At block 4220, the analytics engine 4106 captures a value of the odometer to act as a timestamp of when the requested feature was activated (or deactivated). At block 4224, the analytics engine 4106 generates a certificate to confirm the successful activation (or deactivation) of the requested SDSi feature. In the illustrated example, the certificate includes telemetry data associated with operation of the semiconductor device 4005 and generated by the analytics engine 4106 in response to activation (or deactivation) of the requested SDSi feature. In some examples, the telemetry data includes an indication of whether the feature activation (or deactivation) was a success, a status of the SDSi feature affected by the activation (or deactivation) (e.g., such as the presently configured number of cores that are configured with an application ratio, the presently active clock rate, etc.), a first odometer reading (e.g., first timestamp) indicating when the feature activation (or deactivation) occurred, a second odometer reading (e.g., a second timestamp) indicating whether the certificate was generated, etc.

At block 4226 of the lifecycle 4200, the analytics engine 4106 reports, via the agent interface 4102, the certificate with the telemetry data in response to the activation (or deactivation) of the SDSi feature based on the received license data. In the illustrated example, the analytics engine 4106 reports the certificate with the telemetry data to both the manufacturer enterprise system 4010 and the customer enterprise system 4015. For example, at block 4228, the example SDSi agent management interface 4164 of the manufacturer enterprise system 4010 receives the certificate, and at block 4230 provides it to the SDSi feature management service 4156 of the manufacturer enterprise system 4010. Accordingly, the SDSi agent management interface 4164 is an example of means for receiving a certificate from the semiconductor device 4005 to confirm successful activation or deactivation of an SDSi feature. The SDSi feature management service 4156 processes the certificate and included telemetry data to log the successful feature activation (or deactivation). Similarly, at block 4232, the SDSi client agent 4172 of the customer enterprise system 4015 receives the certificate and at block 4234 provides it to the entitlement management service 4178 of the customer enterprise system 4015. The entitlement management service 4178 processes the certificate and included telemetry data to log the successful feature activation (or deactivation). In the illustrated example, at this point in the lifecycle 4200, the status of the feature activation (or deactivation) may be considered incomplete until verified by a subsequent certificate from the SDSi asset agent 4040 (see blocks 4236 and 4238).

At block 4240 of the lifecycle 4200, the SDSi agent management interface 4164 of the manufacturer enterprise system 4010 receives a subsequent certificate with updated telemetry data from the SDSi asset agent 4040. At block 4242, the subsequent certificate is provided to the SDSi feature management service 4156 of the manufacturer enterprise system 4010. The SDSi feature management service 4156 processes the certificate to obtain the updated telemetry data, and also obtains the prior telemetry data included in the previous certificate. At block 4244, the SDSi feature management service 4156 accesses the odometer readings included in the telemetry data. At block 4246, the SDSi feature management service 4156 compares the telemetry data and odometer reading to confirm the successful activation (or deactivation) (or, more generally, the successful configuration change) of the SDSi feature of interest. Accordingly, the SDSi feature management service 4156 is an example of means for validating the successful activation or deactivation of an SDSi feature based on telemetry data. At block 4248, the customer management service 4154 of the manufacturer enterprise system 4010 generates an invoice for the successful activation (or deactivation) of the SDSi feature of interest, and sends it to the customer enterprise system 4015 via the SDSi portal 4162 for processing by the accounts management service 4176. In some examples, assuming the semiconductor device 4005 is associated with a present SKU (e.g., a first SKU), after the requested SDSi feature is activated (or deactivated), the product management service 4152 of the manufacturer enterprise system 4010 generates a new SKU (e.g., a second SKU) and updates the manufacturer management record maintained for the semiconductor device 4005 to associate the new SKU (second SKU) with the semiconductor device 4005. Accordingly, the product management service 4152 is an example of means for updating a management record to associate a second SKU with the semiconductor device 4005 after an SDSi feature is activated or deactivated. Additionally or alternatively, in some examples, assuming the semiconductor device 4005 is associated with a present SKU (e.g., a first SKU), after the requested SDSi feature is activated (or deactivated), the platform inventory management service 4174 of the customer enterprise system 4015 generates a new SKU (e.g., a second SKU) and updates the customer management record maintained for the semiconductor device 4005 to associate the new SKU (second SKU) with the semiconductor device 4005. Accordingly, the platform inventory management service 4174 is an example of means for updating a management record to associate a second SKU with the semiconductor device 4005 after an SDSi feature is activated or deactivated.

At block 4250 of the lifecycle 4200, the entitlement management service 4178 of the customer enterprise system 4015 generates a request for status of the semiconductor device 4005, and sends the request via the SDSi client agent 4172 to the SDSi asset agent 4040. Additionally or alternatively, the SDSi feature management service 4156 of the manufacturer enterprise system 4010 could generate the request for status of the semiconductor device 4005, and send the request via the SDSi agent management interface 4164 to the SDSi asset agent 4040. In either case, at block 4252, the agent interface 4102 receives the request and invokes the analytics engine 4106 to generate a certificate in response to the request. In the illustrated example, the certificate includes updated telemetry data associated with operation of the semiconductor device 4005 generated by the analytics engine 4106 in response to the request. The updated telemetry data is timestamped with a local time corresponding to an odometer reading captured in response to the request. At blocks 4254 and 4256, the SDSi agent management interface 4164 receives the requested certificate with the updated telemetry data from the SDSi asset agent 4040 and provides it to the SDSi feature management service 4156 of the manufacturer enterprise system 4010. The SDSi feature management service 4156 obtains the updated telemetry data, and also obtains the prior telemetry data for the semiconductor device 4005, and further accesses the odometer readings included in the telemetry data. At block 4256, the example SDSi feature management service 4156 updates a history of the operational status of the semiconductor device 4005 and uses the telemetry data to determine whether the semiconductor device 4005 is operating properly.

Similarly, at block 4260 of the lifecycle 4200, the SDSi client agent 4172 receives the requested certificate with the updated telemetry data from the SDSi asset agent 4040 and provides it to the entitlement management service 4178 of the customer enterprise system 4015. The entitlement management service 4178 obtains the updated telemetry data, and also obtains any prior telemetry data for the semiconductor device 4005, and further accesses the odometer readings included in the telemetry data. The entitlement management service 4178 then updates a history of the operational status of the semiconductor device 4005 and uses the telemetry data to determine whether the semiconductor device 4005 is operating properly. In some examples, the accounts management service 4176 of the customer enterprise system 4015 updates, based on receipt of the certificate, the customer management record associated with the semiconductor device 4005 to confirm establishment or conclusion of a payment obligation with the manufacturer of the semiconductor device 4005, such as the payment obligation associated with the invoice received from the manufacturer enterprise system 4010 at block 4248. Accordingly, the accounts management service 4176 is an example of means for updating a management record, based on a certificate, to confirm establishment or conclusion of a payment obligation with a manufacturer of the semiconductor device 4005.

As illustrated in the example lifecycle 4200 of FIG. 42, the request to activate (or deactivate) the SDSI feature sent by the customer enterprise system 4015 at block 4202 and received by the manufacturer enterprise system 4010 at block 4204 can initiate a contract between the customer and the manufacturer. Later, the sending of the license to the customer enterprise system 4015 at block 4212 can be a trigger to start a payment obligation (see block 4264). In some examples, the start of the payment obligation can be delayed until the feature is activated (or deactivated) in the semiconductor device 4005 based on the license at block 4216. Later, the reporting at block 4226 of the certificate in response to the activation (or deactivation) of the SDSi feature in the semiconductor device 4005 can validate the payment obligation (see block 4266). Later, the generation and receipt of the invoice at block 4248 can trigger reconciliation of the payment obligation (see block 4268).

The licenses generated by the manufacturer enterprise system 4010 to activate (or deactivate) SDSi features in the semiconductor device 4005 can support one-time activation, on-demand activation and/or recurring subscription models. For example, the license may include license data to instruct the license processor 4114 of the SDSi asset agent 4040 executing in the semiconductor device 4005 to perform a one-time activation (or deactivation) of one or more features identified by the license data. In some examples, to support on-demand activation and/or recurring subscription models, the license generated by the manufacturer enterprise system 4010 can include license data that instructs the license processor 4114 to activate (or deactivate) the specified SDSi feature(s) in accordance with an express permit or an express deny control mechanism. For example, under an express permit control mechanism, the license processor 4114 causes an SDSi feature that is activated based on the license to be deactivated upon expiration of a time period (e.g., tracked by a counter, clock, or other mechanism) unless an express permit control signal is received from the manufacturer enterprise system 4010 (e.g., via the SDSi agent management interface 4164) before the time period expires. Conversely, under an express deny control mechanism, the license processor 4114 causes an SDSi feature that is activated based on the license to be remain active unless an express deny control signal is received from the manufacturer enterprise system 4010 (e.g., via the SDSi agent management interface 4164). In such an example, receipt of the express deny control signal causes the license processor 4114 to deny access to the activated feature, such as, by deactivating the feature.

In some examples, the license processor 4114 of the SDSi asset agent 4040 executing in the semiconductor device 4005 activates and deactivates SDSI features through the use of reprogrammable soft fuse(s), register(s), logic gate(s), etc. For example, such reprogrammable soft fuse(s), register(s), logic gate(s), etc., can be connected to control lines of the hardware blocks included in the hardware circuitry 4025 of the semiconductor device 4005 to implement the SDSi features, connected to control inputs read by the firmware 4030 and/or BIOS 4035 to enable/disable the SDSi features, etc. The license processor 4114 can set and/or reset ones of the reprogrammable soft fuse(s), values of the register(s), input(s) of the logic gate(s), etc., to activate/deactivate different SDSi features of the semiconductor device 4005.

In some examples, the license processor 4114 writes received license(s) and/or the license data included therein to a protected license memory region of the semiconductor device 4005. In some examples, the license data is encrypted and the license processor 4114 decrypts the license data before writing it to the protected license memory region of the semiconductor device 4005. In some such examples, SDSi feature activation/deactivation responsive to a received license does not occur until the semiconductor device 4005 reboots (e.g., via a soft reset, a hard reset, etc.) and the license data in the protected license memory region is read upon start-up. In some examples, the license processor 4114 sets one or more particular locations of the protected license memory region to activate one or more SDSi features, and erases or overwrites the license data contained in those location(s) of the protected license memory region to deactivate those SDSi feature(s). For example, to deactivate a given SDSi feature, the license processor 4114 may write random or otherwise garbage data to the location(s) associated with that feature in the protected license memory region, and rely on an error checking capability of the semiconductor device 4005 that causes the given SDSi feature to remain disabled in response to such random or otherwise garbage data.

In some examples, the location(s) of the protected license memory region for deactivated SDSi feature(s) is(are) not erased or overwritten. Rather, in some such examples, to deactivate an SDSi feature, a deactivation license is appended to the list of licenses already stored in the protected license memory region for that SDSi feature. The newly received deactivation license in such an example overrides the actions of previously received licenses for that SDSi feature. In that way, the history of SDSi configuration operations (activations and deactivations) performed on the SDSi feature are stored by the semiconductor device 4005 in the order the SDSi licenses were applied. In some examples, this information could be read by the customer.

The foregoing and following examples provide reference to power and frequency optimizations for network workloads. Advantageously, the variations to the workloads or types of workloads as described herein may enable a CPU fabricator or manufacturer to create any number of custom SKUs and combinations, including those not necessarily applicable to network processing optimizations.

Detailed below are describes of exemplary computer architectures. Other system designs and configurations known in the arts for laptops, desktops, handheld PCs, personal digital assistants, engineering workstations, servers, network devices, network hubs, switches, embedded processors, DSPs, graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 43:
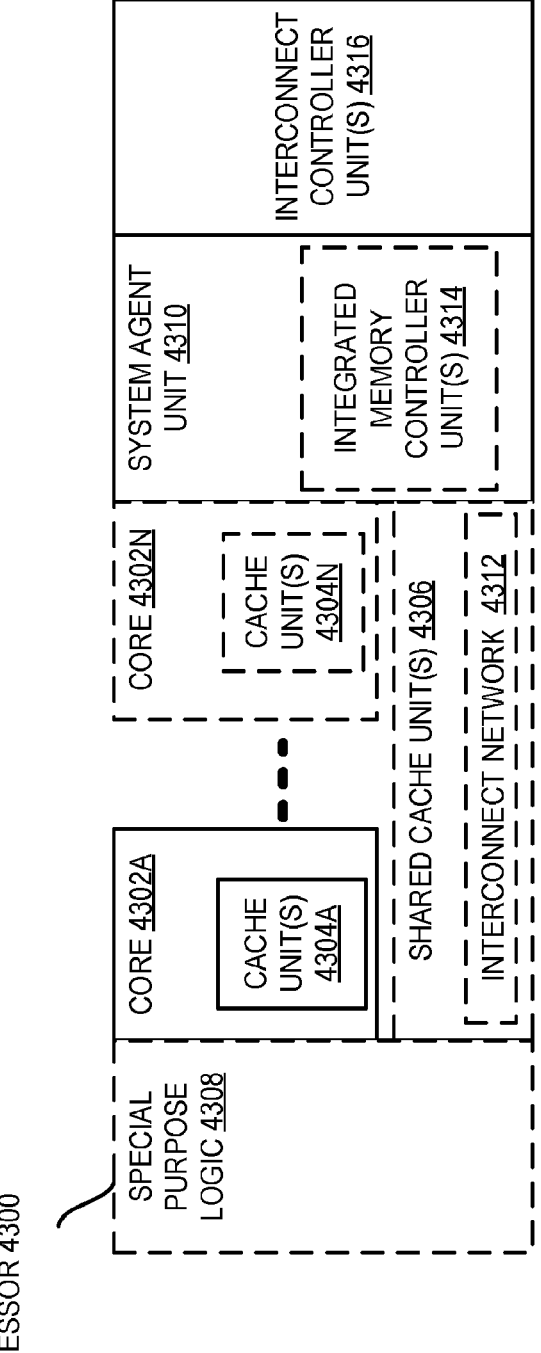
FIG. 43 illustrates a block diagram of embodiments of an example processor that may have more than one core, may have an integrated memory controller, and may have integrated graphics.

FIG. 43 illustrates a block diagram of examples of a processor 4300 that may have more than one core, may have an integrated memory controller, and may have integrated graphics. In some examples, the processor 4300 of FIG. 43 may implement the first multi-core CPU 530 of FIG. 5, the second multi-core CPU 552 of FIG. 5, the multi-core CPU 608 of FIG. 6, the processor 800 of FIG. 8, etc. The solid lined boxes illustrate a processor 4300 with a single core 4302A, a system agent 4310, a set of one or more interconnect controller units circuitry 4316, while the optional addition of the dashed lined boxes illustrates an alternative processor 4300 with multiple cores 4302A-N, a set of one or more integrated memory controller unit(s) circuitry 4314 in the system agent unit circuitry 4310, and special purpose logic 4308, as well as a set of one or more interconnect controller units circuitry 4316. Note that the processor 4300 may be one of the processors 6870 or 6880, or co-processor 6838 or 6815 of FIG. 68.

Thus, different implementations of the processor 4300 may include: 1) a CPU with the special purpose logic 4308 being integrated graphics and/or scientific (throughput) logic (which may include one or more cores, not shown), and the cores 4302A-N being one or more general purpose cores (e.g., general purpose in-order cores, general purpose out-of-order cores, or a combination of the two); 2) a coprocessor with the cores 4302A-N being a large number of special purpose cores intended primarily for graphics and/or scientific (throughput); and 3) a coprocessor with the cores 4302A-N being a large number of general purpose in-order cores. Thus, the processor 4300 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 4300 may be a part of and/or may be implemented on one or more substrates using any of a number of process technologies, such as, for example, BiCMOS, CMOS, or NMOS.

A memory hierarchy includes one or more levels of cache unit(s) circuitry 4304A-N within the cores 4302A-N, a set of one or more shared cache units circuitry 4306, and external memory (not shown) coupled to the set of integrated memory controller units circuitry 4314. The set of one or more shared cache units circuitry 4306 may include one or more mid-level caches, such as level 2 (L2), level 3 (L3), level 4 (L4), or other levels of cache, such as an LLC, and/or combinations thereof. While in some examples ring-based interconnect network circuitry 4312 interconnects the special purpose logic 4308 (e.g., integrated graphics logic), the set of shared cache units circuitry 4306, and the system agent unit circuitry 4310, alternative examples use any number of well-known techniques for interconnecting such units. In some examples, coherency is maintained between one or more of the shared cache units circuitry 4306 and cores 4302A-N.

In some examples, one or more of the cores 4302A-N are capable of multi-threading. The system agent unit circuitry 4310 includes those components coordinating and operating cores 4302A-N. The system agent unit circuitry 4310 may include, for example, power control unit (PCU) circuitry and/or display unit circuitry (not shown). The PCU may be or may include logic and components needed for regulating the power state of the cores 4302A-N and/or the special purpose logic 4308 (e.g., integrated graphics logic). The display unit circuitry is for driving one or more externally connected displays.

The cores 4302A-N may be homogenous or heterogeneous in terms of architecture instruction set; that is, two or more of the cores 4302A-N may be capable of executing the same instruction set, while other cores may be capable of executing only a subset of that instruction set or a different instruction set.

Figure 44B:
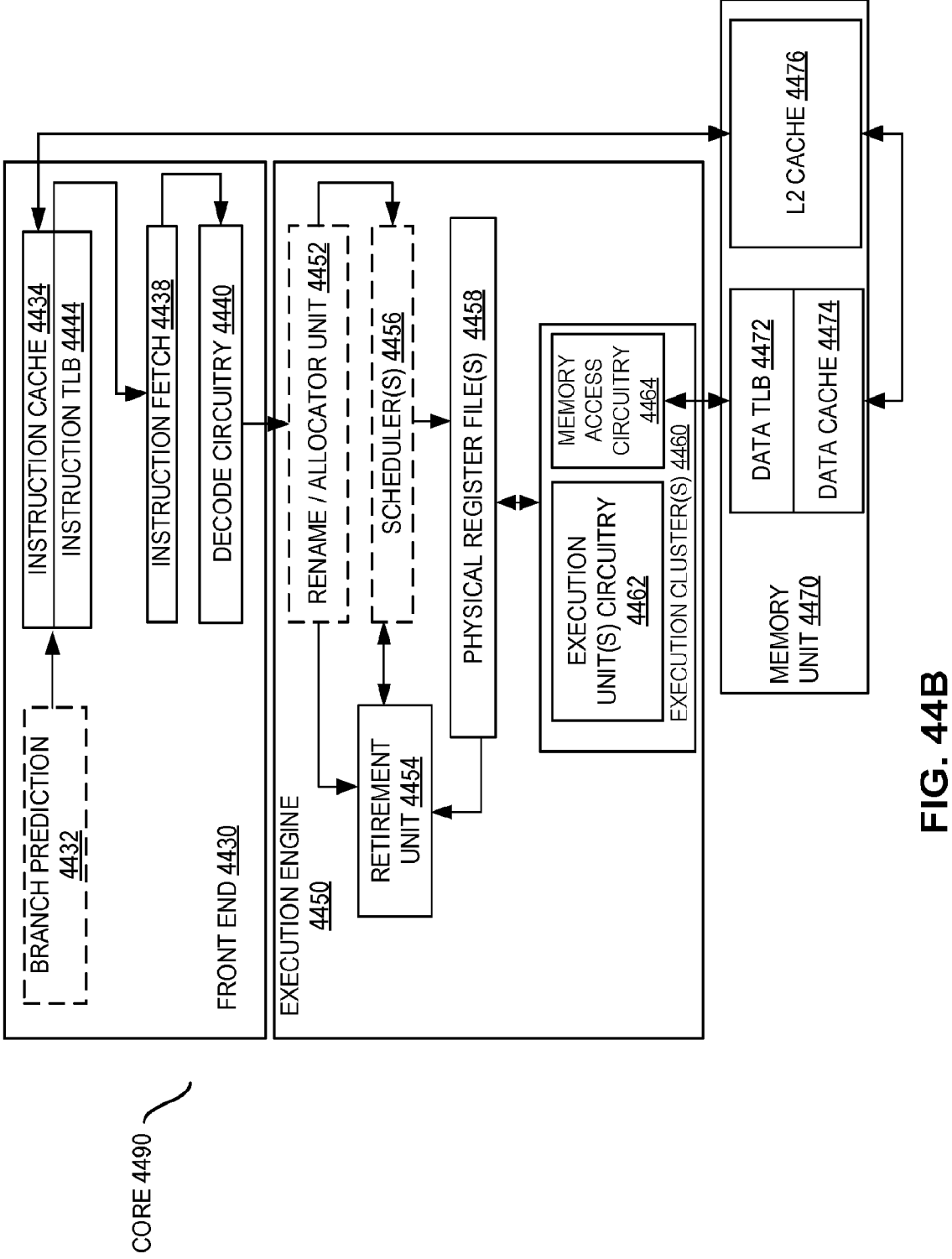
FIG. 44B is a block diagram illustrating both an exemplary embodiment of an in-order architecture core and an exemplary register renaming, out-of-order issue/execution architecture core to be included in a processor according to examples of the disclosure.

FIG. 44A is a block diagram illustrating both an exemplary in-order pipeline and an exemplary register renaming, out-of-order issue/execution pipeline according to examples of the disclosure. FIG. 44B is a block diagram illustrating both an exemplary embodiment of an in-order architecture core and an exemplary register renaming, out-of-order issue/execution architecture core to be included in a processor according to examples of the disclosure. The solid lined boxes in FIGS. 44A-44B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 44A, a processor pipeline 4400 includes a fetch stage 4402, an optional length decode stage 4404, a decode stage 4406, an optional allocation stage 4408, an optional renaming stage 4410, a scheduling (also known as a dispatch or issue) stage 4412, an optional register read/memory read stage 4414, an execute stage 4416, a write back/memory write stage 4418, an optional exception handling stage 4422, and an optional commit stage 4424. For example, a multi-core processor as described herein may determine whether an SSE instruction, an AVX-512 instruction, or a 5G-ISA instruction is to be executed at one or more of the stages of the processor pipeline 4400. One or more operations can be performed in each of these processor pipeline stages. For example, during the fetch stage 4402, one or more instructions (e.g., SSE instructions, AVX-512 instructions, 5G-ISA instructions, etc.) are fetched from instruction memory, during the decode stage 4406, the one or more fetched instructions may be decoded, addresses (e.g., load store unit (LSU) addresses) using forwarded register ports may be generated, and branch forwarding (e.g., immediate offset or a link register (LR)) may be performed. In one embodiment, the decode stage 4406 and the register read/memory read stage 4414 may be combined into one pipeline stage. In one embodiment, during the execute stage 4416, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution core architecture may implement the pipeline 4400 as follows: 1) the instruction fetch unit circuitry 4438 performs the fetch and length decoding stages 4402 and 4404; 2) the decode unit circuitry 4440 performs the decode stage 4406; 3) the rename/allocator unit circuitry 4452 performs the allocation stage 4408 and renaming stage 4410; 4) the scheduler unit(s) circuitry 4456 performs the schedule stage 4412; 5) the physical register file(s) unit(s) circuitry 4458 and the memory unit circuitry 4470 perform the register read/memory read stage 4414; the execution cluster 4460 perform the execute stage 4416; 6) the memory unit circuitry 4470 and the physical register file(s) unit(s) circuitry 4458 perform the write back/memory write stage 4418; 7) various units (unit circuitry) may be involved in the exception handling stage 4422; and 8) the retirement unit circuitry 4454 and the physical register file(s) unit(s) circuitry 4458 perform the commit stage 4424.

FIG. 44B shows processor core 4490 including front-end unit circuitry 4430 coupled to an execution engine unit circuitry 4450, and both are coupled to a memory unit circuitry 4470. For example, the execution engine unit circuitry 4450 may implement the execution unit 802 of FIG. 8 or portion(s) thereof. The core 4490 may be a reduced instruction set computing (RISC) core, a complex instruction set computing (CISC) core, a very long instruction word (VLIW) core, or a hybrid or alternative core type. As yet another option, the core 4490 may be a special-purpose core, such as, for example, a network or communication core, compression engine, coprocessor core, general purpose computing graphics processing unit (GPGPU) core, graphics core, or the like.

The front end unit circuitry 4430 may include branch prediction unit circuitry 4432 coupled to an instruction cache unit circuitry 4434, which is coupled to an instruction translation lookaside buffer (TLB) 4436, which is coupled to instruction fetch unit circuitry 4438, which is coupled to decode unit circuitry 4440. In one embodiment, the instruction cache unit circuitry 4434 is included in the memory unit circuitry 4470 rather than the front-end unit circuitry 4430. The decode unit circuitry 4440 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 4440 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 4440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 4490 includes a microcode ROM (not shown) or other medium that stores microcode for certain macroinstructions (e.g., in decode unit circuitry 4440 or otherwise within the front end unit circuitry 4430). In one embodiment, the decode unit circuitry 4440 includes a micro-operation (micro-op) or operation cache (not shown) to hold/cache decoded operations, micro-tags, or micro-operations generated during the decode or other stages of the processor pipeline 4400. The decode unit circuitry 4440 may be coupled to rename/allocator unit circuitry 4452 in the execution engine unit circuitry 4450.

The execution engine unit circuitry 4450 includes the rename/allocator unit circuitry 4452 coupled to a retirement unit circuitry 4454 and a set of one or more scheduler(s) circuitry 4456. The scheduler(s) circuitry 4456 represents any number of different schedulers, including reservations stations, central instruction window, etc. In some examples, the scheduler(s) circuitry 4456 can include arithmetic logic unit (ALU) scheduler/scheduling circuitry, ALU queues, arithmetic generation unit (AGU) scheduler/scheduling circuitry, AGU queues, etc. The scheduler(s) circuitry 4456 is coupled to the physical register file(s) circuitry 4458. Each of the physical register file(s) circuitry 4458 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. For example, the 5G-ISA instructions as described herein, when executed, may invoke one(s) of the physical register file(s) circuitry 4458 to effectuate 5G network workloads. In one embodiment, the physical register file(s) unit circuitry 4458 includes vector registers unit circuitry, writemask registers unit circuitry, and scalar register unit circuitry. These register units may provide architectural vector registers, vector mask registers, general-purpose registers, etc. The physical register file(s) unit(s) circuitry 4458 is overlapped by the retirement unit circuitry 4454 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 4454 and the physical register file(s) circuitry 4458 are coupled to the execution cluster(s) 4460. The execution cluster(s) 4460 includes a set of one or more execution units circuitry 4462 and a set of one or more memory access circuitry 4464. The execution units circuitry 4462 may perform various arithmetic, logic, floating-point or other types of operations (e.g., shifts, addition, subtraction, multiplication) and on various types of data (e.g., scalar floating-point, packed integer, packed floating-point, vector integer, vector floating-point). For example, the execution units circuitry 4462 may perform such processing in response to executing 5G-ISA instructions as described herein. While some examples may include a number of execution units or execution unit circuitry dedicated to specific functions or sets of functions, other examples may include only one execution unit circuitry or multiple execution units/execution unit circuitry that all perform all functions. The scheduler(s) circuitry 4456, physical register file(s) unit(s) circuitry 4458, and execution cluster(s) 4460 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain examples are implemented in which only the execution cluster of this pipeline has the memory access unit(s) circuitry 4464). It should also be understood that where separate pipelines are used, one or more of these pipelines may be out-of-order issue/execution and the rest in-order.

In some examples, the execution engine unit circuitry 4450 may perform load store unit (LSU) address/data pipelining to an Advanced Microcontroller Bus (AMB) interface (not shown), and address phase and writeback, data phase load, store, and branches.

The set of memory access circuitry 4464 is coupled to the memory unit circuitry 4470, which includes data TLB unit circuitry 4472 coupled to a data cache circuitry 4474 coupled to a level 2 (L2) cache circuitry 4476. In one exemplary embodiment, the memory access units circuitry 4464 may include a load unit circuitry, a store address unit circuit, and a store data unit circuitry, each of which is coupled to the data TLB circuitry 4472 in the memory unit circuitry 4470. The instruction cache circuitry 4434 is further coupled to a level 2 (L2) cache unit circuitry 4476 in the memory unit circuitry 4470. In one embodiment, the instruction cache 4434 and the data cache 4474 are combined into a single instruction and data cache (not shown) in L2 cache unit circuitry 4476, a level 3 (L3) cache unit circuitry (not shown), and/or main memory. The L2 cache unit circuitry

4476 is coupled to one or more other levels of cache and eventually to a main memory.

The core 4490 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 4490 includes logic to support a packed data instruction set extension (e.g., AVX1, AVX2, AVX-512, 5G-ISA, etc.), thereby allowing the operations used by many multimedia applications to be performed using packed data.

Figure 45:
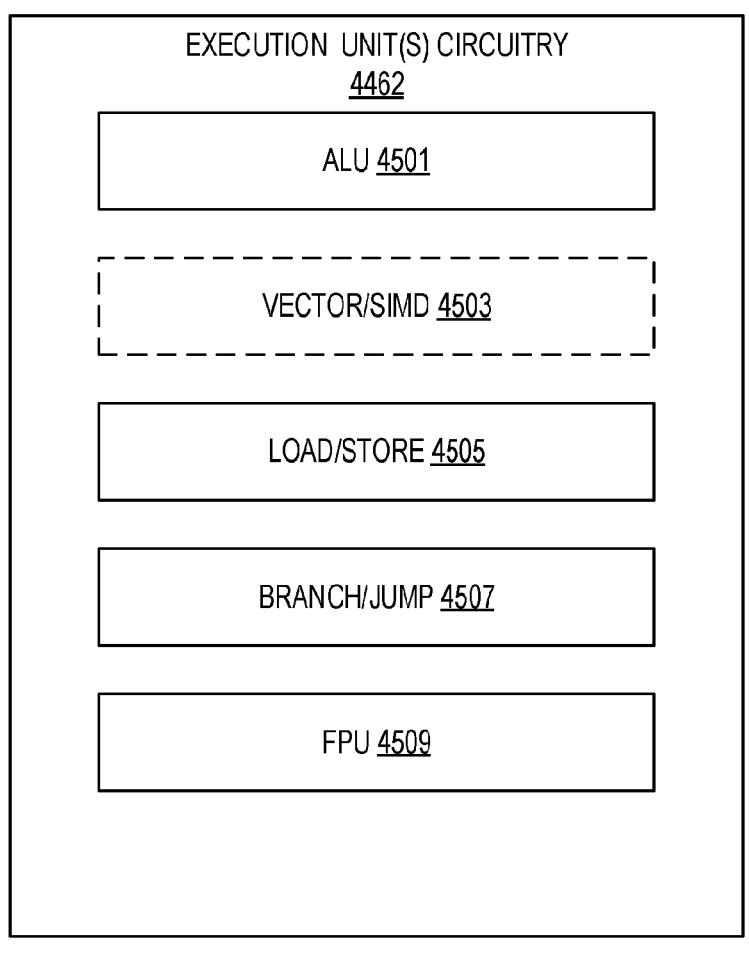
FIG. 45 illustrates examples of execution unit(s) circuitry, such as execution unit(s) circuitry of FIG. 44B.

FIG. 45 illustrates examples of execution unit(s) circuitry, such as execution unit(s) circuitry 4462 of FIG. 44B. As illustrated, execution unit(s) circuitry 4462 may include one or more ALU circuits 4501, vector/SIMD unit circuits 4503, load/store unit circuits 4505, and/or branch/jump unit circuits 4507. ALU circuits 4501 perform integer arithmetic and/or Boolean operations. Vector/SIMD unit circuits 4503 perform vector/SIMD operations on packed data (such as SIMD/vector registers). Load/store unit circuits 4505 execute load and store instructions to load data from memory into registers or store from registers to memory. Load/store unit circuits 4505 may also generate addresses. Branch/jump unit circuits 4507 cause a branch or jump to a memory address depending on the instruction. Floating-point unit (FPU) circuits 4509 perform floating-point arithmetic. For example, the FPU circuits 4509 may perform floating-point arithmetic (e.g., FP16, FP32, etc., arithmetic) in response to invocation of 5G-ISA instructions as described herein. The width of the execution unit(s) circuitry 4662 varies depending upon the embodiment and can range from 16-bit to 1,024-bit. In some examples, two or more smaller execution units are logically combined to form a larger execution unit (e.g., two 128-bit execution units are logically combined to form a 256-bit execution unit).

FIG. 46 is a block diagram of an example register architecture 4600 according to some embodiments. As illustrated, there are vector/SIMD registers 4610 that vary from 128-bit to 1,024 bits width. In some embodiments, the vector/SIMD registers 4610 are physically 512-bits and, depending upon the mapping, only some of the lower bits are used. For example, in some embodiments, the vector/SIMD registers 4610 are ZMM registers which are 512 bits: the lower 256 bits are used for YMM registers and the lower 128 bits are used for XMM registers. In some such examples, 5G-ISA instructions as described herein, when executed, may invoke one(s) of the ZMM registers, the YMM registers, and/or the XMM registers to effectuate 5G-related network workloads. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 4600 includes writemask/predicate registers 4615. For example, in some embodiments, there are 8 writemask/predicate registers (sometimes called k0 through k7) that are each 16-bit, 32-bit, 64-bit, or 128-bit in size. Writemask/predicate registers 4615 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 4615 corresponds to a data element position of the destination. In other embodiments, the writemask/predicate registers 4615 are scalable and consists of a set number of enable bits for a given vector element (e.g., 8 enable bits per 64-bit vector element).

The register architecture 4600 includes a plurality of general-purpose registers 4625. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 4600 includes scalar floating-point register 4645 which is used for scalar floating-point operations on 32/64/80-bit floating-point data using the x87 instruction set extension or as MMX registers to perform operations on 64-bit packed integer data, as well as to hold operands for some operations performed between the MMX and XMM registers. For example, the 5G-ISA instructions as described herein, when executed, may use the scalar floating-point register 4645 to process network workloads.

One or more flag registers 4640 (e.g., EFLAGS, RFLAGS, etc.) store status and control information for arithmetic, compare, and system operations. For example, the one or more flag registers 4640 may store condition code information such as carry, parity, auxiliary carry, zero, sign, and overflow. In some embodiments, the one or more flag registers 4640 are called program status and control registers.

Segment registers 4620 contain segment points for use in accessing memory. In some embodiments, these registers are referenced by the names CS, DS, SS, ES, FS, and GS.

Machine specific registers (MSRs) 4635 control and report on processor performance. Most MSRs 4635 handle system-related functions and are not accessible to an application program. Machine check registers 4660 consist of control, status, and error reporting MSRs that are used to detect and report on hardware errors.

One or more instruction pointer register(s) 4630 store an instruction pointer value. Control register(s) 4655 (e.g., CR0-CR4) determine the operating mode of a processor (e.g., processor 6870, 6880, 6838, 6815 of FIG. 68, and/or processor 4300 of FIG. 43) and the characteristics of a currently executing task. Debug registers 4650 control and allow for the monitoring of a processor or core's debugging operations.

Memory management registers 4665 specify the locations of data structures used in protected mode memory management. These registers may include a GDTR, IDRT, task register, and a LDTR register.

Alternative embodiments of the disclosure may use wider or narrower registers. Additionally, alternative embodiments of the disclosure may use more, less, or different register files and registers.

An instruction set architecture (ISA) (e.g., a 5G-ISA instruction set architecture) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA (e.g., a 5G-ISA) is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

In particular, denormal FP16 operands in the 5G-ISA are handled at full speed to facilitate using the full dynamic range of FP16 numbers. Unlike FP32 and FP64 numbers, the FP16 operands in the 5G-ISA are not conditionally flushed to zero or treated as zero based on MXCSR settings. Except for the legacy instructions that use FP16 inputs, if an instruction uses an FP16 value as a source operand, denormal numbers are unconditionally processed. Similarly, except for the legacy instructions that produce FP16 outputs, if an instruction produces an FP16 output, denormal numbers are unconditionally produced. The legacy instructions associated with the CPUID bits F16C and AVX-512 continue to use MXCSR.DAZ and MXCSR.FTZ for their inputs and outputs respectively. Conversion instructions that use FP32 or FP64 sources continue to use MXCSR.DAZ to control denormal handling for their inputs. Conversion instructions that create FP32 or FP64 outputs continue to use MXCSR.FTZ to control denormal handling for their outputs.

Regarding decoding maps in the 5G-ISA, such as EVEX decoding maps, maps 3, 5 and 6 are used for FP16 instructions. Map 5 is for instructions that were FP32 in map 1 (0Fxx). Map 6 is for instructions that were FP32 in map 2 (0F38xx). There are some exceptions to this rule. Some things in map 1 (0Fxx) with imm8 operands predated our current conventions; those instructions moved to map 3. FP32 things in map 3 (0F3Axx) found new opcodes in map3 for FP16 because map3 is very sparsely populated. Most of the FP16 instructions share opcodes and prefix (EVEX.pp) bits with the related FP32 operations. It is envisioned that other instructions (other than just FP16) will move to maps 5 and 6 eventually. Maps 5 and 6 use 3 bits in the EVEX.mmm field (0b101, 0b110). The current public documents list the map field (EVEX.mm) as 2 bits, with the next two bits being reserved as zero. The FP16 ISA extension liberates the lower one of those 2 reserved the next bits for these new decoding maps. Map 5 and Map 6 are regular fixed length maps, like map 2 (and map 3). In regular fixed length maps, the opcode plays no role in determining the length. All instructions in map 2, 3, 5, and 6 have a MODRM byte. All instructions in map 3 also require an 8b immediate byte. The older map maps 0 and 1 are irregular variable length maps in that the overall instruction length is determined more complex logic including the opcode.

Regarding displacement scaling in the 5G-ISA, with EVEX encodings, 1-byte memory displacements are scaled based on the tuple code and vector length. Example tuples for handling the FP16 instructions are described below (e.g., tuples of FULL, FULLMEM, SCALAR, HALF, HALF-MEM, and QUARTER). In the following examples, N refers to the scale factor applied to the signed 1-byte memory displacement. The units of accessing memory are measured in bytes. The following example tuples only apply to 16b input sizes for load-type operations (or 16b output sizes for store-type operations).

FULL; If broadcasting, N=2 for FP16 inputs and N=4 for complex FP16 inputs. Otherwise N=16, 32, or 64 corresponding to the full vector length, in bytes.

FULLMEM; N=16, 32, or 64 corresponding to the full vector length, in bytes.

SCALAR; N=2 always for FP16 inputs and N=4 for complex FP16 inputs.

HALF; If broadcasting, N=2. Otherwise N=8, 16, or 32 corresponding to half the vector length, in bytes.

HALFMEM; N=8, 16, or 32 corresponding to half the vector length, in bytes.

QUARTER; If broadcasting, N=2. Otherwise N=4, 8, or 16 corresponding to one-quarter the vector length, in bytes.

Regarding rounding of denormal numbers in the 5G-ISA, IEEE-754 does not define the setting of the MXCSR.PE bit when underflow exception is unmasked. If the computation result is underflow (e.g., tiny results) and cannot be accurately represented in the destination format, the MXCSR.PE bit will be set regardless of the underflow mask status (i.e. can get underflow trap with both UE=1 and PE=1). This is different than the handling of FP32/FP64 operations in the 5G-ISA.

Regarding notation in the 5G-ISA, in the instruction encoding, the MODRM byte is represented several ways depending on the role it plays. The MODRM byte has 3 fields: 2-bit MODRM.MOD field, a 3-bit MODRM.REG field and a 3-bit MODRM.RM field. When all bits of the MODRM byte have fixed values for an instruction, the 2-hex nibble value of that byte is presented after the opcode in the encoding boxes on the instruction description pages. When only some fields of the MODRM byte must contain fixed values, those values are specified as follows. If only the MODRM.MOD must be 0b11, and MODRM.REG and MODRM.RM fields are unrestricted, this is denoted "11:rrr: bbb". The "rrr" correspond to the 3-bits of the MODRM-.REG field and the "bbb" correspond to the 3-bits of the MODMR.RM field. If the MODRM.MOD field is constrained to be a value other than 0b11—that is it must be one of 0b00, 0b01, or 0b10—then we use the notation '!(11)'. If for example only the MODRM.REG field had a specific required value, for example 0b101, that would be denoted "mm:101:bbb".

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figures 47, 48:
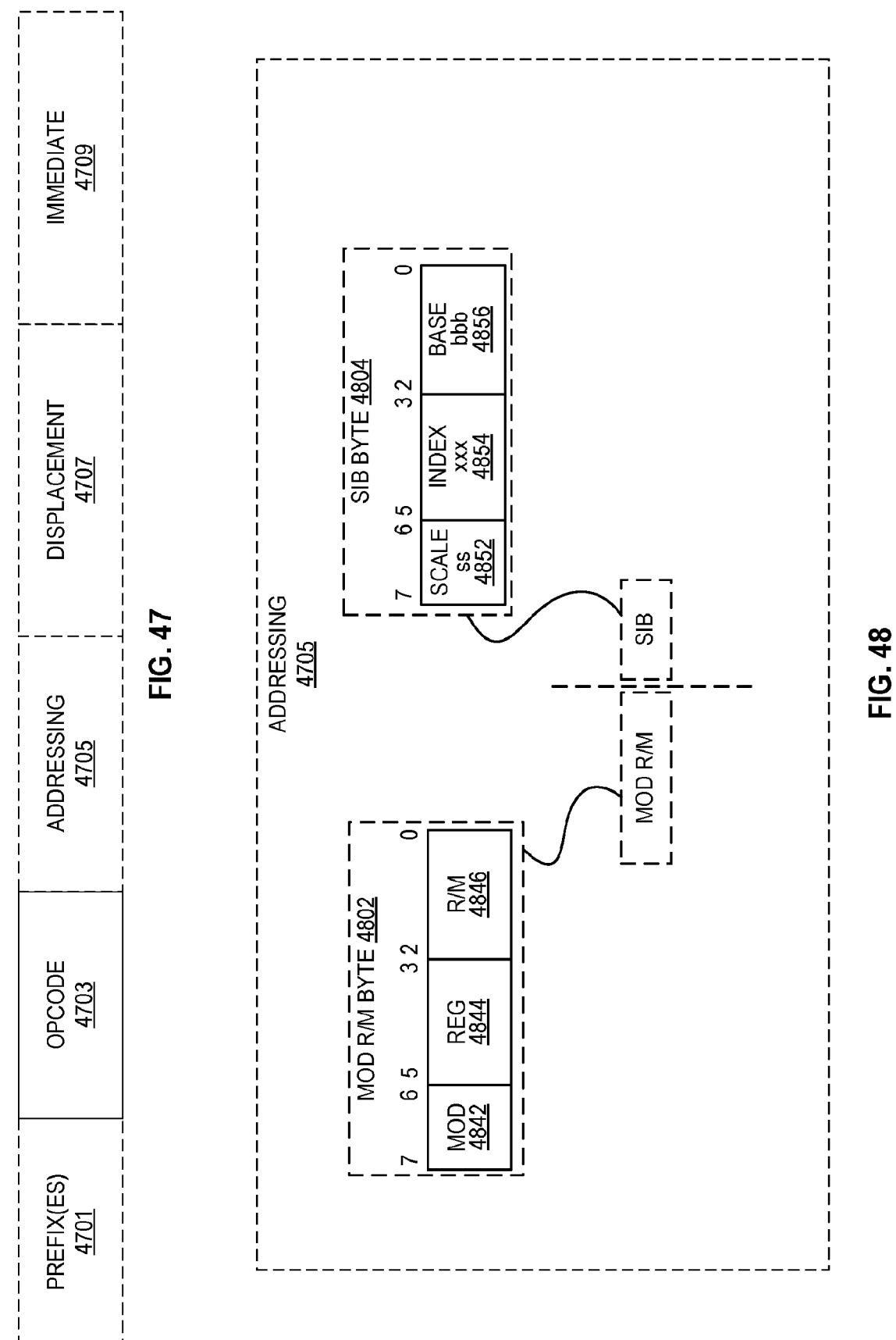
FIG. 47 illustrates embodiments of an instruction format.
FIG. 48 illustrates embodiments of an addressing field.

FIG. 47 illustrates embodiments of an instruction format. As illustrated, an instruction may include multiple components including, but not limited to, one or more fields for: one or more prefixes 4701, an opcode 4703, addressing information 4705 (e.g., register identifiers, memory addressing information, etc.), a displacement value 4707, and/or an immediate 4709. For example, one(s) of the 5G-ISA instructions as described herein may have an instruction format based on the example of FIG. 47 or portion(s) thereof. Note that some instructions utilize some or all of the fields of the format whereas others may only use the field for the opcode 4703. In some embodiments, the order illustrated is the order in which these fields are to be encoded, however, it should be appreciated that in other embodiments these fields may be encoded in a different order, combined, etc.

The prefix(es) field(s) 4701, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 4703 is used to at least partially define the operation to be performed upon a decoding of the instruction. In some embodiments, a primary opcode encoded in the opcode field 4703 is 1, 2, or 3 bytes in length. In other embodiments, a primary opcode can be a different length. An additional 3-bit opcode field is sometimes encoded in another field.

The addressing field 4705 is used to address one or more operands of the instruction, such as a location in memory or one or more registers.

FIG. 48 illustrates embodiments of the addressing field 4705 of FIG. 47. For example, the 5G-ISA instructions as described herein may have an addressing field implemented by the addressing field 4705 of FIG. 47. In this illustration, an optional ModR/M byte 4802, and an optional Scale, Index, Base (SIB) byte 4804 are shown. The ModR/M byte 4802 and the SIB byte 4804 are used to encode up to two operands of an instruction, each of which is a direct register or effective memory address. Note that each of these fields are optional in that not all instructions include one or more of these fields. The MOD R/M byte 4802 includes a MOD field 4842, a register field 4844, and R/M field 4846.

The content of the MOD field 4842 distinguishes between memory access and non-memory access modes. In some embodiments, when the MOD field 4842 has a value of b11, a register-direct addressing mode is utilized, and otherwise register-indirect addressing is used.

The register field 4844 may encode either the destination register operand or a source register operand, or may encode an opcode extension and not be used to encode any instruction operand. The content of register index field 4844, directly or through address generation, specifies the locations of a source or destination operand (either in a register or in memory). In some embodiments, the register field 4844 is supplemented with an additional bit from a prefix (e.g., prefix 4701) to allow for greater addressing.

The R/M field 4846 may be used to encode an instruction operand that references a memory address, or may be used to encode either the destination register operand or a source register operand. Note the R/M field 4846 may be combined with the MOD field 4842 to dictate an addressing mode in some embodiments.

The SIB byte 4804 includes a scale field 4852, an index field 4854, and a base field 4856 to be used in the generation of an address. The scale field 4852 indicates scaling factor. The index field 4854 specifies an index register to use. In some embodiments, the index field 4854 is supplemented with an additional bit from a prefix (e.g., prefix 4701) to allow for greater addressing. The base field 4856 specifies a base register to use. In some embodiments, the base field 4856 is supplemented with an additional bit from a prefix (e.g., prefix 4701) to allow for greater addressing. In practice, the content of the scale field 4852 allows for the scaling of the content of the index field 4854 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 4707 provides this value. Additionally, in some embodiments, a displacement factor usage is encoded in the MOD field of the addressing field 4705 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 4707.

In some embodiments, an immediate field 4709 specifies an immediate for the instruction. An immediate may be encoded as a 1-byte value, a 2-byte value, a 4-byte value, etc.

Figures 49, 50A, 50B, 50C, 50D:
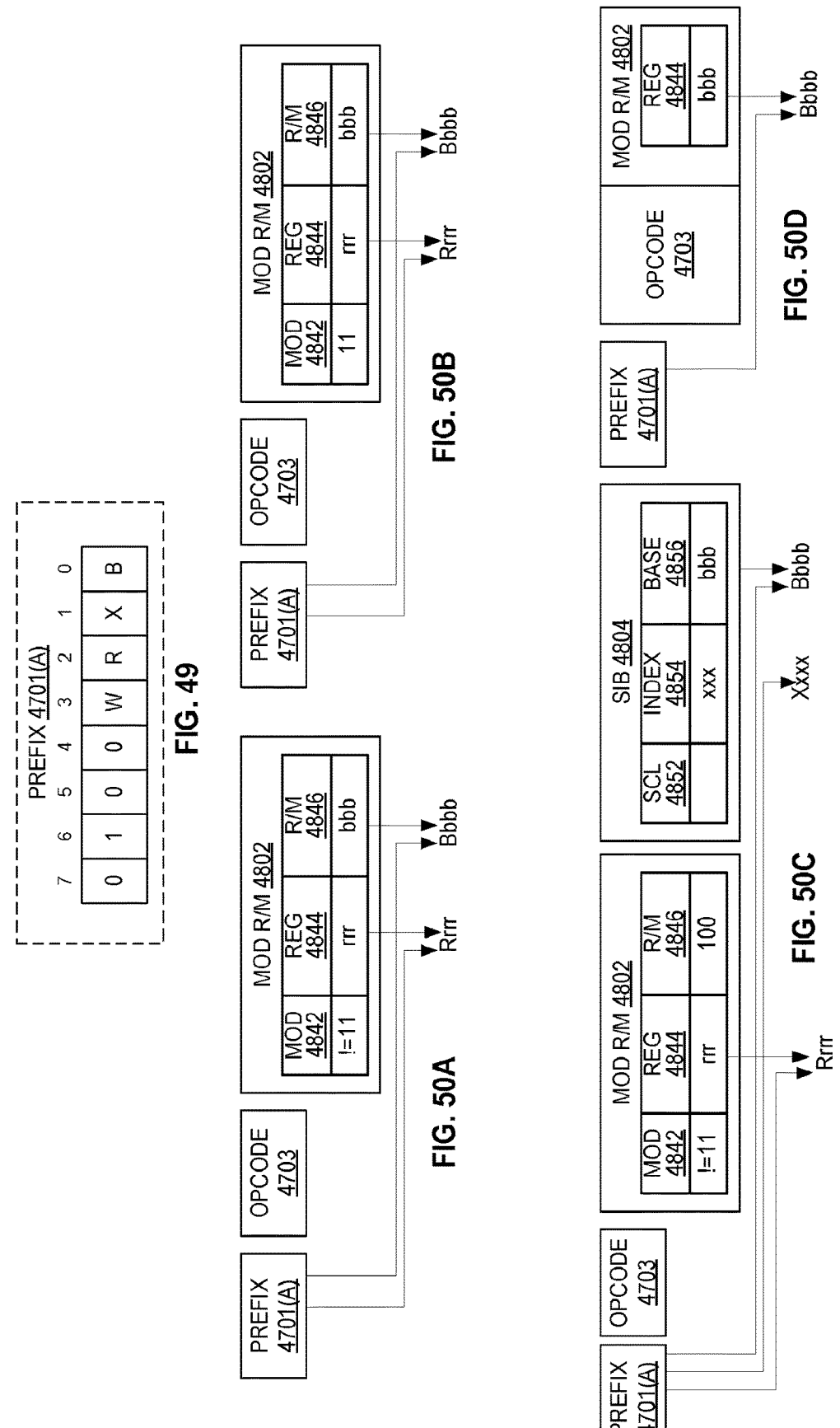
FIG. 49 illustrates embodiments of a first prefix.
FIGS. 50A-50D illustrate embodiments of example fields of the first prefix of FIG. 49.

FIG. 49 illustrates embodiments of a first prefix 4701A. In some embodiments, the first prefix 4701A is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 4701A may specify up to three registers using 3-bit fields depending on the format: 1) using the reg field 4844 and the R/M field 4846 of the Mod R/M byte 4802; 2) using the Mod R/M byte 4802 with the SIB byte 4804 including using the reg field 4844 and the base field 4856 and index field 4854; or 3) using the register field of an opcode.

In the first prefix 4701A, bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 4844 and MOD R/M R/M field 4846 alone can each only address 8 registers.

In the first prefix 4701A, bit position 2 (R) may an extension of the MOD R/M reg field 4844 and may be used to modify the ModR/M reg field 4844 when that field encodes a general purpose register, a 64-bit packed data register (e.g., an SSE register), or a control or debug register. R is ignored when Mod R/M byte 4802 specifies other registers or defines an extended opcode.

Bit position 1 (X) X bit may modify the SIB byte index field 4854.

Bit position B (B) B may modify the base in the Mod R/M R/M field 4846 or the SIB byte base field 4856; or it may modify the opcode register field used for accessing general purpose registers (e.g., general purpose registers 4625).

FIGS. 49A-49D illustrate embodiments of how the R, X, and B fields of the first prefix 4701A are used. FIG. 49A illustrates R and B from the first prefix 4701A being used to extend the reg field 4844 and R/M field 4846 of the MOD R/M byte 4802 when the SIB byte 40 04 is not used for memory addressing. FIG. 49B illustrates R and B from the first prefix 4701A being used to extend the reg field 4844 and R/M field 4846 of the MOD R/M byte 4802 when the SIB byte 40 04 is not used (register-register addressing). FIG. 49C illustrates R, X, and B from the first prefix 4701A being used to extend the reg field 4844 of the MOD R/M byte 4802 and the index field 4854 and base field 4856 when the SIB byte 40 04 being used for memory addressing. FIG. 49D illustrates B from the first prefix 4701A being used to extend the reg field 4844 of the MOD R/M byte 4802 when a register is encoded in the opcode 4703.

Figures 51A, 51B:
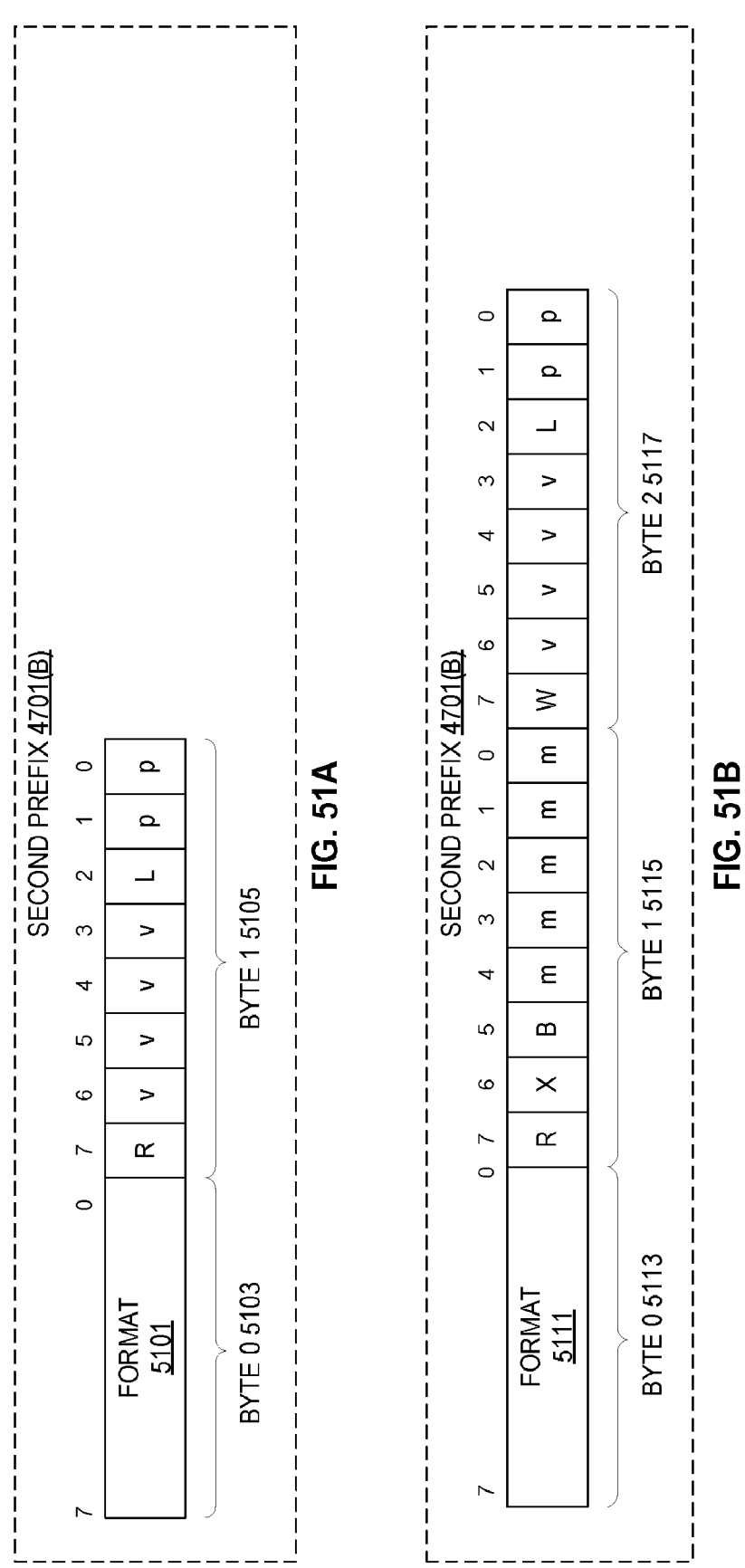
FIGS. 51A-51B illustrate embodiments of a second prefix.

FIGS. 51A-51B illustrate embodiments of a second prefix 4701B. In some embodiments, the second prefix 4701B is an embodiment of a VEX prefix. The second prefix 4701B encoding allows instructions to have more than two operands, and allows SIMD vector registers (e.g., vector/SIMD registers 4610) to be longer than 64-bits (e.g., 128-bit and 256-bit). The use of the second prefix 4701B provides for three-operand (or more) syntax. For example, previous two-operand instructions performed operations such as A=A+B, which overwrites a source operand. The use of the second prefix 4701B enables operands to perform nondestructive operations such as A=B+C.

In some embodiments, the second prefix 4701B comes in two forms—a two-byte form and a three-byte form. The two-byte second prefix 4701B is used mainly for 128-bit, scalar, and some 256-bit instructions; while the three-byte second prefix 4701B provides a compact replacement of the first prefix 4701A and 3-byte opcode instructions.

FIG. 51A illustrates embodiments of a two-byte form of the second prefix 4701B. In one example, a format field 5101 (byte 0 5103) contains the value C5H. In one example, byte 1 5105 includes a "R" value in bit[7]. This value is the complement of the same value of the first prefix 4701A. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 4846 to encode the instruction operand that references a memory address or encode either the destination register operand or a source register operand.

Instructions that use this prefix may use the Mod R/M reg field 4844 to encode either the destination register operand or a source register operand, be treated as an opcode extension and not used to encode any instruction operand.

For instruction syntax that support four operands, vvvv, the Mod R/M R/M field 4846 and the Mod R/M reg field 4844 encode three of the four operands. Bits[7:4] of the immediate 4709 are then used to encode the third source register operand.

FIG. 51B illustrates embodiments of a three-byte form of the second prefix 4701B. In one example, a format field 5111 (byte 0 5113) contains the value C4H. Byte 1 5115 includes in bits[7:5] "R," "X," and "B" which are the complements of the same values of the first prefix 4701A. Bits[4:0] of byte 1 5115 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 5117 is used similar to W of the first prefix 4701A including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

Instructions that use this prefix may use the Mod R/M R/M field 4846 to encode the instruction operand that references a memory address or encode either the destination register operand or a source register operand.

Instructions that use this prefix may use the Mod R/M reg field 4844 to encode either the destination register operand or a source register operand, be treated as an opcode extension and not used to encode any instruction operand.

For instruction syntax that support four operands, vvvv, the Mod R/M R/M field 4846, and the Mod R/M reg field 4844 encode three of the four operands. Bits[7:4] of the immediate 4709 are then used to encode the third source register operand.

Figure 52:
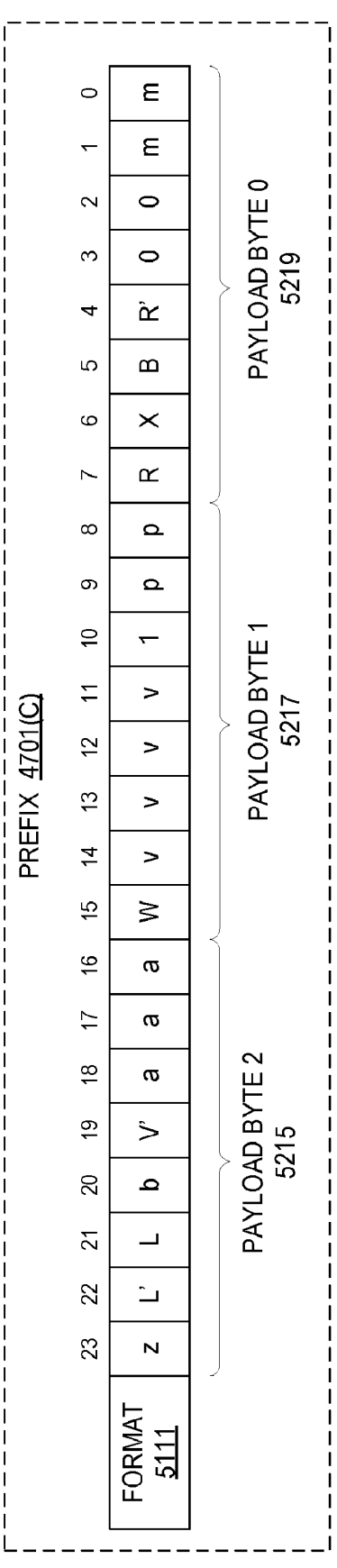
FIG. 52 illustrates embodiments of a third prefix.

FIG. 52 illustrates embodiments of a third prefix 4701C. In some embodiments, the first prefix 4701A is an embodiment of an EVEX prefix. The third prefix 4701C is a four-byte prefix.

The third prefix 4701C can encode 32 vector registers (e.g., 128-bit, 256-bit, and 512-bit registers) in 64-bit mode. In some embodiments, instructions that utilize a writemask/opmask (see discussion of registers in a previous figure, such as FIG. 46) or predication utilize this prefix. Opmask register allow for conditional processing or selection control. Opmask instructions, whose source/destination operands are opmask registers and treat the content of an opmask register as a single value, are encoded using the second prefix 4701B.

The third prefix 4701C may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.). For example, the third prefix 4701C may encode functionality that is specific to a 5G-ISA instruction class.

The first byte of the third prefix 4701C is a format field 5211 that has a value, in one example, of 62H. Subsequent bytes are referred to as payload bytes 5215-5219 and collectively form a 24-bit value of P[23:0] providing specific capability in the form of one or more fields (detailed herein).

In some embodiments, P[1:0] of payload byte 5219 are identical to the low two mmmmm bits. P[3:2] are reserved in some embodiments. Bit P[4] (R') allows access to the high 16 vector register set when combined with P[7] and the ModR/M reg field 4844. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 4844 and ModR/M R/M field 4846. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in is complement form for certain vector shifts; or 3) not encode any operand, the field is reserved and should contain a certain value, such as 1111b.

P[15] is similar to W of the first prefix 4701(A) and second prefix 4701B and may serve as an opcode extension bit or operand size promotion.

P[18:16] specify the index of a register in the opmask (writemask) registers (e.g., writemask/predicate registers 4615). In one embodiment of the disclosure, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the disclosure are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 4701C are detailed in the following tables.

TABLE 1

| 32-Register Support in 64-bit Mode | | | | | |
|------|----|---|-------------|--------------|---------------------|
| | 4 | 3 | [2:0] | REG. TYPE | COMMON USAGES |
| REG | R' | R | ModR/M reg | GPR, Vector | Destination or Source |
| VVVV | V' | | vvvv | GPR, Vector | 2nd Source or Destination |

TABLE 1-continued

| | | | | 32-Register Support in 64-bit Mode | |
| --- | --- | --- | --- | --- | --- |
| | 4 | 3 | [2:0] | REG. TYPE | COMMON USAGES |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

| | Encoding Register Specifiers in 32-bit Mode | | |
| --- | --- | --- | --- |
| | [2:0] | REG. TYPE | COMMON USAGES |
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

| | Opmask Register Specifier Encoding | | |
| --- | --- | --- | --- |
| | [2:0] | REG. TYPE | COMMON USAGES |
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices. In some disclosed examples, a processing system includes any system that has a processor, such as, for example, a DSP, a microcontroller, an ASIC, or a microprocessor.

In some disclosed examples, the program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

In some disclosed examples, such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 53:
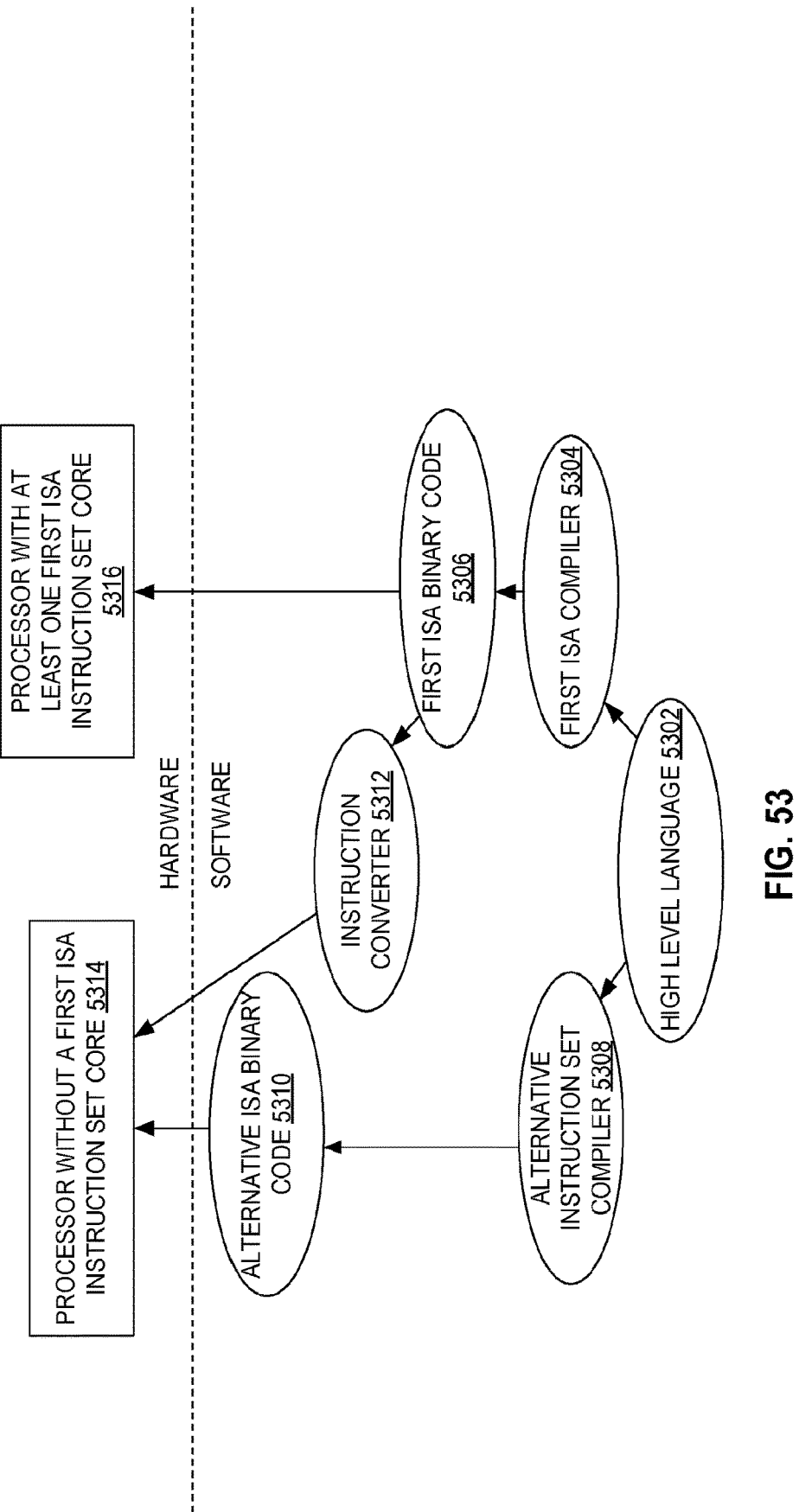
FIG. 53 illustrates a block diagram contrasting the use of a software instruction converter to convert binary instructions in a source instruction set to binary instructions in a target instruction set according to embodiments of the disclosure.

FIG. 53 illustrates a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 53 shows a program in a high level language 5302 may be compiled using a first ISA compiler 5304 to generate first ISA binary code 5306 that may be natively executed by a processor with at least one first instruction set core 5316. The processor with at least one first ISA instruction set core 5316 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 5304 represents a compiler that is operable to generate first ISA binary code 5306 (e.g., object code) that can, with or without additional linkage processing, be executed on the processor with at least one first ISA instruction set core 5316. Similarly, FIG. 53 shows the program in the high level language 5302 may be compiled using an alternative instruction set compiler 5308 to generate alternative instruction set binary code 5310 that may be natively executed by a processor without a first ISA instruction set core 5314. The instruction converter 5312 is used to convert the first ISA binary code 5306 into code that may be natively executed by the processor without a first ISA instruction set core 5314. This converted code is not likely to be the same as the alternative instruction set binary code 5310 because an instruction converter capable of this is difficult to make; however, the converted code will accomplish the general operation and be made up of instructions from the alternative instruction set. Thus, the instruction converter 5312 represents software, firmware, hardware, or a combination thereof that, through emulation, simulation or any other process, allows a processor or other electronic device that does not have a first ISA instruction set processor or core to execute the first ISA binary code 5306.

FIG. 54 is a table 5400 depicting example 5G network workloads that may benefit from the examples disclosed herein. For example, a 5G network workload, such as PF weight (e.g., block 6722 of FIG. 67), PF sort, UE selection (e.g., block 6606 of FIG. 66, block 6726 of FIG. 67, etc.), and post SINR (matrix inversion and ZF) (e.g., block 6726 of FIG. 67) may realize processing benefits by being executed with AVX-512 and/or 5G-ISA instructions as described herein. For example, the 5G-ISA instructions as described herein may include complex number arithmetic and floating-point 16 (FP16) operations. In some such examples, UE selection may use correlation operations for MU-MIMO, which requires IQ samples (e.g., complex number) arithmetic operations (e.g., multiplication, addition, subtraction, etc.). In some such examples, UE selection may computationally benefit by executing the correlation operations using one(s) of the 5G-ISA instructions that implement complex number arithmetic operations. In some examples, SINR calculations may use complex number matrix operations (e.g., multiplication and inversion), which may also computationally benefit by executing such operations using one(s) of the 5G-ISA instructions that implement complex number arithmetic operations. Advantageously, UE selection and post SINR (matrix inversion and ZF) workloads may be executed at higher frequencies and thereby processed in less time by processing such workloads using 5G-ISA instructions as described herein.

Figures 66, 67:
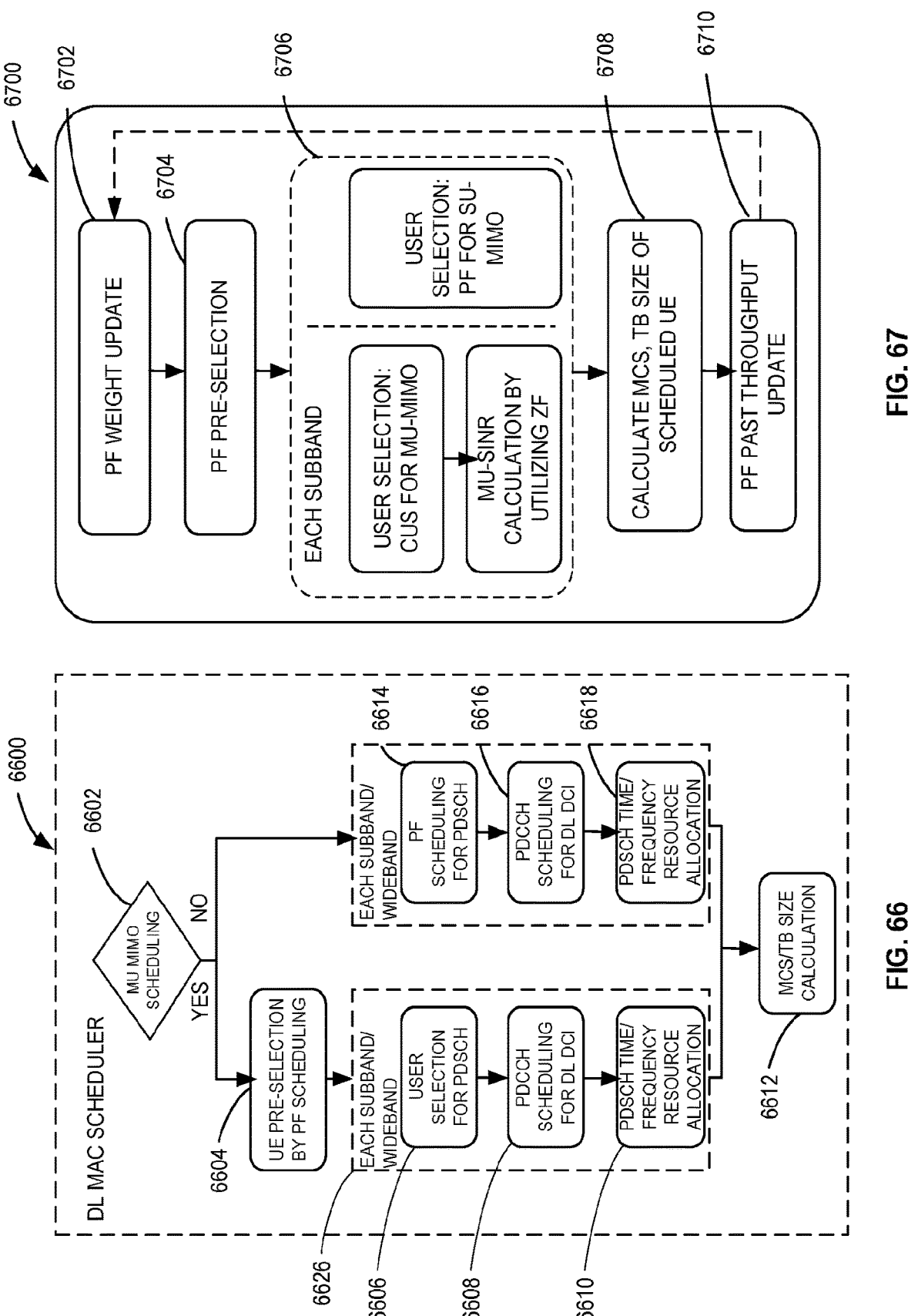
FIGS. 66-67 depict flowcharts representative of example machine readable instructions that may be executed to implement an example workload-adjustable CPU to modify operation of CPU core(s) based on a workload.
Figure 68:
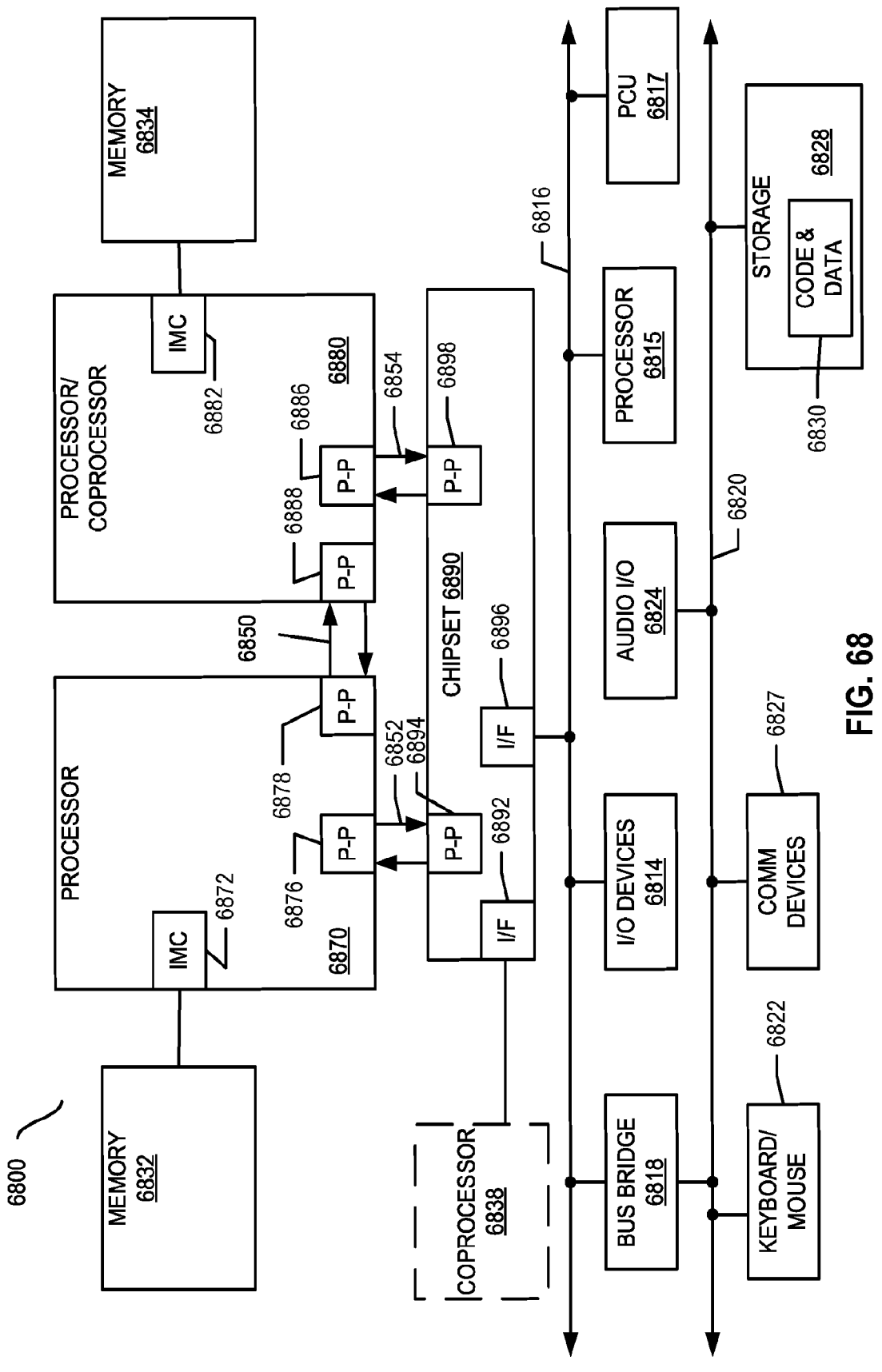
FIG. 68 illustrates examples of an exemplary system.
Figure 69:
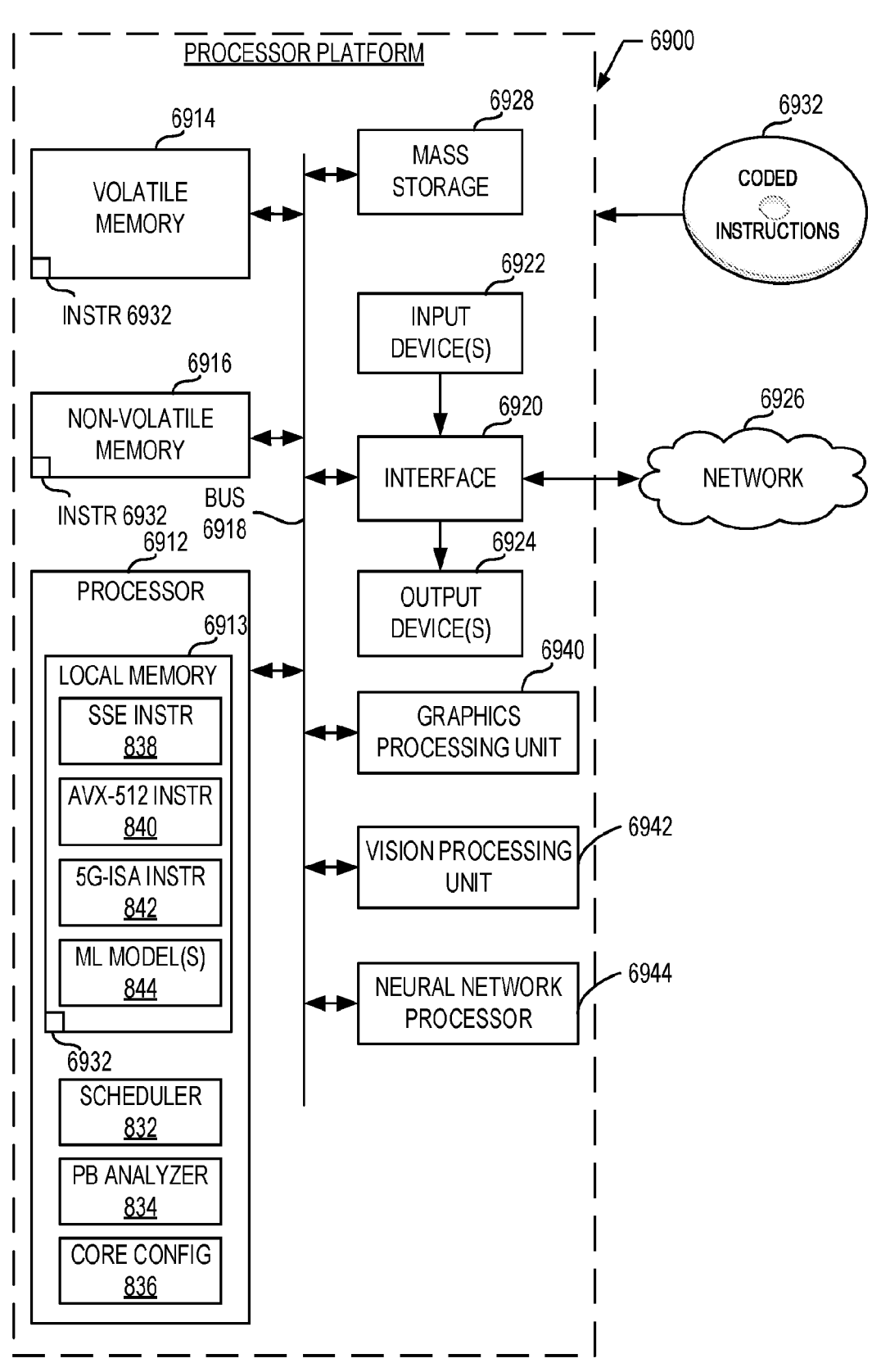
FIG. 69 is a block diagram of an example processing platform structured to execute the example machine readable instructions of FIGS. 55-67 to implement an example workload-adjustable CPU.

Data flow diagrams and/or flowcharts representative of example hardware logic, machine readable instructions, hardware implemented state machines, and/or any combination thereof for implementing the PCU 808 of FIG. 8 and/or, more generally, the processor 800 of FIG. 8, the semiconductor device 4005 of FIG. 40, the manufacturer enterprise system 4010 of FIG. 40, the customer enterprise system 4015 of FIG. 40, the first processor 6870 and/or the second processor 6880 and/or the co-processors 6815, 6838 of FIG. 68, and/or, more generally, the multiprocessor system 6800 of FIG. 68, the processor 6912 of FIGS. 69 and/or 70, and/or any other processor or system as described herein are shown in FIGS. 55-67. The machine readable instructions may be one or more executable programs or portion(s) of an executable program for execution by a computer processor and/or processor circuitry, such as the first processor 6870 and/or the second processor 6880 and/or the co-processors 6815, 6838 of FIG. 68 shown in the multiprocessor system 6800 of FIG. 68 and/or the processor 6912 shown in the example processor platform 6900 discussed below in connection with FIG. 69 and/or the system 7000 discussed below in connection with FIG. 70. The program may be embodied in software stored on a non-transitory computer readable medium such as a CD-ROM, a floppy disk, a hard drive, a DVD, a Blu-ray disk, or a memory associated with the processor 6815, 6838, 6870, 6880 of FIG. 68 and/or the processor 6912 of FIGS. 69 and/or 70, but the entire program and/or parts thereof could alternatively be executed by a device other than the processor 6815, 6838, 6870, 6880 of FIG. 68 and/or the processor 6912 of FIGS. 69 and/or 70 and/or embodied in firmware or dedicated hardware. Further, although the example program is described with reference to the data flow diagrams and/or the flowcharts illustrated in FIGS. 55-67, many other methods of implementing the PCU 808 of FIG. 8 and/or, more generally, the processor 800 of FIG. 8, the semiconductor device 4005 of FIG. 40, the manufacturer enterprise system 4010 of FIG. 40, the customer enterprise system 4015 of FIG. 40, the first processor 6870 and/or the second processor 6880 and/or the co-processors 6815, 6838 of FIG. 68, and/or, more generally, the multiprocessor system 6800 of FIG. 68, and/or the processor 6912 of FIGS. 69 and/or 70 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 55-67 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 55:
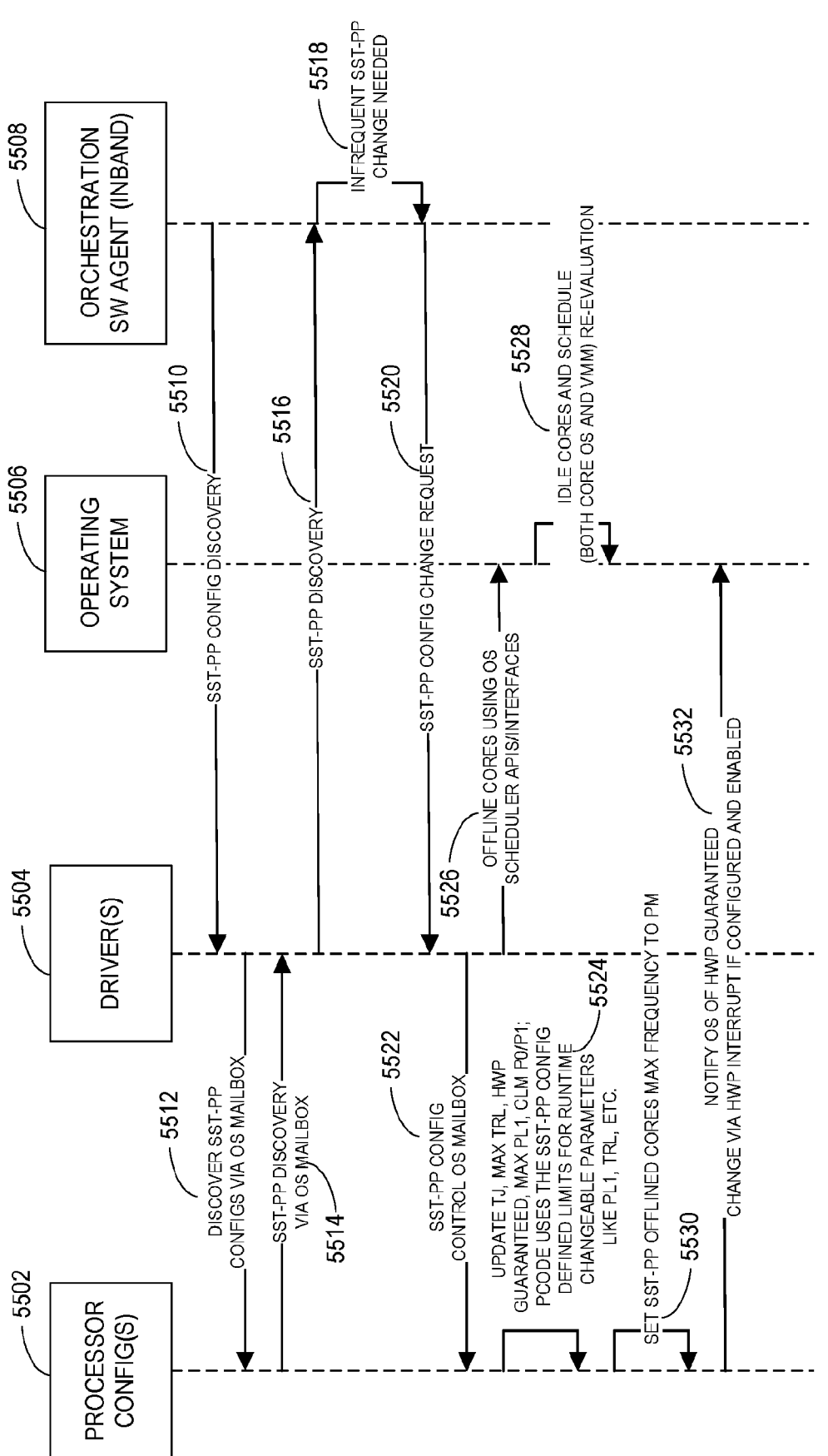
FIG. 55 is an example data flow diagram associated with an example workload-adjustable CPU.

FIG. 55 is a first example data flow diagram 5500 associated with an example workload-adjustable CPU, such as a multi-SKU CPU as described herein. For example, the first data flow diagram 5500 can correspond to actions, functions, operations, etc., implemented by the first multi-core CPU 530 of FIG. 5, the second multi-core CPU 552 of FIG. 5, the multi-core CPU 608 of FIG. 6, the processor 800, etc. In some examples, the first data flow diagram 5500 is implemented by machine readable instructions. For example, the first data flow diagram 5500 or portion(s) thereof can be implemented with a workload-adjustable CPU executing machine readable instructions. In this example, the first data flow diagram 5500 implements dynamic SST PP as provided by Intel®. Alternatively, any other technique for adjusting configuration(s) of core(s), uncore(s), CLM(s), etc., of a workload-adjustable CPU may be used.

The first data flow diagram 5500 of FIG. 55 is implemented by example processor configuration(s) 5502, example driver(s) 5504, an example operating system 5506, and an example orchestration software (SW) agent 5508. In this example, the processor configuration(s) 5502 can implement a configuration of one or more cores of a workload-adjustable CPU, and/or, more generally, of the workload-adjustable CPU. For example, the processor configuration(s) 5502 can implement the configuration(s) 835 of FIG. 8. In some such examples, the processor configuration 5502 can implement a first configuration for the first core 810A, a second configuration for the second core 810N, a third configuration for a first one of the uncore logic 822, a fourth configuration for a first one of the CLM logic 817, etc., of the processor 800.

In this example, the driver(s) 5504 can implement one or more firmware and/or software drivers. For example, the driver(s) 5504 can be implemented by the core configurator 836 of FIG. 8. In this example, the operating system 5506 can implement a computer operating system, a virtual machine manager, etc. In this example, the orchestration software agent 5508 is inband. For example, the orchestration software agent 5508 can implement a software application, a software driver, etc., that can obtain a request for a change in a core and/or processor configuration. Alternatively, the orchestration software agent 5508 may be out-of-band.

In the first data flow diagram 5500, at a first time 5510, the orchestration software agent 5508 generates a configuration discovery request to the driver(s) 5504 for configuration(s) of respective one(s) of cores and/or, more generally, a workload-adjustable CPU. At a second time 5512, the driver(s) 5504 discover the configuration(s) via OS mailbox. At a third time 5514, the processor configuration(s) 5502 are retrieved. For example, the core configurator 836 of FIG. 8 may generate a response to the OS mailbox discover request that includes the requested one(s) of the configuration(s) 835.

At a fourth time 5516, the driver(s) 5504 provides a response to the configuration discovery request from the orchestration software agent 5508. At a fifth time 5518, the orchestration software agent 5508 receives a request to change a configuration of one or more cores and/or, more generally, the workload-adjustable CPU. At a sixth time 5520, the orchestration software agent 5508 transmits a configuration change request to the driver(s) 5504. At a seventh time 5522, the driver(s) 5504 invoke configuration control via OS mailbox. At an eighth time 5524, the processor configuration(s) 5502 are changed. For example, the core configurator 836 can update a junction temperature ($T_j$), a max TRL, a guaranteed hardware P-state (HWP), a change in a CLM P-state, a change in a core P-state, etc., and/or a combination thereof. Alternatively, any other parameter of a core may be adjusted.

At a ninth time 5526, the driver(s) 5504 invoke offline cores to use OS scheduler application programming interfaces (APIs) or other interfaces. At a tenth time 5528, the operating system 5506 re-evaluates idle cores and the scheduler for the core operating system, the VMM, etc., and/or a combination thereof. At an eleventh time 5530, processor configuration(s) 5502 invoke offlined cores to have a max frequency. At a twelfth time 5532, the processor configuration(s) 5502 notify the operating system 5506 of HWP guaranteed change via an HWP interrupt if configured and enabled.

Figure 56:
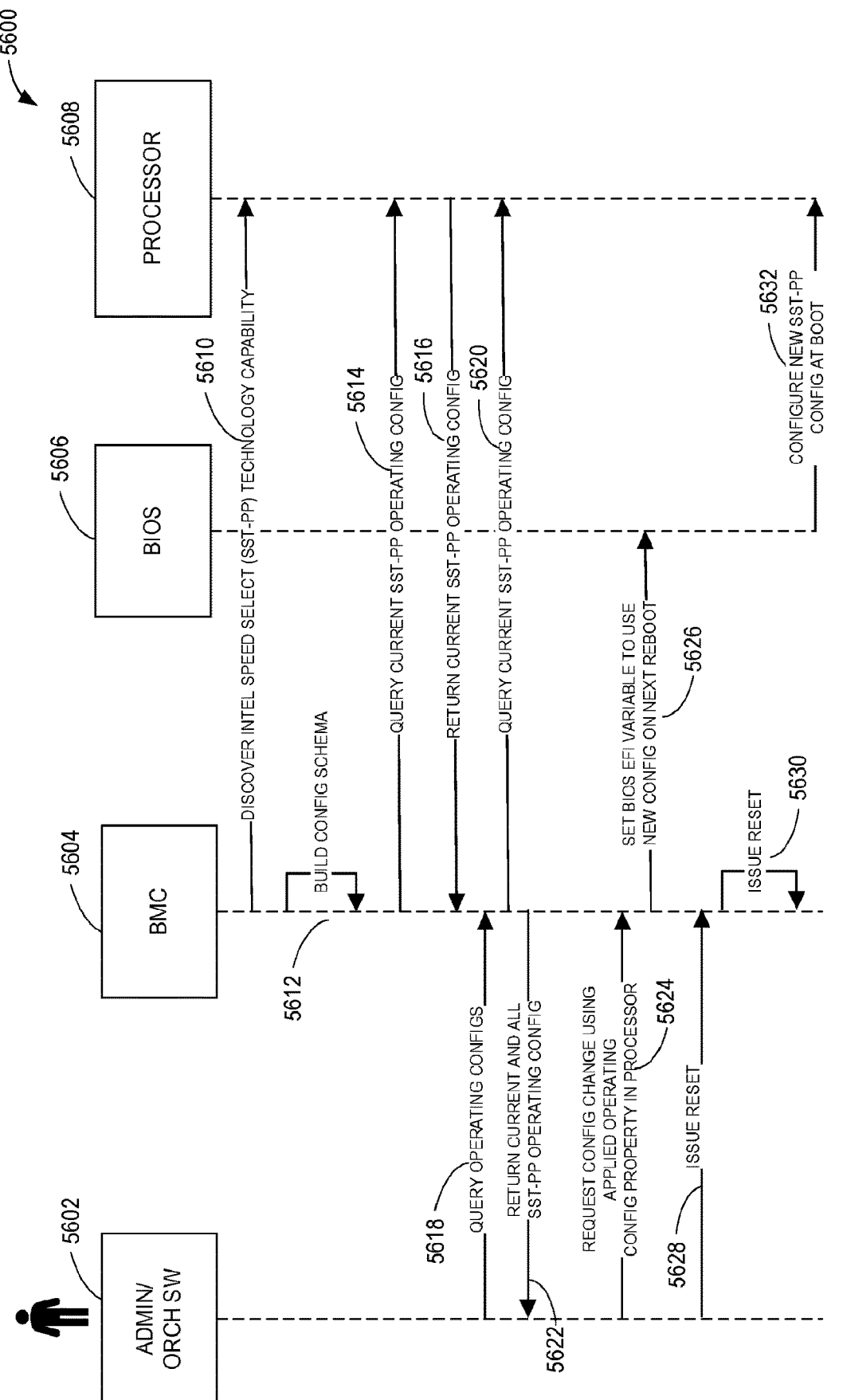
FIG. 56 is another example data flow diagram associated with an example workload-adjustable CPU.

FIG. 56 is a second example data flow diagram 5600 associated with an example workload-adjustable CPU, such as a multi-SKU CPU as described herein. For example, the second data flow diagram 5600 can correspond to actions, functions, operations, etc., implemented by the first multi-core CPU 530 of FIG. 5, the second multi-core CPU 552 of FIG. 5, the multi-core CPU 608 of FIG. 6, the processor 800 of FIG. 8, etc. In some examples, the second data flow diagram 5600 is implemented by machine readable instructions. For example, the second data flow diagram 5600 or portion(s) thereof can be implemented with a workload-adjustable CPU executing machine readable instructions. In this example, the second data flow diagram 5600 implements dynamic SST PP as provided by Intel®. Alternatively, any other technique for adjusting configuration(s) of core(s), uncore(s), CLM(s), etc., of a workload-adjustable CPU may be used.

The second data flow diagram 5600 of FIG. 56 is implemented by an example administrator and/or orchestrator software 5602, an example baseboard management controller (BMC) 5604, an example BIOS 5606, and an example processor 5608. In this example, the second data flow diagram 5600 implements out-of-band (00B) configuration control of the processor 5608. In this example, the orchestrator software 5602 can be controlled by an administrator, a computing device associated with the administrator, etc. For example, the orchestrator software 5602 can be implemented using a cloud-based architecture. In this example, the BMC 5604 is in communication with at least one of the orchestrator software 5602, the BIOS 5606, or the processor 5608. For example, the BMC 5604 and the processor 5608 can be included in a 1S (e.g., a rack-mounted server with one slot for the processor 5608) or 2S server (e.g., a rack-mounted server with two slots for the processor 5608). In such examples, the BMC 5604 can communicate with the processor 5608 or other instances of the processor 5608 included in the 1S or 2S server.

In this example, the BIOS 5606 is implemented by and/or otherwise executes on the processor 5608. In this example, the processor 5608 can implement the first multi-core CPU 530 of FIG. 5, the second multi-core CPU 552 of FIG. 5, the multi-core CPU 608 of FIG. 6, the processor 800 of FIG. 8, etc.

At a first time 5610, the BMC 5604 discovers the capability of the processor 5608 to implement configuration change on a per-core, per-uncore, per-CLM, and/or per-processor basis. At a second time 5612, the BMC 5604 builds a configuration schema, architecture, etc. At a third time 5614, the BMC 5604 queries the processor 5608 for current operating configuration(s) associated with the processor 5608. For example, the BMC 5604 can query the processor 5608 for a configuration of one(s) of cores of the processor 5608. In some such examples, the configuration(s) can implement the configuration(s) 835 of FIG. 8.

At a fourth time 5616, the processor 5608 returns the current operating configuration(s). For example, the BMC 5604 can update the configuration schema built and/or otherwise instantiated at the second time 5612. At a fifth time 5618, the administrator and/or the orchestrator software 5602 queries the BMC 5604 for the operating configuration(s) associated with the processor 5608. At a sixth time 5620, the BMC 5604 queries the processor 5608 for the current operating configurations associated with the processor 5608.

At a seventh time 5622, the BMC 5604 returns the requested configuration(s) to the administrator and/or the orchestrator software 5602. At an eighth time 5624, the administrator and/or the orchestrator software 5602 requests one or more configuration changes. At a ninth time 5626, the BMC 5604 sets one or more variables in the BIOS 5606 to use the new requested configuration changes upon reboot of the BIOS 5606, the processor 5608, etc. At a tenth time 5628, the administrator and/or the orchestrator software 5602 issues a reset of the BMC 5604. At an eleventh time 5630, the BMC 5604 issues a reset. At a twelfth time 5632, the BIOS 5606 configures the new configurations at boot of the processor 5608.

FIG. 57 is a flowchart representative of example machine readable instructions 5700 that may be executed to implement an example workload-adjustable CPU to identify a CPU as a network optimizable CPU. For example, the machine readable instructions 5700 of FIG. 57 may be executed by the first multi-core CPU 530 of FIG. 5, the second multi-core CPU 552 of FIG. 5, the multi-core CPU 608 of FIGS. 6 and/or 7, the multi-core processor 800 of FIG. 8, the multi-core processor 1002 of FIG. 10, the multi-core processor 1102 of FIG. 11, the first CPU 1210 of FIG. 12, the second CPU 1214 of FIG. 12, the third CPU 1216 of FIG. 12, the multi-core CPU 1302 of FIG. 13, the multi-core CPU 1502 of FIG. 15, the workload-adjustable CPU 3102 of FIGS. 31A-31C, the one-socket workload optimized processor 3906 of FIG. 39, the two-socket workload optimized processor 3908 of FIG. 39, the SDSi semiconductor device 4005 of FIGS. 40-41, the manufacturer enterprise system 4010 of FIGS. 40-41, the customer enterprise system 4015 of FIGS. 40-41, the processor 4300 of FIG. 43, and/or any other processor or system including programmable hardware as described herein. Alternatively, the example machine readable instructions 5700 may be executed by one or more servers, one or more semiconductor device inspection machines (e.g., electron beam inspection equipment or machines, laser inspection equipment or machines, etc.) that may be used to analyze, inspect, and/or otherwise characterize semiconductors during or after fabrication.

The example machine readable instructions 5700 of FIG. 57 begin at block 5702, at which the multi-core processor 800 selects a core of a central processing unit (CPU) to process. For example, the multi-core processor 800 may select a first core of a semiconductor die of a semiconductor wafer to process.

At block 5704, the multi-core processor 800 determines power value capabilities of the core. For example, the multi-core processor 800 may determine boundary conditions, a power profile, etc., of the core. In some such examples, the multi-core processor 800 may determine a range of operating voltages, a range of electrical currents, etc., at which the core may operate (e.g., safely operate without damaging the core or other components in circuit with the core).

At block 5706, the multi-core processor 800 determines operating frequency capabilities of the core. For example, the multi-core processor 800 may determine a range of deterministic frequencies at which the core may operate. In some such examples, the multi-core processor 800 may determine one or more application ratios that the first core 810A of FIG. 8 may support based on the power value capabilities and/or the operating frequency capabilities of the core.

At block 5708, the multi-core processor 800 may determine whether the core supports changes in application ratios and/or increased clock speed. For example, the core configurator 836 of FIG. 8 may read a value from a register (e.g., a configuration register, a core configuration register, etc.), a memory area or location, etc. Based on the value, the core configurator 836 may determine that the core can support two or more application ratios (e.g., can support a range of operating frequencies, P-states, etc.). In some such examples, the multi-core processor 800 may determine that the core may support two or more application ratios that may be advantageous to execute network workloads associated with a 5G telecommunications network.

If, at block 5708, the multi-core processor 800 determines that the core does not support changes in application ratios and/or increased clock speeds, control proceeds to block 5712 to determine whether to select another core to process. If, at block 5708, the multi-core processor 800 determines that the core supports changes in application ratios and/or increased clock speeds, then, at block 5710, the multi-core processor 800 identifies the core as a network optimizable candidate core. For example, the multi-core processor 800 may identify the core as capable of supporting multiple application ratios. In some such examples, the multi-core processor 800 may store the indication, the identification, etc., in storage (e.g., non-volatile memory, volatile memory, one or more mass storage devices, etc.).

In response to identifying the core as a network optimizable candidate core at block 5710, the multi-core processor 800 determines whether to select another core to process at block 5712. For example, the multi-core processor 800 may select a second core of the semiconductor die of the semiconductor wafer to process.

If, at block 5712, the multi-core processor 800 determines that there is another core to process, control returns to block 5702 to select another core of the CPU to process. If, at block 5712, the multi-core processor 800 determines that there is not another core to process, then, at block 5714, the multi-core processor 800 determines whether a number of cores of the CPU identified as a network optimizable candidate core satisfies a threshold. For example, the multi-core processor 800 may determine that 24 of 32 cores of a CPU have been identified as network optimizable candidate cores, which satisfies a threshold of 16 cores. Alternatively, the threshold may be any other number of cores.

If, at block 5714, the multi-core processor 800 determines that the number of cores of the CPU identified as a network optimizable candidate core does not satisfy the threshold, the example machine readable instructions 5700 of FIG. 57 conclude. If, at block 5714, the multi-core processor 800 determines that the number of cores of the CPU identified as a network optimizable candidate core satisfies the threshold, then, at block 5716, the multi-core processor 800 identifies the CPU as a network optimizable CPU. For example, the network optimizable CPU may be deployed to an MEC environment to implement a multi-core CPU as described herein. In some such examples, the network optimizable CPU may be used to implement one(s) of the DUs 122 of FIG. 1, the CUs 124 of FIG. 1, the core servers 126 of FIG. 1, etc. In some such examples, the network optimizable CPU may assign a single hard SKU that may be configured after fabrication into two or more soft SKUs, such as a first soft SKU to implement one(s) of the DUs 122, which may be used to implement a vRAN-DU.

In response to identifying the CPU as a network optimizable CPU at block 5716, the multi-core processor 800 stores network optimized configuration(s) in the CPU at block 5718. For example, the multi-core processor 800 can store one or more of the configurations 835 in the memory 837 of FIG. 8. In response to storing the network optimized configuration(s) in the CPU at block 5718, the example machine readable instructions 5700 of FIG. 57 conclude.

FIG. 58 is a flowchart representative of example machine readable instructions 5800 that may be executed to implement an example workload-adjustable CPU to utilize CPU feature(s) based on an example usage terms and activation arrangement. For example, the machine readable instructions 5800 of FIG. 58 may be executed by the first multi-core CPU 530 of FIG. 5, the second multi-core CPU 552 of FIG. 5, the multi-core CPU 608 of FIGS. 6 and/or 7, the multi-core processor 800 of FIG. 8, the multi-core processor 1002 of FIG. 10, the multi-core processor 1102 of FIG. 11, the first CPU 1210 of FIG. 12, the second CPU 1214 of FIG. 12, the third CPU 1216 of FIG. 12, the multi-core CPU 1302 of FIG. 13, the multi-core CPU 1502 of FIG. 15, the workload-adjustable CPU 3102 of FIGS. 31A-31C, the one-socket workload optimized processor 3906 of FIG. 39, the two-socket workload optimized processor 3908 of FIG. 39, the SDSi semiconductor device 4005 of FIGS. 40-41, the manufacturer enterprise system 4010 of FIGS. 40-41, the customer enterprise system 4015 of FIGS. 40-41, the processor 4300 of FIG. 43, and/or any other processor or system including programmable hardware as described herein.

At block 5802, an order (e.g., a request, a contract, an agreement, etc.) for optimized workload feature(s) of processor(s) based on a usage terms and activation arrangement is established. For example, the manufacturer enterprise system 4010 can obtain an order from the customer enterprise system 4015 of FIG. 40 that includes a request to activate one or more software defined silicon features of the SDSi semiconductor device 4005 of FIG. 40 via a network (e.g., a wireless network). For example, the manufacturing of a CPU may enable the integration or configuration of a CPU workload optimization using software defined silicon. This may include a soft SKU mechanism on top of manufacturing settings and verification—such as to enable, unlock, verify, or modify a configuration consistent with manufacturing settings. In some examples, the manufacturer enterprise system 4010 can activate one or more software defined silicon features of the SDSi semiconductor device 4005.

At block 5804, the manufacturer enterprise system 4010 determines whether to activate a workload feature to control the frequency of compute core(s) on a per-core basis. For example, the manufacturer enterprise system 4010 can determine that the order includes a request to enable the PCU 808 of FIG. 8 to control the configuration(s) 835 of the cores 810A-810N of FIG. 8 on a per-core basis. In some such examples, the configuration(s) 835 can include change(s) to a guaranteed operating frequency of one(s) of the cores 810-810N.

If, at block 5804, the manufacturer enterprise system 4010 determines not to activate the workload feature to control the frequency of the compute core(s) on a per-core basis, control proceeds to block 5808 to determine whether to activate a workload feature to control a frequency of uncore(s) on a per-uncore basis. If, at block 5804, the manufacturer enterprise system 4010 determines to activate the workload feature to control the frequency of the compute core(s) on a per-core basis, then, at block 5806, the manufacturer enterprise system 4010 generates a license for the processor(s) to activate per-core control. For example, the SDSi feature management service 4156 of FIG. 41 can generate a first license to activate the SDSi feature as requested in the order.

In response to generating the license for the processor(s) to activate per-core control at block 5806, at block 5808, the manufacturer enterprise system 4010 determines whether to activate a workload feature to control the frequency of uncore(s) on a per-core basis. For example, the manufacturer enterprise system 4010 can determine that the order includes a request to enable the PCU 808 to control the configuration(s) 835 of instances of the uncore logic 822 of FIG. 8 on a per-uncore basis. In some such examples, the configuration(s) 835 can include change(s) to a guaranteed operating frequency of at least one(s) of the CMS 816, the mesh interface 824, or the I/O 826 of FIG. 8.

If, at block 5808, the manufacturer enterprise system 4010 determines not to activate the workload feature to control the frequency of the uncore(s) on a per-uncore basis, control proceeds to block 5812 to determine whether to activate a workload feature to control a frequency of CLM(s) on a per-CLM basis. If, at block 5808, the manufacturer enterprise system 4010 determines to activate the workload feature to control the frequency of the uncore(s) on a per-uncore basis, then, at block 5810, the manufacturer enterprise system 4010 generates a license for the processor(s) to activate per-uncore control. For example, the SDSi feature management service 4156 can generate a second license to activate the SDSi feature as requested in the order. Alternatively, the SDSi feature management service 4156 may update the first license to include the SDSi feature of per-uncore control.

In response to generating the license for the processor(s) to activate per-uncore control at block 5810, at block 5812, the manufacturer enterprise system 4010 determines whether to activate a workload feature to control the frequency of CLM(s) on a per-CLM basis. For example, the manufacturer enterprise system 4010 can determine that the order includes a request to enable the PCU 808 to control the configuration(s) 835 of instances of the CLM logic 817 of FIG. 8 on a per-CLM basis. In some such examples, the configuration(s) 835 can include change(s) to a guaranteed operating frequency of at least one(s) of the LLC 814, the CMS 816, the CHA 812, or the I/O buffer 818 of FIG. 8.

If, at block 5812, the manufacturer enterprise system 4010 determines not to activate the workload feature to control the frequency of the CLM(s) on a per-CLM basis, control proceeds to block 5816 manage CPU feature activation(s). If, at block 5812, the manufacturer enterprise system 4010 determines to activate the workload feature to control the frequency of the CLM(s) on a per-CLM basis, then, at block 5814, the manufacturer enterprise system 4010 generates a license for the processor(s) to activate per-CLM control. For example, the SDSi feature management service 4156 can generate a third license to activate the SDSi feature as requested in the order. Alternatively, the SDSi feature management service 4156 may update the first license to include the SDSi feature of per-CLM control.

In response to generating the license for the processor(s) to activate per-CLM control at block 5814, at block 5816, management of the CPU feature activation is executed. For example, additional operations may be conducted at block 5816 to perform management (e.g., reporting, logging, reconciliation, etc.) of the workload feature(s), and establish usage terms. For example, this may include the SDSi feature management service 4156 executing licensing operations that correspond to the type of optimization provided, the type of control (e.g., per-core control, per-uncore control, per-CLM control, etc.) activated, and/or contractual provisions for the particular customer, manufacturer, or third party managing entity.

At block 5816, in response to successful activation and management, a multi-SKU CPU, such as the SDSi semiconductor device 4005, can utilize CPU feature(s) based on the usage terms and activation arrangement (e.g., according to the defined usage terms) to effectuate optimized execution of network workloads as described herein. In response to utilizing the CPU feature(s) at block 5818, the example machine readable instructions 5800 of FIG. 58 conclude.

FIG. 59 is a flowchart representative of example machine readable instructions 5900 that may be executed to implement an example workload-adjustable CPU to modify an operation of CPU core(s) based on a workload. For example, the machine readable instructions 5900 of FIG. 59 may be executed by the first multi-core CPU 530 of FIG. 5, the second multi-core CPU 552 of FIG. 5, the multi-core CPU 608 of FIGS. 6 and/or 7, the multi-core processor 800 of FIG. 8, the multi-core processor 1002 of FIG. 10, the multi-core processor 1102 of FIG. 11, the first CPU 1210 of FIG. 12, the second CPU 1214 of FIG. 12, the third CPU 1216 of FIG. 12, the multi-core CPU 1302 of FIG. 13, the multi-core CPU 1502 of FIG. 15, the workload-adjustable CPU 3102 of FIGS. 31A-31C, the one-socket workload optimized processor 3906 of FIG. 39, the two-socket workload optimized processor 3908 of FIG. 39, the SDSi semiconductor device 4005 of FIGS. 40-41, the manufacturer enterprise system 4010 of FIGS. 40-41, the customer enterprise system 4015 of FIGS. 40-41, the processor 4300 of FIG. 43, and/or any other processor or system including programmable hardware as described herein.

The machine readable instructions 5900 of FIG. 59 begin at block 5902, at which the multi-core processor 800 determines whether central processing unit (CPU) core(s) support(s) network optimized workloads. For example, the core configurator 836 of FIG. 8 and/or, more generally, the PCU 808 of FIG. 8, may determine whether the first core 810A, the second core 810N, etc., of FIG. 8 support the execution of network optimized workloads, such as the first network workloads 542, the second network workloads 544, and/or the third network workloads 546 of FIG. 5. In some such examples, the core configurator 836 may read a value from a register (e.g., a configuration register, a core configuration register, etc.), a memory area or location, etc., of the processor 800. Based on the value, the core configurator 836 may determine that the first core 810A can support two or more application ratios (e.g., can support a range of operating frequencies, P-states, etc.). In some such examples, the core configurator 836 may determine that the first core 810A can be invoked to operate in different core configurations based on one of two or more application ratios.

If, at block 5902, the multi-core processor 800 determines that the CPU core(s) do not support network optimized workloads, then, at block 5904, the multi-core processor 800 operates the CPU core(s) in regular mode. For example, the core configurator 836 can instruct the first core 810A to operate at a base or baseline voltage and/or operating frequency. In response to operating the CPU core(s) in regular mode at block 5904, control proceeds to block 5916 to determine whether there is another network workload to process.

If, at block 5902, the multi-core processor 800 determines that one(s) of the CPU core(s) support network optimized workloads, control proceeds to block 5906 to identify core(s) of the CPU to execute the network workload(s). For example, an application (e.g., a computing application, a software application, etc.) may execute an application function (e.g., a telecommunication function, a 5G function, etc.) and the scheduler 832 of FIG. 8 can determine that the application function requires one or more network workloads to be completed to execute the application function. In some such examples, the scheduler 832 can identify the first core 810A and the second core 810N (or a different number or one(s) of the cores 810A-810N) to execute the one or more network workloads. For example, the scheduler 832 can identify the first core 810A to execute a first one of the AVX-512 instructions 840 of FIG. 8 and the second core 810N to execute a second one of the 5G-ISA instructions 842 of FIG. 8.

At block 5908, the multi-core processor 800 loads an instruction set on the identified core(s). For example, the scheduler 832 can invoke the first core 810A to load the first one of the AVX-512 instructions 840 and the second core 810N to load the second one of the 5G-ISA instructions 842.

At block 5910, the multi-core processor 800 determines whether a power budget is available to execute the network workload(s) in an increased performance state. For example, the first core 810A may interface with the power budget analyzer 834 of FIG. 8 in response to loading the first one of the AVX-512 instructions 840. In some such examples, the first core 810A may transmit data, such as a type of the loaded instruction (e.g., an SSE instruction, an AVX-512 instruction, a 5G-ISA instruction, etc.), an identifier of the first core 810A, configuration information (e.g., a P-state, an operating voltage, an operating frequency, etc.) of the first core 810A, etc., and/or a combination thereof to the power budget analyzer 834 and/or, more generally, the PCU 808 of FIG. 8. In some such examples, the power budget analyzer 834 may compare a first power consumption of the multi-core processor 800 without the first core 810A operating in an increased performance state (e.g., operating at a higher operating voltage and frequency) and a second power consumption of the multi-core processor 800 with the first core 810A operating in the increased performance state. In some examples, the power budget analyzer 834 executes the machine-learning model(s) 844 using at least one of the type of the loaded instruction, the identifier of the first core 810A, the configuration information, the first power consumption value, or the second power consumption value to determine whether the first core 810A may operate in the increased performance state without violating the TDP or any other requirement (e.g., a latency requirement, a throughput requirement, etc.) of the first core 810A and/or, more generally, the processor 800.

In some examples, the power budget analyzer 834 compares the second power consumption to a threshold (e.g., a power budget threshold, a TDP threshold, etc.). The power budget analyzer 834 may not grant a license to the first core 810A to operate in the increased performance state if the threshold is exceeded and/or otherwise satisfied. The power budget analyzer 834 may grant the license to the first core 810A to operate in the increased performance state if the threshold is not exceeded and/or otherwise not satisfied.

If, at block 5910, the multi-core processor 800 determines that there is not enough power budget available to execute the network workload(s) in the increased performance state, control proceeds to block 5916 to determine whether there is another network load to process. For example, the power budget analyzer 834 may determine that the increase in the performance state of the first core 810A causes the power budget to be exceeded and thereby the threshold is satisfied. In some examples, the power budget analyzer 834 may determine that the increase in the performance state of the first core 810A causes the power budget to be exceeded based on output(s) from the machine-learning model(s) 844.

If, at block 5910, the multi-core processor 800 determines that there is enough power budget available to execute the network workload(s) in the increased performance state, then, at block 5912, the multi-core processor 800 implements network workload optimizations for the identified core(s) and/or corresponding uncore(s) based on the instruction set. For example, the power budget analyzer 834 may determine that the increase in the performance state of the first core 810A does not cause the power budget to be exceeded and thereby the threshold is not satisfied. In some such examples, the core configurator 836 may invoke the power gates 804 of FIG. 8 to deliver increased voltage to the first core 810A and/or may invoke the execution unit 802 to operate the first core 810A with an increased deterministic frequency. In some examples, the core configurator 836 may operate the first instance of the uncore logic 822 that corresponds to the first core 810A with an increased deterministic frequency to improve throughput and/or reduce latency. In some examples, the core configurator 836 may execute the machine-learning model(s) 844 to determine a value of the increased deterministic frequency based on input(s) as described above.

At block 5914, the multi-core processor 800 operates the CPU core(s) and/or uncore(s) to execute the network workload(s) in the increased performance state. For example, the first core 810A may execute the first one of the AVX-512 instructions 840 and the second core 810N may execute the second one of the 5G-ISA instructions 842 in the increased performance state. In some examples, the core configurator 836 may operate the first instance of the uncore logic 822 that corresponds to the first core 810A and/or the second instance of the uncore logic 822 that corresponds to the second core 810N with an increased deterministic frequency to improve throughput and/or reduce latency.

At block 5916, the multi-core processor 800 determines whether there is another workload to process. For example, the scheduler 832 may determine whether the application has another network function to execute. If, at block 5916, the multi-core processor 800 determines that there is another network workload to process, control returns to block 5902 to determine whether the CPU core(s) support(s) network optimized workloads, otherwise the example machine readable instructions 5900 of FIG. 59 conclude.

Figure 60:
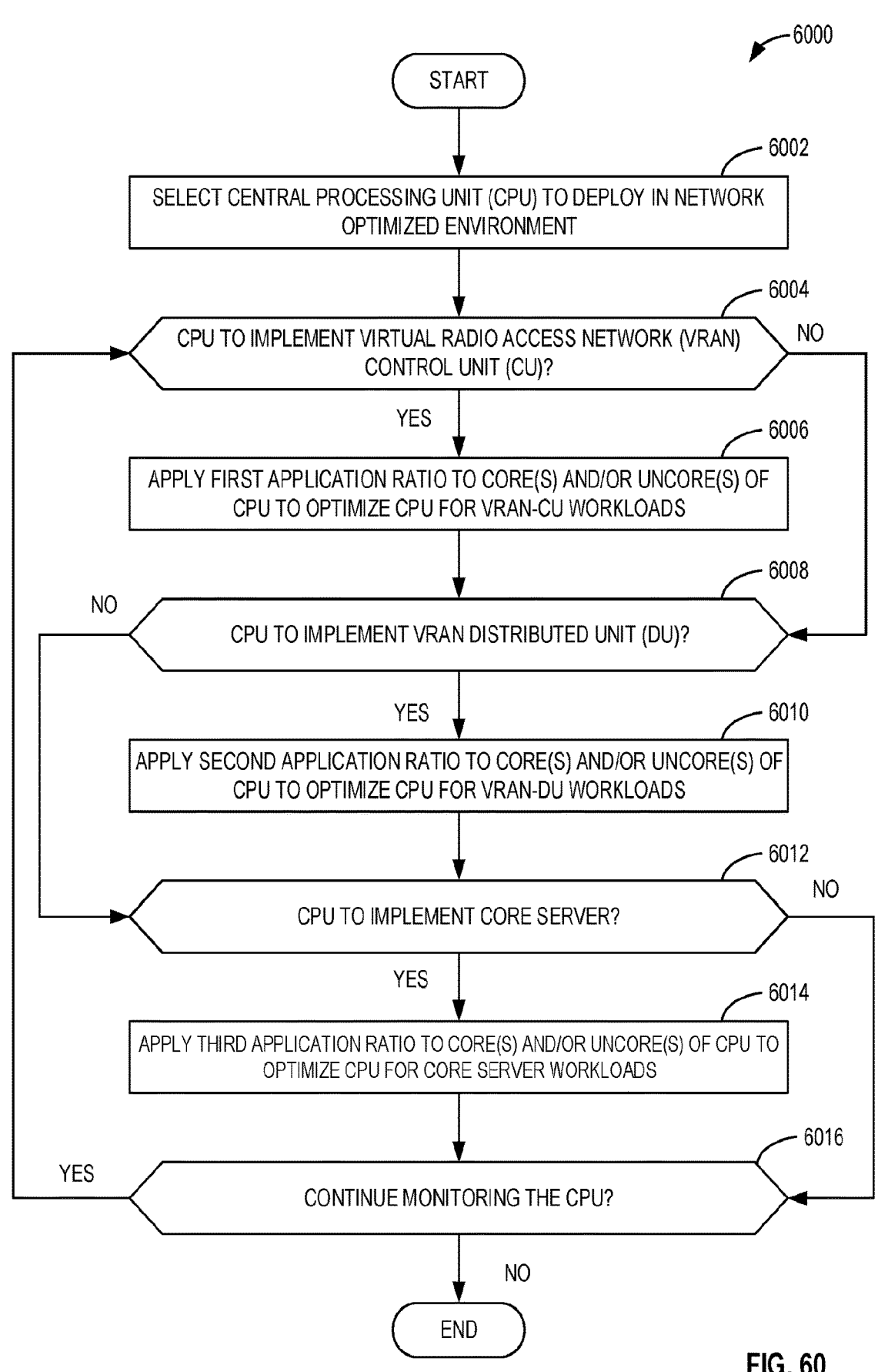
FIG. 60 is a flowchart representative of example machine readable instructions that may be executed to implement an example workload-adjustable CPU to modify operation of CPU core(s) based on an application ratio.

FIG. 60 is a flowchart representative of example machine readable instructions 6000 that may be executed to implement an example workload-adjustable CPU to modify an operation of CPU core(s) based on a workload. For example, the machine readable instructions 6000 of FIG. 60 may be executed by the first multi-core CPU 530 of FIG. 5, the second multi-core CPU 552 of FIG. 5, the multi-core CPU 608 of FIGS. 6 and/or 7, the multi-core processor 800 of FIG. 8, the multi-core processor 1002 of FIG. 10, the multi-core processor 1102 of FIG. 11, the first CPU 1210 of FIG. 12, the second CPU 1214 of FIG. 12, the third CPU 1216 of FIG. 12, the multi-core CPU 1302 of FIG. 13, the multi-core CPU 1502 of FIG. 15, the workload-adjustable CPU 3102 of FIGS. 31A-31C, the one-socket workload optimized processor 3906 of FIG. 39, the two-socket workload optimized processor 3908 of FIG. 39, the SDSi semiconductor device 4005 of FIGS. 40-41, the manufacturer enterprise system 4010 of FIGS. 40-41, the customer enterprise system 4015 of FIGS. 40-41, the processor 4300 of FIG. 43, and/or any other processor or system including programmable hardware as described herein.

The example machine readable instructions 6000 of FIG. 60 begin at block 6002, at which a central processing unit (CPU) is selected to deploy in a network optimized environment. For example, the processor 800 may be selected to deploy in the first multi-core computing environment 100 of FIG. 1. At block 6004, the processor 800 determines whether the processor 800 is to implement a virtual radio access network (vRAN) centralized unit (CU). For example, the processor 800 may determine that the processor 800 is to implement the vRAN-CU based on CU workloads the processor 800 is to process. In some examples, the scheduler 832 of FIG. 8 can execute the machine-learning model(s) 844 to determine that the processor 800 is to implement the vRAN-CU based on providing the CU workloads as inputs to the machine-learning model(s) 844 of FIG. 8 and receiving an identification of the vRAN-CU as an output from the machine-learning model(s) 844.

If, at block 6004, the processor 800 determines that the CPU is not to implement a vRAN-CU, control proceeds to block 6008 to determine whether the CPU is to implement a vRAN distributed unit (DU). If, at block 6004, the processor 800 determines that the CPU is to implement a vRAN-CU, then, at block 6006, the processor 800 is to apply a first application ratio to one(s) of the cores 810A-810N and/or uncore(s) 822 of the processor 800 to optimize the processor 800 for vRAN-CU workloads. For example, one(s) of the cores 810A-810N may be configured on a per-core basis with a first operating frequency based on a first core application ratio of 0.74 and/or corresponding one(s) of the uncore logic 822 may be configured on a per-uncore basis with a second operating frequency based on a first uncore application ratio of 1.5.

At block 6008, the processor 800 determines whether to implement a vRAN-DU. For example, the processor 800 may determine that the processor 800 is to implement the vRAN-DU based on one(s) of the network workloads 542, 544, 546 of FIG. 5 that the processor 800 is to process. In some examples, the scheduler 832 can execute the machine-learning model(s) 844 to determine that the processor 800 is to implement the vRAN-DU based on providing the DU workloads as inputs to the machine-learning model(s) 844 and receiving an identification of the vRAN-DU as an output from the machine-learning model(s) 844.

If, at block 6008, the processor 800 determines that the processor 800 is not to implement a vRAN-DU, control proceeds to block 6012 to determine whether the processor 800 is to implement a core server. If, at block 6008, the processor 800 determines that the processor 800 is to implement a vRAN-DU, then, at block 6010, the processor

800 is to apply a second application ratio to one(s) of the cores 810A-810N and/or uncore(s) 822 of the processor 800 to optimize the processor 800 for vRAN-DU workloads. For example, one(s) of the cores 810A-810N may be configured on a per-core basis with a second operating frequency based on a second core application ratio of 0.65 and corresponding one(s) of the uncore logic 822 may be configured on a per-uncore basis with a second operating frequency based on a second uncore application ratio of 1.0.

At block 6012, the processor 800 determines whether to implement a core server. For example, the processor 800 may determine that the processor 800 is to implement the core server based on one(s) of the third network workloads 542 of FIG. 5 the processor 800 is to process. In some examples, the scheduler 832 can execute the machine-learning model(s) 844 to determine that the processor 800 is to implement the core server based on providing the core server workloads as inputs to the machine-learning model(s) 844 and receiving an identification of the core server as an output from the machine-learning model(s) 844.

If, at block 6012, the processor 800 determines that the processor 800 is not to implement a core server, the example machine readable instructions 6000 of FIG. 60 conclude. If, at block 6012, the processor 800 determines that the processor 800 is to implement a core server, then, at block 6014, the processor 800 is to apply a third application ratio to one(s) of the cores 810A-810N and/or uncore(s) 822 of the processor 800 to optimize the processor 800 for core server workloads. For example, one(s) of the cores 810A-810N may be configured on a per-core basis with a third operating frequency based on a third core application ratio of 1.0 and corresponding one(s) of the uncore logic 822 may be configured on a per-uncore basis with a third operating frequency based on a third uncore application ratio of 1.0. In response to applying the application ratio to one(s) of the cores 810A-810N of the processor 800 to optimize the processor 800 for core server workloads at block 6014, the processor 800 determines whether to continue monitoring the CPU at block 6016. For example, the processor 800 may obtain a request to implement a different configuration (e.g., a vRAN-CU, a vRAN-DU, a core server, etc.). If, at block 6016, the processor 800 determines to continue monitoring the CPU, control returns to block 6004 to determine whether the CPU is to implement a vRAN-CU, otherwise the example machine readable instructions 6000 of FIG. 60 conclude.

Figure 61:
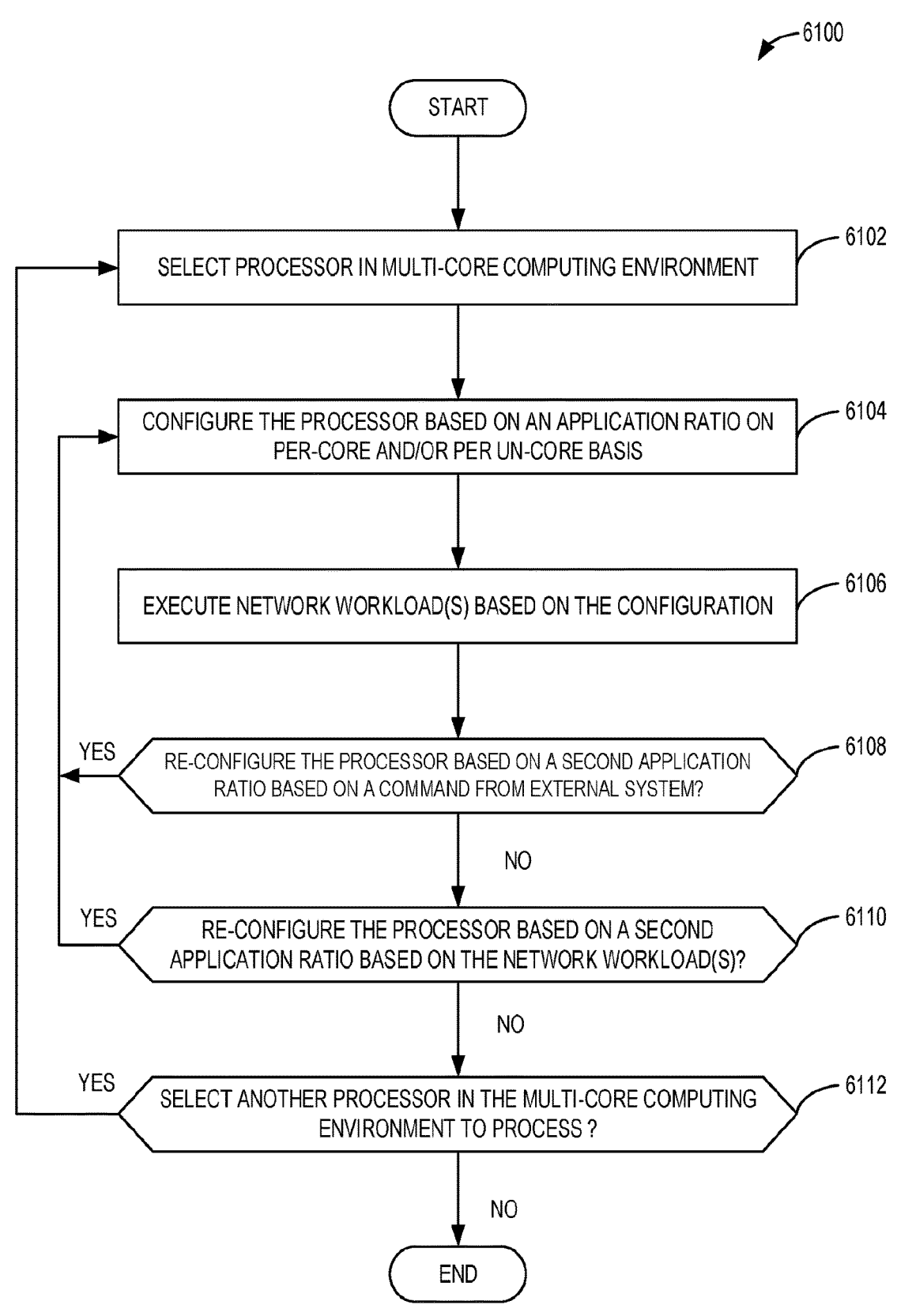
FIG. 61 is another flowchart representative of example machine readable instructions that may be executed to implement an example workload-adjustable CPU to modify operation of CPU core(s) based on an application ratio.

FIG. 61 is a flowchart representative of example machine readable instructions 6100 that may be executed to implement an example workload-adjustable CPU to modify an operation of CPU core(s) based on a workload. For example, the machine readable instructions 6100 of FIG. 61 may be executed by the first multi-core CPU 530 of FIG. 5, the second multi-core CPU 552 of FIG. 5, the multi-core CPU 608 of FIGS. 6 and/or 7, the multi-core processor 800 of FIG. 8, the multi-core processor 1002 of FIG. 10, the multi-core processor 1102 of FIG. 11, the first CPU 1210 of FIG. 12, the second CPU 1214 of FIG. 12, the third CPU 1216 of FIG. 12, the multi-core CPU 1302 of FIG. 13, the multi-core CPU 1502 of FIG. 15, the workload-adjustable CPU 3102 of FIGS. 31A-31C, the one-socket workload optimized processor 3906 of FIG. 39, the two-socket workload optimized processor 3908 of FIG. 39, the SDSi semiconductor device 4005 of FIGS. 40-41, the manufacturer enterprise system 4010 of FIGS. 40-41, the customer enterprise system 4015 of FIGS. 40-41, the processor 4300 of FIG. 43, and/or any other processor or system including programmable hardware as described herein.

The example machine readable instructions 6120 of FIG. 61 begin at block 6102, at which a central processing unit (CPU) is selected in a multi-core computing environment. For example, an instance of the processor 800 in the first multi-core computing environment 100 of FIG. 1 may be selected.

At block 6104, the processor 800 configures the processor 800 based on an application ratio on a per-core and/or per-uncore basis. For example, the processor 800 can configure one(s) of the cores 810A-810N of FIG. 8 on a per-core basis with a first operating frequency based on a core application ratio of 0.74 and/or corresponding one(s) of the uncore logic 822 on a per-uncore basis with a second operating frequency based on a first uncore application ratio of 1.5. In some such examples, the processor 800 can be configured to implement a vRAN-DU.

At block 6106, the processor 800 executes network workload(s) based on the configuration. For example, the cores 810A-810N can execute the first workloads 542, the second workloads 544, and/or the third workloads 546 of FIG. 5.

At block 6108, the processor 800 determines whether to re-configure the processor 800 based on a second application ratio based on a command from an external system. For example, the customer enterprise system 4015 as described above in connection with FIGS. 40-42 can request a license from the manufacturer enterprise system 4010 of FIGS. 40-41 to operate the processor 800 based on the second application ratio. In some examples, a user in connection with the customer enterprise system 4015 of FIGS. 40-41 can transmit a request (e.g., via an OS mailbox command as described above in connection with FIGS. 55 and/or 56) to re-configure the processor 800 based on the second application ratio.

If, at block 6108, the processor 800 determines to re-configure the processor 800 based on the second application ratio based on the command from the external system, control returns to block 6104 to configure the processor 800 based on the second application ratio on a per-core basis. If, at block 6108, the processor 800 determines not to re-configure the processor 800 based on the second application ratio based on the command from the external system, then, at block 6110, the processor 800 determines whether to re-configure the processor 800 based on the second application ratio based on the network workload(s). For example, the processor 800 can generate an output from the machine-learning model(s) 844 of FIG. 8 using data associated with the network workload(s) as input(s). In some such examples, the processor 800 can invoke the machine-learning model(s) 844 to generate an output that indicates that a different application ratio may be used to execute the network work-load(s) in a more optimized and/or otherwise improved manner, such as by increasing throughput and/or reducing latency when executing the first workloads 542, the second workloads 544, and/or the third workloads 546 of FIG. 5.

If, at block 6110, the processor 800 determines to re-configure the processor 800 based on the second application ratio based on the network workload(s), control returns to block 6104 to configure the processor 800 based on the second application ratio on a per-core and/or per-uncore basis. If, at block 6110, the processor 800 determines not to re-configure the processor 800 based on the second application ratio based on the network workload(s), then, at block 6112, the processor 800 determines whether to select another processor in the multi-core computing environment to process. If, at block 6112, the processor 800 determines to select another processor in the multi-core computing environment to process, control returns to block 6112 to select another processor in the multi-core computing environment, otherwise the example machine readable instructions 6100 of FIG. 61 conclude.

FIG. 62 is yet another flowchart representative of example machine readable instructions 6200 that may be executed to implement an example workload-adjustable CPU to modify an operation of CPU core(s) based on a workload. For example, the machine readable instructions 6200 of FIG. 62 may be executed by the first multi-core CPU 530 of FIG. 5, the second multi-core CPU 552 of FIG. 5, the multi-core CPU 608 of FIGS. 6 and/or 7, the multi-core processor 800 of FIG. 8, the multi-core processor 1002 of FIG. 10, the multi-core processor 1102 of FIG. 11, the first CPU 1210 of FIG. 12, the second CPU 1214 of FIG. 12, the third CPU 1216 of FIG. 12, the multi-core CPU 1302 of FIG. 13, the multi-core CPU 1502 of FIG. 15, the workload-adjustable CPU 3102 of FIGS. 31A-31C, the one-socket workload optimized processor 3906 of FIG. 39, the two-socket work-load optimized processor 3908 of FIG. 39, the SDSi semi-conductor device 4005 of FIGS. 40-41, the manufacturer enterprise system 4010 of FIGS. 40-41, the customer enter-prise system 4015 of FIGS. 40-41, the processor 4300 of FIG. 43, and/or any other processor or system including programmable hardware as described herein.

The example machine readable instructions 6200 of FIG. 62 begin at block 6202, at which the multi-core processor 800 determines network function(s) to execute. For example, the scheduler 832 of FIG. 8 may be in communi-cation with an application operating on an OS. In some such examples, the scheduler 832 may determine that to facilitate an application function, task, workload, etc., one or more network workloads, such as the network workloads 542, 544, 546 of FIG. 5, is/are to be executed. For example, the scheduler 832 may determine that AVX-512 network work-loads, such as scrambling or descrambling, modulation or demodulation, etc., are to be executed. In some examples, the scheduler 832 may determine that AVX-512 and/or 5G-ISA workloads, such as beam forming workloads, are to be executed. In some such examples, the scheduler 832 may invoke the machine-learning model(s) 844 of FIG. 8 to determine what type of network workloads are to be executed based on an application, machine-readable code, etc., or portion(s) thereof provided as inputs to the machine-learning model(s) 844.

At block 6204, the multi-core processor 800 identifies core(s) of the network optimized central processing unit (CPU) to execute the network function(s). For example, the scheduler 832 can identify the first core 810A and the second core 810N (or a different number or one(s) of the cores 810A-810N) of FIG. 8 to execute the one or more network workloads. For example, the scheduler 832 can identify the first core 810A to execute a first one of the AVX-512 instructions 840 of FIG. 8 and/or the second core 810N to execute a second one of the 5G-ISA instructions 842 of FIG. 8.

At block 6206, the multi-core processor 800 invokes the core(s) to load instruction set(s) based on the network function(s). For example, the scheduler 832 can invoke the first core 810A to load the first one of the AVX-512 instructions 840 based on the second network functions 244 to be executed and the second core 810N to load the second one of the 5G-ISA instructions 842 based on the third network workloads 546 to be executed.

At block 6208, the multi-core processor 800 determines whether a CPU power budget is available to execute the network function(s) with increased performance. For example, the second core 810N may interface with the power budget analyzer 834 of FIG. 8 in response to loading the first one of the 5G-ISA instructions 842. In some such examples, the second core 810N may transmit data, such as a type of the loaded instruction (e.g., an SSE instruction, an AVX-512 instruction, a 5G-ISA instruction, etc.), an identifier of the second core 810N, configuration information (e.g., a P-state, an operating voltage, an operating frequency, etc.) of the second core 810N, etc., and/or a combination thereof to the PCU 808 of FIG. 8. In some such examples, the power budget analyzer 834 may compare a power consumption (e.g., 120 W, 150 W, 185 W, etc.) of the multi-core processor 800 with the second core 810N operating in an increased performance state (e.g., operating at a higher operating voltage and frequency) to a threshold (e.g., a power budget threshold, a power consumption threshold, etc.). The power budget analyzer 834 may not grant a license to the second core 810N to operate in the increased performance state if the threshold is exceeded and/or otherwise satisfied. For example, the power budget analyzer 834 may instruct the power gates 804 of FIG. 8 to maintain and/or otherwise not increase the operating voltage of the second core 810N. The power budget analyzer 834 may grant the license to the second core 810N to operate in the increased performance state if the threshold is not exceeded and/or otherwise not satisfied. For example, the power budget analyzer 834 may instruct the power gates 804 to increase the operating voltage of the second core 810N. In some examples, the power budget analyzer 834 may execute the machine-learning model(s) 844 to generate outputs based upon which the power budget analyzer 834 may determine whether to grant a license to the second core 810N to operate in the increased performance state.

If, at block 6208, the multi-core processor 800 determines that there is not enough CPU power budget available to execute the network functions(s) with increased performance, then, at block 6210, the multi-core processor 800 operates the CPU core(s) in regular mode. For example, the core configurator 836 of FIG. 8 can instruct the second core 810N to operate at a base or baseline voltage and/or operating frequency. In response to operating the CPU core(s) in regular mode at block 6210, the example machine readable instructions 6200 of FIG. 62 conclude.

If, at block 6208, the multi-core processor 800 determines that there is available CPU power budget to execute the network functions(s) with increased performance, control proceeds to block 6212 to configure a P-state of the core(s). For example, the core configurator 836 may adjust a P-state of the second core 810N from P1n to P0n to increase a voltage and frequency of the second core 810N.

At block 6214, the multi-core processor 800 configures a deterministic frequency of the core(s). For example, in response to adjusting the P-state of the second core 810N, the core configurator 836 may cause the clock speed of the second core 810N to increase.

At block 6216, the multi-core processor 800 enables instruction set extension(s) for the core(s). For example, the scheduler 832 may grant the second core 810N access to one(s) of the 5G-ISA instructions 842 for execution to execute the third network workloads 246.

At block 6218, the multi-core processor 800 operates the core(s) in the increased performance state to execute the network function(s). For example, the execution unit 802 of FIG. 8 may operate the first core 810A, the second core 810N, etc., in the increased performance state in response to optimizing a configuration and/or operation of the cores 810A-810N on a per-core basis. In response to operating the core(s) in the increased performance state to execute the network function(s) at block 6218, the example machine readable instructions 6200 of FIG. 62 conclude.

FIG. 63 is a flowchart representative of example machine readable instructions 6300 that may be executed to implement an example workload-adjustable CPU to modify an operation of at least one of a core, an uncore, or a CLM based on a workload. For example, the machine readable instructions 6300 of FIG. 63 may be executed by the first multi-core CPU 530 of FIG. 5, the second multi-core CPU 552 of FIG. 5, the multi-core CPU 608 of FIGS. 6 and/or 7, the multi-core processor 800 of FIG. 8, the multi-core processor 1002 of FIG. 10, the multi-core processor 1102 of FIG. 11, the first CPU 1210 of FIG. 12, the second CPU 1214 of FIG. 12, the third CPU 1216 of FIG. 12, the multi-core CPU 1302 of FIG. 13, the multi-core CPU 1502 of FIG. 15, the workload-adjustable CPU 3102 of FIGS. 31A-31C, the one-socket workload optimized processor 3906 of FIG. 39, the two-socket workload optimized processor 3908 of FIG. 39, the SDSi semiconductor device 4005 of FIGS. 40-41, the manufacturer enterprise system 4010 of FIGS. 40-41, the customer enterprise system 4015 of FIGS. 40-41, the processor 4300 of FIG. 43, and/or any other processor or system including programmable hardware as described herein.

The example machine readable instructions 6300 of FIG. 63 begin at block 6302, at which the multi-core processor 800 determines network function(s) to execute. For example, the scheduler 832 of FIG. 8 may be in communication with an application operating on an OS. In some such examples, the scheduler 832 may determine that to facilitate an application function, task, workload, etc., one or more network workloads, such as the network workloads 542, 544, 546 of FIG. 5, is/are to be executed. For example, the scheduler 832 may determine that AVX-512 network workloads, such as scrambling or descrambling, modulation or demodulation, etc., are to be executed. In some examples, the scheduler 832 may determine that AVX-512 and/or 5G-ISA workloads, such as beam forming workloads, are to be executed.

At block 6304, the multi-core processor 800 identifies core(s) of the network optimized central processing unit (CPU) to execute the network function(s). For example, the scheduler 832 can identify the first core 810A and the second core 810N (or a different number or one(s) of the cores 810A-810N) of FIG. 8 to execute the one or more network workloads. For example, the scheduler 832 can identify the first core 810A to execute a first one of the AVX-512 instructions 840 of FIG. 8 and/or the second core 810N to execute a second one of the 5G-ISA instructions 842 of FIG. 8.

At block 6306, the multi-core processor 800 determines whether a CPU power budget is available to execute the network function(s) at a higher operating frequency. For example, the second core 810N may interface with the power budget analyzer 834 of FIG. 8 in response to loading the first one of the 5G-ISA instructions 842. In some such examples, the second core 810N may transmit data, such as a type of the loaded instruction (e.g., an SSE instruction, an AVX-512 instruction, a 5G-ISA instruction, etc.), an identifier of the second core 810N, configuration information (e.g., a P-state, an operating voltage, an operating frequency, etc.) of the second core 810N, etc., and/or a combination thereof to the PCU 808 of FIG. 8. In some such examples, the power budget analyzer 834 may compare a power consumption (e.g., 120 W, 150 W, 185 W, etc.) of the multi-core processor 800 with the second core 810N operating in an increased performance state (e.g., operating at a higher operating voltage and frequency) to a threshold (e.g., a power budget threshold, a power consumption threshold, etc.). The power budget analyzer 834 may not grant a license to the second core 810N to operate in the increased performance state if the threshold is exceeded and/or otherwise satisfied. For example, the power budget analyzer 834 may instruct the power gates 804 of FIG. 8 to maintain and/or otherwise not increase the operating voltage of the second core 810N. The power budget analyzer 834 may grant the license to the second core 810N to operate in the increased performance state if the threshold is not exceeded and/or otherwise not satisfied. For example, the power budget analyzer 834 may instruct the power gates 804 to increase the operating voltage of the second core 810N.

If, at block 6306, the multi-core processor 800 determines that there is not enough CPU power budget available to execute the network functions(s) at the higher operating frequency, control proceeds to block 6320 to determine whether there is/are additional network function(s) to execute. For example, the core configurator 836 of FIG. 8 can instruct the second core 810N to operate at a base or baseline voltage and/or operating frequency. If, at block 6306, the multi-core processor 800 determines that there is available CPU power budget to execute the network functions(s) at the higher operating frequency, then, at block 6308, the multi-core processor 800 determines whether to increase an operating frequency of the core(s) on a per-core basis.

If, at block 6308, the multi-core processor 800 determines not to increase the operating frequency of the cores(s) on a per-core basis, control proceeds to block 6312 to determine whether to increase an operating frequency of uncore(s) on a per-core basis. If, at block 6308, the multi-core processor 800 determines to increase the operating frequency of the cores(s) on a per-core basis, then, at block 6310, the multi-core processor 800 configures a P-state of the core(s) to operate at the increased operating frequency to improve performance. For example, the core configurator 836 may adjust a P-state of the second core 810N from P1n to P0n to increase a voltage and frequency of the second core 810N.

In response to configuring the P-state of the core(s) to operate at the increased operating frequency to improve performance at block 6310, the multi-core processor 800 determines whether to increase an operating frequency of uncore(s) on a per-core basis at block 6312. If, at block 6312, the multi-core processor 800 determines not to increase the operating frequency of the uncore(s) on a per-uncore basis, control proceeds to block 6316 to determine whether to increase an operating frequency of CLM(s) on a per-CLM basis. If, at block 6312, the multi-core processor 800 determines to increase the operating frequency of the uncore(s) on a per-uncore basis, then, at block 6314, the multi-core processor 800 configures the uncore(s) to operate at the increased operating frequency to improve throughput and reduce latency. For example, the core configurator 836 may increase a UCLK frequency of an instance of the uncore logic 822 of FIG. 8 that corresponds to the second core 810N.

In response to configuring the uncore(s) to operate at the increased operating frequency to improve throughput and reduce latency at block 6314, the multi-core processor 800 determines whether to increase an operating frequency of CLM(s) on a per-CLM basis at block 6316. If, at block 6316, the multi-core processor 800 determines not to increase the operating frequency of the CLM(s) on a per-CLM basis, control proceeds to block 6320 to determine whether there are additional network function(s) to execute. If, at block

6316, the multi-core processor 800 determines to increase the operating frequency of the CLM(s) on a per-CLM basis, then, at block 6318, the multi-core processor 800 configures the CLM(s) to operate at the increased operating frequency to improve throughput and reduce latency. For example, the core configurator 836 may increase a UCLK frequency of an instance of the CLM 817 of FIG. 8 that corresponds to the second core 810N.

In response to configuring the CLM(s) to operate at the increased operating frequency to improve throughput and reduce latency at block 6318, the multi-core processor 800 determines whether there are additional network function(s) to execute at block 6320. For example, the scheduler 832 may determine that there are additional one(s) of the network workloads 542, 544, 546 of FIG. 5, that is/are to be executed. If, at block 6320, the multi-core processor 800 determines that there are additional network function(s) to execute, control returns to block 6302 to determine the network function(s) to execute, otherwise the example machine readable instructions 6300 of FIG. 63 conclude.

FIG. 64 is a flowchart representative of example machine readable instructions 6400 that may be executed to implement an example workload-adjustable CPU to modify an operation of the workload-adjustable CPU based on execution of one or more machine-learning models. For example, the machine readable instructions 6400 of FIG. 64 may be executed by the first multi-core CPU 530 of FIG. 5, the second multi-core CPU 552 of FIG. 5, the multi-core CPU 608 of FIGS. 6 and/or 7, the multi-core processor 800 of FIG. 8, the multi-core processor 1002 of FIG. 10, the multi-core processor 1102 of FIG. 11, the first CPU 1210 of FIG. 12, the second CPU 1214 of FIG. 12, the third CPU 1216 of FIG. 12, the multi-core CPU 1302 of FIG. 13, the multi-core CPU 1502 of FIG. 15, the workload-adjustable CPU 3102 of FIGS. 31A-31C, the one-socket workload optimized processor 3906 of FIG. 39, the two-socket workload optimized processor 3908 of FIG. 39, the SDSi semiconductor device 4005 of FIGS. 40-41, the manufacturer enterprise system 4010 of FIGS. 40-41, the customer enterprise system 4015 of FIGS. 40-41, the processor 4300 of FIG. 43, and/or any other processor or system including programmable hardware as described herein The example machine readable instructions 6400 of FIG. 64 begin at block 6402, at which the workload-adjustable CPU identifies an instruction to be loaded by a processor in a multi-core computing environment to execute a workload. For example, the scheduler 832 of FIG. 8 can identify which one(s) of the SSE instructions 838, the AVX-512 instructions 840, or the 5G-ISA instructions 842 of FIG. 8 are to be loaded by one(s) of the cores 810A-810N, such as the first core 810A and the second core 810N, to execute a network workload, such as the first network workloads 542, the second network workloads 544, or the third network workloads 546 of FIG. 5.

At block 6404, the workload-adjustable CPU determines workload parameters. For example, the power budget analyzer 834 of FIG. 8 may obtain workload parameters from the PMU 828 of FIG. 8, which may include a latency, a power consumption, and/or a throughput associated with the first core 810A, the second core 810N, and/or, more generally, the processor 800. In some examples, the core configurator 836 of FIG. 8 may determine a configuration of the first core 810A and the second core 810N by querying the first core 810A and the second core 810N and/or by querying the configuration(s) 835 in the memory 837 of FIG. 8. In some examples, the power budget analyzer 834 of FIG. 8 may determine workload parameters of the first core 810A by associating a latency, a power consumption, and/or through-put of the first core 810A with the configuration of the first core 810A. In some examples, the power budget analyzer 834 may determine workload parameters of the second core 810N by associating a latency, a power consumption, and/or throughput of the second core 810N with the configuration of the second core 810N.

At block 6406, the workload-adjustable CPU executes a machine-learning model to determine an application ratio. For example, the power budget analyzer 834 can execute the machine-learning model(s) 844 of FIG. 8 with the workload parameters, the configuration of one(s) of the cores 810A-810N, an instruction to be loaded by one(s) of the cores 810A-810N, etc., and/or a combination thereof as machine-learning model inputs. In some such examples, the power budget analyzer 834 can execute the machine-learning model(s) 844 to generate outputs that may be indicative of an application ratio to be applied to one(s) of the cores 810A-810N, one(s) of the uncore logic 822 of FIG. 8, and/or one(s) of the CLM logic 817 of FIG. 8. For example, the outputs can include a configuration of the first core 810A, a first one of the CLM logic 817, a first one of the uncore logic 822, etc., which, when applied, may implement an application ratio that does not exceed and, thus, does not satisfy a power consumption threshold. In some examples, the outputs can include an application ratio that the power budget analyzer 834 may interpret, convert, and/or otherwise translate into configurations of the first core 810A, a first one of the CLM logic 817, a first one of the uncore logic 822.

At block 6408, the workload-adjustable CPU determines whether a power consumption threshold is satisfied based on the application ratio. For example, the power budget analyzer 834 can determine whether configuring the processor 800 or portion(s) thereof based on the application ratio would violate (e.g., exceed) a TDP of the processor 800 or portion(s) thereof. If, at block 6408, the workload-adjustable CPU determines that the power consumption threshold is not satisfied based on the application ratio, control proceeds to block 6412 to configure one or more cores of the processor based on the application. If, at block 6408, the workload-adjustable CPU determines that the power consumption threshold is satisfied based on the application ratio, then, at block 6410, the workload-adjustable CPU adjusts the application ratio to reduce the power consumption. For example, the power budget analyzer 834 may invoke the core configurator 836 to reduce an operating frequency of at least one of the first core 810A, the first CLM logic 817, or the first uncore logic 822 to reduce power consumption to avoid violating the TDP of the processor 800 or portion(s) thereof.

At block 6412, the workload-adjustable CPU configures one or more cores of the processor based on the application ratio. For example, the core configurator 836 can configure the first core 810A based on (i) the application ratio indicated by the outputs of the machine-learning model(s) 844 or (ii) on a reduced application ratio to avoid exceeding the TDP of the processor 800 or portion(s) thereof. In some examples, the configurations of the first core 810A can include an increase or decrease in operating frequency.

At block 6414, the workload-adjustable CPU configures uncore logic and/or CLM logic of the processor based on the application ratio. For example, the core configurator 836 can configure the first CLM logic 817 that corresponds to the first core 810A and/or the first uncore logic 822 that corresponds to the first core 810A based on (i) the application ratio indicated by the outputs of the machine-learning model(s) 844 or (ii) on a reduced application ratio to avoid exceeding the TDP of the processor 800 or portion(s)

thereof. In some examples, the configurations of the first CLM logic 817 and/or the first uncore logic 822 can include an increase or decrease in operating frequency.

At block 6416, the workload-adjustable CPU executes the workload based on the configurations. For example, the first core 810A, the first CLM logic 817, and/or the first uncore logic 822 can execute the workload based on the configurations, such as changes in operating frequency.

At block 6418, the workload-adjustable CPU re-trains the machine-learning model based on the execution. For example, the PMU 828 can determine workload parameters associated with the first core 810A, the first CLM logic 817, and/or the first uncore logic 822 executing the workload based on the configurations. In some examples, the power budget analyzer 834 causes and/or otherwise invokes the machine-learning model(s) 844 to re-train based on training data, which may include the configurations, the workload parameters, the workload, the instruction loaded by the first core 810A, etc., and/or a combination thereof. Advantageously, the re-training of the machine-learning model(s) 844 may improve the accuracy of the machine-learning model(s) 844 to determine an application ratio to increase performance and/or throughput, reduce latency, etc., without violating a TDP of the processor 800 or portion(s) thereof.

At block 6420, the workload-adjustable CPU reports telemetry data to a computing system. For example, the processor 800 may transmit telemetry data to at least one of the manufacturer enterprise system 4010 or the customer enterprise system 4015 of FIG. 40. In some such examples, the at least one of the manufacturer enterprise system 4010 or the customer enterprise system 4015 may train a machine-learning model based on the telemetry data to improve an accuracy of the machine-learning model when determining an application ratio to optimize and/or otherwise improve execution of network workloads (e.g., 5G network workloads). In some such examples, the at least one of the manufacturer enterprise system 4010 or the customer enterprise system 4015 may provide the trained machine-learning model to other processors (e.g., the processor 800 or different processors), such as the SDSi semiconductor device 4005 of FIG. 40.

At block 6422, the workload-adjustable CPU determine whether to continue monitoring the processor. For example, the processor 800 can determine whether another workload is to be executed by the processor 800. If, at block 6422, the workload-adjustable CPU determines to continue monitoring the processor, control returns to block 6402 to identify another instruction to be loaded by the processor in the multi-core computing environment to execute a workload. If, at block 6422, the workload-adjustable CPU determines not to continue monitoring the processor, then the machine readable instructions 6400 of FIG. 64 conclude.

FIG. 65 is a flowchart representative of example machine readable instructions 6500 that may be executed to implement an example workload-adjustable CPU to modify an operation of at least one of a core, an uncore, or a CLM based on whether one or more thresholds are satisfied. For example, the machine readable instructions 6500 of FIG. 65 may be executed by the first multi-core CPU 530 of FIG. 5, the second multi-core CPU 552 of FIG. 5, the multi-core CPU 608 of FIGS. 6 and/or 7, the multi-core processor 800 of FIG. 8, the multi-core processor 1002 of FIG. 10, the multi-core processor 1102 of FIG. 11, the first CPU 1210 of FIG. 12, the second CPU 1214 of FIG. 12, the third CPU 1216 of FIG. 12, the multi-core CPU 1302 of FIG. 13, the multi-core CPU 1502 of FIG. 15, the workload-adjustable CPU 3102 of FIGS. 31A-31C, the one-socket workload optimized processor 3906 of FIG. 39, the two-socket workload optimized processor 3908 of FIG. 39, the SDSi semiconductor device 4005 of FIGS. 40-41, the manufacturer enterprise system 4010 of FIGS. 40-41, the customer enterprise system 4015 of FIGS. 40-41, the processor 4300 of FIG. 43, and/or any other processor or system including programmable hardware as described herein The example machine readable instructions 6500 of FIG. 65 begin at block 6502, at which a workload-adjustable CPU identifies core(s) of network optimized central processing unit (CPU) to execute network workload(s). For example, the scheduler 832 of FIG. 8 can identify the first core 810A of the processor 800 to execute a network workload, such as one of the network workloads 542, 544, 546 of FIG. 5.

At block 6504, the workload-adjustable CPU determines workload parameters associated with the core(s). For example, the power budget analyzer 834, and/or, more generally, the PCU 808 of FIG. 8, can obtain workload parameters from the PMU 828 of FIG. 8, which may include a value of a latency parameter, a power consumption parameter, or a throughput parameter associated with the first core 810A, a first one of the CLM logic 817 that corresponds to the first core 810A, and/or a first one of the uncore logic 822 that corresponds to the first core 810A.

At block 6506, the workload-adjustable CPU determines whether a latency threshold is satisfied. For example, the power budget analyzer 834 can determine whether the value of the latency parameter is less than the latency threshold (e.g., latency threshold not satisfied) or greater than the latency threshold (e.g., latency threshold is satisfied) based on a comparison of the value and the latency threshold. If, at block 6506, the workload-adjustable CPU determines that the latency threshold is not satisfied, control proceeds to block 6510 to determine whether a throughput threshold is satisfied. If, at block 6506, the workload-adjustable CPU determines that the latency threshold is satisfied, then, at block 6508, the workload-adjustable CPU determines at least one of an application ratio or a type of instruction to execute to reduce latency. For example, the power budget analyzer 834 can determine an application ratio and/or identify one(s) of the SSE instructions 838, the AVX-512 instructions 840, or the 5G-ISA instructions 842 of FIG. 8 to execute to reduce latency (e.g., reduce latency to no longer satisfy and/or otherwise exceed the latency threshold).

In response to determining the at least one of the application ratio or the type of instruction to execute to reduce latency at block 6508, the workload-adjustable CPU determines whether the throughput threshold is satisfied at block 6510. For example, the power budget analyzer 834 can determine whether the value of the throughput parameter is less than the throughput threshold (e.g., throughput threshold not satisfied) or greater than the throughput threshold (e.g., throughput threshold is satisfied) based on a comparison of the value and the throughput threshold. If, at block 6510, the workload-adjustable CPU determines that the throughput threshold is satisfied, control proceeds to block 6514 to determine whether a power consumption threshold is satisfied. If, at block 6510, the workload-adjustable CPU determines that the throughput threshold is not satisfied, then, at block 6512, the workload-adjustable CPU determines at least one of an application ratio or a type of instruction to execute to increase throughput. For example, the power budget analyzer 834 can determine an application ratio and/or identify one(s) of the SSE instructions 838, the AVX-512 instructions 840, or the 5G-ISA instructions 842 of FIG. 8 to execute to increase throughput (e.g., increase throughput to satisfy and/or otherwise exceed the throughput threshold).

In response to determining the at least one of the application ratio or the type of instruction to execute to increase throughput at block 6512, the workload-adjustable CPU determines whether the power consumption threshold is satisfied at block 6514. For example, the power budget analyzer 834 can determine whether the value of the power consumption parameter is less than the power consumption threshold (e.g., power consumption threshold is not satisfied) or greater than the power consumption threshold (e.g., power consumption threshold is satisfied) based on a comparison of the value and the power consumption threshold. If, at block 6514, the workload-adjustable CPU determines that the power consumption threshold is satisfied, control proceeds to block 6518 to configure the CPU based on the at least one of the application ratio or the instruction. If, at block 6514, the workload-adjustable CPU determines that the power consumption threshold is not satisfied, then, at block 6516, the workload-adjustable CPU determines at least one of an application ratio or a type of instruction to execute to increase performance. For example, the power budget analyzer 834 can determine an application ratio and/or identify one(s) of the SSE instructions 838, the AVX-512 instructions 840, or the 5G-ISA instructions 842 of FIG. 8 to execute to increase performance (e.g., increase performance up to the power consumption threshold, increase performance to temporarily exceed the power consumption threshold, etc.).

In response to determining the at least one of the application ratio or the type of instruction to execute to increase performance at block 6516, the workload-adjustable CPU configures the CPU based on the at least one of the application ratio or the instruction at block 6518. For example, the core configurator 836 can configure at least one of the first core 810A, the first CLM logic 817, or the first uncore logic 822 to operate at one or more operating frequencies, which may be indicated by the application ratio or associated with the SSE instructions 838, the AVX-512 instructions 840, or the 5G-ISA instructions 842 of FIG. 8 selected to execute one(s) of the network workloads 542, 544, 546 of FIG. 5.

In response to configuring the CPU based on the at least one of the application ratio or the instruction at block 6518, the workload-adjustable CPU executes the network workload(s). For example, at least one of the first core 810A, the first CLM logic 817, or the first uncore logic 822 can execute one(s) of the network workloads 542, 544, 546 of FIG. 5 based on the configuration(s).

At block 6522, the workload-adjustable CPU determines whether to continue monitoring the CPU. For example, the scheduler 832 can determine whether one(s) of the cores 810A-810N have loaded one(s) of the instructions 838, 840, 842 of FIG. 8 to execute one(s) of the network workloads 542, 544, 546 of FIG. 5. If, at block 6522, the workload-adjustable CPU determines to continue monitoring the CPU, control returns to block 6502 to identify the core(s) of the network optimized CPU to execute the network workload(s), otherwise the machine readable instructions 6500 of FIG. 65 conclude.

FIGS. 66-67 depict flowcharts representative of example machine readable instructions 6600, 6700 that may be executed to implement an example workload-adjustable CPU to modify an operation of CPU core(s) based on a workload. For example, the machine readable instructions 6600 of FIG. 66 and/or the machine readable instructions 6700 of FIG. 67 may be executed by the first multi-core CPU 530 of FIG. 5, the second multi-core CPU 552 of FIG. 5, the multi-core CPU 608 of FIGS. 6 and/or 7, the multi-core processor 800 of FIG. 8, the multi-core processor 1002 of FIG. 10, the multi-core processor 1102 of FIG. 11, the first CPU 1210 of FIG. 12, the second CPU 1214 of FIG. 12, the third CPU 1216 of FIG. 12, the multi-core CPU 1302 of FIG. 13, the multi-core CPU 1502 of FIG. 15, the workload-adjustable CPU 3102 of FIGS. 31A-31C, the one-socket workload optimized processor 3906 of FIG. 39, the two-socket workload optimized processor 3908 of FIG. 39, the SDSi semiconductor device 4005 of FIGS. 40-41, the manufacturer enterprise system 4010 of FIGS. 40-41, the customer enterprise system 4015 of FIGS. 40-41, the processor 4300 of FIG. 43, and/or any other processor or system including programmable hardware as described herein.

In some examples, the machine readable instructions 6600 of FIG. 66 and/or the machine readable instructions 6700 of FIG. 67 may implement the corresponding L2 functions associated with the L1 functions depicted in the example of FIG. 34. The example machine readable instructions 6600 of FIG. 66 may be executed to implement an example downlink (DL) MAC scheduler (e.g., a L2-rt MAC scheduler) for MU-MIMO, which may benefit from executing one(s) of the 5G-ISA instructions (e.g., 5G-ISA instructions to execute complex number arithmetic) as described herein. For example, the multi-core processor 800 of FIG. 8, or any other multi-core processor, CPU, etc., as described herein may implement the DL MAC scheduler.

At block 6602, the DL MAC scheduler determines whether MU-MIMO scheduling is to be performed. If, at block 6602, the DL MAC scheduler determines that MU-MIMO scheduling is to be performed, control proceeds to block 6604 to execute UE pre-selection by proportional fair (PF) control.

At block 6606, the DL MAC scheduler executes user selection for the physical data shared channel (PDSCH). At block 6608, the DL MAC scheduler executes the physical downlink control channel (PDDCH) scheduling for downlink control information (DCI). At block 6810, the DL MAC scheduler executes PDSCH time/frequency resource allocation. In response to executing blocks 6606, 6608, 6610 for each sub band and/or wideband, control proceeds to block 6612 to calculate the modulation and coding scheme (MCS) and/or transport block (TB) sizes.

If, at block 6602, the DL MAC scheduler determines that MU-MIMO scheduling is not to be performed, control proceeds to block 6614 to execute PF scheduling for PDSCH. At block 6616, the DL MAC scheduler executes PDCCH scheduling for DL DCI. At block 6618, the DL MAC scheduler executes PDSCH time/frequency resource allocation. In response to executing blocks 6614, 6616, 6618 for each sub band and/or wideband, control proceeds to block 6612 to calculate the MCS and/or TB sizes.

The example machine readable instructions 6700 of FIG. 67 may be executed to implement the example DL MAC scheduler described above in connection with FIG. 66. At block 6702, the DL MAC scheduler updates a PF weight. At block 6704, the DL MAC scheduler executes PF pre-selection. For example, blocks 6702 and 6704 may implement block 6604 of FIG. 66.

At block 6706, the DL MAC scheduler executes correlation user selection (CUS) for MU-MIMO and MU signal-to-interference-plus-noise ratio (SINR) (MU-SINR) calculation by utilizing zero forcing (ZF) for each sub band. Additionally or alternatively, at block 6706, the DL MAC scheduler may execute PF for SU-MIMO for each sub band.

At block 6708, the DL MAC scheduler calculates MCS and/or TB size of the scheduled UE. At block 6710, the DL MAC scheduler updates the PF past throughput. For example, blocks 6708 and 6710 may implement block 6612 of FIG. 66.

FIG. 68 illustrates examples of an exemplary system. Multiprocessor system 6800 is a point-to-point interconnect system and includes a plurality of processors including a first processor 6870 and a second processor 6880 coupled via a point-to-point interconnect 6850. In some examples, the first processor 6870 and the second processor 6880 are homogeneous. In some examples, first processor 6870 and the second processor 6880 are heterogenous. For example, the multiprocessor system 6800 may implement the DUs 122 of FIG. 1, the CUs 124 of FIG. 1, the core servers 126 of FIG. 1, the first multi-core computing system 522 of FIG. 5 or portion(s) thereof, the second multi-core computing system 524 of FIG. 5 or portion(s) thereof, the third multi-core computing system 600 of FIG. 6 or portion(s) thereof, and/or the fourth multi-core computing system 700 of FIG. 7 or portion(s) thereof. In some examples, the first processor 6870 and/or the second processor 6880 may implement the first multi-core CPU 530 of FIG. 5, the second multi-core CPU 552 of FIG. 5, the multi-core CPU 608 of FIGS. 6 and/or 7, the multi-core processor 800 of FIG. 8, the multi-core processor 1002 of FIG. 10, the multi-core processor 1102 of FIG. 11, the first CPU 1210 of FIG. 12, the second CPU 1214 of FIG. 12, the third CPU 1216 of FIG. 12, the multi-core CPU 1302 of FIG. 13, the multi-core CPU 1502 of FIG. 15, the workload-adjustable CPU 3102 of FIGS. 31A-31C, the one-socket workload optimized processor 3906 of FIG. 39, the two-socket workload optimized processor 3908 of FIG. 39, the SDSi semiconductor device 4005 of FIGS. 40-41, the manufacturer enterprise system 4010 of FIGS. 40-41, the customer enterprise system 4015 of FIGS. 40-41, the processor 4300 of FIG. 43, and/or any other processor or system including programmable hardware as described herein. For example, the multiprocessor system 6800 may execute 5G-ISA instructions as described herein to improve processing of telecommunication workloads related to 5G networks.

Processors 6870 and 6880 are shown including integrated memory controller (IMC) units circuitry 6872 and 6882, respectively. Processor 6870 also includes as part of its interconnect controller units point-to-point (P-P) interfaces 6876 and 6878; similarly, second processor 6880 includes P-P interfaces 6886 and 6888. Processors 6870, 6880 may exchange information via the point-to-point (P-P) interconnect 6850 using P-P interface circuits 6878, 6888. IMCs 6872 and 6882 couple the processors 6870, 6880 to respective memories, namely a memory 6832 and a memory 6834, which may be portions of main memory locally attached to the respective processors.

Processors 6870, 6880 may each exchange information with a chipset 6890 via individual P-P interconnects 6852, 6854 using point to point interface circuits 6876, 6894, 6886, 6898. Chipset 6890 may optionally exchange information with a coprocessor 6838 via a high-performance interface 6892. In some examples, the coprocessor 6838 is a special-purpose processor, such as, for example, a high-throughput MIC processor, a network or communication processor, compression engine, graphics processor, GPGPU, embedded processor, or the like.

A shared cache (not shown) may be included in either processor 6870, 6880 or outside of both processors, yet connected with the processors via P-P interconnect, such that either or both processors' local cache information may be stored in the shared cache if a processor is placed into a low power mode.

Chipset 6890 may be coupled to a first interconnect 6816 via an interface 6896. In some examples, the first interconnect 6816 may be a Peripheral Component Interconnect (PCI) interconnect, or an interconnect such as a PCI Express interconnect or another I/O interconnect. In some examples, one of the interconnects couples to a power control unit (PCU) 6817, which may include circuitry, software, and/or firmware to perform power management operations with regard to the processors 6870, 6880 and/or co-processor 6838. For example, PCU 6817 may implement the PCU 808 of FIG. 8. PCU 6817 provides control information to a voltage regulator to cause the voltage regulator to generate the appropriate regulated voltage. PCU 6817 also provides control information to control the operating voltage generated. In various examples, PCU 6817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 6817 is illustrated as being present as logic separate from the processor 6870 and/or processor 6880. In other cases, PCU 6817 may execute on a given one or more of cores (not shown) of processor 6870 or 6880. In some cases, PCU 6817 may be implemented as a microcontroller (dedicated or general-purpose) or other control logic configured to execute its own dedicated power management code, sometimes referred to as P-code. In yet other examples, power management operations to be performed by PCU 6817 may be implemented externally to a processor, such as by way of a separate power management integrated circuit (PMIC) or another component external to the processor. In yet other examples, power management operations to be performed by PCU 6817 may be implemented within BIOS or other system software.

Various I/O devices 6814 may be coupled to first interconnect 6816, along with an interconnect (bus) bridge 6818 which couples first interconnect 6816 to a second interconnect 6820. In some examples, one or more additional processor(s) 6815, such as coprocessors, high-throughput MIC processors, GPGPU's, accelerators (such as, e.g., graphics accelerators or DSP units), FPGAs, or any other processor, are coupled to first interconnect 6816. In some examples, second interconnect 6820 may be a low pin count (LPC) interconnect. Various devices may be coupled to second interconnect 6820 including, for example, a keyboard and/or mouse 6822, communication devices 6827 and a storage unit circuitry 6828. Storage unit circuitry 6828 may be a disk drive or other mass storage device which may include instructions/code and data 6830, in some examples. Further, an audio I/O 6824 may be coupled to second interconnect 6820. Note that other architectures than the point-to-point architecture described above are possible. For example, instead of the point-to-point architecture, a system such as multiprocessor system 6800 may implement a multi-drop interconnect or other such architecture.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

FIG. 69 is a block diagram of an example processor platform 6900 structured to execute the instructions of FIGS. 55-67 to implement the example PCU 808 of FIG. 8, and/or, more generally, the processor 800 of FIG. 8, the first processor 6870 and/or the second processor 6880 of FIG. 68, and/or, more generally, the multiprocessor system 6800 of FIG. 68, and/or any other processor as described herein (e.g., the multi-core CPU 530 of FIG. 5, the SDSi semiconductor device 4005 of FIG. 40, etc.). The processor platform 6900 can be, for example, a centralized unit, a distributed unit, a core device, a server (e.g., a computing server, a core server, an edge server, etc.), a personal computer, a workstation, a self-learning machine (e.g., a neural network), or any other type of computing device.

The processor platform 6900 of the illustrated example includes a processor 6912. The processor 6912 of the illustrated example is hardware. For example, the processor 6912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 6912 implements the example scheduler 832, the example power budget analyzer 834, and the example core configurator 836 of FIG. 8.

The processor 6912 of the illustrated example includes a local memory 6913 (e.g., a cache). In this example, the local memory 6913 implements the example SSE instructions 838, the example AVX-512 instructions 840, the example 5G-ISA instructions 842, and the machine-learning model(s) 844 of FIG. 8. For example, the local memory 6913 can implement the memory 837 of FIG. 8. The processor 6912 of the illustrated example is in communication with a main memory including a volatile memory 6914 and a non-volatile memory 6916 via a bus 6918. The volatile memory 6914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 6916 may be implemented by flash memory and/or any other desired type of memory device. Access to the main memory 6914, 6916 is controlled by a memory controller.

The processor platform 6900 of the illustrated example also includes an interface circuit 6920. The interface circuit 6920 may be implemented by any type of interface standard, such as an Ethernet interface, a USB, a Bluetooth® interface, a near field communication (NFC) interface, and/or a PCI express interface.

In the illustrated example, one or more input devices 6922 are connected to the interface circuit 6920. The input device(s) 6922 permit(s) a user to enter data and/or commands into the processor 6912. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 6924 are also connected to the interface circuit 6920 of the illustrated example. The output devices 6924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 6920 of the illustrated example, thus, typically includes a graphics driver card, a graphics driver chip and/or a graphics driver processor.

The interface circuit 6920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 6926. In some examples, the network 6926 may be implemented by one or more edge clouds as described above in connection with FIGS. 2-4. The communication can be via, for example, an Ethernet connection, a digital subscriber line (DSL) connection, a telephone line connection, a coaxial cable system, a satellite system, a line-of-site wireless system, a cellular telephone system, etc.

The processor platform 6900 of the illustrated example also includes one or more mass storage devices 6928 for storing software and/or data. Examples of such mass storage devices 6928 include floppy disk drives, hard drive disks, compact disk drives, Blu-ray disk drives, redundant array of independent disks (RAID) systems, and DVD drives.

The machine executable instructions 6932 of FIGS. 55-67 may be stored in the mass storage device 6928, in the volatile memory 6914, in the non-volatile memory 6916, and/or on a removable non-transitory computer readable medium such as a CD or DVD. Additionally or alternatively, one or more of the example SSE instructions 838, the example AVX-512 instructions 840, the example 5G-ISA instructions 842, and/or the example machine-learning model(s) 844 may be stored in the volatile memory 6914, the non-volatile memory 6916, the mass storage device 6928, and/or the coded instructions 6932.

The processor platform 6900 of the illustrated example of FIG. 69 includes an example graphics processing unit (GPU) 6940, an example vision processing unit (VPU) 6942, and an example neural network processor 6944. In this example, the GPU 6940, the VPU 6942, and the neural network processor 6944 are in communication with different hardware of the processor platform 6900, such as the volatile memory 6914, the non-volatile memory 6916, etc., via the bus 6918. In this example, the neural network processor 6944 may be implemented by one or more integrated circuits, logic circuits, microprocessors, GPUs, DSPs, or controllers from any desired family or manufacturer that can be used to execute an AI model, such as a neural network, which may be implemented by the ML model(s) 844. In some examples, one or more of the scheduler 832, the power budget analyzer 834, and/or the core configurator 836 of FIG. 8 can be implemented by, in, or with at least one of the GPU 6940, the VPU 6942, or the neural network processor 6944 instead of or in addition to the processor 6912. Additionally or alternatively, the processor platform 6900 may include different type(s) of processors, such as a machine learning accelerator or processor, an artificial intelligence accelerator or processor, a DSP, a vector processor or processing unit, an electronic control unit (ECU) (e.g., an ECU that may be included in a vehicle to effectuate vehicle functions, such as driving, parking, or other general automotive activities), etc., and/or any other type of accelerator or processor.

Figure 70:
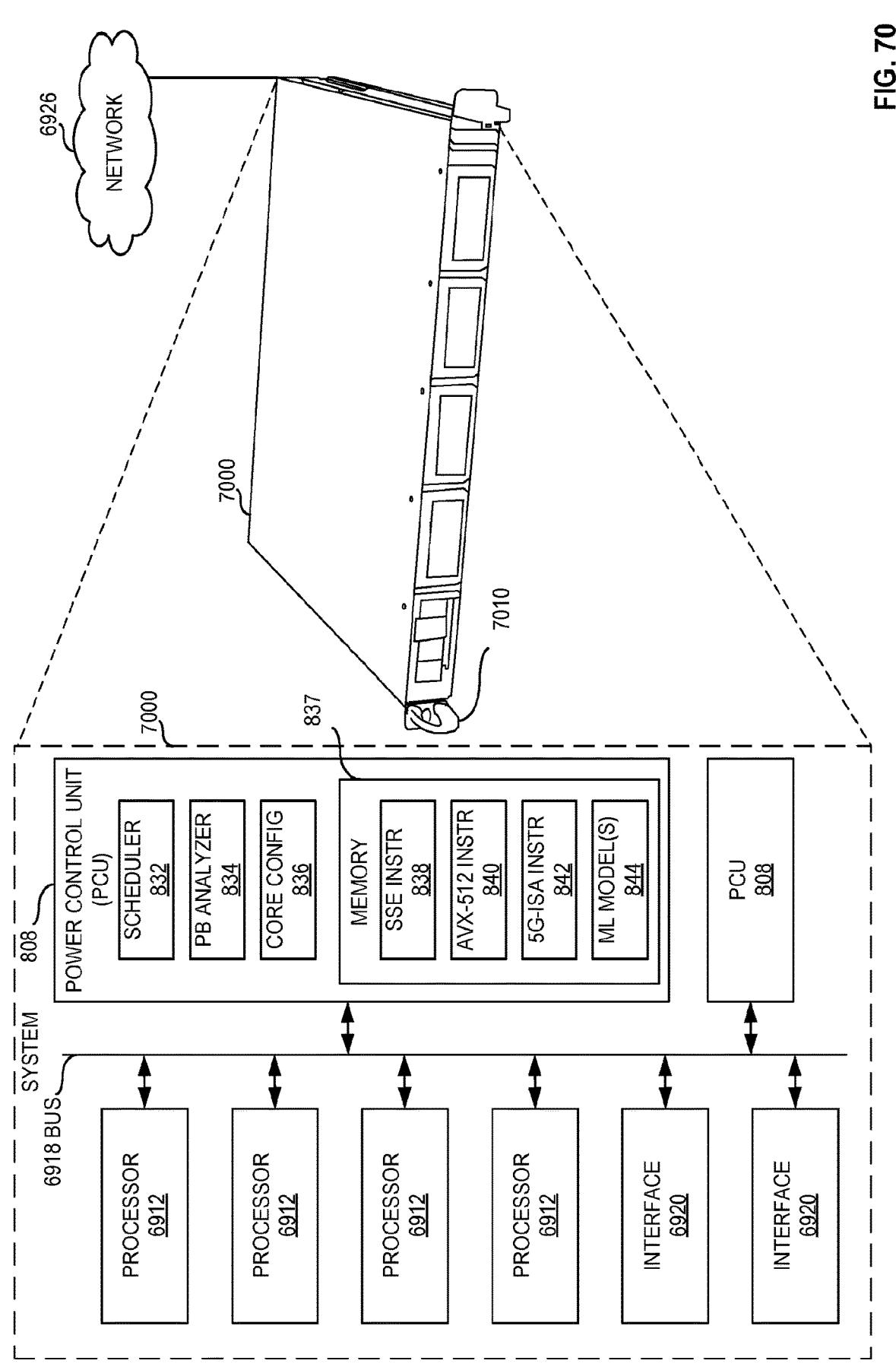
FIG. 70 is a block diagram of another example processing platform system structured to execute the example machine readable instructions of FIGS. 55-67 to implement an example workload-adjustable CPU.

FIG. 70 is an example system (e.g., a single socket system, a dual socket system, etc.) 7000 capable of executing the example instructions of FIGS. 55-67 to implement the example scheduler 832, the example power budget analyzer 834, the example core configurator 836, the example memory 837, the example SSE instructions 838, the example AVX-512 instructions 840, the example 5G-ISA instructions 842, and/or the example machine-learning model(s) 844 of FIG. 8, and/or, more generally, the example PCU 808 of FIG. 8. In the illustrated example of FIG. 70, the system 7000 is a processor platform (e.g., a multi-core computing system, a multi-core processor system), such as a server (e.g., a single socket server, a dual socket server, a 1U server, a 2U server, etc.). For example, the system 7000 can implement one of the DUs 122 of FIG. 1, one of the CUs 124 of FIG. 1, one of the core devices 126 of FIG. 1, etc. Alternatively, the system 7000 can be any other type of computing device or computing system. The system 7000 of the illustrated example includes an example chassis 7010, which can be coupled to and/or otherwise integrated into a cabinet (e.g., a server cabinet, a rack-mounted cabinet, etc.). Alternatively, the system 7000 may be integrated in any other location in a MEC environment.

In the illustrated example, the system 7000 includes a plurality of the processors 6912 of FIG. 69, a plurality of the interfaces 6920 of FIG. 69, and a plurality of the PCU 808 of FIG. 8. For example, the plurality of the interfaces 6920 can facilitate exchange of data with external machines (e.g., computing devices of any kind) via the network 6926 of FIG. 69. Alternatively, fewer or more than the processors 6912, the interfaces 6920, and/or the PCU 808 than depicted in FIG. 70 may be used. The system 7000 may also include one or more of any other component or circuitry discussed above in connection with FIG. 69.

Figure 71:
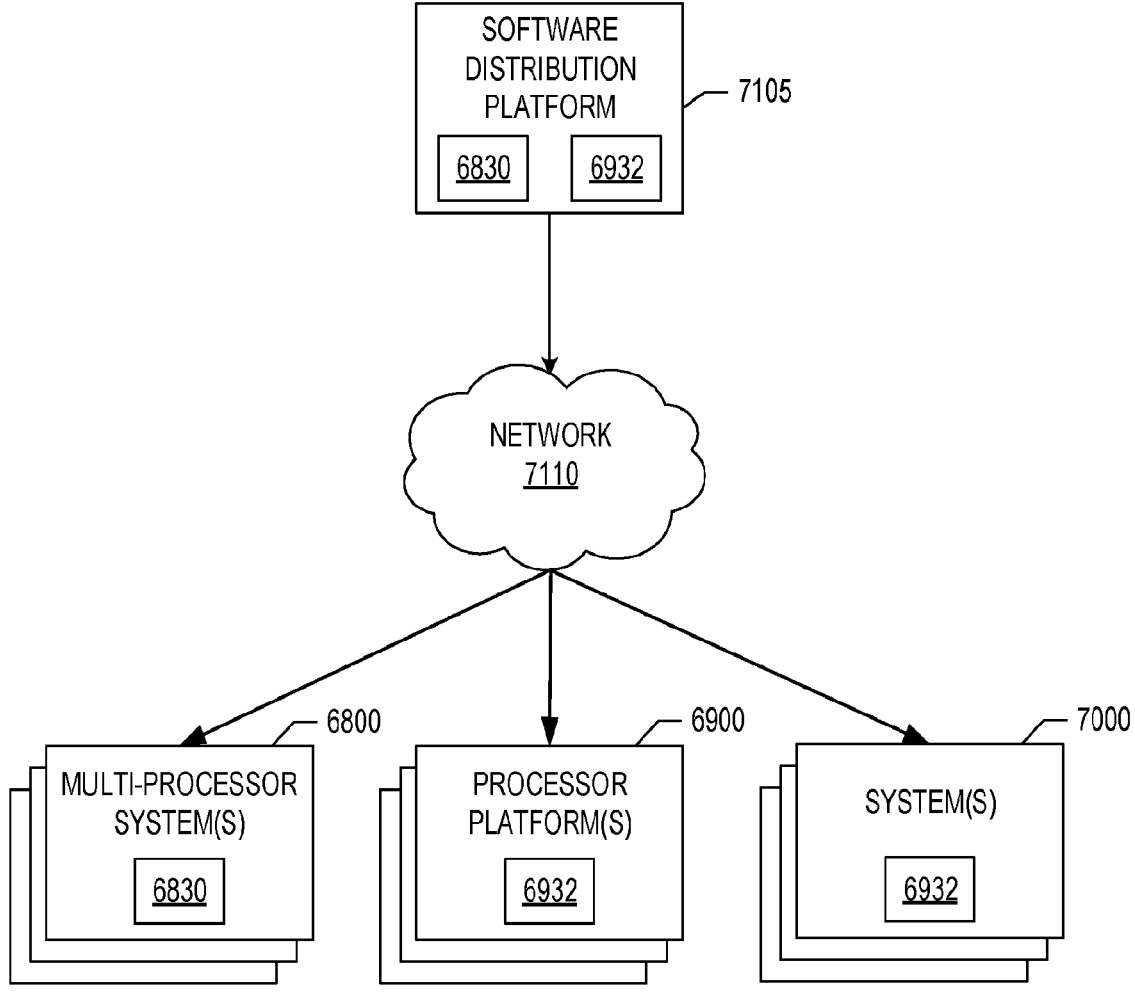
FIG. 71 is a block diagram of an example software distribution platform to distribute software (e.g., software corresponding to the example computer readable instructions of FIGS. 55-67) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 7105 to distribute software such as the example code 6830 of FIG. 68 and/or the example machine readable instructions 6932 of FIG. 69 to third parties is illustrated in FIG. 71. The example software distribution platform 7105 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example code 6830 of FIG. 68 and/or the example computer readable instructions 6932 of FIG. 69. The third parties may be consumers, users, retailers, OEMs, etc., who purchase and/or license the software for use and/or re-sale and/or sub-licensing. In the illustrated example, the software distribution platform 7105 includes one or more servers and one or more storage devices. The storage devices store the code 6830 and/or the machine readable instructions 6932, which may correspond to the example computer readable instructions 5500, 5600, 5700, 5800, 5900, 6000, 6100, 6200, 6300, 6400, 6500, 6600, 6700 of FIGS. 55-67, as described above. The one or more servers of the example software distribution platform 7105 are in communication with a network 7110, which may correspond to any one or more of the Internet and/or any of the example networks 104, 106, 107, 118, 210, 6926 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the machine readable instructions 6830, 6932 from the software distribution platform 7105. For example, the software, which may correspond to the example computer readable instructions 5500, 5600, 5700, 5800, 5900, 6000, 6100, 6200, 6300, 6400, 6500, 6600, 6700 of FIGS. 55-67, may be downloaded to the example multi-processor system(s) 6800, the example processor platform(s) 6900 of FIG. 69, and/or the system(s) 7000 of FIG. 70, which is to execute the code 6830 and/or the machine readable instructions 6932 to implement the PCU 808 of FIG. 8. In some examples, one or more servers of the software distribution platform 7105 periodically offer, transmit, and/or force updates to the software (e.g., the example code 6830, the example machine readable instructions 6932 of FIG. 69) to ensure improvements, patches, updates, etc. are distributed and applied to the software at the end user devices.

From the foregoing, it will be appreciated that example systems, methods, apparatus, and articles of manufacture have been disclosed that optimize hardware based on a workload, such as a 5G network workload. The above-described example systems, methods, apparatus, and articles of manufacture may effectuate the support of a 5G RAN and 5G Core with the same CPU by optimizing per-core frequencies associated with AVX512-FP16 ISA signal processing ISA instructions on a subset of cores within a CPU. The above-described example systems, methods, apparatus, and articles of manufacture may facilitate the use of the same CPU for both 5G Core UPF and 5G vRAN-DU and 5G vRAN-CU network nodes. The disclosed systems, methods, apparatus, and articles of manufacture improve the efficiency of using a computing device by processing network workloads with increased performance. The disclosed systems, methods, apparatus, and articles of manufacture are accordingly directed to one or more improvement(s) in the functioning of a computer.

Example methods, apparatus, systems, and articles of manufacture to workload optimize hardware are disclosed herein. Further examples and combinations thereof include the following:

Example 1 includes an apparatus to configure execution of a workload, the apparatus comprising power control circuitry to determine an application ratio based on an instruction to be executed by one or more cores of a processor to execute the workload, and configure, before the execution of the workload, at least one of (i) the one or more cores of the processor based on the application ratio or (ii) uncore logic of the processor based on the application ratio, and execution circuitry to initiate execution of the workload with the at least one of the one or more cores or the uncore logic.

In Example 2, the subject matter of Example 1 can optionally include that the power control circuitry is to identify a first operating frequency of a first core of the one or more cores, the first operating frequency included in a first set of one or more operating frequencies associated with the application ratio, and identify a second operating frequency of the uncore logic, the second operating frequency included in a second set of one or more operating frequencies associated with the application ratio, the power control circuitry to configure the at least one of (i) the one or more cores of the processor based on at least one of the first operating frequency or the second operating frequency or (ii) the uncore logic of the processor based on the at least one of the first operating frequency or the second operating frequency.

In Example 3, the subject matter of Examples 1-2 can optionally include that the power control circuitry is to configure the at least one of the one or more cores of the processor or the uncore logic of the processor in response to a determination that a power consumption associated with the application ratio satisfies a threshold.

In Example 4, the subject matter of Examples 1-3 can optionally include that the power control circuitry is to decrease a first operating frequency of the one or more cores to decrease a first power consumption associated with the one or more cores, and increase a second operating frequency of at least a portion of the uncore logic to increase a second power consumption associated with the at least the portion of the uncore logic, the increase of the second power consumption to increase throughput of the processor, the power control circuitry to configure the at least one of the one or more cores of the processor or the uncore logic of the processor based on at least one of the decrease of the first operating frequency or the increase of the second operating frequency.

In Example 5, the subject matter of Examples 1-4 can optionally include that the power control circuitry is to at least one of adjust a first operating frequency of the one or more cores to a second operating frequency, or adjust a third operating frequency of the uncore logic to a fourth operating frequency, at least one of the second operating frequency or the fourth operating frequency associated with the application ratio, the power control circuitry to configure the at least one of the one or more cores of the processor or the uncore logic of the processor based on at least one of the adjustment of the first operating frequency to the second operating frequency or the adjustment of the third operating frequency to the fourth operating frequency.

In Example 6, the subject matter of Examples 1-5 can optionally include that the instruction is a first instruction, the workload is a first workload, the application ratio is a first application ratio, the one or more cores are one or more first cores, the uncore logic is first uncore logic, and wherein the power control circuitry is to determine a second application ratio based on a second instruction to be executed by one or more second cores of the processor to execute a second workload, and configure, before execution of the second, at least one of (i) the one or more second cores of the processor based on the second application ratio or (ii) second uncore logic of the processor based on the second application ratio, and the execution circuitry is to initiate the execution of the second workload with the at least one of the one or more second cores or the second uncore logic, the one or more first cores to execute a first portion of the first workload while the one or more second cores execute a second portion of the second workload.

In Example 7, the subject matter of Examples 1-6 can optionally include that the application ratio is a first application ratio, and the power control circuitry is to compare at least one of a latency of the processor to a latency threshold or a throughput of the processor to a throughput threshold, in response to the respective one of the latency threshold or the throughput threshold being satisfied, adjust the first application ratio to a second application ratio, and configure the uncore logic based on the second application ratio to at least one of increase the throughput of the processor or reduce the latency of the processor.

In Example 8, the subject matter of Examples 1-7 can optionally include that the instruction is a first instruction, and wherein the power control circuitry is to determine a first value of power consumption of the one or more cores to execute the workload with the first instruction, and determine a second value of power consumption of the one or more cores to execute the workload with a second instruction, the second value greater than the first value, and the execution circuitry is to initiate the execution of the workload with the second instruction to improve throughput of the processor in response to the second value satisfying a threshold.

In Example 9, the subject matter of Examples 1-8 can optionally include that the first instruction is a 256-bit Streaming Single Instruction, Multiple Data Extension instruction or an Advanced Vector Extension 512-bit instruction and the second instruction is a fifth generation Instruction Set Architecture instruction, the fifth generation Instruction Set Architecture instruction to perform a complex number arithmetic operation or a floating point operation.

In Example 10, the subject matter of Examples 1-9 can optionally include asset agent circuitry to provide a plurality of features including a first feature and a second feature based on a first license, the first feature associated with a first operating frequency of the one or more cores of the processor, the second feature associated with a second operating frequency of the uncore logic, initialize the one or more cores to operate at the first operating frequency, initialize the uncore logic to operate at the second operating frequency, and in response to obtaining a second license, activate at least one of (i) one of the one or more cores to operate at a third operating frequency or (ii) a portion of the uncore logic to operate at a fourth operating frequency.

In Example 11, the subject matter of Examples 1-10 can optionally include that the workload is a first workload, and the application ratio is based on a ratio of a first value of power consumption and a second value of power consumption, the first value corresponding to the first workload, the second value corresponding to a second workload.

In Example 12, the subject matter of Examples 1-11 can optionally include that the first workload is a networking workload for network function virtualization and the second workload is a power virus workload.

In Example 13, the subject matter of Examples 1-12 can optionally include that the processor is to implement at least one of a core server, a centralized unit, or a distributed unit, the at least one of the centralized unit or the distributed unit to implement a virtual radio access network.

Example 14 includes an apparatus to configure execution of a workload, the apparatus comprising means for determining an application ratio based on an instruction to be executed by one or more cores of a processor to execute the workload, and means for configuring, before the execution of the workload, at least one of (i) the one or more cores of the processor based on the application ratio or (ii) uncore logic of the processor based on the application ratio, and means for initiating the execution of the workload with the at least one of the one or more cores or the uncore logic.

In Example 15, the subject matter of Example 14 can optionally include that the means for configuring is to identify a first operating frequency of a first core of the one or more cores, the first operating frequency included in a first set of one or more operating frequencies associated with the application ratio, and identify a second operating frequency of the uncore logic, the second operating frequency included in a second set of one or more operating frequencies associated with the application ratio, the means for configuring to configure the at least one of (i) the one or more cores of the processor based on at least one of the first operating frequency or the second operating frequency or (ii) the uncore logic of the processor based on the at least one of the first operating frequency or the second operating frequency.

In Example 16, the subject matter of Examples 14-15 can optionally include that the means for configuring is to configure the at least one of the one or more cores of the processor or the uncore logic of the processor in response to a determination that a power consumption associated with the application ratio satisfies a threshold.

In Example 17, the subject matter of Examples 14-16 can optionally include that the means for configuring is to decrease a first operating frequency of the one or more cores to decrease a first power consumption associated with the one or more cores, and increase a second operating frequency of at least a portion of the uncore logic to increase a second power consumption associated with the at least the portion of the uncore logic, the increase of the second power consumption to increase throughput of the processor, the means for configuring to configure the at least one of the one or more cores of the processor or the uncore logic of the processor based on at least one of the decrease of the first operating frequency or the increase of the second operating frequency.

In Example 18, the subject matter of Examples 14-17 can optionally include that the means for configuring is to at least one of adjust a first operating frequency of the one or more cores to a second operating frequency, or adjust a third operating frequency of the uncore logic to a fourth operating frequency, at least one of the second operating frequency or the fourth operating frequency associated with the application ratio, the means for configuring to configure the at least one of the one or more cores of the processor or the uncore logic of the processor based on at least one of the adjustment of the first operating frequency to the second operating frequency or the adjustment of the third operating frequency to the fourth operating frequency.

In Example 19, the subject matter of Examples 14-18 can optionally include that the instruction is a first instruction, the workload is a first workload, the application ratio is a first application ratio, the one or more cores are one or more first cores, the uncore logic is first uncore logic, and wherein the means for determining is to determine a second application ratio based on a second instruction to be executed by one or more second cores of the processor to execute a second workload, the means for configuring is to configure, before execution of the second, at least one of (i) the one or more second cores of the processor based on the second application ratio or (ii) second uncore logic of the processor based on the second application ratio, and the means for executing is to initiate the execution of the second workload with the at least one of the one or more second cores or the second uncore logic, the one or more first cores to execute a first portion of the first workload while the one or more second cores execute a second portion of the second workload.

In Example 20, the subject matter of Examples 14-19 can optionally include that the application ratio is a first application ratio, and wherein the means for determining is to compare at least one of a latency of the processor to a latency threshold or a throughput of the processor to a throughput threshold, and the means for configuring is to in response to the respective one of the latency threshold or the throughput threshold being satisfied, adjust the first application ratio to a second application ratio, and configure the uncore logic based on the second application ratio to at least one of increase the throughput of the processor or reduce the latency of the processor.

In Example 21, the subject matter of Examples 14-20 can optionally include that the instruction is a first instruction, and wherein the means for determining is to determine a first value of power consumption of the one or more cores to execute the workload with the first instruction, and determine a second value of power consumption of the one or more cores to execute the workload with a second instruction, the second value greater than the first value, and the means for executing is to initiate the execution of the workload with the second instruction to improve throughput of the processor in response to the second value satisfying a threshold.

In Example 22, the subject matter of Examples 14-21 can optionally include that the first instruction is a 256-bit Streaming Single Instruction, Multiple Data Extension instruction or an Advanced Vector Extension 512-bit instruction and the second instruction is a fifth generation Instruction Set Architecture instruction, the fifth generation Instruction Set Architecture instruction to perform a complex number arithmetic operation or a floating point operation.

In Example 23, the subject matter of Examples 14-22 can optionally include means for activating a plurality of features including a first feature and a second feature based on a first license, the first feature associated with a first operating frequency of the one or more cores of the processor, the second feature associated with a second operating frequency of the uncore logic, the means for activating to initialize the one or more cores to operate at the first operating frequency, initialize the uncore logic to operate at the second operating frequency, and in response to obtaining a second license, activate at least one of (i) one of the one or more cores to operate at a third operating frequency or (ii) a portion of the uncore logic to operate at a fourth operating frequency.

In Example 24, the subject matter of Examples 14-23 can optionally include that the workload is a first workload, and the application ratio is based on a ratio of a first value of power consumption and a second value of power consumption, the first value corresponding to the first workload, the second value corresponding to a second workload.

In Example 25, the subject matter of Examples 14-24 can optionally include that the first workload is a networking workload for network function virtualization and the second workload is a power virus workload.

In Example 26, the subject matter of Examples 14-25 can optionally include that the processor is to implement at least one of a core server, a centralized unit, or a distributed unit, the at least one of the centralized unit or the distributed unit to implement a virtual radio access network.

Example 27 includes at least one computer readable medium comprising first instructions that, when executed, cause at least one processor to at least determine an application ratio based on a second instruction to be executed by one or more cores of the at least one processor to execute a workload, configure, before the execution of the workload, at least one of (i) the one or more cores of the at least one processor based on the application ratio or (ii) uncore logic of the at least one processor based on the application ratio, and execute the workload with the at least one of the one or more cores or the uncore logic.

In Example 28, the subject matter of Example 27 can optionally include that the first instructions, when executed, cause the at least one processor to identify a first operating frequency of a first core of the one or more cores, the first operating frequency included in a first set of one or more operating frequencies associated with the application ratio, and identify a second operating frequency of the uncore logic, the second operating frequency included in a second set of one or more operating frequencies associated with the application ratio.

In Example 29, the subject matter of Examples 27-28 can optionally include that the first instructions, when executed, cause the at least one processor to configure the at least one of the one or more cores of the at least one processor or the uncore logic of the at least one processor in response to a determination that a power consumption associated with the application ratio satisfies a threshold.

In Example 30, the subject matter of Examples 27-29 can optionally include that the first instructions, when executed, cause the at least one processor to decrease a first operating frequency of the one or more cores to decrease a first power consumption associated with the one or more cores, and increase a second operating frequency of at least a portion of the uncore logic to increase a second power consumption associated with the at least the portion of the uncore logic, the increase of the second power consumption to increase throughput of the at least one processor.

In Example 31, the subject matter of Examples 27-30 can optionally include that the first instructions, when executed, cause the at least one processor to at least one of adjust a first operating frequency of the one or more cores to a second operating frequency, or adjust a third operating frequency of the uncore logic to a fourth operating frequency, at least one of the second operating frequency or the fourth operating frequency associated with the application ratio.

In Example 32, the subject matter of Examples 27-31 can optionally include that the workload is a first workload, the application ratio is a first application ratio, the one or more cores are one or more first cores, the uncore logic is first uncore logic, and the first instructions, when executed, cause the at least one processor to determine a second application ratio based on a third instruction to be executed by one or more second cores of the at least one processor to execute a second workload, configure, before execution of the second, at least one of (i) the one or more second cores of the at least one processor based on the second application ratio or (ii) second uncore logic of the at least one processor based on the second application ratio, and execute the second workload with the at least one of the one or more second cores or the second uncore logic, the one or more first cores to execute a first portion of the first workload while the one or more second cores execute a second portion of the second workload.

In Example 33, the subject matter of Examples 27-32 can optionally include that the application ratio is a first application ratio, and the first instructions, when executed, cause the at least one processor to compare at least one of a latency of the at least one processor to a latency threshold or a throughput of the at least one processor to a throughput threshold, in response to the respective one of the latency threshold or the throughput threshold being satisfied, adjust the first application ratio to a second application ratio, and configure the uncore logic based on the second application ratio to at least one of increase the throughput of the at least one processor or reduce the latency of the at least one processor.

In Example 34, the subject matter of Examples 27-33 can optionally include that the first instructions, when executed, cause the at least one processor to determine a first value of power consumption of the one or more cores to execute the workload with the second instruction, determine a second value of power consumption of the one or more cores to execute the workload with a third instruction, the second value greater than the first value, and in response to the second value satisfying a threshold, execute the workload with the third instruction to improve throughput of the at least one processor.

In Example 35, the subject matter of Examples 27-34 can optionally include that the second instruction is a 256-bit Streaming Single Instruction, Multiple Data Extension instruction or an Advanced Vector Extension 512-bit instruction and the third instruction is a fifth generation Instruction Set Architecture instruction, the fifth generation Instruction Set Architecture instruction to perform a complex number arithmetic operation or a floating point operation.

In Example 36, the subject matter of Examples 27-35 can optionally include that the first instructions, when executed, cause the at least one processor to identify one or more of a plurality of features associated with the at least one processor, the plurality of the features including a first feature and a second feature based on a first license, the first feature associated with a first operating frequency of the one or more cores of the at least one processor, the second feature associated with a second operating frequency of the uncore logic, initialize the one or more cores to operate at the first operating frequency, initialize the uncore logic to operate at the second operating frequency, and in response to obtaining a second license, activate at least one of (i) one of the one or more cores to operate at a third operating frequency or (ii) a portion of the uncore logic to operate at a fourth operating frequency.

In Example 37, the subject matter of Examples 27-36 can optionally include that the workload is a first workload, and the first instructions, when executed, cause the at least one processor to determine the application ratio based on a ratio of a first value of power consumption and a second value of power consumption, the first value corresponding to the first workload, the second value corresponding to a second workload.

In Example 38, the subject matter of Examples 27-37 can optionally include that the first workload is a networking workload for network function virtualization and the second workload is a power virus workload.

In Example 39, the subject matter of Examples 27-38 can optionally include that the first instructions, when executed, cause the at least one processor to implement at least one of a core server, a centralized unit, or a distributed unit, the at least one of the centralized unit or the distributed unit to implement a virtual radio access network.

Example 40 includes an apparatus to configure execution of a workload, the apparatus comprising at least one memory, and at least one processor to execute first instructions to at least determine an application ratio based on a second instruction to be executed by one or more cores of the at least one processor to execute a workload, configure, before the execution of the workload, at least one of (i) the one or more cores of the at least one processor based on the application ratio or (ii) uncore logic of the at least one processor based on the application ratio, and execute the workload with the at least one of the one or more cores or the uncore logic.

In Example 41, the subject matter of Example 40 can optionally include that the at least one processor is to identify a first operating frequency of a first core of the one or more cores, the first operating frequency included in a first set of one or more operating frequencies associated with the application ratio, and identify a second operating frequency of the uncore logic, the second operating frequency included in a second set of one or more operating frequencies associated with the application ratio.

In Example 42, the subject matter of Examples 40-41 can optionally include that the at least one processor is to configure the at least one of the one or more cores of the at least one processor or the uncore logic of the at least one processor in response to a determination that a power consumption associated with the application ratio satisfies a threshold.

In Example 43, the subject matter of Examples 40-42 can optionally include that the at least one processor is to decrease a first operating frequency of the one or more cores to decrease a first power consumption associated with the one or more cores, and increase a second operating frequency of at least a portion of the uncore logic to increase a second power consumption associated with the at least the portion of the uncore logic, the increase of the second power consumption to increase throughput of the at least one processor.

In Example 44, the subject matter of Examples 40-43 can optionally include that the at least one processor is to at least one of adjust a first operating frequency of the one or more cores to a second operating frequency, or adjust a third operating frequency of the uncore logic to a fourth operating frequency, at least one of the second operating frequency or the fourth operating frequency associated with the application ratio.

In Example 45, the subject matter of Examples 40-44 can optionally include that the workload is a first workload, the application ratio is a first application ratio, the one or more cores are one or more first cores, the uncore logic is first uncore logic, and the at least one processor is to determine a second application ratio based on a third instruction to be executed by one or more second cores of the at least one processor to execute a second workload, configure, before execution of the second, at least one of (i) the one or more second cores of the at least one processor based on the second application ratio or (ii) second uncore logic of the at least one processor based on the second application ratio, and execute the second workload with the at least one of the one or more second cores or the second uncore logic, the one or more first cores to execute a first portion of the first workload while the one or more second cores execute a second portion of the second workload.

In Example 46, the subject matter of Examples 40-45 can optionally include that the application ratio is a first application ratio, and the at least one processor is to compare at least one of a latency of the at least one processor to a latency threshold or a throughput of the at least one processor to a throughput threshold, in response to the respective one of the latency threshold or the throughput threshold being satisfied, adjust the first application ratio to a second application ratio, and configure the uncore logic based on the second application ratio to at least one of increase the throughput of the at least one processor or reduce the latency of the at least one processor.

In Example 47, the subject matter of Examples 40-46 can optionally include that the at least one processor is to determine a first value of power consumption of the one or more cores to execute the workload with the second instruction, determine a second value of power consumption of the one or more cores to execute the workload with a third instruction, the second value greater than the first value, and in response to the second value satisfying a threshold, execute the workload with the third instruction to improve throughput of the at least one processor.

In Example 48, the subject matter of Examples 40-47 can optionally include that the second instruction is a 256-bit Streaming Single Instruction, Multiple Data Extension instruction or an Advanced Vector Extension 512-bit instruction and the third instruction is a fifth generation Instruction Set Architecture instruction, the fifth generation Instruction Set Architecture instruction to perform a complex number arithmetic operation or a floating point operation.

In Example 49, the subject matter of Examples 40-48 can optionally include that the at least one processor is to identify one or more of a plurality of features associated with the at least one processor, the plurality of the features including a first feature and a second feature based on a first license, the first feature associated with a first operating frequency of the one or more cores of the at least one processor, the second feature associated with a second operating frequency of the uncore logic, initialize the one or more cores to operate at the first operating frequency, initialize the uncore logic to operate at the second operating frequency, and in response to obtaining a second license, activate at least one of (i) one of the one or more cores to operate at a third operating frequency or (ii) a portion of the uncore logic to operate at a fourth operating frequency.

In Example 50, the subject matter of Examples 40-49 can optionally include that the workload is a first workload, and the at least one processor is to determine the application ratio based on a ratio of a first value of power consumption and a second value of power consumption, the first value corresponding to the first workload, the second value corresponding to a second workload.

In Example 51, the subject matter of Examples 40-50 can optionally include that the first workload is a networking workload for network function virtualization and the second workload is a power virus workload.

In Example 52, the subject matter of Examples 40-51 can optionally include that the at least one processor is to implement at least one of a core server, a centralized unit, or a distributed unit, the at least one of the centralized unit or the distributed unit to implement a virtual radio access network.

Example 53 includes a method to configure execution of a workload, the method comprising determining an application ratio based on an instruction to be executed by one or more cores of a processor to execute a workload, configuring, before the execution of the workload, at least one of (i) the one or more cores of the processor based on the application ratio or (ii) uncore logic of the processor based on the application ratio, and executing the workload with the at least one of the one or more cores or the uncore logic.

In Example 54, the subject matter of Example 53 can optionally include that the configuring of the at least one of (i) the one or more cores of the processor or (ii) the uncore logic of the processor includes identifying a first operating frequency of a first core of the one or more cores, the first operating frequency included in a first set of one or more operating frequencies associated with the application ratio, and identifying a second operating frequency of the uncore logic, the second operating frequency included in a second set of one or more operating frequencies associated with the application ratio.

In Example 55, the subject matter of Examples 53-54 can optionally include that the configuring of the at least one of the one or more cores of the processor or the uncore logic of the processor is in response to determining that a power consumption associated with the application ratio satisfies a threshold.

In Example 56, the subject matter of Examples 53-55 can optionally include that the configuring of the at least one of the one or more cores of the processor or the uncore logic of the processor includes decreasing a first operating frequency of the one or more cores to decrease a first power consumption associated with the one or more cores, and increasing a second operating frequency of at least a portion of the uncore logic to increase a second power consumption associated with the at least the portion of the uncore logic, the increase of the second power consumption to increase throughput of the processor.

In Example 57, the subject matter of Examples 53-56 can optionally include that the configuring of the at least one of the one or more cores of the processor or the uncore logic of the processor includes at least one of adjusting a first operating frequency of the one or more cores to a second operating frequency, or adjusting a third operating frequency of the uncore logic to a fourth operating frequency, at least one of the second operating frequency or the fourth operating frequency associated with the application ratio.

In Example 58, the subject matter of Examples 53-57 can optionally include that the instruction is a first instruction, the workload is a first workload, the application ratio is a first application ratio, the one or more cores are one or more first cores, the uncore logic is first uncore logic, and further including determining a second application ratio based on a second instruction to be executed by one or more second cores of the processor to execute a second workload, configuring, before execution of the second, at least one of (i) the one or more second cores of the processor based on the second application ratio or (ii) second uncore logic of the processor based on the second application ratio, and executing the second workload with the at least one of the one or more second cores or the second uncore logic, the one or more first cores to execute a first portion of the first workload while the one or more second cores execute a second portion of the second workload.

In Example 59, the subject matter of Examples 53-58 can optionally include that the application ratio is a first application ratio, and further including comparing at least one of a latency of the processor to a latency threshold or a throughput of the processor to a throughput threshold, in response to the respective one of the latency threshold or the throughput threshold being satisfied, adjusting the first application ratio to a second application ratio, and configuring the uncore logic based on the second application ratio to at least one of increase the throughput of the processor or reduce the latency of the processor.

In Example 60, the subject matter of Examples 53-59 can optionally include that the instruction is a first instruction, and further including determining a first value of power consumption of the one or more cores to execute the workload with the first instruction, determining a second value of power consumption of the one or more cores to execute the workload with a second instruction, the second value greater than the first value, and in response to the second value satisfying a threshold, executing the workload with the second instruction to improve throughput of the processor.

In Example 61, the subject matter of Examples 53-60 can optionally include that the first instruction is a 256-bit Streaming Single Instruction, Multiple Data Extension instruction or an Advanced Vector Extension 512-bit instruction and the second instruction is a fifth generation Instruction Set Architecture instruction, the fifth generation Instruction Set Architecture instruction to perform a complex number arithmetic operation or a floating point operation.

In Example 62, the subject matter of Examples 53-61 can optionally include that the processor includes circuitry configurable to provide a plurality of features including a first feature and a second feature based on a first license, the first feature associated with a first operating frequency of the one or more cores of the processor, the second feature associated with a second operating frequency of the uncore logic, and the configuring of (i) the one or more cores of the processor or (ii) the uncore logic includes initializing the one or more cores to operate at the first operating frequency, initializing the uncore logic to operate at the second operating frequency, and in response to obtaining a second license, activating at least one of (i) one of the one or more cores to operate at a third operating frequency or (ii) a portion of the uncore logic to operate at a fourth operating frequency.

In Example 63, the subject matter of Examples 53-62 can optionally include that the workload is a first workload, and the application ratio is based on a ratio of a first value of power consumption and a second value of power consumption, the first value corresponding to the first workload, the second value corresponding to a second workload.

In Example 64, the subject matter of Examples 53-63 can optionally include that the first workload is a networking workload for network function virtualization and the second workload is a power virus workload.

In Example 65, the subject matter of Examples 53-64 can optionally include that the processor implements at least one of a core server, a centralized unit, or a distributed unit, the at least one of the centralized unit or the distributed unit to implement a virtual radio access network.

Example 66 is at least one computer readable medium comprising instructions to perform the method of any of Examples 53-65.

Example 67 includes an apparatus comprising processor circuitry to perform the method of any of Examples 53-65.

Example 68 is a distributed unit comprising processor circuitry to perform any of Examples 53-65.

Example 69 is a centralized unit comprising processor circuitry to perform any of Examples 53-65.

Example 70 is an edge server comprising processor circuitry to perform any of Examples 53-65.

Example 71 is a core server comprising processor circuitry to perform any of Examples 53-65.

Example 72 is an apparatus comprising a graphics processing unit to perform any of Examples 53-65.

Example 73 is an apparatus comprising a vision processing unit to perform any of Examples 53-65.

Example 74 is an apparatus comprising a neural network processor to perform any of Examples 53-65.

Example 75 is an apparatus comprising a general purpose processor to perform any of Examples 53-65.

Example 76 includes a central processing unit (CPU), comprising a plurality of cores and a power control unit coupled to the plurality of cores, the power control unit configured to modify an operation of the plurality of cores on a per-core basis, based on an application ratio, to optimize performance for one or more workloads, in accordance with the techniques discussed herein.

In Example 77, the subject matter of Example 76 can optionally include that the modification of the operation of the plurality of cores includes adjusting a guaranteed operating frequency of one or more of the plurality of cores on a per-core basis.

In Example 78, the subject matter of Examples 76-77 can optionally include that the application ratio is a first application ratio, and the power control unit is configured to modify an operation of a plurality of uncore logic circuits on a per-uncore logic circuit basis, based on the first application ratio or a second application ratio, to at least one of improve throughput or reduce latency, in accordance with the techniques discussed herein.

In Example 79, the subject matter of Examples 76-78 can optionally include that the modification of the operation of the plurality of uncore logic circuits includes adjusting a guaranteed operating frequency of one or more of the plurality of uncore logic circuits on a per-uncore logic circuit basis.

In Example 80, the subject matter of Examples 76-79 can optionally include that the uncore logic includes at least one of a converged/common mesh stop (CMS), a mesh interface, or an input/output (I/O).

In Example 81, the subject matter of Examples 76-80 can optionally include that the plurality of uncore logic circuits includes a first uncore logic circuit, which includes at least one of a first CMS, a first mesh interface, or a first I/O, and the power control unit is to adjust a guaranteed operating frequency of the at least one of the first CMS, the first mesh interface, or the first I/O to modify the operation of the first uncore logic circuit.

In Example 82, the subject matter of Examples 76-81 can optionally include that the application ratio is a first application ratio, and the power control unit is configured to modify an operation of a plurality of CLM logic circuits on a per-CLM logic circuit basis, based on the first application ratio or a second application ratio, to at least one of improve throughput or reduce latency, in accordance with the techniques discussed herein.

In Example 83, the subject matter of Examples 76-82 can optionally include that the modification of the operation of the plurality of CLM logic circuits includes adjusting a guaranteed operating frequency of one or more of the plurality of CLM logic circuits on a per-CLM logic circuit basis.

In Example 84, the subject matter of Examples 76-83 can optionally include that the CLM logic includes at least one of a last level cache (LLC), a cache/home agent (CHA), a converged/common mesh stop (CMS), or an input/output (I/O) buffer.

In Example 85, the subject matter of Examples 76-84 can optionally include that the plurality of CLM logic circuits includes a first CLM logic circuit, which includes at least one of a first LLC, a first CHA, a first CMS, or a first I/O buffer, and the power control unit is to adjust a guaranteed operating frequency of the at least one of the first LLC, the first CHA, the first CMS, or the first I/O buffer to modify the operation of the first CLM logic circuit.

In Example 86, the subject matter of Examples 76-85 can optionally include that at least one of the first application or the second application ratio is based on at least one of (i) a network node location of the CPU, (ii) a latency requirement associated with the one or more workloads, (iii) a power dissipation or thermal design power requirement associated with the one or more workloads, or (iv) a throughput requirement associated with the one or more workloads.

In Example 87, the subject matter of Examples 76-86 can optionally include that the network node location is based on a terrestrial network or a non-terrestrial network.

In Example 88, the subject matter of Examples 76-87 can optionally include that the network node location corresponds to a backhaul, a midhaul, or a fronthaul of a 5G telecommunications network.

In Example 89, the subject matter of Examples 76-88 can optionally include that the network node location corresponds to whether the CPU implements a virtual radio access network (vRAN), such as a 5G vRAN centralized unit (5G vRAN-CU) or a 5G vRAN distributed unit (vRAN-DU), or a core server, such as a 5G core server.

In Example 90, the subject matter of Examples 76-89 can optionally include that the CPU is a fifth generation (5G) network optimized CPU.

In Example 91, the subject matter of Examples 76-90 can optionally include that the modification of the operation is based on a type of instruction to be loaded by the plurality of cores, the type of instruction being a 256-bit Streaming Single Instruction, Multiple Data (SIMD) Extension (SSE) instruction, an Advanced Vector Extension 512-bit instruction (AVX-512), or a fifth generation (5G) Instruction Set Architecture (ISA) instruction.

In Example 92, the subject matter of Examples 76-91 can optionally include that the 5G ISA instruction is a complex number arithmetic operation or a floating point operation.

In Example 93, the subject matter of Examples 76-92 can optionally include that at least one of the first application ratio or the second application is modified to a value either greater than 1.0 or less than 1.0.

In Example 94, the subject matter of Examples 76-93 can optionally include that the one or more workloads relate to wired or wireless networking workloads for network function virtualization, in accordance with types of the networking workloads discussed herein.

In Example 95, the subject matter of Examples 76-94 can optionally include a software defined silicon feature to control activation and use of the power control unit with the optimized performance for the one or more workloads, within a soft stock keeping unit (SKU) product.

In Example 96, the subject matter of Examples 76-95 can optionally include that the software defined silicon feature is to control activation and use of at least one of per-core control, per-uncore control, or per-CLM control by the power control unit.

In Example 97, the subject matter of Examples 76-96 can optionally include that the power control unit is provided with settings at time of manufacture, based on the first application ratio or the second application ratio, to optimize performance for the one or more workloads, within a hard stock keeping unit (SKU) product.

Example 98 includes a method of using a software defined silicon feature to control activation and use of a feature of the CPU of any one of Examples 76-97, to configure the power control unit to operate with the optimized performance for the one or more workloads.

Example 99 includes a method of operating the CPU of any one of Examples 76-97, comprising operations to optimize frequency and power usage for execution of the one or more workloads.

Example 100 includes a method of manufacturing the CPU of any one of Examples 76-97, the method of manufacturing configured to establish the values for the power and frequency control unit based on an estimated application ratio for the one or more workloads.

Example 101 includes a method of testing and validating performance of the CPU of any one of Examples 76-97, the testing and validating configured to verify operation of respective cores and other CPU ingredients to implement operational values from the power and frequency control unit, based on the estimated application ratio for the one or more workloads.

Example 102 includes an edge server, comprising a single socket hardware platform, configured to operate the CPU of any one of Examples 76-97.

Example 103 includes a core server, comprising a dual socket hardware platform, configured to operate the CPU of any one of Examples 76-97.

Example 104 includes a distributed unit, comprising a single socket hardware platform or a dual socket hardware platform, including the CPU of any one of Examples 76-97.

Example 105 includes the distributed unit of example 104, wherein the single socket hardware platform or the dual socket hardware platform implements a virtual radio access network.

Example 106 includes a centralized unit, comprising a single socket hardware platform or a dual socket hardware platform, including the CPU of any one of Examples 76-97.

Example 107 includes the centralized unit of example 106, wherein the single socket hardware platform or the dual socket hardware platform implements a virtual radio access network.

Example 108 includes an apparatus comprising decoder circuitry to decode a single instruction, the single instruction to include a field for an identifier of a first source operand, a field for an identifier of a second source operand, a field for an identifier of a destination operand, and a field for an opcode, the opcode to indicate execution circuitry is to execute a fifth-generation (5G) workload, and execution circuitry to execute the decoded instruction according to the opcode to execute the 5G workload.

In Example 109, the subject matter of Example 108 can optionally include that the decoder circuitry is to add the identified first source operand to the identified second source operand and store a result of the addition into the identified destination operand.

In Example 110, the subject matter of Examples 108-109 can optionally include that the field for the identifier of the first source operand is to identify a vector register.

In Example 111, the subject matter of Examples 108-110 can optionally include that the field for the identifier of the first source operand is to identify a memory location.

In Example 112, the subject matter of Examples 108-111 can optionally include that the instruction is an Advanced Vector Extensions (AVX) 512-bit instruction or a 5G-ISA instruction.

Example 113 is an artificial intelligence processor to perform any of Examples 53-65.

Example 114 is a machine learning processor to perform any of Examples 53-65.

Example 115 is a vector processor to perform any of Examples 53-65.

Example 116 is an electronic control unit to perform any of Examples 53-65.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
power control circuitry to:
    determine an application ratio of a first power consumption value to a second power consumption value, the first power consumption value corresponding to a first workload, the second power consumption value corresponding to a power virus workload; and
    configure, before execution of the first workload, at least one of (i) one or more cores of a processor circuit based on the application ratio or (ii) uncore logic of the processor circuit based on the application ratio; and
execution circuitry to initiate the execution of the first workload with the at least one of the one or more cores or the uncore logic.

2. The apparatus of claim 1, wherein the power control circuitry is to:
identify a first operating frequency of a first core of the one or more cores;
identify a second operating frequency of the uncore logic; and
configure the at least one of (i) the one or more cores of the processor circuit or (ii) the uncore logic of the processor circuit based on the at least one of the first operating frequency or the second operating frequency.

3. The apparatus of claim 1, wherein the power control circuitry is to configure the at least one of the one or more cores of the processor circuit or the uncore logic of the processor circuit based on a determination that a power consumption associated with the application ratio satisfies a threshold.

4. The apparatus of claim 1, wherein the power control circuitry is to:
decrease a first operating frequency of the one or more cores to decrease a first power consumption associated with the one or more cores; and
increase a second operating frequency of at least a portion of the uncore logic to increase a second power consumption associated with the at least the portion of the uncore logic, the increase of the second power consumption to increase throughput of the processor circuit.

5. The apparatus of claim 1, wherein the power control circuitry is to at least one of:
adjust a first operating frequency of the one or more cores to a second operating frequency; or
adjust a third operating frequency of the uncore logic to a fourth operating frequency.

6. The apparatus of claim 1, wherein the application ratio is a first application ratio, the one or more cores are one or more first cores, the uncore logic is first uncore logic, and:
the power control circuitry is to:
    determine a second application ratio associated with a second workload to be executed by one or more second cores of the processor circuit; and
    configure, before execution of the second workload, at least one of (i) the one or more second cores of the processor circuit based on the second application ratio or (ii) second uncore logic of the processor circuit based on the second application ratio; and the execution circuitry is to initiate the execution of the second workload with the at least one of the one or more second cores or the second uncore logic, the one or more first cores to execute a first portion of the first workload while the one or more second cores execute a second portion of the second workload.

7. The apparatus of claim 1, wherein the application ratio is a first application ratio, and the power control circuitry is to:
compare at least one of a latency of the processor circuit to a latency threshold or a throughput of the processor circuit to a throughput threshold;
based on the at least one of the latency threshold or the throughput threshold being satisfied, adjust the first application ratio to a second application ratio; and
configure the uncore logic based on the second application ratio to at least one of increase the throughput of the processor circuit or reduce the latency of the processor circuit.

8. The apparatus of claim 1, wherein:
the power control circuitry is to:
    determine the first power consumption value based on the execution of the first workload with a first instruction; and
    determine a second power consumption value based on the execution of the first workload with a second instruction, the second power consumption value greater than the first power consumption value; and
the execution circuitry is to initiate the execution of the first workload with the second instruction to improve throughput of the processor circuit based on the second power consumption value satisfying a threshold.

9. The apparatus of claim 8, wherein the first instruction is a 256-bit Streaming Single Instruction, Multiple Data Extension instruction or an Advanced Vector Extension 512-bit instruction and the second instruction is a fifth generation Instruction Set Architecture instruction, the fifth generation Instruction Set Architecture instruction to perform a complex number arithmetic operation or a floating point operation.

10. The apparatus of claim 1, including asset agent circuitry to:
provide a plurality of features including a first feature and a second feature based on a first license, the first feature associated with a first operating frequency of the one or more cores of the processor circuit, the second feature associated with a second operating frequency of the uncore logic;
initialize the one or more cores to operate at the first operating frequency;
initialize the uncore logic to operate at the second operating frequency; and
after obtaining a second license, activate at least one of (i) one of the one or more cores to operate at a third operating frequency or (ii) a portion of the uncore logic to operate at a fourth operating frequency.

11. The apparatus of claim 1, wherein the processor circuit is to implement at least one of a core server, a centralized unit, or a distributed unit, the at least one of the centralized unit or the distributed unit to implement a virtual radio access network.

12. An apparatus comprising:
means for determining an application ratio based on an instruction to be executed by one or more cores of a processor of a first power consumption value to a second power consumption value, the first power consumption value corresponding to a first workload, the second power consumption value corresponding to a power virus workload; and means for configuring, before execution of the first workload, at least one of (i) one or more cores of a processor circuit based on the application ratio or (ii) uncore logic of the processor circuit based on the application ratio; and means for initiating the execution of the first workload with the at least one of the one or more cores or the uncore logic.

13. The apparatus of claim 12, wherein the means for configuring is to:

identify a first operating frequency of a first core of the one or more cores;

identify a second operating frequency of the uncore logic; and configure the at least one of (i) the one or more cores of the processor circuit or (ii) the uncore logic of the processor circuit based on the at least one of the first operating frequency or the second operating frequency.

14. The apparatus of claim 12, wherein the means for configuring is to:

decrease a first operating frequency of the one or more cores to decrease a first power consumption associated with the one or more cores; and increase a second operating frequency of at least a portion of the uncore logic to increase a second power consumption associated with the at least the portion of the uncore logic, the increase of the second power consumption to increase throughput of the processor circuit.

15. The apparatus of claim 12, wherein the means for configuring is to at least one of:

adjust a first operating frequency of the one or more cores to a second operating frequency; or adjust a third operating frequency of the uncore logic to a fourth operating frequency.

16. At least one non-transitory computer readable medium comprising instructions to cause at least one processor circuit to at least:

determine an application ratio of a first power consumption value to a second power consumption value, the first power consumption value corresponding to a first workload, the second power consumption value corresponding to a power virus workload;

configure, before execution of the first workload, at least one of (i) one or more cores of the at least one processor circuit based on the application ratio or (ii) uncore logic of the at least one processor circuit based on the application ratio; and execute the first workload with the at least one of the one or more cores or the uncore logic.

17. The at least one non-transitory computer readable medium of claim 16, wherein the application ratio is a first application ratio, and the instructions are to cause the at least one processor circuit to:

compare at least one of a latency of the at least one processor circuit to a latency threshold or a throughput of the at least one processor circuit to a throughput threshold;

based on the at least one of the latency threshold or the throughput threshold being satisfied, adjust the first application ratio to a second application ratio; and configure the uncore logic based on the second application ratio to at least one of increase the throughput of the at least one processor circuit or reduce the latency of the at least one processor circuit.

18. The at least one non-transitory computer readable medium of claim 16, wherein the instructions are to cause the at least one processor circuit to:

determine the first power consumption value based on the execution of the first workload with a first instruction;

determine a second power consumption value based on the execution of the first workload with a second instruction, the second power consumption value greater than the first power consumption value; and based on the second power consumption value satisfying a threshold, execute the first workload with the second instruction to improve throughput of the at least one processor circuit.

19. The at least one non-transitory computer readable medium of claim 16, wherein the instructions are to cause the at least one processor circuit to:

identify one or more of a plurality of features associated with the at least one processor circuit, the plurality of the features including a first feature and a second feature based on a first license, the first feature associated with a first operating frequency of the one or more cores of the at least one processor circuit, the second feature associated with a second operating frequency of the uncore logic;

initialize the one or more cores to operate at the first operating frequency;

initialize the uncore logic to operate at the second operating frequency; and after obtaining a second license, activate at least one of (i) one of the one or more cores to operate at a third operating frequency or (ii) a portion of the uncore logic to operate at a fourth operating frequency.

20. An apparatus comprising:

interface circuitry;

machine-readable instructions; and at least one processor circuit to be programmed based on the machine-readable instructions to at least:

determine an application ratio of a first power consumption value to a second power consumption value, the first power consumption value corresponding to a first workload, the second power consumption value corresponding to a power virus workload;

configure, before execution of the first workload, at least one of (i) one or more cores of the at least one processor circuit based on the application ratio or (ii) uncore logic of the at least one processor circuit based on the application ratio; and execute the first workload with the at least one of the one or more cores or the uncore logic.

21. The apparatus of claim 20, wherein the application ratio is a first application ratio, the one or more cores are one or more first cores, the uncore logic is first uncore logic, and the at least one processor circuit is to:

determine a second application ratio associated with a second workload to be executed by one or more second cores of the at least one processor circuit;

configure, before execution of the second workload, at least one of (i) the one or more second cores of the at least one processor circuit based on the second application ratio or (ii) second uncore logic of the at least one processor circuit based on the second application ratio; and execute the second workload with the at least one of the one or more second cores or the second uncore logic, the one or more first cores to execute a first portion of the first workload while the one or more second cores execute a second portion of the second workload.

22. The apparatus of claim 20, wherein the application ratio is a first application ratio, and the at least one processor circuit is to:

compare at least one of a latency of the at least one processor circuit to a latency threshold or a throughput of the at least one processor circuit to a throughput threshold;

based on the at least one of the latency threshold or the throughput threshold being satisfied, adjust the first application ratio to a second application ratio; and configure the uncore logic based on the second application ratio to at least one of increase the throughput of the at least one processor circuit or reduce the latency of the at least one processor circuit.

23. The apparatus of claim 20, wherein the at least one processor circuit is to:

determine the first power consumption value based on the execution of the first workload with a first instruction;

determine a second power consumption value based on the execution of the first workload with a second instruction, the second power consumption value greater than the first power consumption value; and based on the second power consumption value satisfying a threshold, execute the first workload with the second instruction to improve throughput of the at least one processor circuit.

* * * * *